(12) United States Patent
Scheucher

(10) Patent No.: US 10,931,026 B2
(45) Date of Patent: Feb. 23, 2021

(54) PORTABLE BDA APPARATUS AND METHOD

(71) Applicant: Karl F. Scheucher, Waite Hill, OH (US)

(72) Inventor: Karl F. Scheucher, Waite Hill, OH (US)

(*) Notice: Subject to any disclaimer, the term of this patent is extended or adjusted under 35 U.S.C. 154(b) by 0 days.

(21) Appl. No.: 16/894,840

(22) Filed: Jun. 7, 2020

(65) Prior Publication Data
US 2020/0303829 A1    Sep. 24, 2020

Related U.S. Application Data

(63) Continuation of application No. 16/593,188, filed on Oct. 4, 2019, now Pat. No. 10,680,343, which is a continuation of application No. 16/166,415, filed on Oct. 22, 2018, now Pat. No. 10,439,295, which is a continuation of application No. 15/878,531, filed on Jan. 24, 2018, now Pat. No. 10,109,927, which is a continuation of application No. 15/622,871, filed on Jun. 14, 2017, now Pat. No. 9,905,933, which is a
(Continued)

(51) Int. Cl.
*H01Q 19/30*  (2006.01)
*H01Q 9/30*   (2006.01)

(52) U.S. Cl.
CPC ............. *H01Q 19/30* (2013.01); *H01Q 9/30* (2013.01)

(58) Field of Classification Search
CPC .... H04B 7/15507; H04B 7/2606; H04B 1/03; H04B 1/1027; H04B 7/15535; H04B 7/15564; H04B 17/102; H04B 17/18

USPC ..... 455/7, 11.1, 13.1, 16, 67.11, 67.13, 501, 455/562, 566, 570, 424; 370/243, 315, 370/247, 251, 252, 274
See application file for complete search history.

(56) References Cited

U.S. PATENT DOCUMENTS 5,285,500 A * 2/1994 Mantz ...................... H04B 1/20
                                                 381/120
5,568,537 A * 10/1996 Shechet ............... H04B 1/3877
                                                 455/571
(Continued)

*Primary Examiner* — Bobbak Safaipour

(57) ABSTRACT

An In-Building Communications system is disclosed which permits communication in tunnels, underground parking garages, tall buildings such as skyscrapers, buildings having thick walls of concrete or metal, and/or any building which has communication dead zones due to electromagnetic shielding. The invention includes a portable bi-directional amplifier (BDA) system, an outdoor antenna system attached to the building or independently mountable, an indoor antenna system attached to the building or independently mountable inside the building, and a standardized, In-Building Communications (IBC) interface box affixed preferably to the exterior of the building. The interface box communicates with antenna systems attached to the building. The fire department or other emergency response personnel carry portable outdoor and indoor antenna systems and a portable, lithium-ion battery powered, bi-directional amplifier (BDA) system which may be connected to the building during an event such as a fire, earthquake, or an act of terrorism or whenever radio coverage enhancement is required. The portable BDA system is simply connected to the standardized, IBC interface box and powered thus restoring communications within.

21 Claims, 79 Drawing Sheets

Related U.S. Application Data continuation of application No. 12/697,289, filed on Jan. 31, 2010, now Pat. No. 9,711,868.

(60) Provisional application No. 61/148,395, filed on Jan. 30, 2009.

(56) References Cited

U.S. PATENT DOCUMENTS

| | | | | |
|---|---|---|---|---|
| 7,157,882 | B2* | 1/2007 | Johnson | H02J 7/0026 320/134 |
| 7,176,654 | B2* | 2/2007 | Meyer | H02J 7/0047 320/110 |
| 7,253,585 | B2* | 8/2007 | Johnson | H02J 7/0044 320/112 |
| 7,551,938 | B1* | 6/2009 | Stein | H04B 7/2606 455/515 |
| 9,711,868 | B2* | 7/2017 | Scheucher | H04B 7/15557 |
| 9,905,933 | B2* | 2/2018 | Scheucher | H01Q 19/30 |
| 10,109,927 | B2* | 10/2018 | Scheucher | H01Q 19/30 |
| 10,439,295 | B2* | 10/2019 | Scheucher | H01Q 9/30 |
| 10,778,332 | B2* | 9/2020 | Ashrafi | H04B 10/2581 |
| 2001/0016490 | A1* | 8/2001 | Martin-Leon | H04W 16/18 455/424 |
| 2004/0166802 | A1* | 8/2004 | McKay, Sr. | H04B 7/1555 455/15 |
| 2006/0105705 | A1* | 5/2006 | Maca | H04B 7/155 455/11.1 |
| 2006/0139230 | A1* | 6/2006 | Shirosaka | H01Q 21/062 343/817 |
| 2006/0273965 | A1* | 12/2006 | Gat | H04B 1/707 343/711 |
| 2007/0099667 | A1* | 5/2007 | Graham | H01Q 13/203 455/562.1 |
| 2007/0188130 | A1* | 8/2007 | Scheucher | H01M 10/441 320/110 |
| 2007/0268846 | A1* | 11/2007 | Proctor, Jr. | H04B 7/15535 370/279 |
| 2008/0008933 | A1* | 1/2008 | Lampe-Onnerud | H01M 4/485 429/156 |
| 2008/0061122 | A1* | 3/2008 | Klein | H04W 24/02 235/375 |
| 2008/0213652 | A1* | 9/2008 | Scheucher | H01M 10/615 429/62 |
| 2008/0261520 | A1* | 10/2008 | Bassiri | H04W 16/26 455/7 |
| 2008/0299899 | A1* | 12/2008 | Wolfe | H04B 1/3805 455/15 |
| 2009/0029193 | A1* | 1/2009 | Onnerud | H01M 2/345 429/7 |
| 2009/0086043 | A1* | 4/2009 | Scheucher | H02J 7/0063 348/211.4 |
| 2009/0181296 | A1* | 7/2009 | Lampe-Onnerud | H01M 10/425 429/160 |
| 2010/0127927 | A1* | 5/2010 | Rousset | G01S 5/0009 342/465 |
| 2010/0285736 | A1* | 11/2010 | Gore | H04L 27/2607 455/7 |
| 2010/0295751 | A1* | 11/2010 | Sheers | H01Q 1/10 343/901 |
| 2012/0208451 | A1* | 8/2012 | Mohammadian | H01Q 25/005 455/7 |
| 2018/0151960 | A1* | 5/2018 | Scheucher | H04B 7/15557 |
| 2019/0058495 | A1* | 2/2019 | Myers | H04B 1/00 |
| 2020/0275517 | A1* | 8/2020 | Ashrafi | H04B 7/0871 |

* cited by examiner

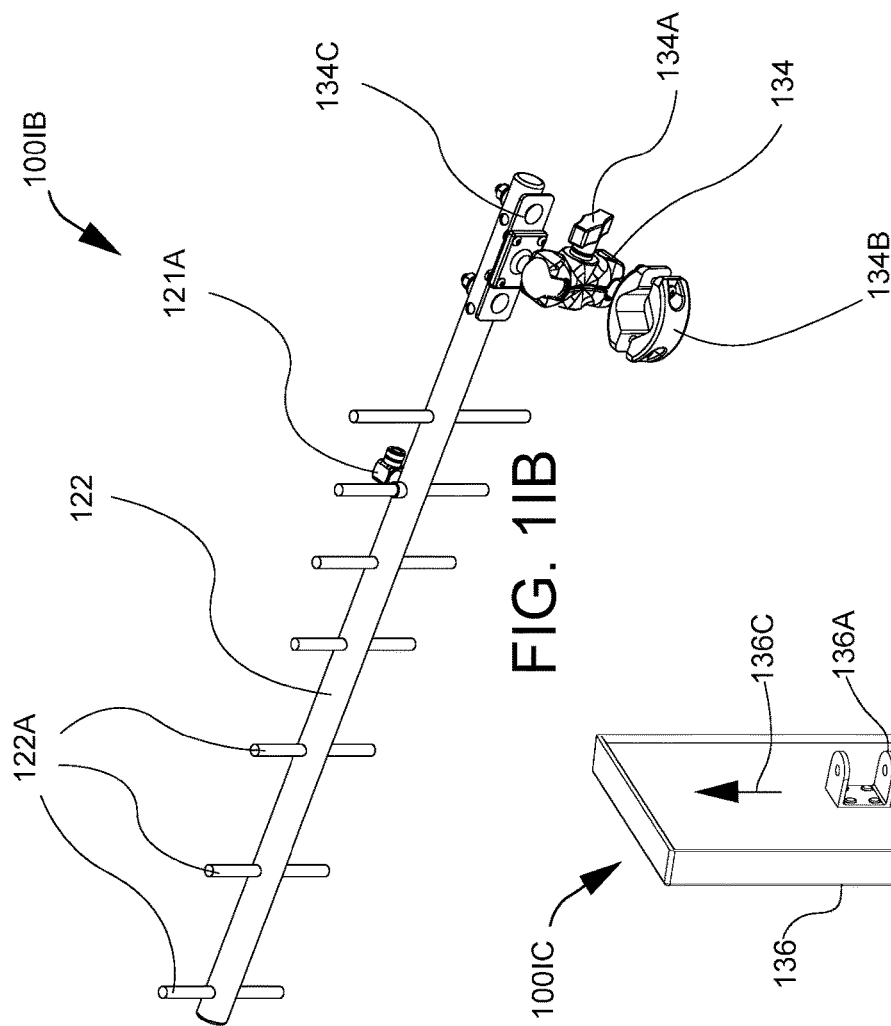
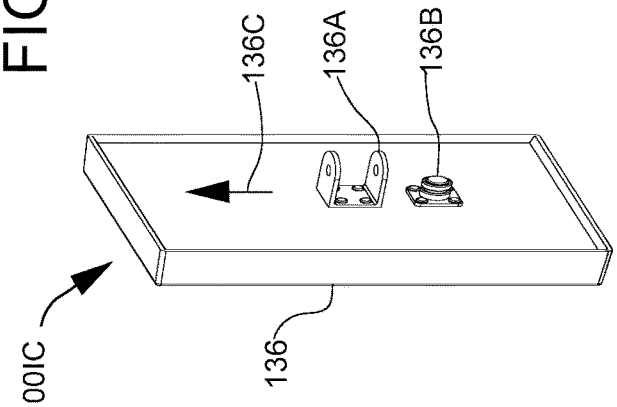
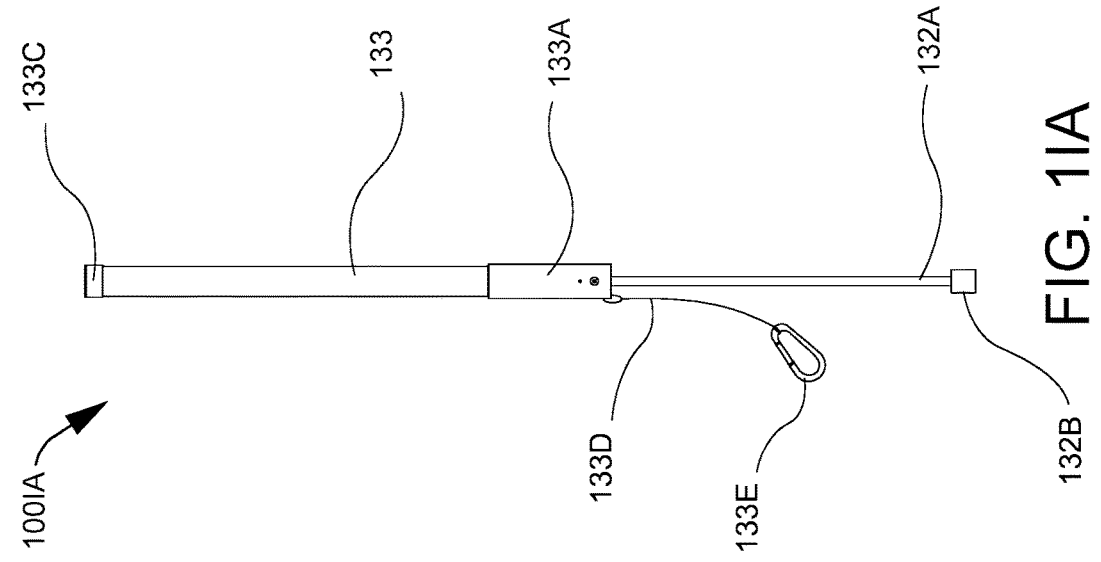

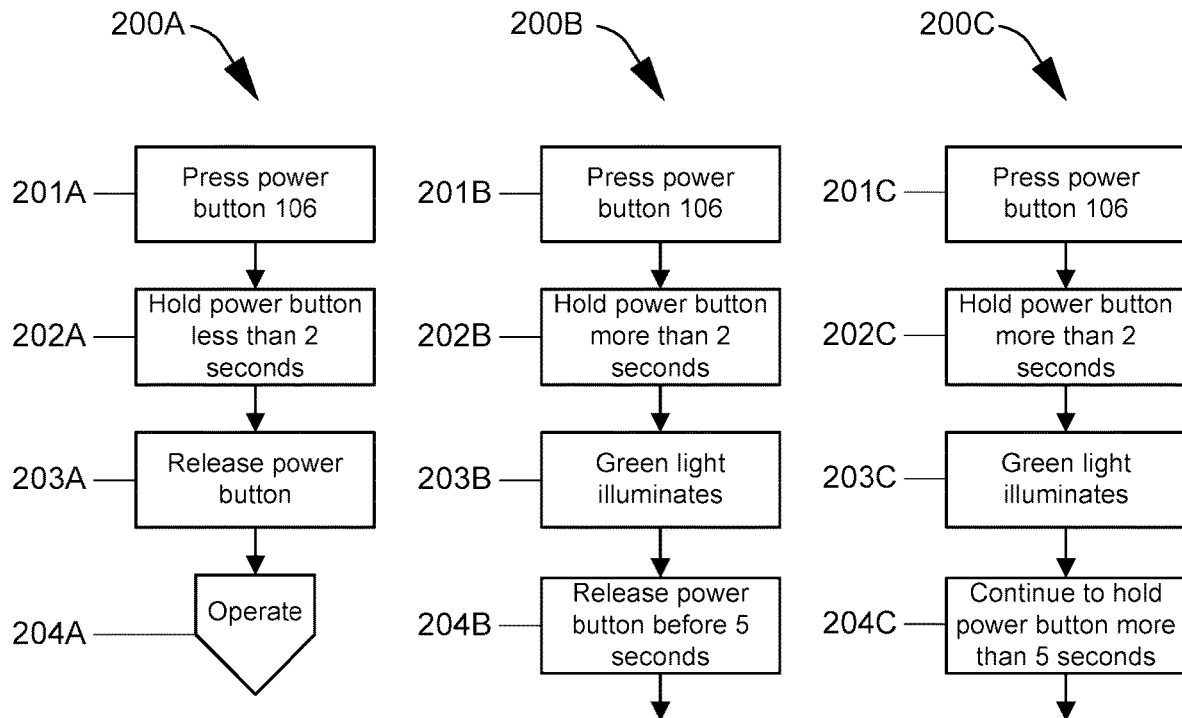
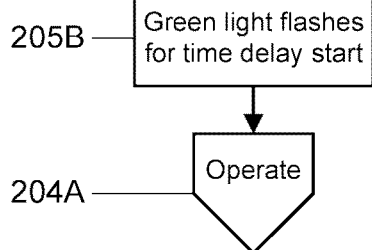
FIG. 2A
FIG. 2B
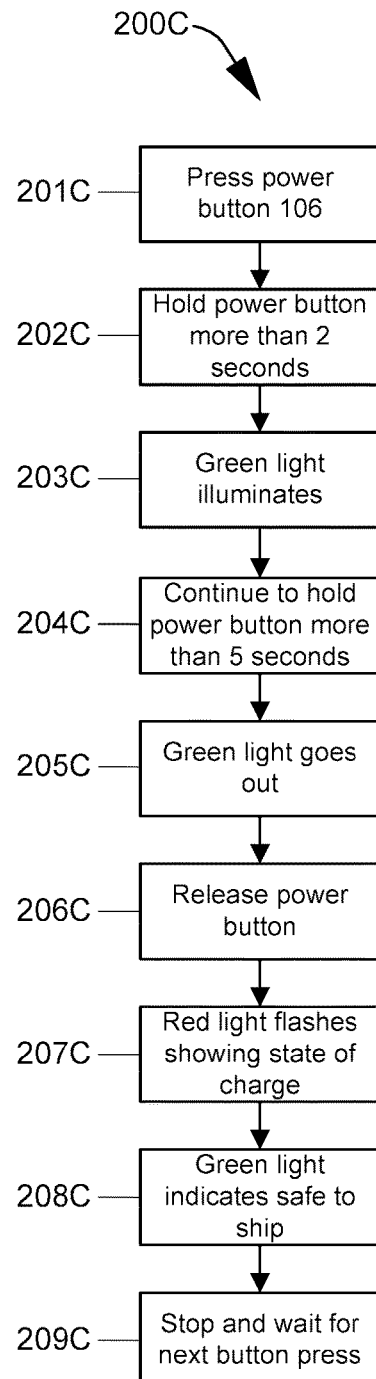
FIG. 2C

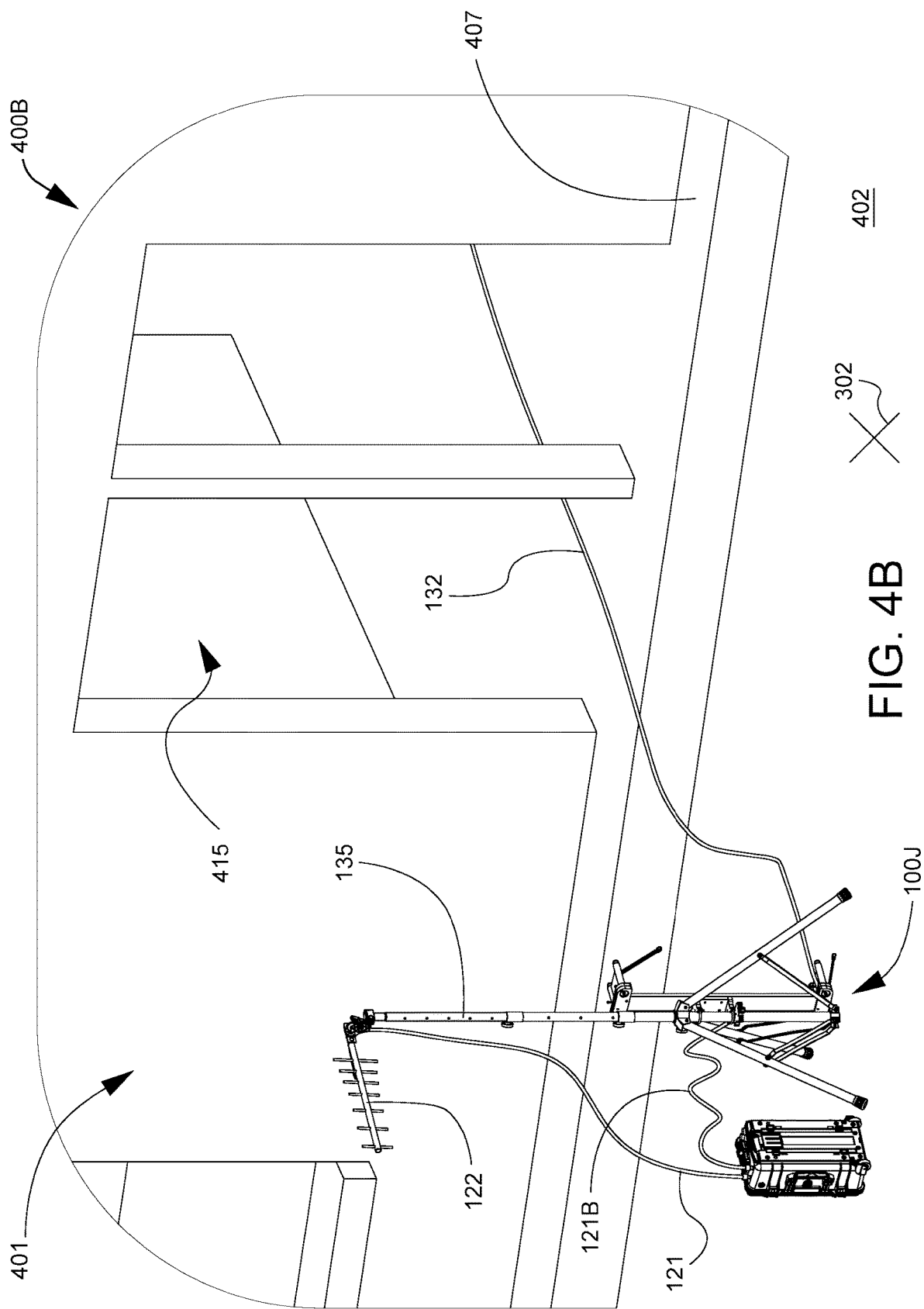

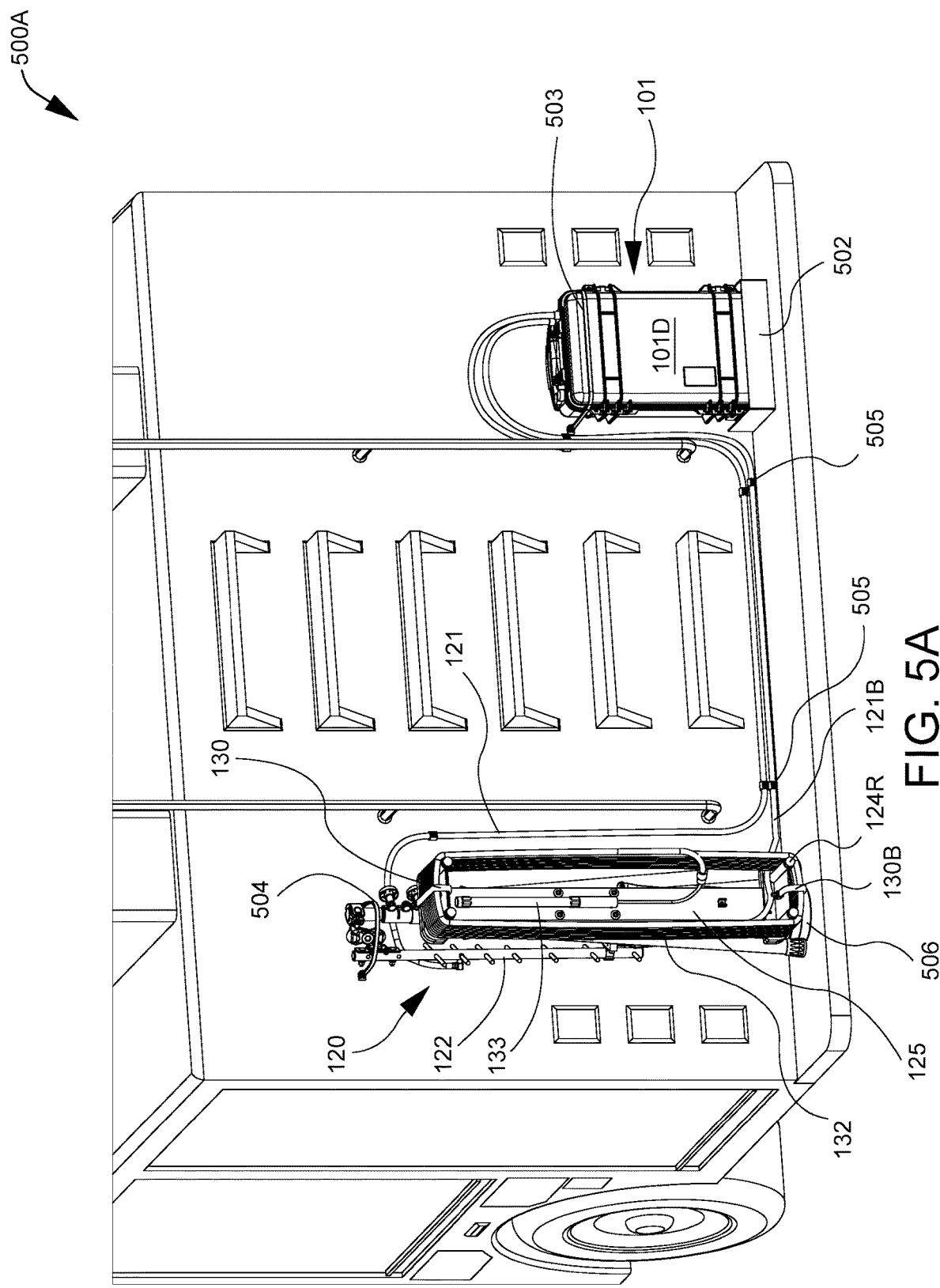

| Strategy | | Relative Investment | | Configuration | | | |
|---|---|---|---|---|---|---|---|
| # | Description | First Responders | Premise | # | Outdoor Antenna | Amplifier | Indoor Antenna |
| 0 | No Treatment | 0 | 0 | 0 | None | None | None |
| 1 | First reponders equip with *portable system* | 1 to 2 | 0 | 1 | Portable | None | Portable |
| | | | | 2 | Portable | Portable | Portable |
| 2 | First responders with *portable system*, building installs antenna subsystems *using* standard building interface | 1 to 2 | 0.3 to 0.5 | 3 | Built-In | None | Built-In |
| | | | | 4 | Portable | None | Built-In |
| | | | | 5 | Built-In | None | Portable |
| | | | | 6 | Built-In | Portable | Built-In |
| | | | | 7 | Portable | Portable | Built-In |
| | | | | 8 | Built-In | Portable | Portable |
| 3 | First responders with *portable system*, building installs antenna subsystems, signal booster, backup power, and alarm system using standard building interface | 1 to 2 | 3 to 10 | 9 | Built-In | Built-In | Built-In |
| | | | | 10 | Portable | Built-In | Built-In |
| | | | | 11 | Built-In | Built-In | Portable |
| | | | | 12 | Portable | Built-In | Portable |
| | | | | 13 | Built-In | Portable | Built-In |
| | | | | 14 | Portable | Built-In | Portable |
| | | | | 15 | Built-In | Portable | Portable |

FIG. 7

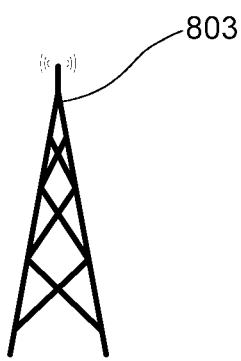
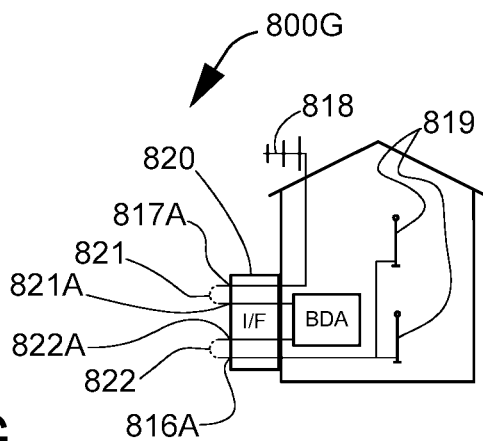
FIG. 8G
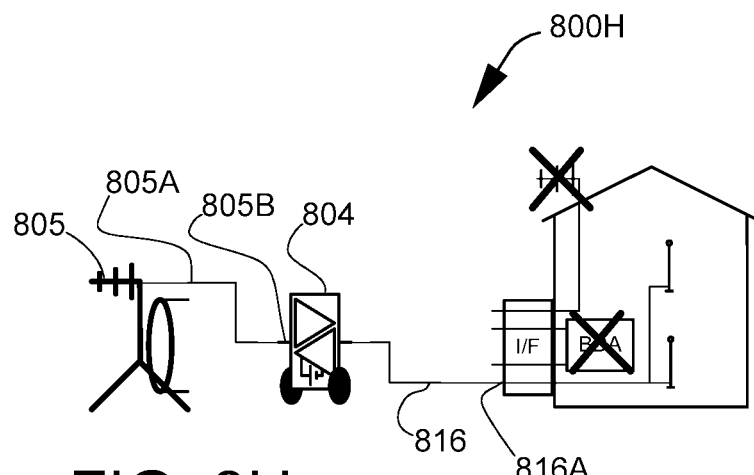
FIG. 8H
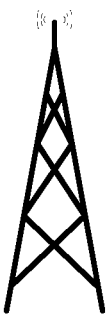
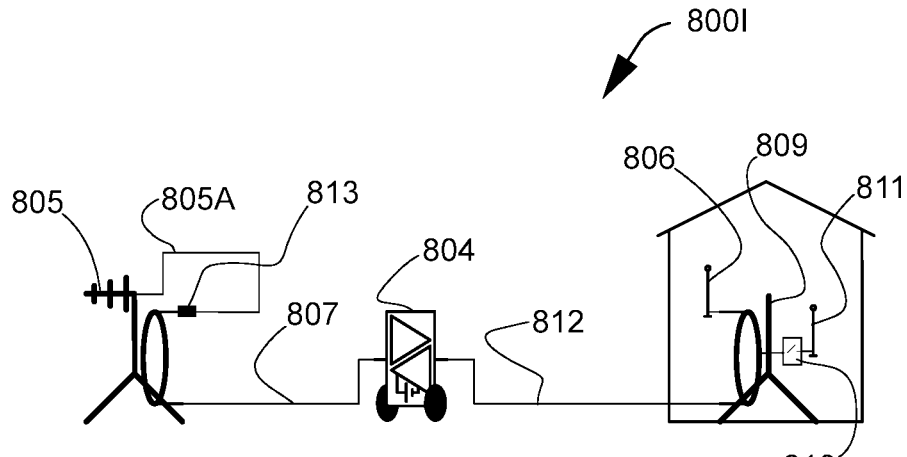
FIG. 8I

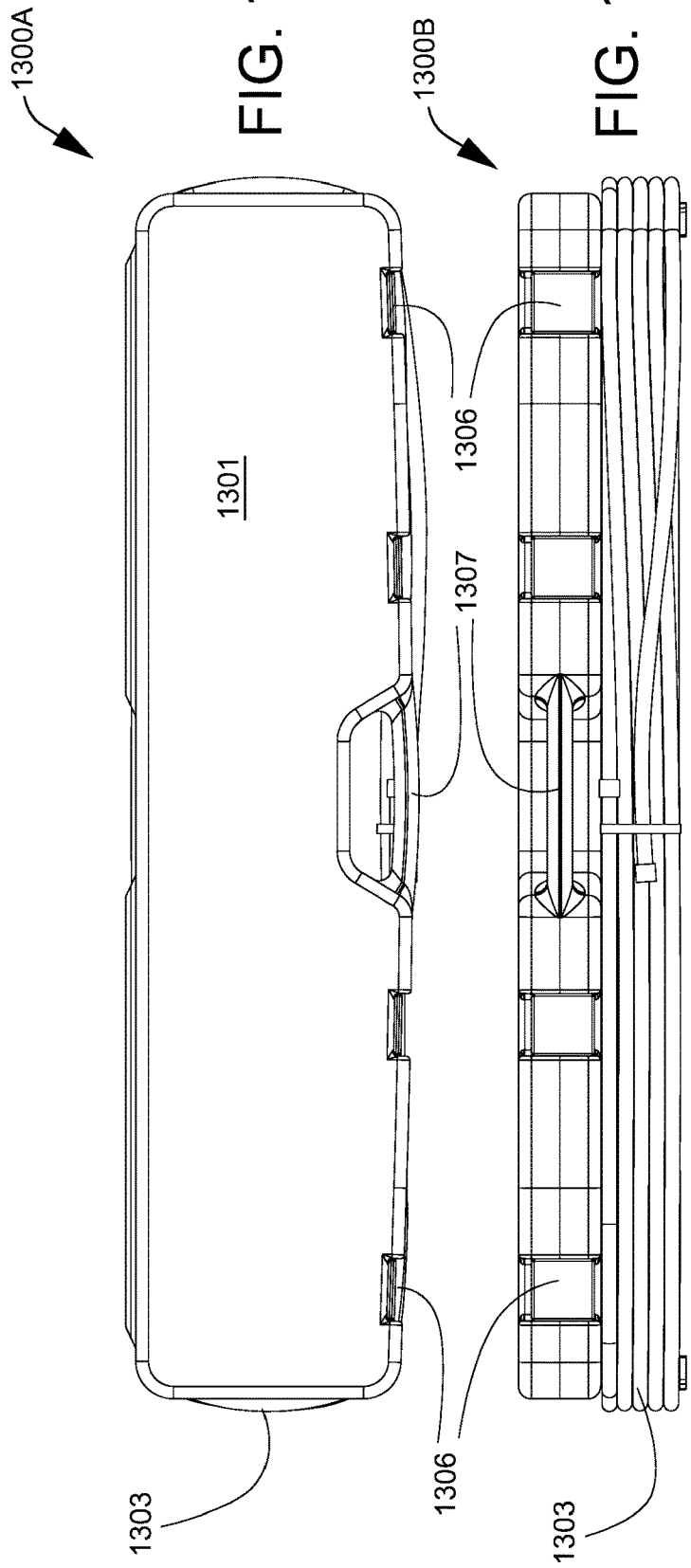
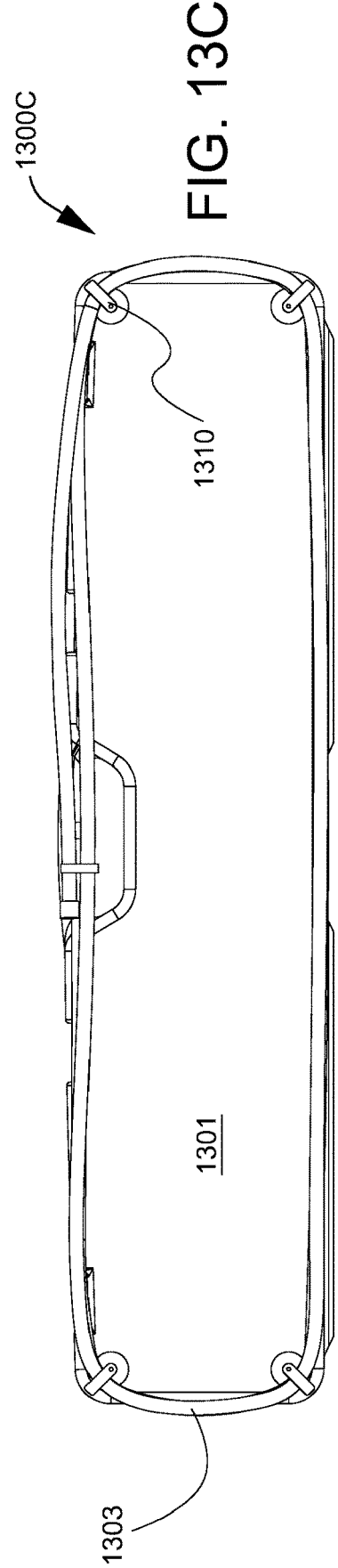
FIG. 13A
FIG. 13B
FIG. 13C

PORTABLE BDA APPARATUS AND METHOD

This application incorporates herein by reference hereto U.S. utility patent application Ser. No. 11/672,853, filed Feb. 8, 2007. This application claims the benefit of the filing date of provisional application Ser. No. 61/148,395, filed Jan. 30, 2009 and the contents of provisional application No. 61/148,395 and application Ser. No. 11/672,853, are both expressly hereby incorporated by reference.

FIELD OF THE INVENTION

The invention relates to In-Building Communications (IBC) systems, distributed antenna systems (DAS), public safety communication systems, and emergency communication systems with portable, uninterruptible, hot swappable power systems.

BACKGROUND OF THE INVENTION

Problems with In-Building Communication are described in the Phoenix Fire Department Radio System Safety Project, Final Report, Version 1.7, dated Oct. 8, 2004, which is hereby expressly incorporated by reference and in the National Public Safety Telecommunications Council, NPSTC, Best Practices for In-Building Communications, dated Nov. 12, 2007, which is hereby expressly incorporated by reference.

During an emergency, fire department communications depend on land mobile radio systems. Land mobile radio systems are allowed to operate in portions of the radio spectrum under rules administered by the FCC. Portions of the spectrum are divided into bands where land mobile radio systems operate with frequencies in the 30 MHz (VHF low), 150 MHz (VHF high), 450 MHz (UHF), 700 MHz, and 800 MHz bands. Fire department communication systems may also use 154,280 (MHz) as this frequency is designated by the FCC as a mutual-aid radio channel. The bandwidth of radio channels, the amount of radio spectrum used by the signal transmitted by the radio, is set by the FCC to include a maximum and a minimum bandwidth for channels in each frequency band. A frequency number indicates the center of each radio channel with half of the bandwidth located on each side of the center.

Based on the limited radio spectrum, permitted bandwidth has been decreasing. Previously, channel bandwidths were 25 kHz. Newer rules require reducing bandwidths to 12.5 kHz. As the bandwidth has become more crowded, there is increasing difficulty to ensure quality reception. The reduced bandwidth means reduced energy to canrry the same amount of information over the same distance increasing the challenge of reliable communications. The 800 MHz band is typically considered to have reduced naturally occurring interference. However, the large number of cellular phone company and other spectrum users has led to increasing man-made interference in the 800 MHz band.

During land mobile radio communications, a radio signal is sent from a transmitter to a receiver starting when the transmitter generates electromagnetic energy. This electromagnetic energy is converted by an antenna into electromagnetic waves. One type of electromagnetic radiation used in communication is commonly referred to as radio waves or radio signals. Radio waves sent outward from the antenna of the transmitter to the antenna of a receiver are considered downlink transmissions. The antenna of the receiver converts the electromagnetic waves back into energy, which is directed through a transmission line to a receiver. Radio waves then sent from the receiver to the original transmitter are considered uplink transmissions. When both the uplink and downlink transmissions are transmitted on the same frequency, it is considered simplex communication. Typically, one radio user may communicate directly with another radio user using simplex communications. In duplex mode of operation, when a radio user transmits a message, the message is received by a tower, which then retransmits the radio signal to other portable radio users. In half duplex operation or repeated radio communication, two radio frequencies are used for communication. The transmitting radio transmits on a first frequency to a repeater. The repeater then repeats the transmission on a frequency 2 and the signal is received by the receiving radio. Line-of-Sight (LOS) describes an unobstructed free-space link from a source antenna to a receiving antenna.

Variations in the signal level at the receiver may be due to manmade sources or natural structures including multipath interference, internal noise in the electronic circuit, structures blocking or obstructing pathway of the radio waves, natural noise, near-far interference, intermodulation interference, receiver desensitization interference, or receiver overload.

Typically, one of the most important factors for effective radio coverage is the location and orientation of the antenna to provide a direct path between the transmitter and the receiver. Important properties of the antenna include operating frequency, polarization, and radiation pattern. Optimizing these properties of the antenna in the desired range may provide improved radio coverage in desired areas and reduce interference in undesired directions. In particular, a directional antenna such as a Yagi antenna or a panel antenna may be used to provide a signal with increased gain near the front of the antenna and a weaker signal from the back.

In typical fire service operation, portable handheld radios powered with rechargeable or replaceable battery packs are used to communicate with base station radios, which may be powered by AC utility power. Mobile radios are designed for use in vehicles and may be powered from the vehicle's electrical system. Repeaters are capable of transmitting and receiving signals at the same time and can be used to extend the coverage of portable or mobile radios. Analog radios use frequency modulation to transmit a signal directly correlated to the microphone audio. Digital radios may also be used which have better spectrum efficiency than analog radios and have increased radio reception range in weak signal conditions relative to analog radios.

The Association of Public Safety Communications Officers (APCO) developed P25 as the standard in digital radio communications in preparation for the move to digital technology. While P25 was intended to serve as a common digital language for the radios and system infrastructures, system manufacturers developed proprietary features resulting in a loss of interoperability. Further, due to difficulty of digital radios to distinguish between high background noise levels and spoken voice data has led to P25 digital portable radios not being recommended for fire-fighting applications when an SCBA facepiece is being used. Analog modulation is preferred for situations where an SCBA (Self Contained Breathing Apparatus) facepiece is used, while law enforcement operations and emergency medical incidents and support functions by the fire department are likely to utilize digital radio technology. As a result of these different functional needs and preferences among the different personnel arriving at the scene of an emergency, different choices in radio equipment has been made increasing concerns over interoperability between different agencies using different models and radios from different manufacturers at the scene of a single event.

Free-space loss (FSL) is the loss in signal strength of an electromagnetic wave that results from a line-of-sight path through free space, which assumes no obstacles in the path to cause reflection or diffraction. The FSL is proportional to the square of the distance between the transmitter and receiver and also inversely proportional to the square of the wavelength and proportional to the square of the frequency. Other factors like the gain of antennas used by the transmitter or receiver or the loss associated with hardware imperfections are typically not considered in the FSL calculation.

The equation for FSL is as follows:

$$FSL=(4\pi d/\lambda)^2$$

$$FSL=(4\pi df/c)^2$$

where $\lambda$ is the signal wavelength in meters;
f is the signal frequency in hertz;
d is the distance from the transmitter; and
c is the speed of light in a vacuum, $2.99792458 \times 10^8$ meters per second.

FSL may also be expressed in terms of decibel (dB).

$$FSL(dB)=10\ \log_{10}(((4\pi/c)df)^2))$$

In radio applications, using f, in units of MHz and d in units of km provides the following relationship.

$$FSL(dB)=20\ \log_{10}(d)+20\ \log_{10}(f)+32.45$$

As the electromagnetic energy in the radio wave spreads out over free space there is a reduction in power of the signal. This is shown by the following equation.

$$S=P_t(1/(4\pi d^2))$$

where:
S is the power per unit area or power spatial density (in Watts per meter squared) at distance, d, and $P_t$ is the total power transmitted (in Watts).

The receiving antenna's aperture is a measure of how well an antenna can pick up power from an incoming electromagnetic wave. This relationship for an isotropic antenna is shown in the following equation:

$$P_r=S\lambda^2/4\pi$$

where $P_r$ is the received power. The total loss is given by the following equation:

$$FSL=P_t/P_r$$

Additionally, as the radio wave travels from the transmitter to the receiver, different paths traveled by the electromagnetic waves before reaching the receiver may affect the signal quality. Objects in the path of the radio waves such as buildings, trees, or local terrain will reduce the strength of the waves by absorbing or interrupting the signal. The density, size, shape, and type of material obstructing the path of the waves will determine if the waves are reduced, blocked, absorbed, or reflected before reaching the receiver. The final engineered system should consider all the gains and losses in a specific structure to provide a more realistic expectation of coverage according to the following equation:

$$R\times P=T\times P+T\times G-T\times L-FSL-ML+R\times G-R\times L$$

where:
R×P=received power in dBm;
T×P=transmitter output power in dBm;
T×G=transmitter antenna gain in dBi;
T×L=transmitter losses (coax, connectors . . . ) in dB;
FSL=free space loss or path loss in dB;
ML=miscellaneous losses (fading, body loss, polarization mismatch, other losses);
R×G=receiver antenna gain in dBi;
R×L=receiver losses (coax, connectors) in dB.

In order for a radio user to communicate when they are in a building or other structure, the radio waves must be strong enough after traveling through space to penetrate the structure of the building. Increased distance from the communications tower where the radio waves are generated can lead to weakened radio signals making it difficult for the radio waves to provide coverage inside a building. In-building coverage level (the coverage of a radio system in the interior of a building) is affected by the type of materials used in the construction of the building as well as the distance from the radio tower. Generally, the heavier the construction materials, the higher the dB level needed for the radio waves to penetrate into the structure to provide in-building communication.

The National Public Safety Telecommunications Council (NPSTC) issued a Best Practices for In-Building Communications publication on Nov. 12, 2007 to provide reliable communications methods inside buildings, basements, stadiums, and tunnels. In this publication, the three primary methods for attaining In-Building Communication are: 1) utilizing additional antenna sites within a jurisdiction to increase signal level; 2) supplementing coverage in a specific building with a permanent system to boost the signal received and boost the signal transmitted to the outside; and 3) deploying a system on a temporary basis to boost coverage in a building for a specific incident scene.

Increasing signal strength with additional antenna sites is typically limited by the cost, spectrum availability, approval, as well as structural obstacles preventing certain building structures from receiving adequate signal necessary for in-Building Communication. Supplemental coverage in specific buildings may add additional expense for treating each building separately and these individual systems may create problematic interference. Most importantly, permanent building specific solutions may not be reliable during an actual event at the building location. For example, a building fire may damage these systems or the antenna or power lines essential for communications.

Deployable communications systems provide a practical approach to improving radio coverage and backup existing systems during an incident. Bi-directional amplifier communications systems are subject to oscillation when there is inadequate isolation (path loss) between the transmitting and receiving antenna. Because this type of oscillation can lead to serious interference disrupting other communications in the nearby area, it is illegal to operate a signal booster that oscillates and the FCC (FCC) may impose fines and confiscate equipment.

According to CFR 47 Section 90.7 of the FCC, a signal booster is

"a device at fixed location which automatically receives, amplifies, and retransmits on a one-way or two-way basis, the signals received from base, fixed, mobile, and portable stations, with no change in frequency or authorized bandwidth. A signal booster may be either narrow band (Class A), in which case the booster amplifies only those discrete frequencies intended to be retransmitted, or broadband (Class B), in which case all signals within the passband of the signal booster are amplified."

Under this designation, class A signal boosters are considered to be channelized amplifiers.

An RF amplifier that is able to select what frequencies are to be amplified in the downlink and uplink paths and increases the RF signal strength in both directions is known as a bi-directional amplifier.

Typically, the desired signal strength delivered to the facility is at least ~95 dBm through at least 95 percent of the facility in non-critical areas and 99% of the facility in critical areas such as fire control rooms and exit corridors. The in-building environment should be isolated from the outside of the building to prevent detrimental oscillations. Typically, 15 dB more than the gain of the deployable communication system booster is an appropriate amount of isolation between the two inside and outside. For a 90 dB gain booster/BDA, the ideal isolation situation would be at least 105 dB of isolation for example.

While the FSL is governed by the equations listed above when the wave travels through free space, when the wave encounters a solid object such as a building wall the wave can be further weakened significantly. A radio wave may lose as much as 40 dB or more in signal strength when passing through the wall of a building. Transmission of radio signals through wire or cable must also be evaluated independent of FSL. Generally, radio signal strength losses at 800 MHz frequencies, typically used in public safety radio systems, may be about 4 dB or more per approximately 100 feet of low loss type coaxial cable. The losses realized by sending radio waves through a wall via a low loss cable may be advantageous compared to the loss attributable to building wall attenuation realized when sending radio waves through thick walls as an entirely wireless transmission, especially when the former is combined with an amplifier system.

U.S. Pat. No. 4,476,574 to Struven describes a method of providing multiple channels of mobile-to-mobile radio communication in tunnels, mines, buildings, and other confined spaces using radiating transmission lines.

U.S. Pat. No. 4,905,302 to Childress et al. describes a method for using a trunked radio repeater system in a public service trunked (PST) system and special mobile radio (SMR) application.

U.S. Pat. No. 6,032,020 to Cook et al relates to the operation of multiple repeaters utilizing a single communication infrastructure as a fixture within a building to provide communications past a barrier.

US Pat. Pub. No. 20060148468 to Mann relates to the field of in-building radio communication coverage enhancement utilizing a primary external antenna, an ancillary external antenna, a donor site diversity system, an internal antenna, and a bi-directional amplifier.

US Pat. Pub. No. 20070099667 to Graham discloses an in-building wireless enhancement system for high-rises with an emergency backup mode of operation including a wireless base station, a backbone coupled to the base station, a plurality of coupler units connected to the backbone, a first plurality of antennas, a plurality of amplifiers connected to the backbone, a second plurality of antennas, and optionally an emergency access port coupled to the backbone.

SUMMARY OF THE INVENTION

An In-Building Communication (IBC) System is disclosed which permits communication in underground structures such as parking garages, basements, or tunnels, tall buildings such as sky scrapers, buildings having thick walls of concrete or metal, and/or any structure which may have dead zones due to shielding of electromagnetic radiation necessary for radio communications.

The SIPS-BDA (Scaleable Intelligent Power Supply-Bi-Dirctional Amplifier) In-Building Communication System provides a highly effective communication system to eliminate communication dead zones in buildings during emergency situations or emergency response events. The SIPS-BDA system has its own portable lightweight power supply to power a bi-directional amplifier or other type of signal booster to overcome communications barriers in buildings, tunnels, or other radio obscuring structures during emergencies or whenever radio communications coverage is required. The invention is intended to provide radio coverage enhancement during emergency events such as fire, explosion, terrorist or violence related incidents, as well as whenever public safety or other security requirements for two-way radio coverage are present such as conventions, special events, and other public gatherings. The invention includes in various combinations and configurations a completely portable coverage enhancement system including portable outdoor (donor) antenna equipment, portable indoor antenna or antenna array equipment including the use of radiating cable or other radiating distribution components, a portable, autonomously powered signal booster system, a standardizable In-Building Communication interface box or unit, and various antenna and signal booster components which are fixed and built in to the building or structure requiring coverage enhancement.

In one embodiment, the invention includes: a) an outdoor antenna system attached to the building or mounted separately outside the building, b) an indoor antenna system mounted inside the building, c) a standardized, In-Building Communication (IBC) interface box mounted on the exterior of the building, and d) a portable SIPS-BDA kit. The IBC interface box may have connections to fixed antennas in the interior of the building and an antenna directed to the exterior of the building. The portable SIPS-BDA kit is connected to an outdoor antenna system and an indoor antenna system. The portable BDA may be connected to the outdoor antenna system directly or connected via the IBC interface box. The portable BDA may be connected to the indoor antenna system directly or connected via the IBC interface box.

During operation, the fire department may carry the portable bi-directional amplifier (BDA) kit, which may be powered by a lithium-ion battery pack (or other battery type or independent, portable, and/or wireless energy source). The BDA may be connected to the exterior of the building when the building is experiencing an incident such as a fire, earthquake, or an act of terrorism which requires emergency and fire personnel to report to the scene quickly. When called to a building, the fire department personnel may connect their portable, lithium-ion battery powered, bi-directional amplifier (BDA) system to the building's standardized, IBC interface box on the outside of the building. Once the BDA is connected, communications between the outside and inside of the building are enabled and communication dead zones may be significantly reduced. The connection/setup time in this embodiment is estimated to be under one (1) minute, enabling communications without having to enter the building until communications between the outside and the inside of the building are established.

As an additional embodiment, the SIPS-BDA system may function independent of existing communication infrastructure. In an alternative embodiment, the invention includes: a) a portable outdoor antenna system mounted outside the building or mounted facing outside the building from within; b) a portable indoor antenna system mounted inside the building; and c) a portable SIPS-BDA kit outside or inside the building. In this embodiment, a portable outdoor antenna system and/or a portable indoor antenna system may be used as a backup in place of existing infrastructure or as the sole means of coverage enhancement in the absence of existing infrastructure. In the absence of building equipment or in the event of a building equipment failure, for instance, if the indoor antenna or cabling to the antenna has been destroyed or its status is uncertain during an incident, the portable system may be used to establish or re-establish excellent communications. It does so independent of any fixed coverage enhancement system, which may be inoperable or damaged during an emergency event.

The SIPS-BDA system includes a portable outdoor antenna and a portable indoor antenna. In this embodiment, the SIPS-BDA is attached to a portable outdoor antenna that is located on the outside of the building. The SIPS-BDA is placed in a suitable location in the building and is attached to a portable indoor antenna also placed in the building.

In an additional embodiment, the SIPS-BDA system may function independent of existing communication infrastructure. In an alternative embodiment, the invention includes: a) an outdoor antenna system attached mounted outside the building, b) an indoor antenna system mounted inside the building, and c) a portable SIPS-BDA kit located inside the building. The system is able to provide excellent communications capabilities independent of the fixed antenna system dependent on existing infrastructure. The SIPS-BDA system includes a portable outdoor antenna and a portable indoor antenna. In this embodiment, the SIPS-BDA is attached to a portable outdoor antenna that is located on the outside of the building. The SIPS-BDA is placed in a suitable location in the building and is attached to a portable indoor antenna also placed in the building. The outdoor antenna system may also be located in the building where it may be positioned facing outside a window or other opening in the direction of a communications tower and where suitable isolation may be obtained from the other antenna also located within the building.

Other examples may be used where the SIPS-BDA is used in different combinations with the interface box and the indoor set-ups discussed above.

One aspect of the system is the reduced expense and increased flexibility in comparison to fixed building treatments. The community fire department may own one or more of the SIPS-BDA portable kit(s) which can serve any number of buildings due to the standard IBC interface box on the building and standard connection to the SIPS-BDA portable kit. In addition, the SIPS-BDA portable kit may be used separately from the interface box. The SIPS-BDA portable kit may also be used by bringing it into any building upon the fire department's arrival at an event to provide effective In-Building Communication coverage when the fixed communication infrastructure connected to the IBC standard interface is damaged or not working properly.

In this embodiment, the SIPS-BDA can be brought to a building experiencing an emergency by fire, emergency medicine, police, or rescue personnel to ensure communications between the inside and outside of a building regardless of the condition of the site power or communication infrastructure.

It is an objective of the invention to send communication signals past barriers without causing deleterious interference or consuming power needlessly.

It is an objective of the invention to provide a solution to In-Building Communication dead zones, while maintaining interoperable communications between rescue personnel during an emergency or other multi-agency event.

It is an objective of the invention to provide a solution to In-Building Communication dead zones without interfering with radio system operations.

It is an objective of the invention to provide a solution to In-Building Communication dead zones that can be easily maintained in the event of an emergency.

It is an objective of the invention to provide a solution to In-Building Communication dead zones that is quick and simple to set up during an emergency.

It is an objective of the invention to provide a solution to In-Building Communication dead zones that is powered autonomously without need for connection to existing power infrastructure.

It is an objective of the invention to provide a solution to In-Building Communication dead zones that can be powered by connection to vehicle or building power but is also backed up by an included battery system and continues to operate without interruption in the event the vehicle or building power source is disabled or disconnected.

It is an objective of the invention to provide a solution to In-Building Communication dead zones that can be utilized independent of fixed antenna and cabling and is compatible with existing infrastructure such as fixed antenna and cabling.

It is an objective of the invention to provide a solution to In-Building Communication dead zones that is lightweight.

It is an objective of the invention to provide a solution to In-Building Communication dead zones that is safe and does not include corrosive or explosive materials such as acid, hydrogen, or other combustible fuels and does not generate any hanrmful by products such as exhaust gases containing carbon monoxide or carbon dioxide.

It is an objective of the invention to provide a solution to In-Building Communication dead zones that is quiet and may be advantageous in security situations where noise from vehicle, motor generator, or other conventional power sources would compromise a mission.

It is an objective of the invention to provide a solution to In-Building Communication dead zones that can be applied effectively in older buildings and existing structures as well as new construction.

It is an objective of the invention to provide a solution to In-Building Communication dead zones that can be utilized by first responders and emergency personnel in a rapid and standard manner in the event of an emergency response.

It is an objective of the invention to provide a solution to ensure In-Building Communication during an emergency that can be configured by first responders without having to enter the building.

It is an objective of the invention to provide a solution to ensure In-Building Communication during an emergency that can be configured by first responders before entering the building.

It is an objective of the invention to provide a solution to ensure In-Building Communications safely during an emergency while having access to only the periphery of the building.

It is an objective of the invention to provide to monitor a building for In-Building Communication safety without having to enter the building.

It is an objective of the invention to provide building treatment for In-Building Communication safety that can be shared across several buildings.

It is an objective of the invention to provide standard equipment for effective In-Building Communication during an emergency that can be used by rescue personnel on more than one building.

It is an objective of the invention to provide a standard interface for In-Building Communication equipment.

It is an objective of the invention to provide in-Building Communication equipment which is able to be kept in a safe location and protected from damage by the events in an emergency.

It is an objective of the invention to ensure simple radio communication interoperability during an incident quickly.

It is an objective of the invention to reduce the path loss of radio waves at critical points in an in-building communication application.

It is an objective of the invention to overcome physical barriers to transmission of radio waves quickly and safely in an in-building communication application.

It is an objective of the invention to provide an in-building communication system solution that is less likely to be in the way of emergency personnel and rendered inoperative.

It is an objective of the invention to establish a distributed army of indoor antennas quickly in a building during an incident.

BRIEF DESCRIPTION OF THE DRAWINGS

FIG. 1IA is a view of the portable indoor antenna, an omni-directional example.

FIG. 1IB is a view of the portable outdoor antenna, a Yagi example.

FIG. 1IC is a view of a portable antenna for indoor or outdoor use, the panel antenna example.

FIG. 2A is a flow chart (process diagram) for deploying portable radio coverage.

FIG. 2B is a flow chart (process diagram) for deploying portable radio coverage.

FIG. 2C is a flow chart (process diagram) for deploying portable radio coverage.

FIG. 4B schematically illustrates a partially enlarged view of a portable antenna kit and portable amplifier kit deployed at a location of a site requiring radio coverage enhancement at a building having multiple floors.

FIG. 5A illustrates an enlarged view of the vehicle borne portable radio enhancement system.

FIG. 7 is a table of preparedness strategies and deployment configurations.

FIG. 8G is a schematic of the full built-in system utilizing a standard interface box.

FIG. 8H is a schematic of the built-in system bypassing a failed antenna and amplifier.

FIG. 8I is a schematic of portable deployment including an extension antenna kit.

FIG. 13A is a top view of the optional outdoor antenna kit.

FIG. 13B is a front view of the optional outdoor antenna kit.

FIG. 13C is a bottom view of the optional outdoor antenna kit.

DESCRIPTION OF THE INVENTION

Figure 1:
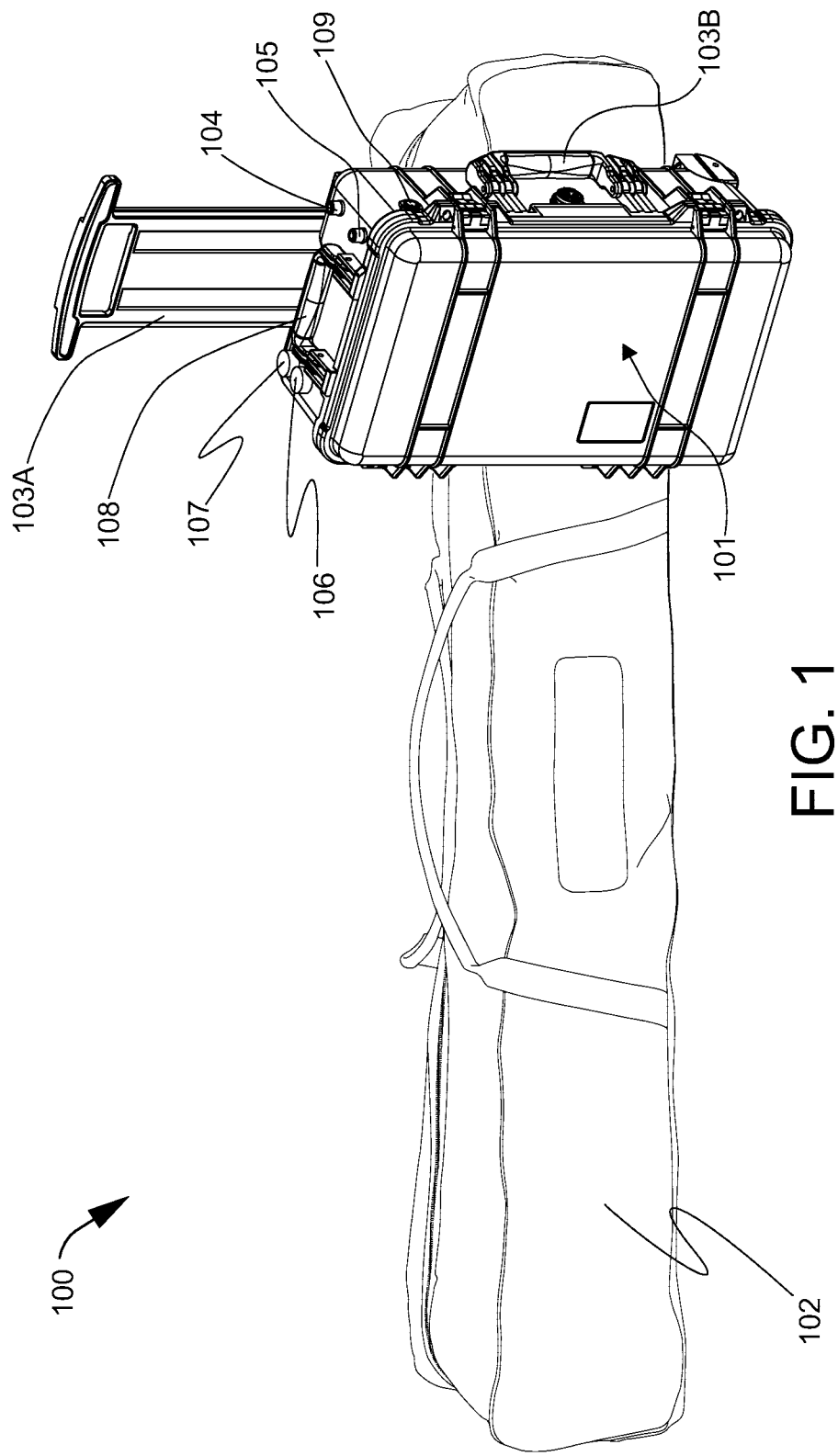
FIG. 1 is a view of in-building communication system including a portable amplifier kit and a portable antenna kit.

FIG. 1 is a view 100 of in-building communication system including a portable amplifier kit 101 and a portable antenna kit 102. The portable amplifier kit 101 has a rectangular shape and stands in an upright lengthwise direction. The longest side of the amplifier kit is perpendicular to the ground. The top portion of the portable amplifier kit when standing in an upright lengthwise position includes a sliding handle 103A, an indoor antenna connector port 104, an outdoor antenna connector port 105, a power switch 106, a status light 107, and a top handle 108. The sliding handle 103A extends past the top portion of the amplifier kit and is attached to the back panel of the amplifier kit. Power switch 106 and the status light 107 are located adjacent to each other with the power switch positioned closer to the front of the amplifier kit and the status light positioned more closely to the rear left corner on the top panel of the amplifier kit. The status light provides a large visual indication of the status of power of the amplifier kit. The power switch is large and green in color and is actuated by depressing the switch 106. A green illuminator or light is incorporated into the power switch and illuminates when power is enabled. On the opposite end of the top portion of the amplifier kit are the indoor antenna connector port 104 and the outdoor antenna connector port 105. The indoor antenna connector port 104 is located closer to the rear corner of the top portion opposite of the status light 107. The outdoor antenna connector port 105 is located closer to the front corner position on the top of the amplifier kit. The connector ports are polarized to receive opposite ends of a connector. This structure prevents a connection error and adds to ease of setting up the device to establish communications at a site quickly.

The bottom of the amplifier kit rests on the ground. The front of the amplifier kit includes a closed-door panel. The amplifier kit has two side panel portions on the right and the left. The side panel portion on the right includes: an AC/DC output connector 109 and a side handle 103B. The AC/DC output connector 109 is located near the top portion of the amplifier kit. The side handle 103B located on the right side panel portion connects to the amplifier kit in two places with a space in between to allow gripping by hand. The side handle 103B is positioned near the middle of the side panel portion. When the side handle 103B is gripped by a person's hand, the amplifier kit may be carried with the longest side of the amplifier kit parallel to the ground.

Portable antenna kit 102 is located on the ground adjacent to the amplifier kit 101. Portable antenna kit is in the shape of a long duffel bag and has its longest side parallel and resting on the ground.

Figure 1A:
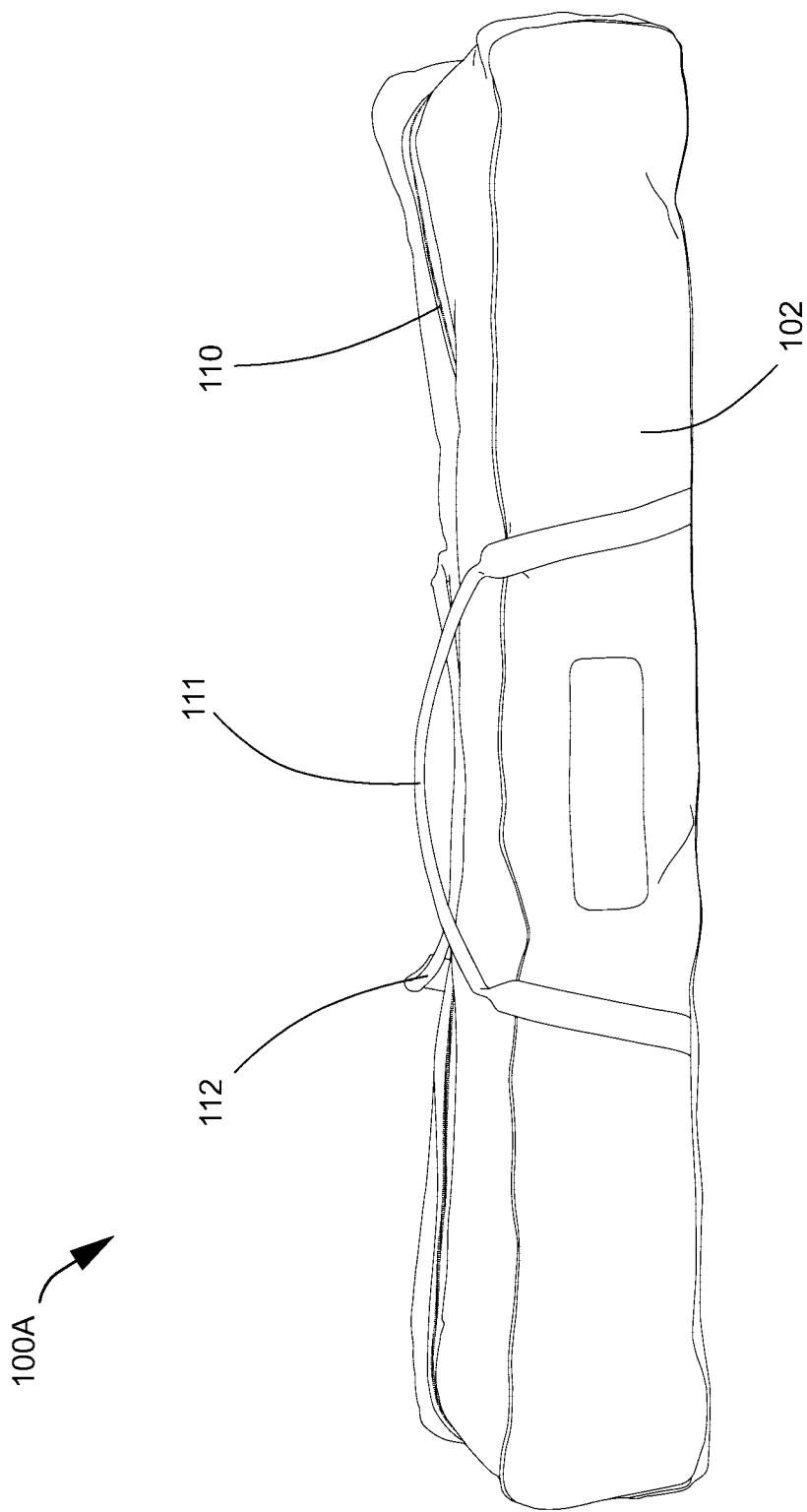
FIG. 1A is a view of a portable antenna kit.

FIG. 1A is a view 100A of the carrier for the portable antenna kit 102. The portable antenna kit 102 residing within a container includes: the cable organizer, a zipper 110 and two portable antenna kit handles 111, 112. Zipper 110 runs lengthwise down the middle of a top portion of the portable antenna kit and separates the portable antenna kit into two opposite sides. Zipper 110 brings the two opposite sides of the antenna kit together when in a closed position. Handles 111 and 112 are located on opposite sides of the zipper. Each handle is attached in two positions near the bottom of the portable antenna kit with a central portion of the handle located near the middle of the bag being separated from the portable antenna kit by a space large enough to receive a hand. The central portions of the two handles are capable of being brought together, so that both handles may be carried in a single hand.

Figure 1B:
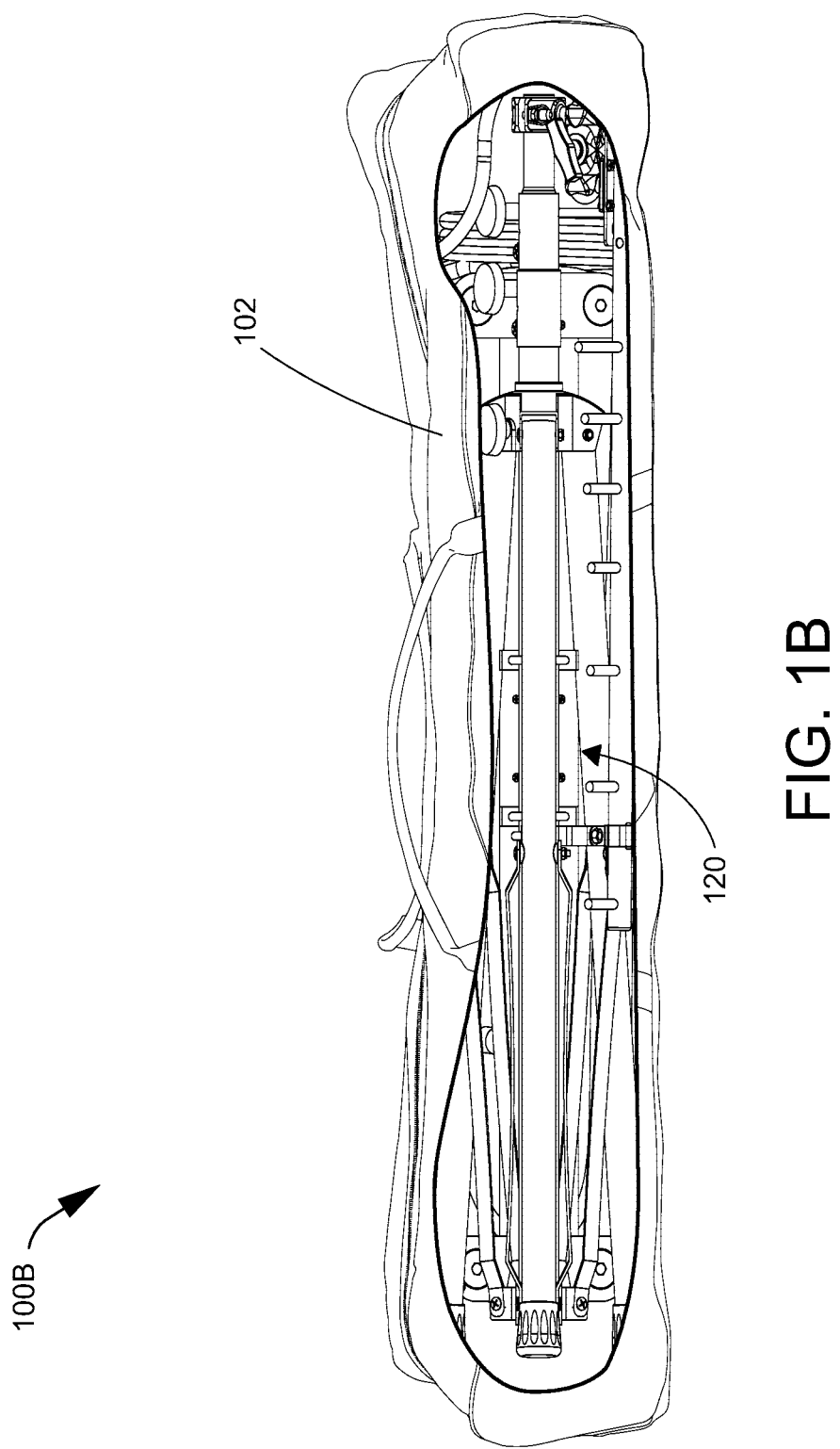
FIG. 1B is a cutaway view of the portable antenna kit.

FIG. 1B is a cutaway view 100B of the portable antenna kit 102. The cutaway view reveals a portable antenna kit tripod assembly 120 lying lengthwise along the length of the portable antenna kit 102.

Figure 1C:
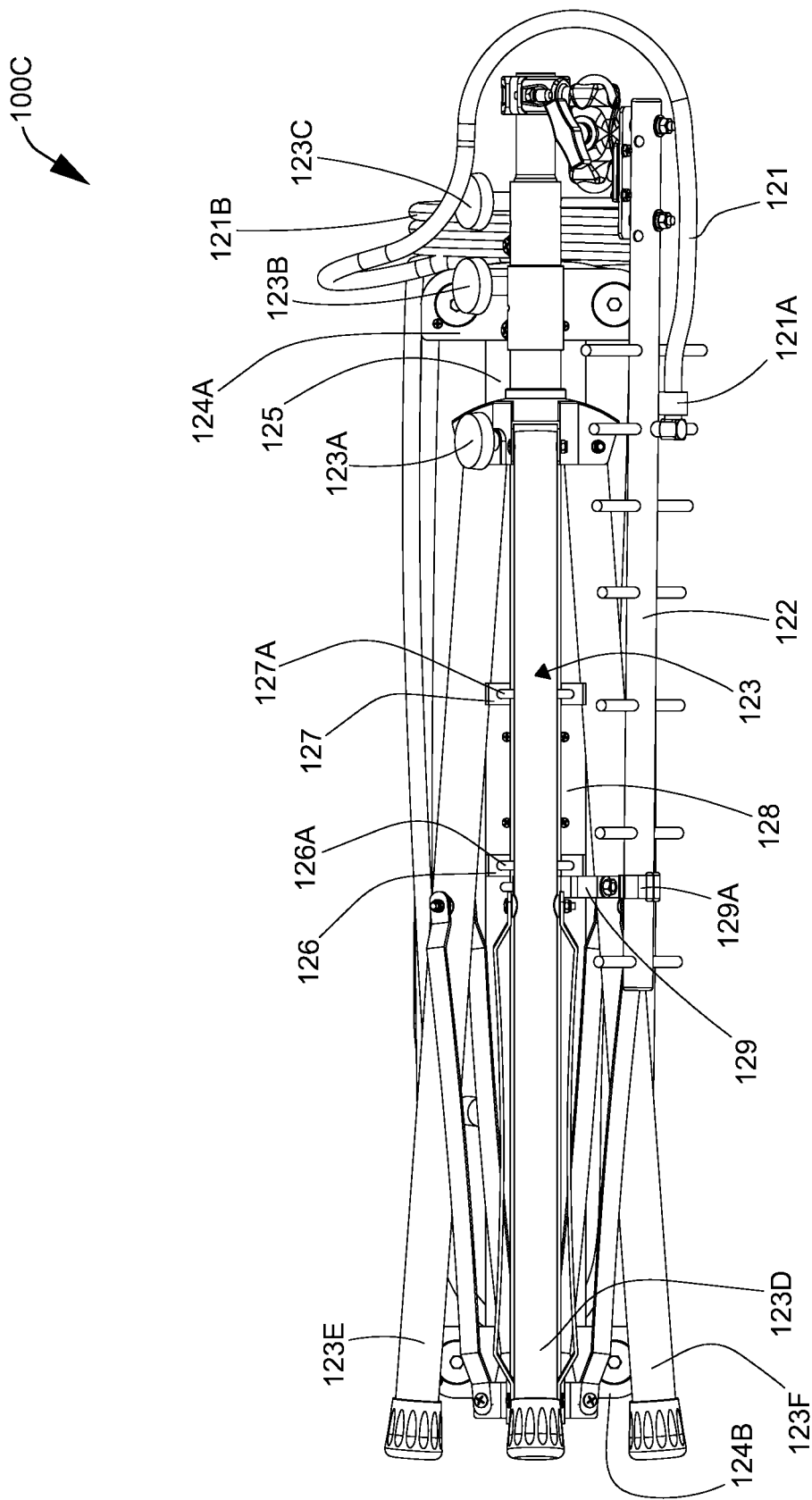
FIG. 1C is a top view of the portable antenna once the bag has been removed.

FIG. 1C is a top view 100C of the inside components of the portable antenna kit 102 and cable organizer 124. The portable antenna kit includes the cable organizer, which enables rapid delivery, quick set up of the antennas, rapid dispensation of the cables and a compact storage means for the cable and the antennas. The portable antenna kit tripod 123 extends lengthwise from right to left with tripod leg 123D positioned in a flat, straight, orientation and located in a central middle top of the portable antenna kit. The three tripods legs, 123D, 123E, and 123F, are located adjacently with two of the legs 123E, 123F extending at angle from the tripod leg 123D oriented in a straight flat position near the middle of the portable antenna kit 102 in this view. The tripod legs' position in proximity to one another is controlled by an adjustor 123A, which is a knob located near an end portion of the tripod legs. The adjustor 123A is a screw type lock with a handle to operate the screw. Located underneath the central tripod leg 123D is a cable organizer including the following components: an end portion of cable organizer 124A, an alternate end portion of cable organizer 124B, spine of cable organizer 125, lower cable organizer mount spacer block 126, lower cable organizer mount spacer block clamp 126A, upper cable organizer mount spacer block 127, upper cable organizer mount spacer block clamp 127A, cable organizer spacer block brace 128, outdoor antenna mount spacer block 129, and an outdoor antenna clip 129A. The spacer block clamps affix the cable organizer spine to the center tube of the tripod 135 (see FIG. 1E) which is not visible in this view because it is hidden behind leg 123D. Short segment 121B of the cable is illustrated in FIG. 1C. The tripod 120 includes two telescoping portions to increase its length with adjustor 123B controlling the first telescoping section and adjustor 123C controlling the second telescoping section. The tripod is positioned in shortest configuration with both telescoping sections being located in their shortened telescoped position. An outdoor antenna cable 121 is positioned between an outdoor antenna connector 121A of an outdoor antenna 122 and an end portion of cable organizer 124A. The outdoor antenna 122 lays lengthwise adjacent to the tripod legs with an outdoor antenna clip 129A securing the antenna to the tripod main tube.

Figure 1D:
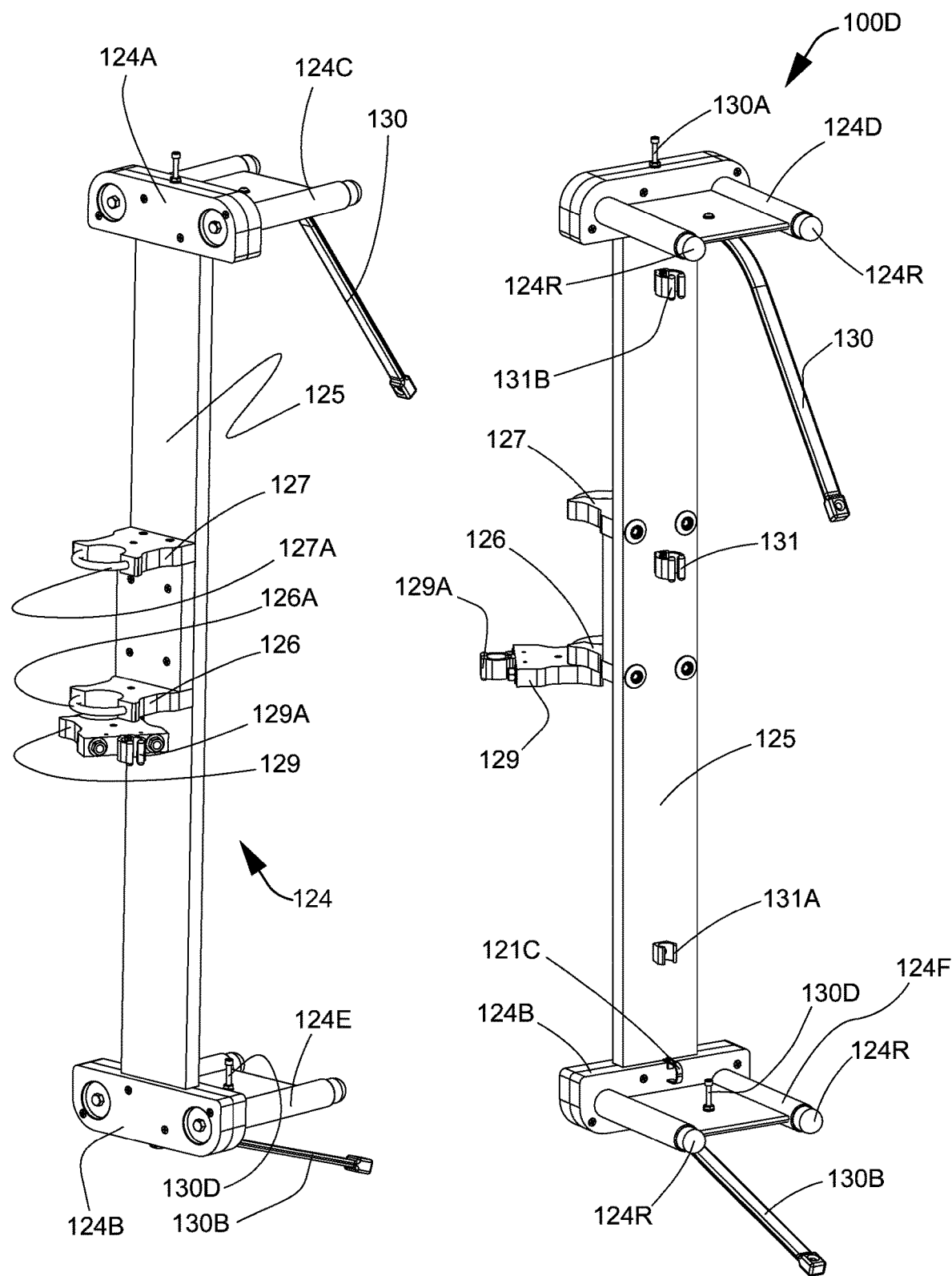
FIG. 1D is a perspective view of the cable organizer with the cable removed.

FIG. 1D is an enlarged view 100D of the cable organizer. The cable organizer is illustrated from two different perspectives. Cable organizer extends in a vertical direction with a top portion 124A in a top position, the bottom end portion 124B, and a spine 125 located therebetween. Spine 125 has a front side and a rear side. Protrusions 124C. 124D are located on the top end portion 124A and bottom end portion has protrusions 124E, 124F to receive the cable. On each end of the protrusions are rubber tips or feet 124R. Each end of the cable organizer includes a retention strap 130, 130B which extends from underneath the central portion of the protrusion. Each end of the cable retention strap is received by a pin 130A, 130D. On the front side of spine 125 are an indoor antenna clip 131, an indoor antenna connector clip 131A, and a second indoor antenna clip 131B. Outdoor antenna clip 129A is also illustrated in FIG. 1D, as is the indoor antenna cable retainer clip 121C. Rear side of the spine 125 includes an upper cable organizer mount spacer block 127, a lower cable organizer mount spacer block 126, and an outdoor antenna mount spacer block 129. The cable organizer mount spacer blocks 127, 126 include a respective clamp 127A, 126A for gripping the tripod leg 123D.

Figure 1E:
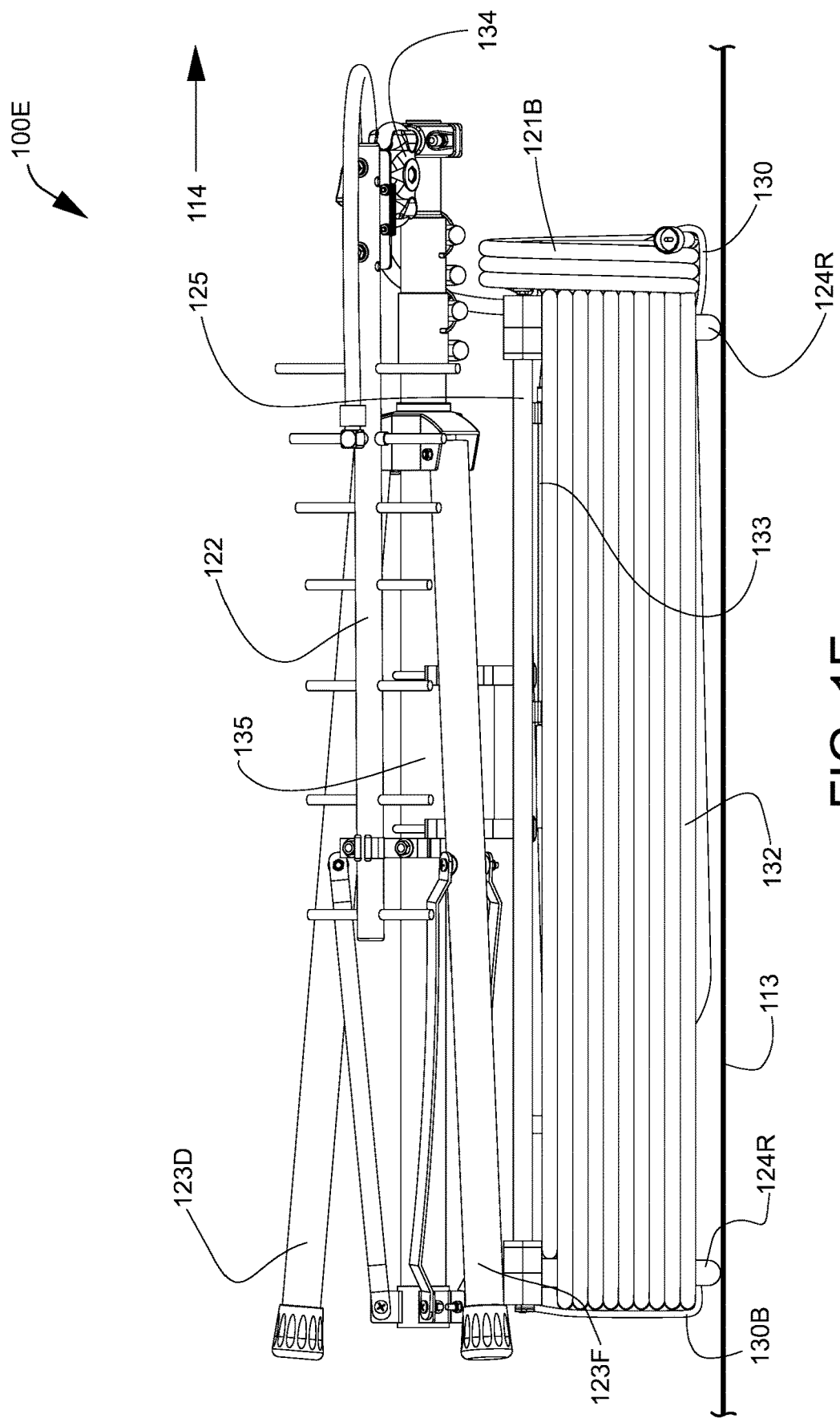
FIG. 1E is a side view portable antenna kit removed from the bag.

FIG. 1E is a side view 100E of the portable antenna kit removed from bag. The portable antenna kit is shown resting on the rubber feet 124R of the cable organizer in a horizontal position. The rubber feet 124R are in direct contact with the ground 113. The long segment of indoor antenna cable 132 is wound around both ends 124A, 124B of the cable organizer and held in position by the upper cable retention strap 130 and the lower cable retention strap 130B. The indoor antenna 133 is clipped to the spine of the cable organizer 125 with the indoor antenna cable wrapped surrounding the indoor antenna 133, so that only a portion of the indoor antenna 133 may be seen. The indoor antenna cable 132, short segment of the indoor antenna cable 121B, and the dual ball joint 134 on the outdoor antenna mount are located on the upper end portion of the antenna kit. In this view, the upper end portion of the antenna is shown in a horizontal orientation with the end portion of the antenna kit including the short segment of the indoor antenna cable 121B, the dual ball joint 134, and the end of the antenna kit facing closest to the building 114.

In one embodiment, the cable 132 is a flexible coaxial RF communication cable. The cable may be a low loss RF cable. The cable may have about a one-inch minimum bend radius that allows the cable to extend into and through tight passages without kinking. The cable may have a bonded tape outer conductor that provides superior bending and flexibility allowing rapid and safe deployment across both indoor and outdoor environments. The cable may also be weatherproof having a UV protected black or yellow polyethylene jacket making the cable durable and useable in all weather conditions. In one embodiment, the cable may have the following mechanical specifications; a minimum bend radius of about 1 in, a bending moment of about 0.5 ft lbs, a weight of about 0.068 lbs/ft, a tensile strength of about 160 lbs, and a flat plate crush of about 40 lb/in. In one embodiment, the cable may have an installation temperature range of about −40° F. to about 185° F. a storage temperature range of about −94° F. to about 185° F., and an operating temperature range of about −40° F. to about 185° F.

The cable may comprise about 0.11 inches of an inner conductor material of solid BCCAI, a dielectric of foamed polyethylene of about 0.285 inches, an outer conductor of aluminum of about 0.291 inches, an overall braid of tinned copper of about 0.320 inches, and a standard jacket of black polyethylene of about 0.405 inches. The electrical specifications of the cable may include a cutoff frequency of about 16.2 GHz, about an 85% velocity of propagation, a voltage withstand of about 2,500 VDC, a peak power of about 16 kW, a jacket spark of about 8,000 VRMS, an impedance of about 50 ohms, a capacitance of about 23.9 pF/ft an inductance of about 0.060 uH/ft, a shielding effectiveness of at least about 90 Db, a phase stability of less than about 10 ppm/° C., and an attenuation of about 3.9 dB/100 ft for a frequency of about 900 MHz and a power of about 0.58 kW. In addition, the cable may have a DC resistance of about 1.39 ohms/1000 ft for the inner conductor and a DC resistance of about 1.65 ohms/1000 ft. for the inner conductor.

In another embodiment, the cable may be continuous and of the same type of flexible low loss coaxial cable. In another embodiment, the cable may be a fiber optic cable. In still another embodiment, the cable may be a type of leaky coaxial cable. In another embodiment, a portion of the cable may be a low loss coaxial cable, a portion may be a leaky coaxial cable, and a portion may be fiber optic cable.

The outdoor antenna 122 is secured to a main section of the tripod 135. The first section of the tripod is in a flat horizontal position parallel to the ground 113 with tripod legs 123D, 123F oriented at a slight angle from the first section of the tripod.

Figure 1F:
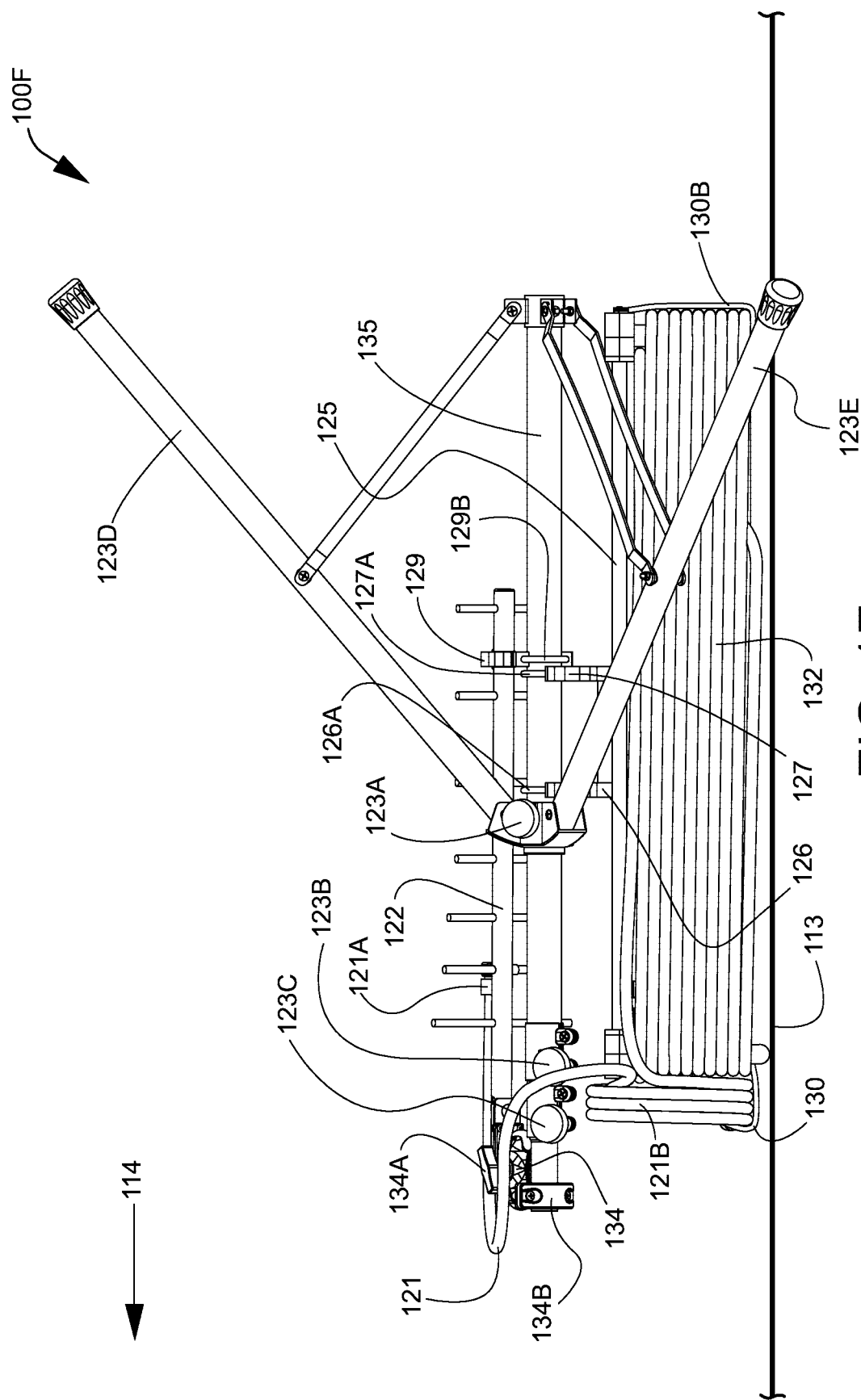
FIG. 1F is a side view of the portable antenna with the legs of the tripod partially extended.

FIG. 1F is a side view 100F of the portable antenna with the legs of the tripod partially extended. Tripod legs 123D, 123E. 123F are extended from the first section (mast) of the tripod 135 by turning screw type adjustor 123A. Leg 123F is not visible in FIG. 1F and resides behind mast 135 (also described herein as the first section of the tripod. The cable organizer is attached to the first section (mast) of the tripod 135 with a lower cable organizer mount spacer block clamp 127A and an upper cable organizer mount spacer block clamp 126A. Reference numeral 114 indicates the direction of the building. Once the tripod legs are extended, the entire tripod along with attached cable organizer can be rotated to a vertical position coming to rest upon legs 123D, 123E, and 123F with cable organizer now facing the building to facilitate easy payout of cable 132 toward the building.

Figure 1G:
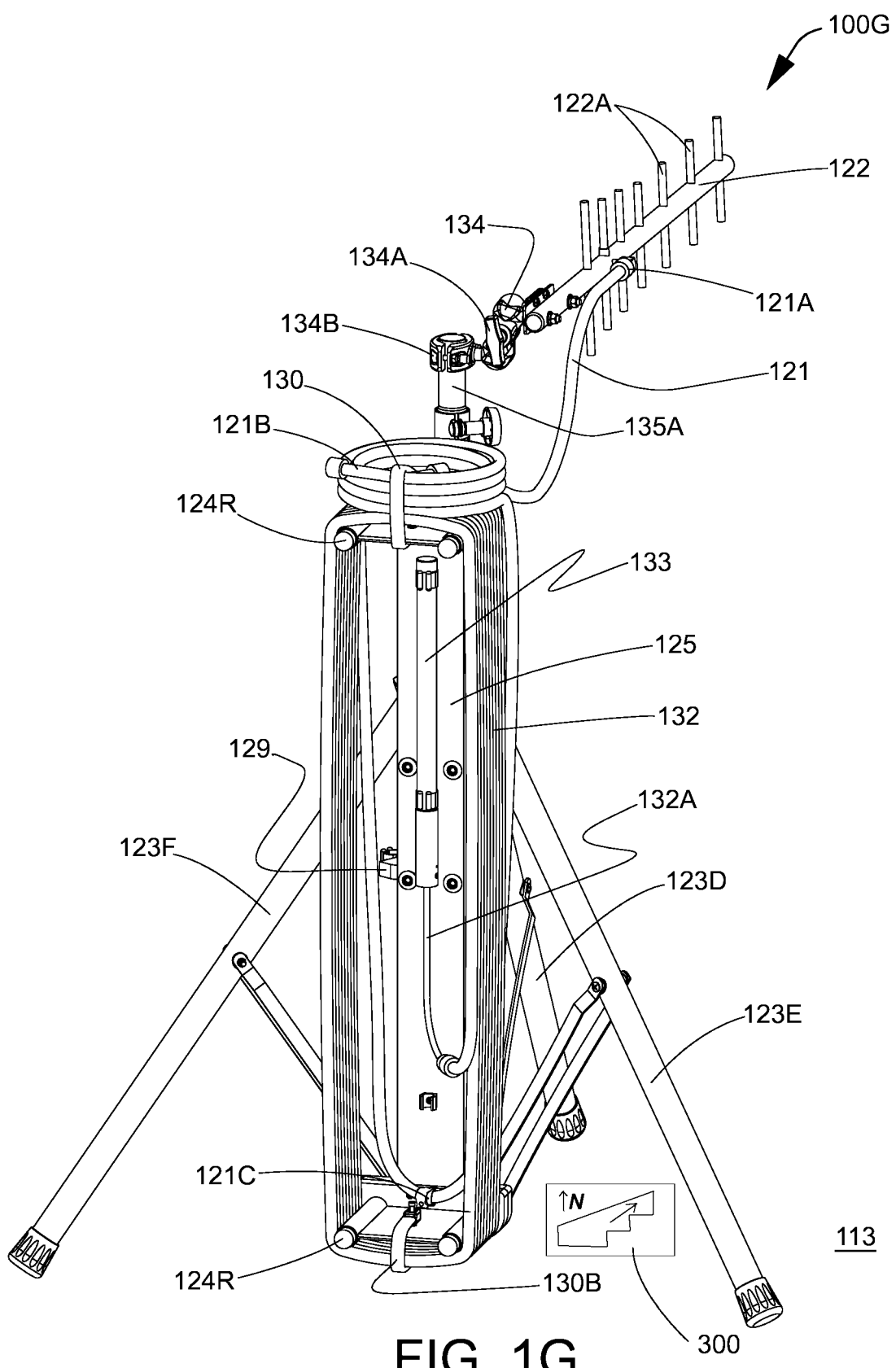
FIG. 1G is a side view of the portable antenna in a standing position.

FIG. 1G is a side view 100G of the portable antenna kit in an upright standing position. The portable antenna kit/cable organizer are positioned in an upright vertical position resting on the tripod legs 123D, 123E, 123F which are in direct contact with the ground 113. Rubber feet 124R on the protrusions of the cable organizer are pointing in a direction parallel to the ground 113 and toward the building. The long segment of the indoor antenna cable 132 is held in place at the lower end portion by a lower cable retention strap 130B and at the upper end portion by an upper cable retention strap 130 around the upper and lower protrusions of the cable organizer. Upper cable retention strap 130 holds the short segment 121B in place above the upper protrusions of the cable organizer. The wound long segment of the indoor antenna cable 130B surrounds the indoor antenna 133, which is mounted to the spine 125 of the cable organizer at a location in the middle of the coil of long segment of indoor cable.

The outdoor antenna kit and the rear of the cable organizer are oriented in the northward direction. The outdoor antenna is aimed in the direction of the nearest tower using dual ball joint 134 and adjuster 134A according to plot 300. The vertical elements 122A of the antenna are aligned in a vertical direction perpendicular to the ground. The outdoor antenna cable 121 is connected to the outdoor antenna 122 via an outdoor antenna connector 121A. In another embodiment, the outdoor antenna 122 may have one or more servomotors connected to aim or orient the outdoor antenna in the location of a preferred radio tower, or to respond to remote sensing and automatic aiming protocol.

Figure 1H:
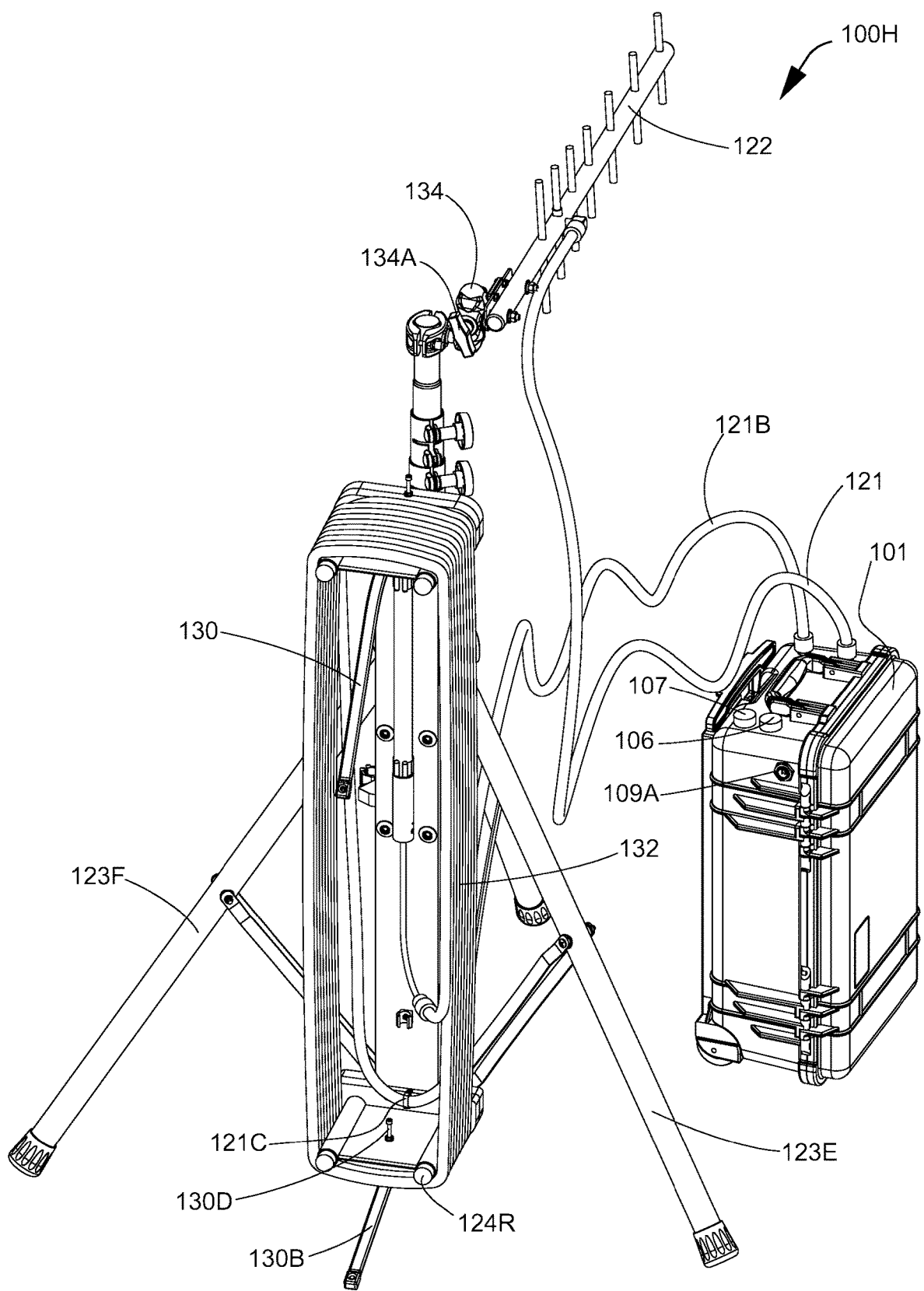
FIG. 1H is a side view of the portable antenna connected to the portable amplifier kit/cable organizer.

FIG. 1H is a perspective view 100H of the portable antenna connected to the portable amplifier kit. Both the upper cable retention strap 130 and the lower cable retention strap 130B are unattached from the pin 130A and 130D allowing the indoor and outdoor antenna cable to be dispensed from the cable organizer. The outdoor antenna cable 121 is connected from the outdoor antenna to the outdoor antenna port of the amplifier kit 101. The indoor antenna cable is in fact a continuous cable including: 1). a short segment 121B and 2). a long segment 132. The short segment indoor antenna cable 121B is connected from the cable organizer to the indoor antenna cable port on the amplifier kit 101.

Still referring to FIG. 1H, the cable organizer has orientation that enables an effective and standard set-up allowing communications to be established quickly. Rubber feet 124R are on the ends of protrusions on the ends of the cable organizer, which are perpendicular to the spine of the cable organizer. The cable organizer can be set up so the ends of the protrusions point directly into the entranceway of the building or other area in need of communication enhancement. In this way, the indoor antenna and the long segment of indoor cable 132 connected to the indoor antenna can be dispensed quickly into the area in need of communication enhancement. The short segment of indoor antenna cable 121B which connects to the amplifier and the long segment of the indoor antenna cable 132 which connects to the indoor antenna are secured with an indoor antenna cable retainer clamp 121C near the bottom of the vertical cable organizer. This location of the clamp 121C reduces the risk of toppling the tripod or applying tension to the amplifier connection when tugging on cable 132.

Still referring to FIG. 1H, once the cable organizer is orientated in the proper direction with respect to the opening or other entranceway into the building, the orientation of the outdoor antenna 122 can be adjusted with the outdoor antenna mount dual ball joint 134. The outdoor antenna can be aligned to point its tip in the direction of the most preferred radio site and the elements of the antenna are aligned in a vertical position. The adjustor 134A for the outdoor antenna mount can be used to secure the outdoor antenna 122, once it has been adjusted (pointed and turned) in the proper alignment.

FIG. 11A is a view 100IA of the portable indoor antenna 133. This view includes the omni-directional antenna embodiment as the portable indoor antenna 133. The omni-directional antenna is connected on one end to a base 133A and to an antenna cap 133C on the other end. The antenna base 133A is connected to a pigtail cable 132A. The other end of the pigtail cable 132A is attached to a pigtail cable connector 132B. The indoor antenna has a lanyard cable 133D which is also attached to the antenna base 133A. The lanyard cable 133D is connected to a coupling 133E.

Still referring to FIG. 11A in one embodiment the indoor antenna is an omni-directional antenna. The omni-directional antenna in one embodiment may have the following properties: a receiving frequency of about 806 to about 869 MHz, a gain of about 0 db, a VSWR of 1.5:1, a bandwidth of about 63 MHz, a 3 dB beamwidth E-plane (deg) of 75, and a power handling of 150 W. In one embodiment, the main cylindrical vertical element of the omni-directional antenna may be a plated copper laminate with a fiberglass enclosure. In one embodiment, the omni-directional indoor antenna has a height of about 17.5 inches and includes a standard pigtail cable length of about 1 ft. The omni-directional antennas may be built on a copper laminate and housed in fiberglass having a fiberglass wall thickness of about 0.1 inch.

The omni-directional antenna may be used as the indoor antenna preferably in situations where radio signals may be received from different directions. This may occur where a first responder may have to move about inside the building while sending and receiving radio signals in a number of different directions and positions throughout the interior of the building. The omni-directional antenna may be mounted right side up or tipped upside down depending upon the desired pattern. The omni-directional antenna may also be clamped or mounted in a variety of configurations.

FIG. 1IB is a view 100IB of the portable outdoor antenna 122. In this view, a Yagi directional antenna is shown in this embodiment as the portable outdoor antenna. The portable outdoor antenna has a main shaft or boom extending in a horizontal direction. At one end of the boom is a mounting flange 134C, which connects the outdoor antenna to a dual ball joint 134. The dual ball joint includes an adjuster 134A for the outdoor antenna mount and a tripod clamp 134B for the mounting outdoor antenna to the tripod. Along the horizontal shaft of the outdoor antenna are several vertical elements 122A, which are perpendicular to the horizontal shaft and extend both above and below the horizontal boom. The outdoor antenna also includes an outdoor antenna connector 121A, which has a fitting to connect the outdoor antenna to a cable or other device.

Still referring to FIG. 1IB, in one embodiment the outdoor antenna is a directional Yagi outdoor antenna which has a receiving frequency of about 806 to about 869 MHz, a gain of about 11 db, about 10 vertical elements which are generally perpendicular to the horizontal boom, a front to back ratio of about 20 dB, a 3 dB beamwidth E-plane of about 40 degrees, a 3 dB beamwidth H-plane of about 45 degrees and a power handling of 200 W. The element may be made of an aluminum rod. The main horizontal boom may have a length of about 46 inches and several vertical elements having a height of about 4 to 7 inches. The approximate weight of the outdoor antenna may be about 1.6 lbs.

FIG. 11C is a view 100IC of a portable antenna for indoor or outdoor use, the panel antenna example. The panel antenna has a rectangular shape with two large horizontal surfaces. On one large horizontal surface is an antenna face 136. On the opposite horizontal surface, there are a mounting bracket 136A and a panel antenna connector 136B. The panel can be oriented in an upright position in the direction of its polarization 136C.

In addition, to the antenna embodiments disclosed other devices for receiving and transmitting radio waves may be used. In addition to antenna structures, other transmitting devices such as radiating cable may be used. In one embodiment, a particular type of coaxial cable referred to as "leaky coax" may be used as a type of antenna device. In one embodiment, leaky coax may be used as an indoor antenna device or may be used in conjunction with an indoor antenna device.

Figure 1J:
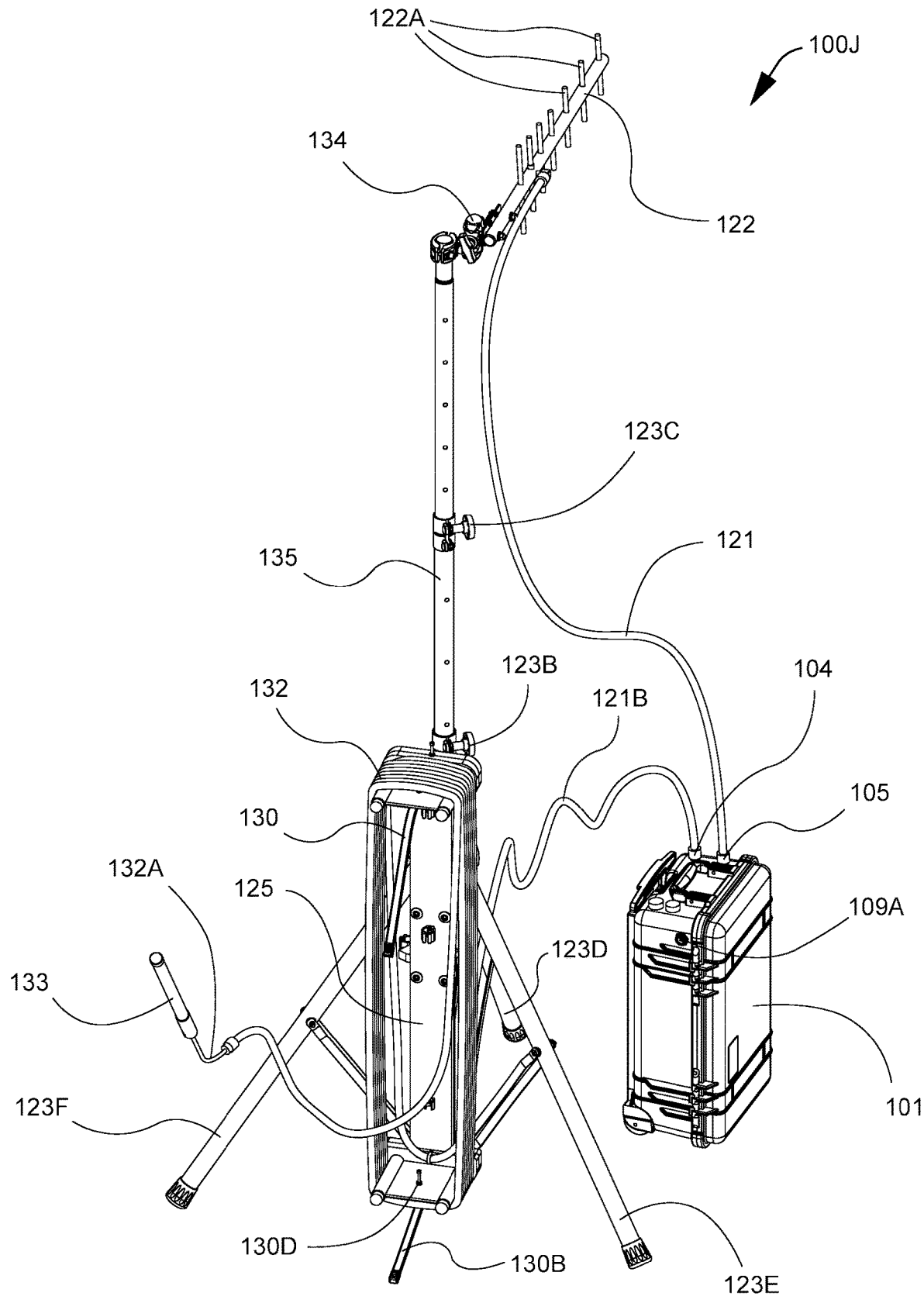
FIG. 1J is a side view of the portable In-Building Communication system in deployed position with the antenna mast of the outdoor antenna in a vertical extended position.

FIG. 1J is a side view 100J of the portable in-Building Communication system in deployed position with antenna mast of the outdoor antenna in a vertical extended position. The indoor antenna cable short segment 121B is connected to the indoor antenna connector port 104 of the portable amplifier kit 101. The portable amplifier kit 101 is positioned on the ground near the portable outdoor antenna kit. The outdoor antenna cable 121 connects the outdoor antenna 122 to the outdoor antenna connector port 105 of the amplifier kit 101. The outdoor antenna 122 has vertical elements 122A which are perpendicular to the horizontal boom of the outdoor antenna 122. The outdoor antenna can be pivoted about the double ball joint 134 on the outdoor antenna mount to position the vertical elements perpendicular to the ground and aim the directional antenna in the direction of the nearest tower or other transmitter. The outdoor antenna is elevated above the tripod with telescoping section 135 of the tripod extended and secured in position with adjuster 123C for the second telescoping section of the tripod. The first telescoping section of the tripod is also extended and secured in position with adjustment by adjuster 123B for the first telescoping section.

Still referring to FIG. 1J, the outdoor antenna 122 may be pointed in the direction of the nearest radio site and the horizontal boom of the indoor antenna may be rotated, so that the elements are aligned vertically. Once the outdoor antenna has the proper orientation, the adjustment can be maintained by turning adjuster 134A. Once the proper horizontal and rotational orientation of the outdoor antenna are properly oriented and secured, the telescoping sections 135, 135A of the tripod may be extended, raising the outdoor antenna into an elevated position.

Still referring to FIG. 1J, the indoor antenna 133 is illustrated removed from the spine of the cable organizer and outside of the central position of the coil of long segment of indoor antenna cable 132. The cable retention strap, upper 130 and the cable retention strap, lower 130B are unfastened from the cable retention strap pins allowing the cable 132 to be pulled from the cable organizer to supply cable 132 in the direction of the indoor antenna 133. The indoor antenna 133 is connected to an indoor antenna pigtail cable 132A which is connected to the long segment of the indoor antenna cable wound around the cable organizer. The pigtail cable provides a sturdy and flexible connector between the indoor antenna 133 and the indoor antenna cable 132.

Still referring to FIG. 1J, the cable organizer of the antenna kit has the proper orientation, so that cable may be rapidly dispensed to optimize cable length, safety, and set up time. The indoor antenna can be removed from the cable organizer and run directly into the entranceway of an area in need of communication enhancement. The shape of the cable organizer allows the identification of the proper alignment to set up the cable organizer facing the building. The protrusions of the cable organizer enable the long segment of indoor antenna cable to be dispensed rapidly from the cable organizer and run into the building without causing snags or other unnecessary delays.

Figure 1K:
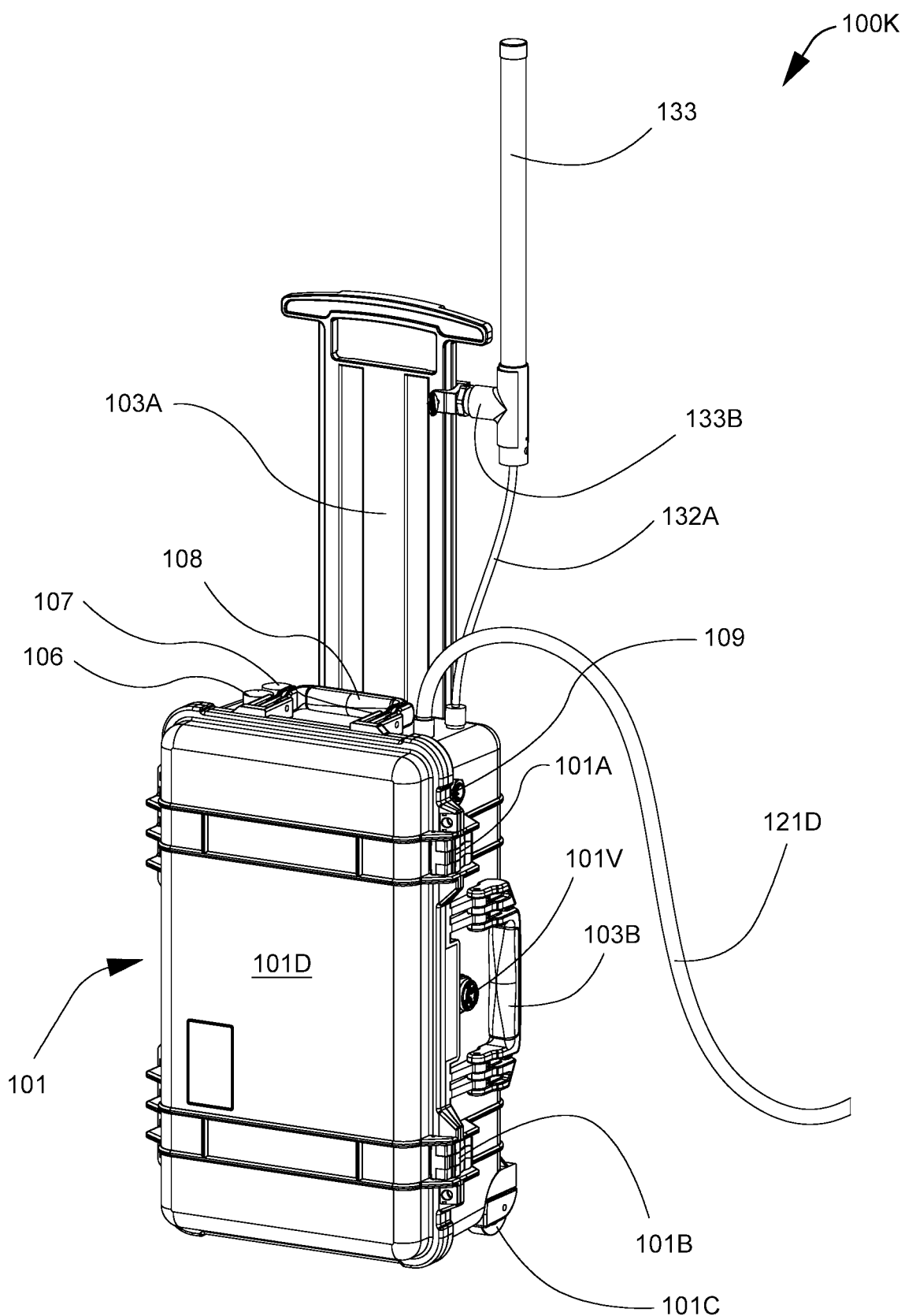
FIG. 1K is a view of the portable amplifier kit with a portable indoor antenna connected to the sliding handle of the portable amplifier kit.

FIG. 1K is a view 100K of the portable amplifier kit with a portable indoor antenna 133 connected to the sliding handle 103A of the portable amplifier kit 101. The portable amplifier kit 101 has a top portion, a front portion, and side portions. The portable amplifier kit has a generally rectangular shape with rounded edges. The portable amplifier kit is standing lengthwise in a vertically upright position. The front portion of the portable amplifier kit includes a door 101D which has latches 101A, 101B fastened to the side portion of the amplifier case. At the bottom of the side portion on the right of the amplifier case is a wheel 101C. At the bottom of the side portion on the left of the amplifier case there is also a wheel (not shown). In a central position of the side portion is a side handle 103B which is attached to the amplifier kit in two points.

The top portion of the amplifier case includes: a power switch 106, a status light 107, a sliding handle 103A, and a top handle 108. In one embodiment, both the sliding handle and the amplifier case are made of heavy-duty injection molded polypropylene plastic. The sliding handle 103A extends past the top surface of the amplifier case and is attached to the back portion of the amplifier case. The sliding handle can be positioned in an extended position as shown or pushed into a groove behind the amplifier case (not shown). The amplifier case can be tilted by pulling the sliding handle in a downward position allowing the amplifier case to move on its wheels located at the bottom of the amplifier case.

An indoor antenna 133 is attached to the sliding handle with an optional mount of the indoor antenna 133B. The indoor antenna is connected at its bottom portion to an indoor antenna pigtail cable 132A. The indoor antenna pigtail cable 132A is connected to the indoor antenna connector port on the top portion of the amplifier case. The indoor antenna pigtail cable 132A has sufficient length, so that the indoor antenna 133 remains connected when the sliding handle is moved in an elevated or lowered position.

Figure 1L:
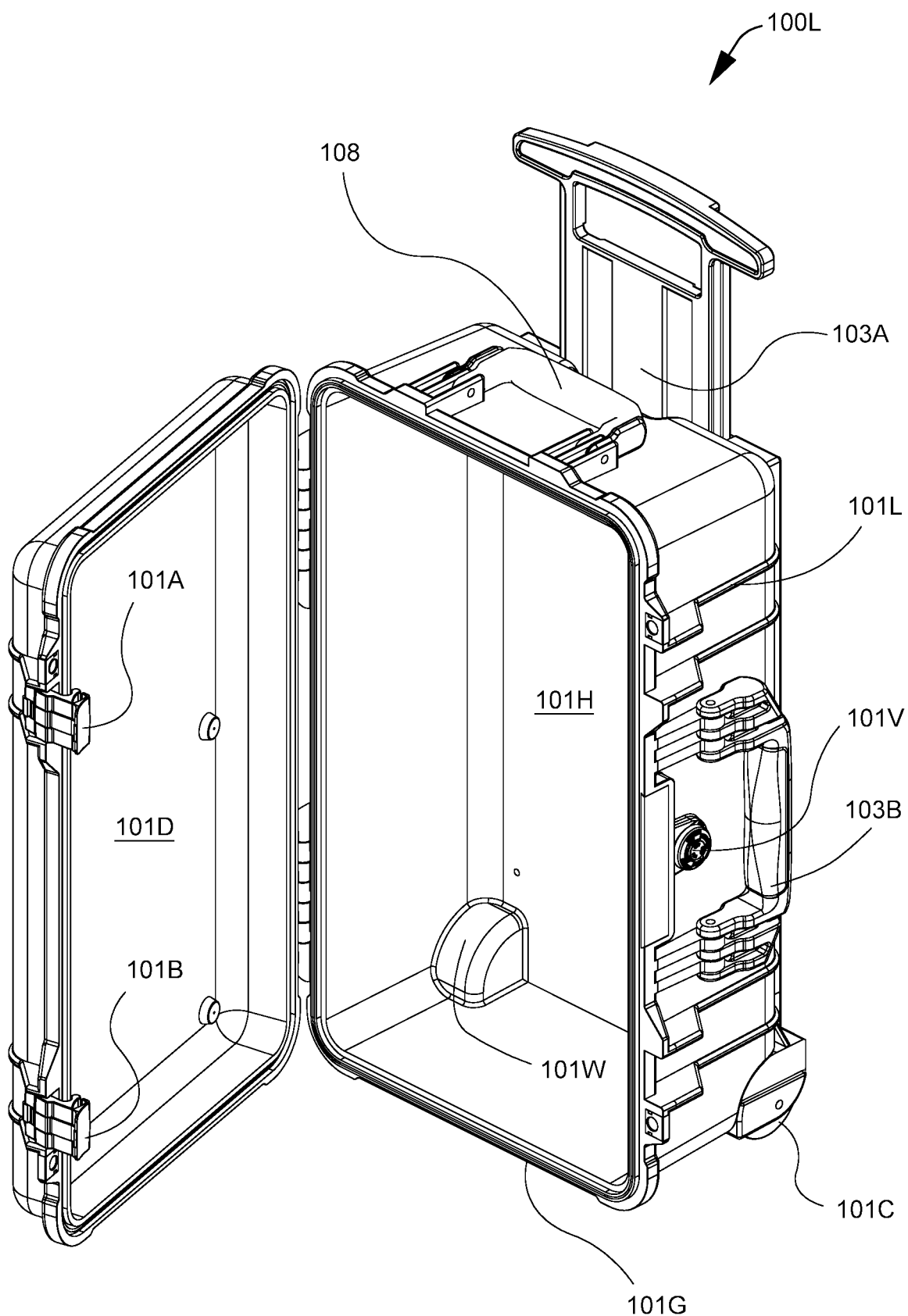
FIG. 1L is a view of the portable amplifier kit housing.

FIG. 1L is a view 100L of the portable amplifier kit housing 101H. The portable amplifier kit case 101L is generally rectangular in shape with rounded edges at the corners. The portable amplifier kit case 101L is formed by a central housing 101H with an attached door 101D. The door and the housing are made up of heavy-duty injection molded polypropylene plastic. The housing has a deep rectangular shaped cavity formed by the rear side of the amplifier case and four attached walls including the top, bottom, and side portions of the amplifier case. The cavity has a wheel well protrusion in the bottom left corner 101W and bottom right corner (not shown) of the amplifier kit case 101L. The cavity is open to the front of the amplifier case. A seal 101G is attached to the perimeter of the cavity facing the front of the amplifier case. The housing 101H is attached on one side to a door 101D by a hinge. The door has concave shape and includes latches 101A, 101B on the side of the door opposite the hinge. The latches engage lips on the side portion of the housing.

Still referring to FIG. 1L, in one embodiment, the housing has a length of about 22 inches, a height of about 13.9 inches, a depth of about 9 inches, and can transport a loaded weight of about 29 lbs. Roller blade style wheels with retractable handle may be included to increase the speed and ease which the case can be transported. The housing is rugged and can provide a watertight enclosure.

Still referring to FIG. 1L, in one embodiment, the housing has a length of about 25 inches, a height of about 20 inches, a depth of about 12 inches, and can transport a loaded weight of at least about 45 pounds. Roller blade style wheels with retractable handle may be included to increase the speed and ease which the case can be transported.

Figure 1M:
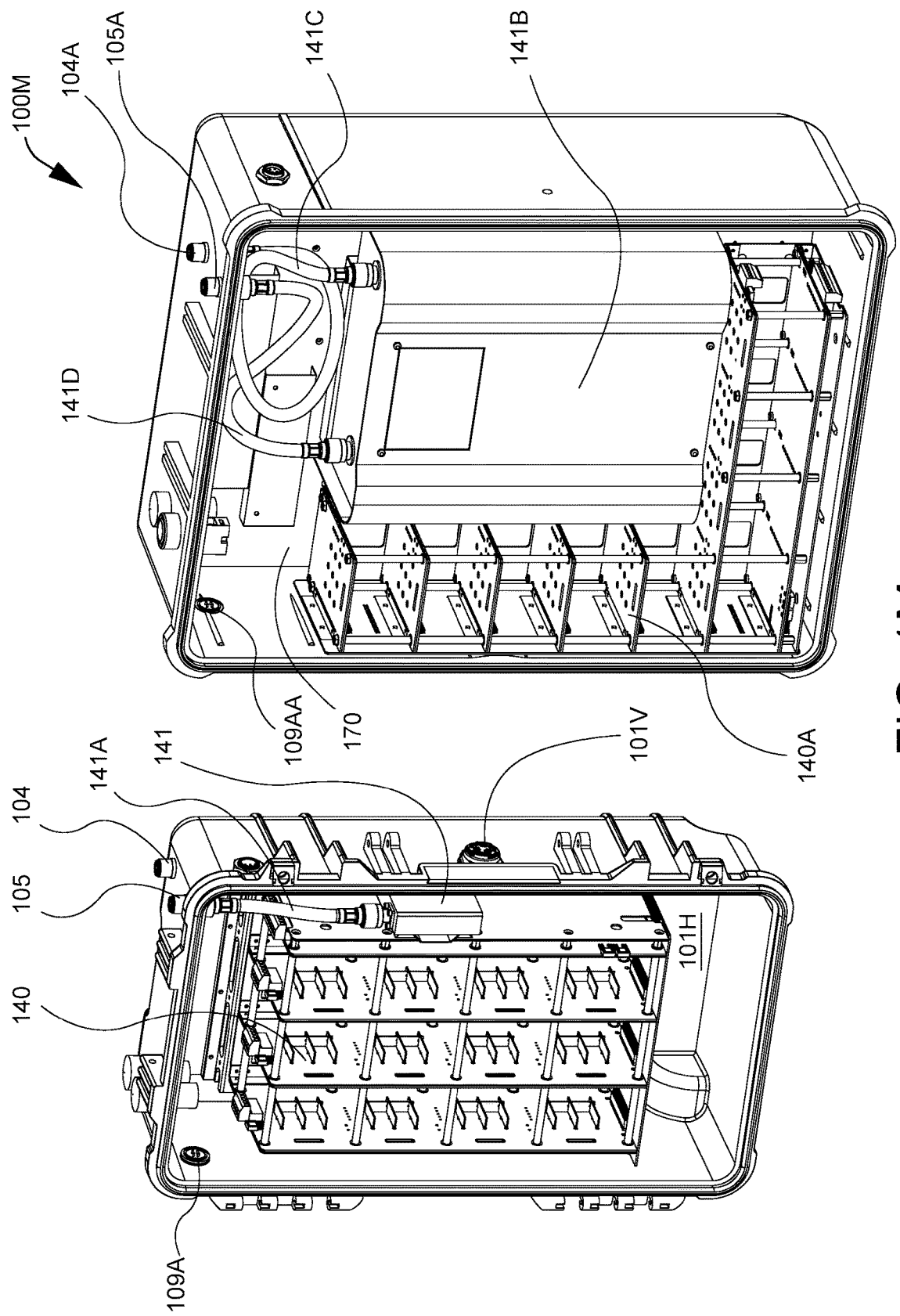
FIG. 1M is a view of two portable amplifier kits side-by-side with the front doors removed.

FIG. 1M is a view 100M of two portable amplifier kits side-by-side with the front doors removed. The portable amplifier kit on the left includes a bi-directional amplifier 141 and a battery module docking location 140 having a 3 by 4 array of open battery slots to hold a total of twelve modules. The bi-directional amplifier 141 is oriented sideways in space between a side portion of the housing and the battery module docking location. The amplifier kit also includes an AC/DC input connector 109A on the inner side portion of the housing near the upper left corner of the portable amplifier kit. On the top portion of the amplifier kit are the indoor antenna connector port 104 and the outdoor antenna connector port 105. The bi-directional amplifier 141 is connected to the outdoor antenna connector port 105 by an outdoor cable 141A. The bi-directional amplifier is connected to the indoor antenna connector port 104 by an indoor antenna cable (not shown). The vent 101H is located on a central portion of the side portion of the portable amplifier case.

In one embodiment, the bi-directional amplifier 141 is SIPS-BDA-800B having an operating frequency of about 806-824 MHz and about 851-869 MHz for use in 800 MHz Public Safety Radio Applications. It has a gain of about 50 dB and a linear output power of 19 (dBm, typical), a propagation delay of less than 150 nsec, a noise figure of 4 dB, AGC gain control, and overload protection including shutdown with auto-recovery. The bi-directional amplifier 141 is capable of operating with a stand-alone power supply or UPS (uninterruptible power supply). The AC input may be ACI-100 or hot swappable meaning that the device may continue to operate on AC power while additional sources of AC power are connected, disconnected, or interexchanged. In one embodiment, the voltage may be about 90-264 (VAC). In one embodiment, the frequency may be about 47 to 63 Hz. In one embodiment, the input power may be about 120 (VA).

In one embodiment, the backup power source may be a type of standalone battery. The preferred battery run time is 12 hours and may be expandable up to 48 hours. The batteries may be charged outside of the case or inside of the case, while they are in place with an AC or DC input. In one preferred embodiment, the batteries used as a power source are EM-100 manufactured by Modtech Corp in Willoughby, Ohio. The batteries may be lithium-ion and hot swappable.

Still referring to FIG. 1M, in one embodiment, the amplifier 141 may be operable in the temperature range of about −20 C to 50 C, up to an altitude of 3000 m, and in humidity of up to about 90% (relative). In one preferred embodiment, the amplifier kit can be used as a completely portable system with a total set up time of less than a few minutes.

The portable amplifier kit on the right includes a bi-directional amplifier 141B and a battery module docking location 140A having an L-configuration of shelves of open battery slots to hold a total of nine battery modules. The bi-directional amplifier 141B is oriented with its front portion facing out of the front of the amplifier kit. The amplifier kit also includes an AC/DC input connector 109AA on the inner side portion of the housing near the upper left corner of the portable amplifier kit. On the top portion of the amplifier kit are the indoor antenna connector port 104A and the outdoor antenna connector port 105A. The bi-directional amplifier 141B is connected to the outdoor antenna connector port 105A by an outdoor cable 141D. The bi-directional amplifier 141B is connected to the indoor antenna connector port 104A by an outdoor cable 141C.

In one embodiment, the bi-directional amplifier 141B in the kit on the right is a SIPS-BDA-800C having an operating frequency of about 806-824 MHz and about 851-869 MHz for use in 800 MHz Public Safety Radio Applications. It has a gain of about 65 or 75 dB and a linear output power of 25 (dBm, typical), a propagation delay of less than about 250 nsec, a noise figure of about 5.5 dB, AGC and manual gain control, and overload protection including shutdown with auto-recovery. The bi-directional amplifier 141B is capable of operating with a standalone power supply or an UPS (uninterruptible power supply). The AC input may be ACI-100 or hot swappable meaning that the device may continue to operate on AC power while additional sources of AC power are connected, disconnected, or interexchanged. The voltage is about 90-264 (VAC) with a frequency of about 47 to 63 Hz, and an input power (VA) of 120.

In one embodiment, the backup power source may be a type of standalone battery. The preferred battery run time (hr) is about 12 hours and expandable up to about 24 hours. The batteries may be charged outside of the case or inside of the case, while they are in place with an AC or DC input. In one preferred embodiment, the batteries used as a power source are EM-100 manufactured by Modtech Corp in Willoughby, Ohio. The batteries may be lithium-ion and hot swappable. The batteries may be interchangeable of a variety of handheld tools, portable devices, communication equipment, emergency lighting, as well as another size amplifier kit including the SIPS-BDA-800B. The amplifier kit may be connected to another amplifier kit to share power from batteries. Additionally, the amplifier kit may receive power from a variety of different sources including solar panel, car battery, wall socket, generator, and other stationary and fixed sources of power.

Still referring to FIG. 1M, in one embodiment the amplifier 141B has an operating temperature of about −20 to 50 C, is operable up to an altitude of 3000 m and in humidity of up to about 90% relative. In one preferred embodiment, the amplifier kit can be used as a completely portable system with a total set up time of less than a few minutes.

Still referring to FIG. 1M, both BDAs are seated in the amplifier kits with sufficient storage space for power supply and room for energy storage modules. The kit on the right houses a larger BDA 141B than the kit on the left. The kit on the right has a slightly greater height, a greater span across, and approximately the same depth. Both amplifiers have most of the same features built-in or attached to the amplifier kit housing.

Figure 1N:
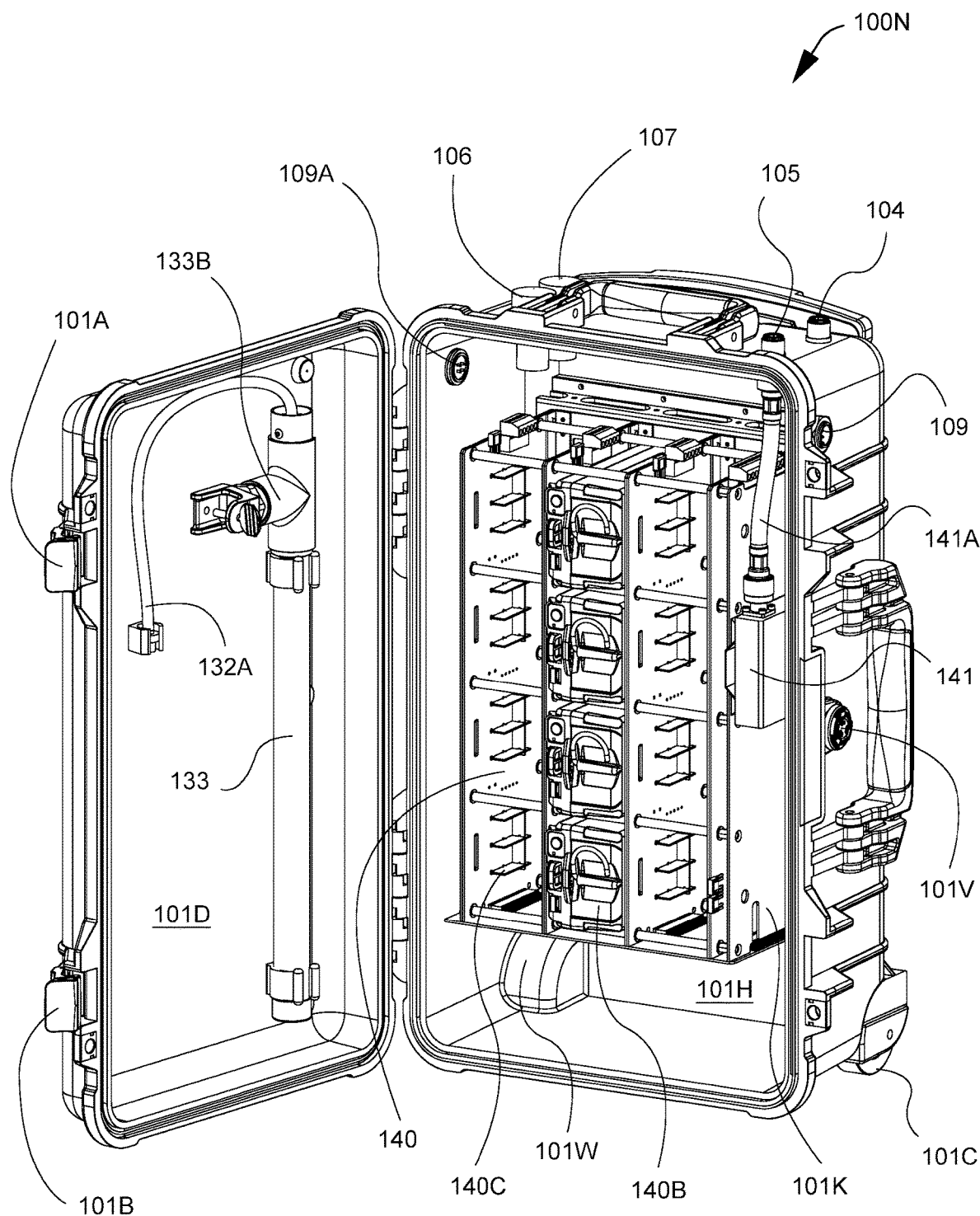
FIG. 1N is a perspective view of the portable amplifier kit with the door in an open position.

FIG. 1N is a perspective view 100N of the portable amplifier kit with the door 101D in an open position. The portable amplifier kit includes a top portion, a bottom portion, a right side portion, a left side portion, and a central cavity portion. The central cavity portion of the housing 101H includes a battery module docking location 140. The battery module docking location 140 includes a 3 by 4 array of open slots to hold a total of twelve modules including a left column, a middle column, and a right column of slots. Each slot includes battery module electrical connections 140C on the left side of the slots of the battery module docking location. In this view, the slots in the middle column are filled with battery modules 140B. The batteries are oriented to engage the battery module electrical connections 140C on the left side of the slots. Attached to one side of the battery module docking location 140 is a bi-directional amplifier 141.

The left side portion of the amplifier kit is connected to an amplifier kit door 101D with a hinge. The inside of the amplifier kit door 101D has a cavity which includes clips for securing the indoor antenna 133 in place. The indoor antenna optional mount 133B and indoor antenna pigtail cable 132A which are both attached directly to the indoor antenna may also be stored securely in this cavity allowing for one person to carry the equipment in a portable, convenient carrying case.

Figure 1O:
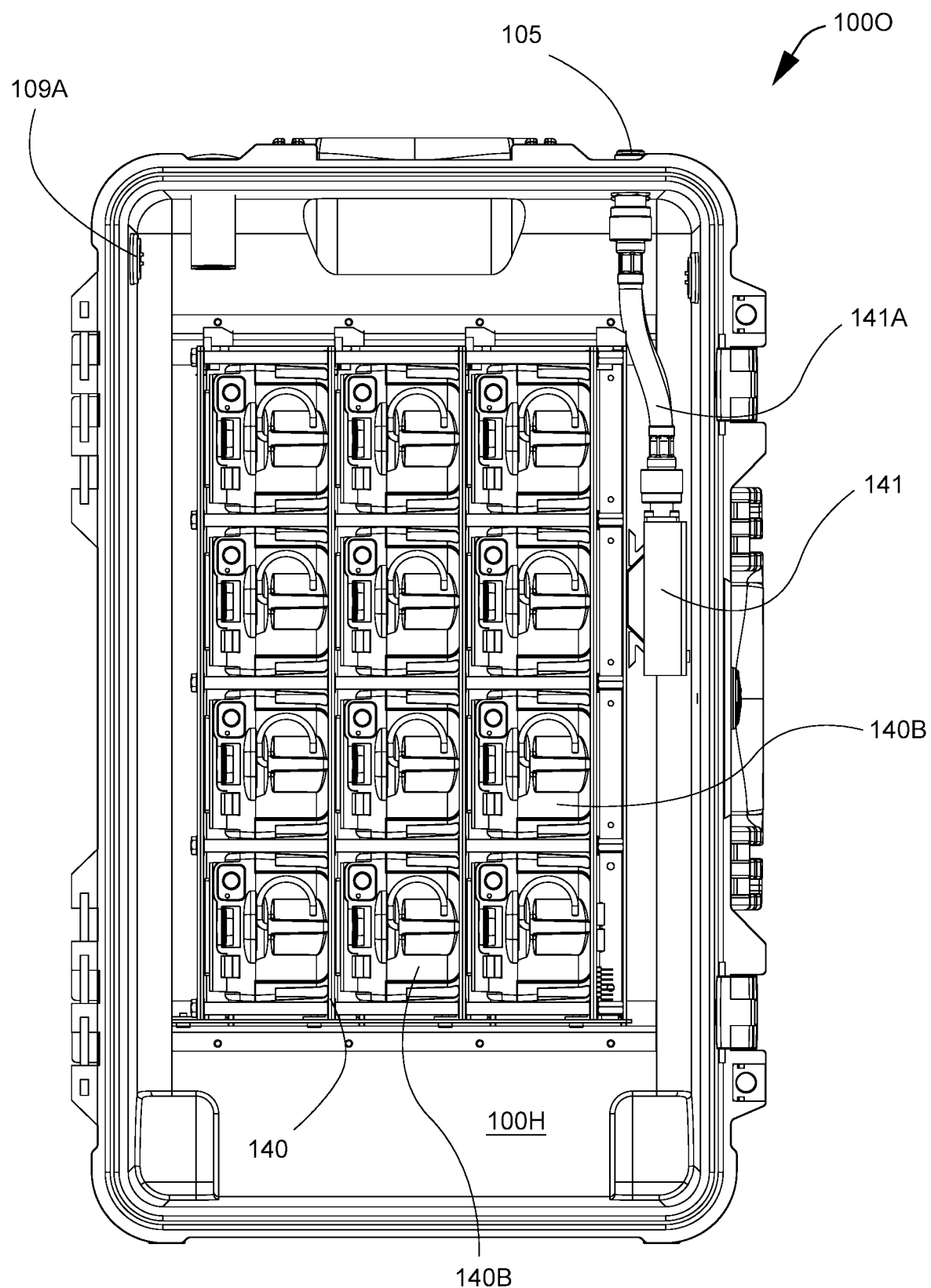
FIG. 1O is a front view of the portable amplifier kit including amplifier with the door removed.

FIG. 1O is a front view 100O of the portable amplifier kit including amplifier 141 with the door 101D removed. The housing 101H of the portable amplifier case is shown with the battery module docking location 140. In this embodiment, all slots of the battery module docking location 140 engage a battery energy module 140B.

Figure 1P:
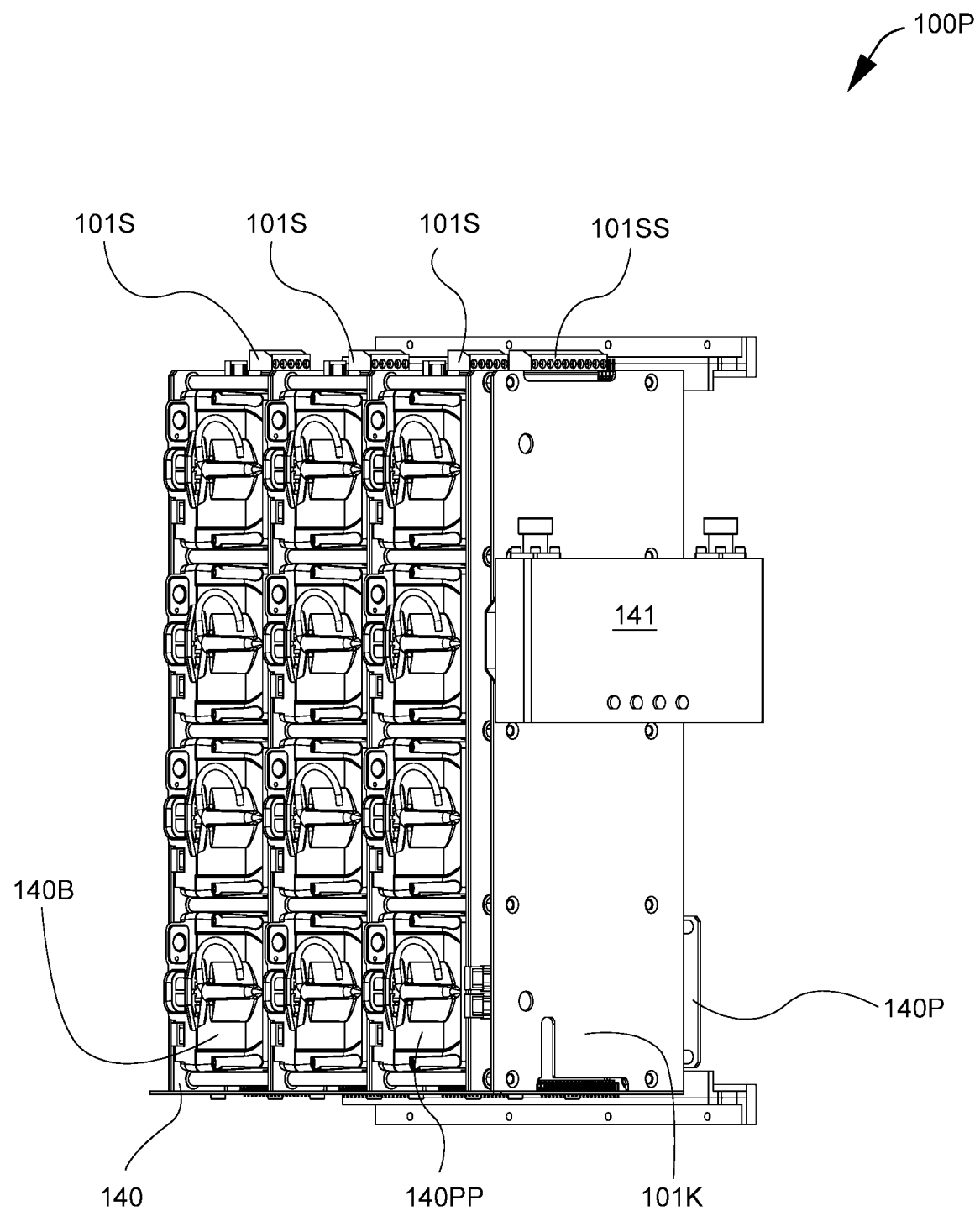
FIG. 1P is a perspective view of the internal details of the portable amplifier kit removed from the portable amplifier kit housing.

FIG. 1P is a perspective view 100P of the internal details of the portable amplifier kit removed from the portable amplifier kit housing 101H. The bi-directional amplifier 141 is located to the right of the battery module docking location 140. Across the top of the battery module docking location 140 are ancillary energy subsystem connectors 101S and a primary energy subsystem connector 101SS. Battery module 140B sits in the slot of the battery module docking location 140. A power conversion module 140PP is located in the slot in the lower right corner in the last column of the battery module docking location. A power conversion I/O connector 140P extends beyond the metal rack on the lower left side of the battery module docking location 140. The controller with cover 101K is located adjacent to the power conversion I/O connector 140P.

Figure 1Q:
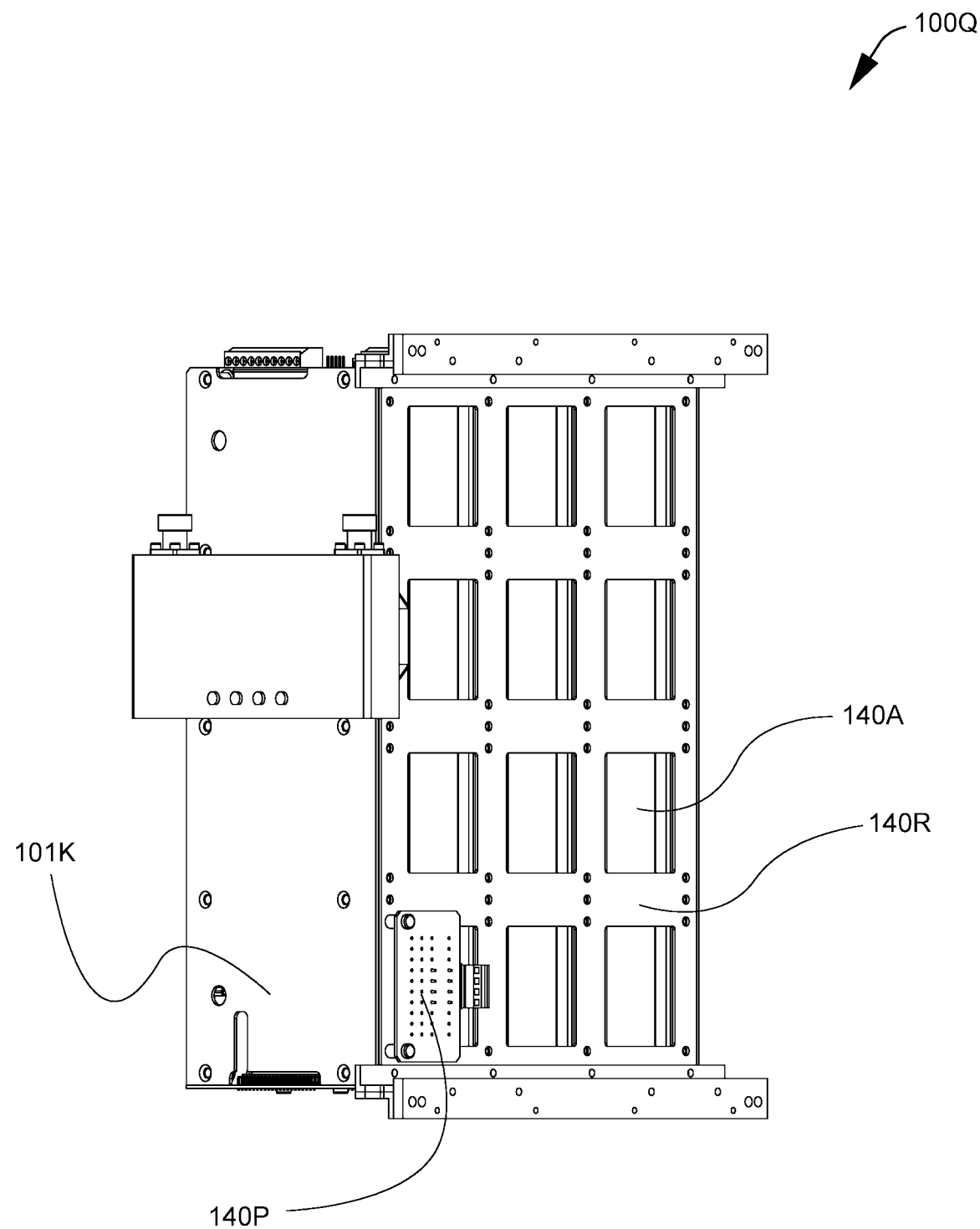
FIG. 1Q is a rear view of the internal details of the portable amplifier kit removed from the portable amplifier kit housing.

FIG. 1Q is a rear view 100Q of the internal details of the portable amplifier kit removed from the portable amplifier kit housing 101H. The energy subsystem rack 140R is shown to have slots. The power conversion I/O connector 140P can be seen in the left column on the lower left. The controller with cover 101K is adjacent to the power conversion I/O 140P in the lower left portion of the battery module docking location 140 in this view. The clearance for the power conversion I/O connector 140A is shown in the column on the right in this view.

Figure 1R:
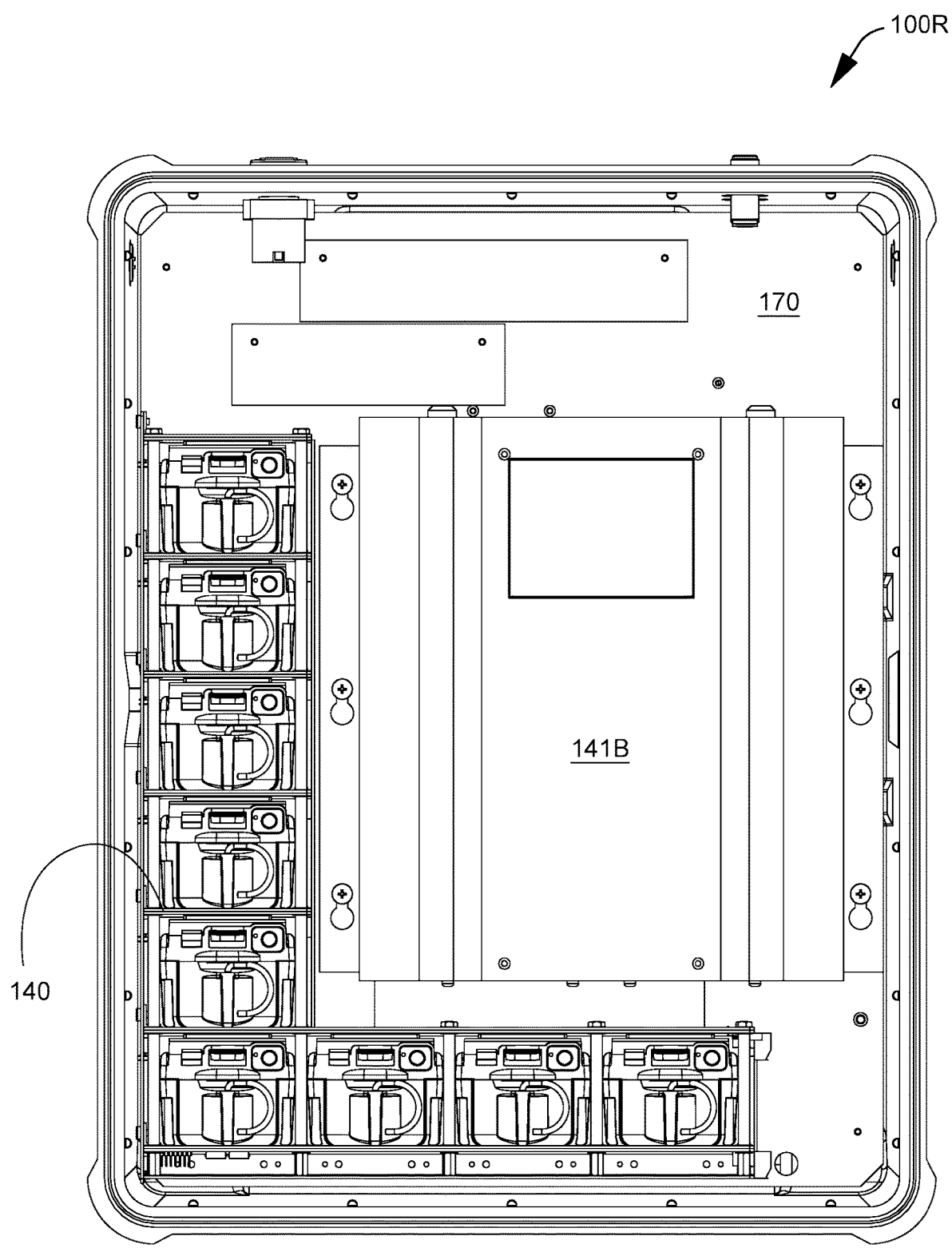
FIG. 1R is a front view of a second embodiment of the portable amplifier kit including amplifier 141B with the door removed from the portable amplifier kit.

FIG. 1R is a front view 100R of a second embodiment of the portable amplifier kit including an amplifier 141B with the door 101D removed from the portable amplifier kit. The battery module docking location 140 is shown to have an L-shaped configuration. The BDA is secured with screws to the portable amplifier internal main mounting plate 170. The BDA 141B is set nearly adjacent to the upper portion of the battery module docking location 140.

Figure 1S:
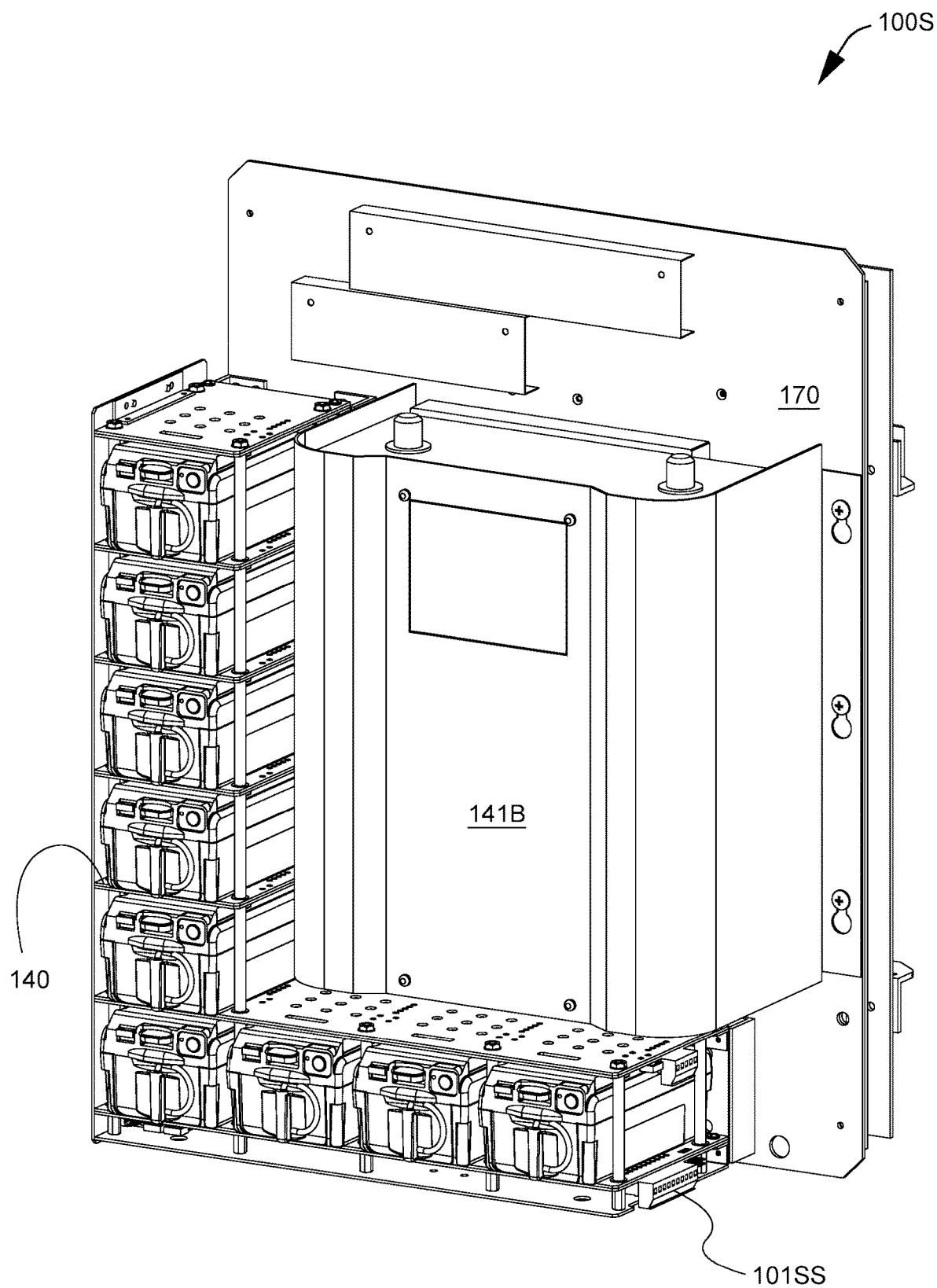
FIG. 1S is a perspective view of the internal details of the portable amplifier kit (including amplifier) removed from the portable amplifier kit housing.

FIG. 1S is a perspective view 101S of the internal details of the portable amplifier kit with the amplifier and power assembly removed from the portable amplifier kit housing 101H. The primary energy subsystem connector 101SS is located at the end of the lower portion of the battery module docking location 140. The bi-directional amplifier 141B is attached to the portable amplifier internal main mounting plate 170 with a column of screws on the right side.

Figure 1T:
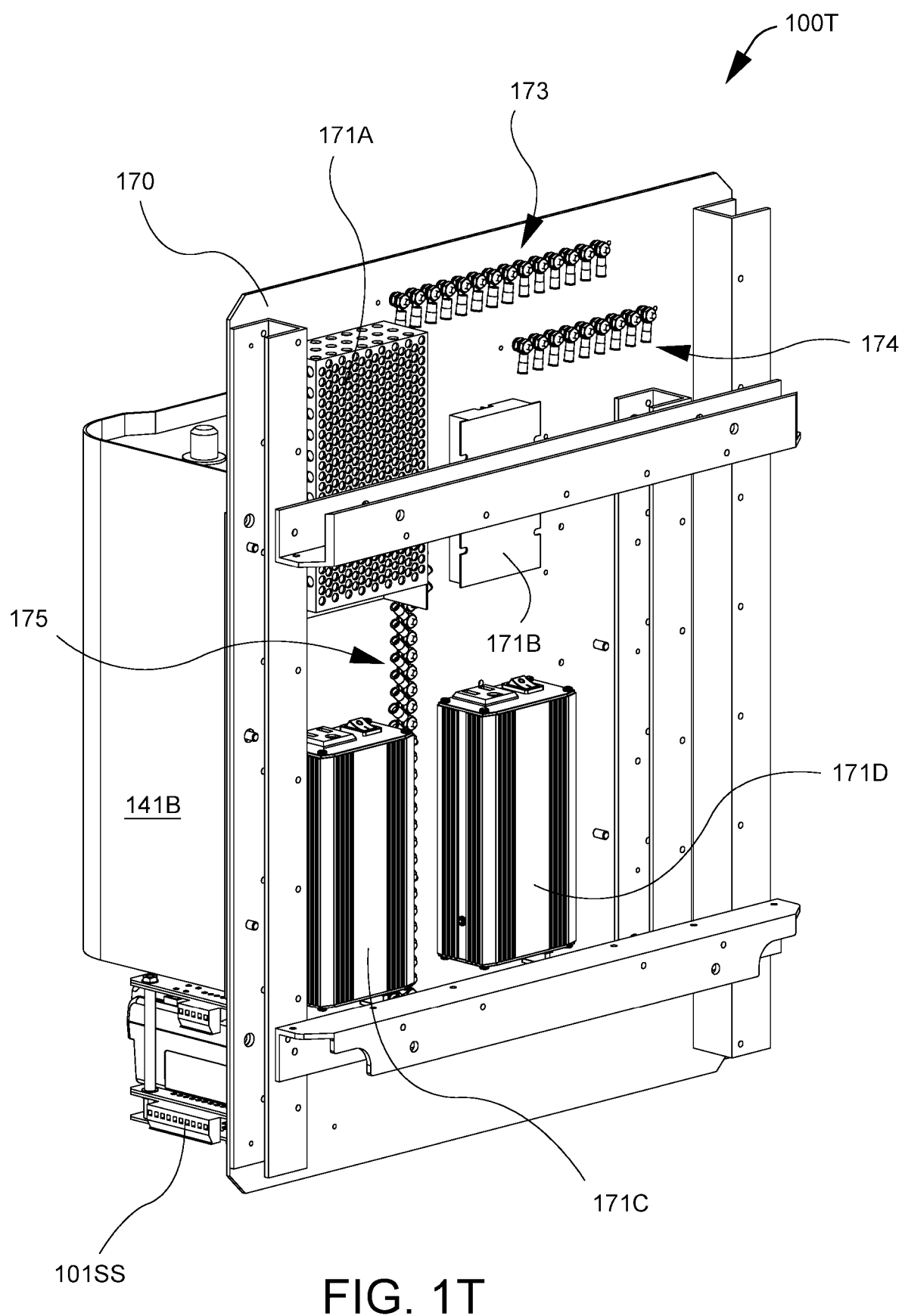
FIG. 1T is a rear perspective view of the internal details of the portable amplifier kit (including amplifier) removed from the portable amplifier kit housing.

FIG. 1T is a rear perspective view 100T of the internal details of the portable amplifier kit with the amplifier and power assembly removed from the portable amplifier kit housing 101H. A rear view of the portable amplifier internal main mounting plate 170 shows the following components: An AC/DC conversion module for AC input 171A in the upper left corner, electrical terminals for amplifier kit I/O interconnections 173 in relative proximity to the top of the mounting plate, a set of electrical terminals 174 used as bi-directional amplifier interconnections, a DC/DC conversion module 171B for DC input below the first set of amplifier kit I/O interconnections, a set of electrical terminals 175 for power I/O interconnections extending in a vertical line down the back of the mounting plate, a DC/AC inverter module 171C for bi-directional amplifier power located to the left of the electric terminals 175, and an DC/AC inverter module 171D for convenience AC output power. The bi-directional amplifier 141B is located on the opposite side of the mounting plate 170. The primary energy subsystem connector 101SS is located beneath the bi-directional amplifier 141B on the opposite side of the mounting plate 170.

Figure 1U:
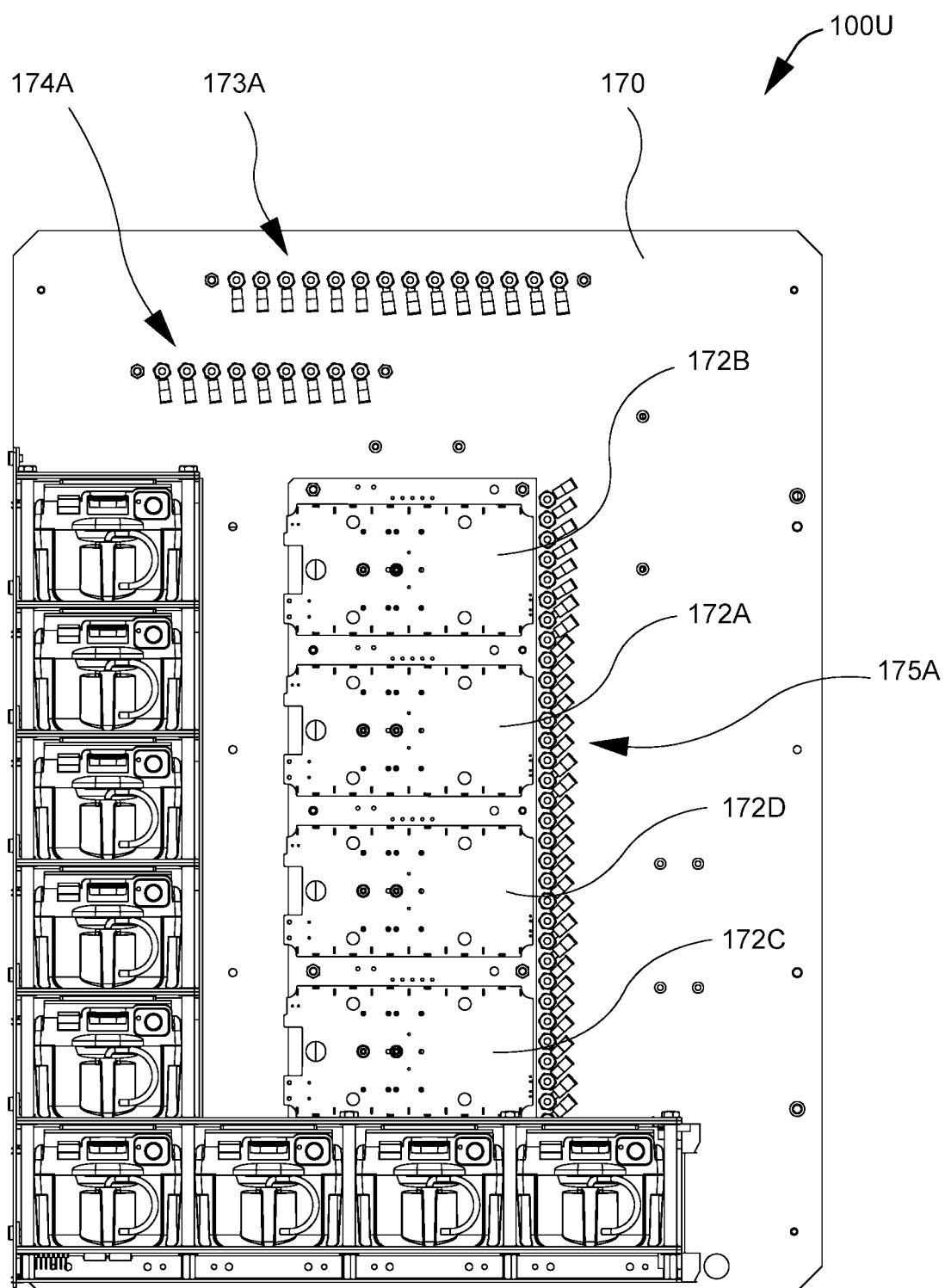
FIG. 1U is a front view of the internal details of the battery module docking location 140 (with the amplifier removed outside of the portable amplifier kit housing.

FIG. 1U is an alternate front view 100U of the internal details of the portable amplifier kit with the amplifier and power assembly removed from the portable amplifier kit housing 101H and the bi-directional amplifier 141B removed from the mounting plate 170. The portable amplifier internal main mounting plate is seen from the front with the BDA removed showing four rectangular shaped controllers stacked from top to bottom: a controller of DC/DC conversion module for DC input 172B, a controller of AC/DC conversion module for AC input 172A, a controller of DC/AC inverter module for convenience AC output power 172D, and a controller of DC/AC inverter module for bi-directional amplifier power 172C. These controllers are stacked on top of each other starting with the controller of DC/DC conversion module for DC input 172B near the upper portion of the L-shaped configuration battery module docking location down to the lower portion of the L-shaped configuration of the battery module docking location. Along the top of the mounting plate, a first line of electrical terminals for amplifier kit I/O interconnections 173A extend in a horizontal line. A second line of electrical terminals 174A for bi-directional amplifier interconnections extends in horizontal direction beneath this first line of electrical terminals. A third line of electric terminals 175A extends down the front of the mounting plate 170 providing power I/O interconnections with modules 172A, 172B, 172C, and 172D with power conversion units 171A, 1718, 171C, and 171D.

Figure 1V:
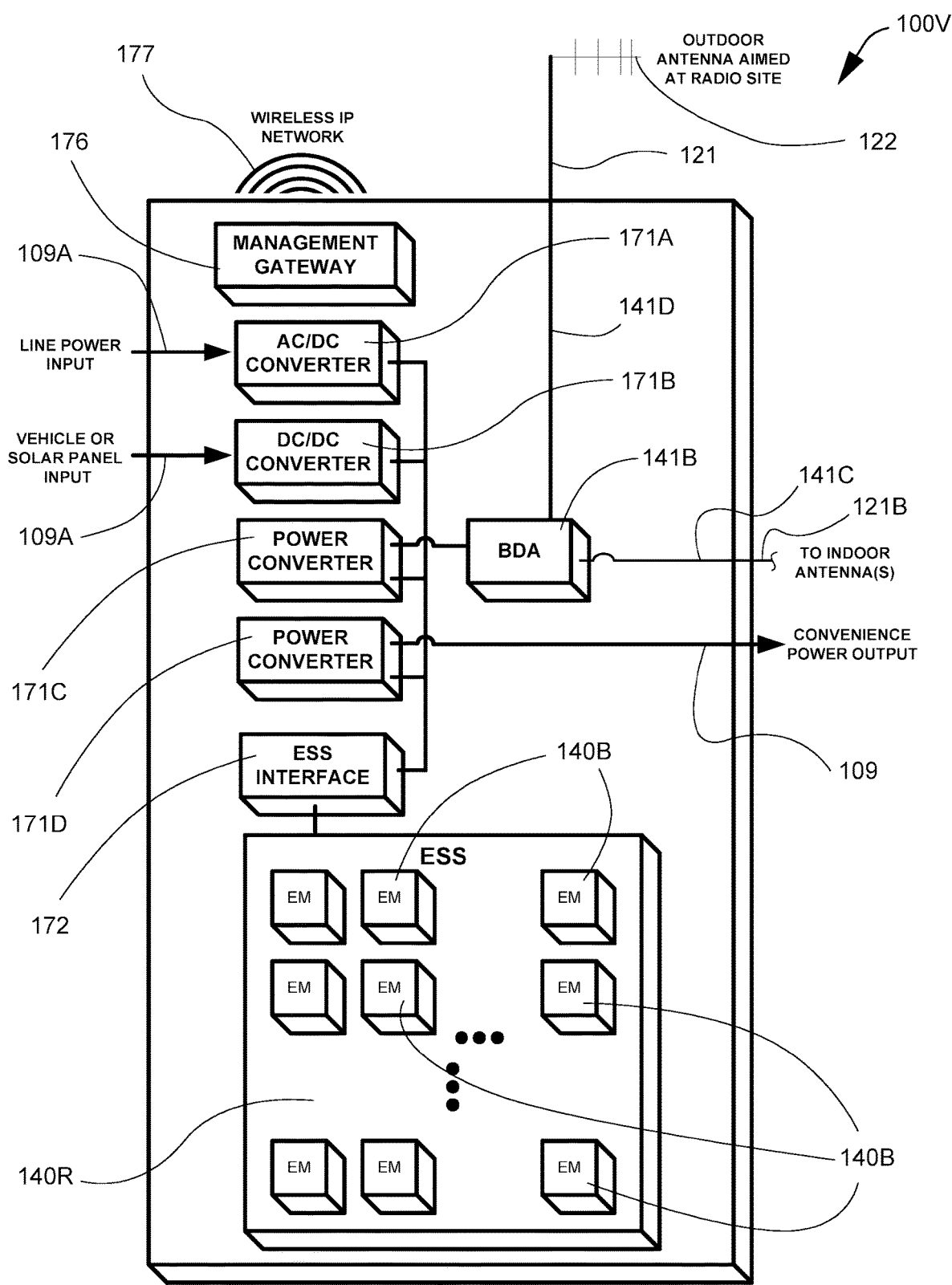
FIG. 1V illustrates a block diagram of an alternate In-Building Communication System as an integrated, portable bi-directional amplifier and alarming system (IPBDAAS).

FIG. 1V shows a block diagram 100V of an alternate In-Building Communication System as an integrated, portable bi-directional amplifier and alarming system (IP-BDAAS). The portable amplifier kit 101 has an AC/DC output connector 109A in the upper right portion of the amplifier kit which acts as a port allowing line power input from outside the amplifier kit into the kit. Line power input which enters the kit through 109A is then received by AC/DC conversion module for AC input 171A which is able to convert an AC input to a DC power output. Underneath the AC/DC output connector is a DC/DC input connector 109A which is able to receive power from a DC source such as a vehicle or solar panel. Once a DC input enters the amplifier kit from 109A it is routed to a DC/DC conversion module 171B which is able to convert the power to a level of DC power which can be more effectively utilized in the amplifier kit. Both the AC/DC conversion module for AC input 171A and the DC/DC conversion module for DC input 171B are connected to a common line which has a connection to a DC/AC inverter module 171C. This inverter module 171C has a connection to the bi-directional amplifier 141B to provide power to the BDA. The common line which interconnects the AC/DC conversion module 171A for AC input, the DC/DC conversion module 171B for DC input, and the DC/AC inverter module 171C to power the bi-directional amplifier together extends further to interconnect to the DC/AC inverter module 171D convenience AC output power and an energy subsystem rack interface 172. The DC/AC inverter module 171D connects to an AC/DC output connector 109 on the outside of the amplifier kit which is able to provide convenience AC output power to devices located where the amplifier kit is deployed. The amplifier kit is able to act as a wireless portable energy source at a site providing power in the event of an energy outage at the location in need of communication enhancement, or to reduce the need for extension cords increasing safety and reducing response time when using the amplifier kit. In this way, the amplifier kit may significantly lighten the load for an emergency responder providing a faster response time.

Adjacent to and interconnected to the DC/AC inverter module 171D is an energy subsystem rack interface 172. The energy subsystem rack interface 172 is connected to the energy subsystem rack 140R which houses individual battery energy modules 140B. The energy subsystem rack interface 172 labeled ESS Interface manages power received from these battery modules, from the AC/DC conversion module 171A, DC/DC conversion module 171B, DC/AC inverter module 171C, and DC/AC inverter module 171D and the power interchanged between these different power modules and/or power sources. Both the BDA 141B and the AC/DC output connector 109 can receive power from the battery modules through the energy subsystem rack interface 172. The BDA 141B and the AC/DC output connector 109 can receive power from a line power input, vehicle, or solar panel input (power sources from outside the amplifier kit) or from the battery modules 140B (power source located inside the amplifier kit) located in the energy subsystem rack 140R. The ESS interface 172 has intelligence in the form of at least one controller to manage power effectively and direct power to provide optimum energy storage capacity in the battery modules 140S stored in the energy subsystem rack 140R. The ESS interface 172 follows a predetermined series of steps to manage power optimally to the BDA 141B, convenience power input 109, converter modules 171A, 171B, 171C, 171D, and the battery modules 140B. The ESS interface 172 follows a predetermined series of steps to manage power optimally from the line power input, vehicle or solar panel input, converter modules, and the battery modules. The predetermined series of steps optimally manages power based on the temperature, environmental conditions, performance requirements of the BDA, performance history of the batteries, and other conditions required by the application. The predetermined series of steps to optimally deliver energy can be programmed based on the energy source in the battery modules. Additional information on the process steps is found in U.S. patent Ser. No. 11/672,853, having a file date of Feb. 8, 2007 which is hereby incorporated by reference.

The amplifier kit 101 includes a scalable intelligent power supply which can receive, store, and deliver power from a variety of sources. A variety of methods and circuitry to interconnect the circuitry within the amplifier case may be used. Pulse width modulation is one preferred method for managing power from a variety of inputs.

The battery modules 140B each are individually connectable and removable to and from the energy subsystem rack 140R. Each of the battery modules has electrical connections to the energy subsystem rack 140R which in turn is connected to the ESS interface 172. The ESS interface can measure and control the state of charge, power, and energy storage within each battery on an individual battery module basis. The energy subsystem rack 140R has electrical connections interconnecting the battery modules to each other and allowing them to share power to balance their state of charge for optimum energy storage or power delivery. Individual batteries may be removed from the energy subsystem rack 140R without interrupting or interfering with the power to any of the other components in the device. Individual batteries may be inserted into the energy subsystem rack 140R without interrupting the power to any of the other components in the device. As a result, the amplifier kit has an uninterruptible, hot swappable power supply. The power supply in the amplifier kit may be able to provide power to the BDA 141B or convenience power output 109 with all or none of the battery modules engaged into their respective slots in the energy subsystem rack 140R. Preferably, the battery modules 140B have sufficient energy to supply the BDA 141B with at least 12 hours of continuous run-time.

The battery modules 140B may also have their own intelligence in the form of controllers programmed with a series of steps to provide optimum energy storage or power delivery. Power may be received from the batteries in a sequential, proportional, alternate, step wise, or all-or-nothing manner based on the series of steps programmed in each battery module taking into account the power requirements for each application and environmental conditions. Additional information on the process steps is found in U.S. patent Ser. No. 11/672,853, having a file date of Feb. 8, 2007 which is hereby incorporated by reference.

The batteries have an effective energy density, so that the amplifier case remains light-weight to be carried by one person quickly with at least 12 hours of continuous run time for the bi-directional amplifier. In one embodiment, the energy source of the battery modules are lithium-ion cells have a very high energy density allowing the amplifier kit to remain lightweight and portable and provide continuous power sufficient to operate the bi-directional amplifier for at least 12 hours. In addition, less battery modules may also be supplied if a line power is available or shorter battery run time is allowable. Optionally, more battery modules may be supplied if longer battery runtime is desired. The battery modules may all have the same energy source or different energy sources. In particular, battery modules having the same lithium-ion cells with same cell structure may be used or different lithium cells may be used within the battery modules used in the same energy subsystem rack 140R.

The batteries are interoperable with other portable equipment that may utilize a portable energy source. In particular, the batteries may also be used to supply power to portable radios, repeaters, lights, cameras, vehicles, hand tools, telephones, amplifiers, computers, medical equipment, electric equipment, inverters, or alarms which may be used at the site of an event in the case of a power outage. The lightweight high energy density of the power supply provides an important versatility advantage by being able to power other equipment. The power supply is self-contained within the amplifier kit and easy to carry, transport, and ship. Cords for transmission of power or Internet connectivity are not essential.

The safety, reliability, and utility benefits of the amplifier kit are significant. The batteries may power other equipment while they remain in the amplifier kit or by being removed from amplifier kit. More information on the battery modules and charging mechanisms are found in U.S. patent Ser. No. 11/672,853, having a file date of Feb. 8, 2007 which is hereby incorporated by reference.

The portable amplifier kit 101 holds the bi-directional amplifier 141B which is connected via an outdoor antenna cable 121 to an outdoor antenna 122 aimed at a radio site. The bi-directional amplifier 141B is connected via a cable 141C inside the amplifier kit to an indoor cable short segment 121B outside of the amplifier kit which is connectable to an indoor antenna system.

The amplifier kit is also connected to a management gateway 176 which connects the amplifier kit to a wireless Internet Protocol (IP) network 177. The power supply of the amplifier is accessible remotely over the Internet. The energy content of the batteries as well as the overall power supply of the amplifier kit may be monitored remotely using a standard web browser interface program. The remote web monitoring of the power status of the amplifier kits enables a single individual to monitor more than one kit and efficiently attend to the interchange of battery modules or other power sources as necessary in a multiple system deployment using more than one portable enhancement system. In one embodiment, the amplifier kit has a specific IP address assigned to it that is accessible by at least one user to monitor the power supply and run time available based on the energy content and energy inputs in real time.

Further, important controls such as on/off power would also be accessible and controllable remotely providing quick communication enhancement as necessary for intermittent problems. Additionally, in the event of problematic oscillation or other forms of interference the BDA may be easily powered off through this remote access feature. In the event this amplifier kit were deployed in a larger multiple system deployment with one or more units which may be susceptible to cause interference, any unit may be powered off or on remotely as needed or desired to diagnose the best possible location to provide enhanced coverage and reduced likelihood of interference from a variety of locations.

Figure 2:
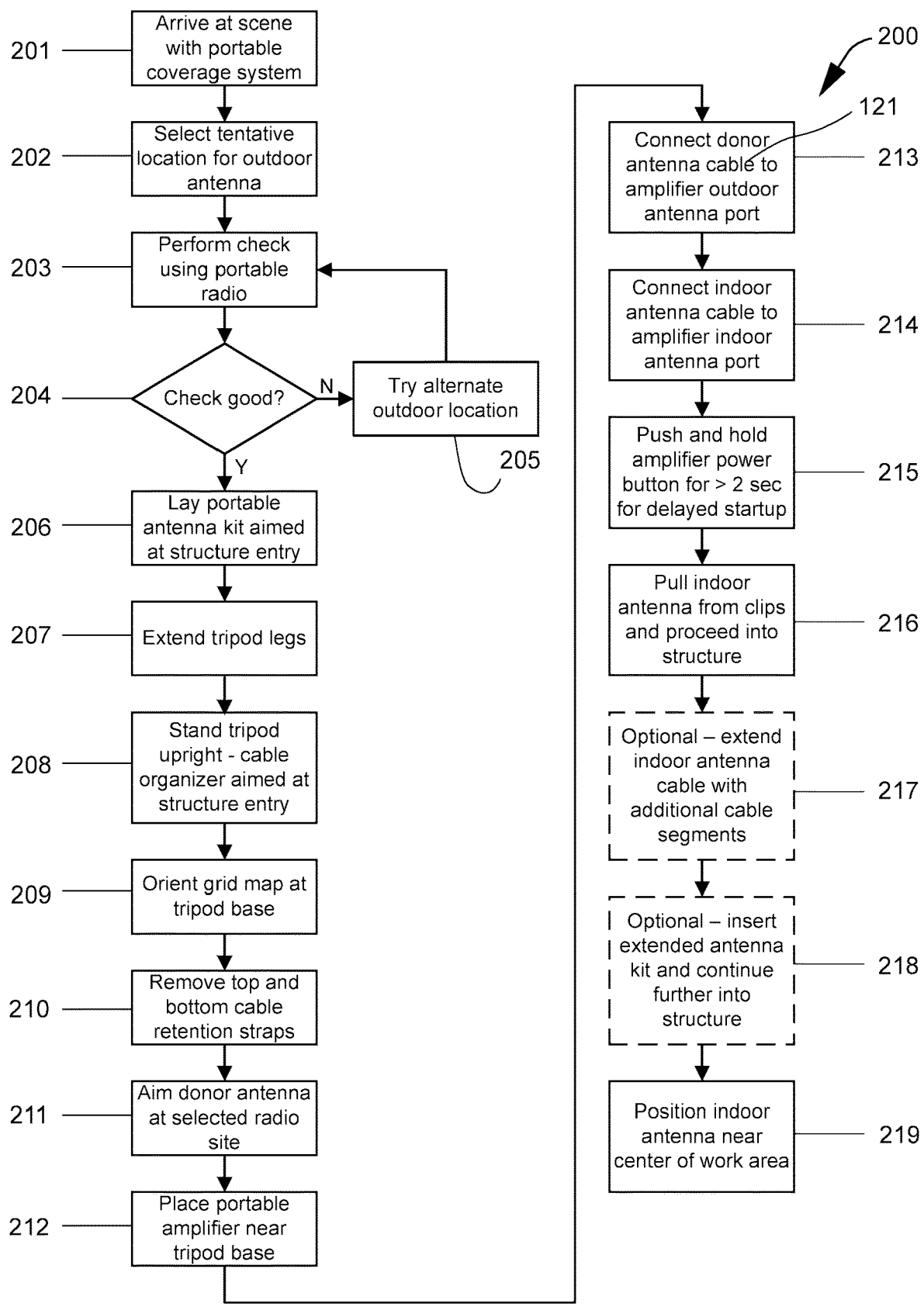
FIG. 2 illustrates a flow chart (process diagram) for deploying portable radio coverage system.

FIG. 2 is a flow chart 200 showing a method for deploying portable radio coverage. In step 201, arrival at scene with portable coverage system occurs. A tentative location for the outdoor antenna 122 of the antenna kit 102 is selected in step 202. A portable radio is used to perform a coverage check at the tentative location in step 203. The results of the check are obtained in step 204. If coverage as checked with the portable radio is not adequate at this location (negative result), the set up requires an additional testing step in step 205 to try an alternate outdoor location. In the negative result pathway step 203, perform check using portable radio, is then repeated.

Once an acceptable check result is obtained, the step 206 of laying the portable antenna kit aimed at structure entry is performed. This is depicted graphically in FIG. 1E. Tripod legs are extended in step 207 as depicted graphically in FIG. 1F. The tripod is stood upright with the cable organizer aimed at structure entry in step 208 as shown in FIG. 1G. A grid map 300 at tripod base is oriented to the North using a compass in step 209, also shown in FIG. 1G. FIG. 1H depicts the following steps: The top and bottom cable retention straps are removed in step 210. The donor antenna is aimed at a selected radio site in the next step 211. The portable amplifier kit is placed near the tripod based in step 212. In step 213, the donor antenna cable is connected to the amplifier outdoor antenna port. The indoor antenna cable is connected to the amplifier indoor antenna port 214. Although not shown explicitly as a step in FIG. 2, the telescoping sections of the tripod stand can also be raised to increase the height of the outdoor antenna if desired at this point. As part of step 215, the amplifier power button is held for at least 2 seconds for delayed startup of the bi-directional amplifier. The duration of the time delay is preconfigured by software and stored in nonvolatile memory of the onboard amplifier kit microcontroller. It will typically range from several tens of seconds to several minutes depending on user requirements. The indoor antenna is pulled from clips securing it to the spine of the cable organizer and the indoor antenna is carried into the structure. Optional step 217 includes extending indoor antenna distance from the amplifier with additional cable segments. Optionally, an extended antenna kit may be inserted and taken further into the structure. Use of extended antenna kit(s) allow additional indoor antennas to be coupled and enabled creating a distributed antenna array as deployment progresses. As part of step 219, the indoor antenna is ultimately positioned near the center of coverage area or in location to provide optimal coverage of the area in need of coverage enhancement. In some cases, it may be advantageous to select a location for the indoor antenna that is out of the way of traffic or above an area that has not yet been cleared for passage. The intelligence embedded in the amplifier kit enabling the turn on delay is activated by holding down the button provides safer, more effective operation of the BDA and communication coverage enhancement by reducing the opportunity for oscillation and resulting radio system interference due to their being inadequate isolation between the sending and receiving antennas until the indoor antenna has been taken some distance away from the outdoor antenna and into the attenuating structure.

FIG. 2A is a flow chart 200A showing a method for deploying portable radio coverage. Initially, the power button 106 is pressed in step 201A. The power button is held for less than 2 seconds as part of step 202A, the power button is released as part of step 203A, and the amplifier kit is ready without delay to operate in step 204A. This series of process steps may be used once the amplifier kit, the outdoor antenna, and the indoor antenna, are all set up and connections to the cables connecting the amplifier kit and the outdoor antenna and the indoor antenna have all been made. The amplifier kit has storage capability to use a different process to power the BDA corresponding to different methods of actuating the power button switch. This variety of start-up sequences helps to provide effective coverage enhancement, while avoiding and reducing the opportunity for oscillation or other problematic sources of interference. A variety of different methods of actuating the power to the BDA may be used including pressing the power button in a specific sequence, holding the power button, etc. A variety of button configurations may be used on the outside of the amplifier kit. In a preferred embodiment, a button is used on the outside of the case and a variety of different start-up sequences may be initiated by using a single power button. The power to the controller intelligence in the amplifier kit may be enabled independently of powering on the amplifier in order to access important diagnostic information, while preserving battery life and reducing potential for interference. In one embodiment, the intelligence embedded in the amplifier kit and activated by holding down the button for less than two seconds. In another embodiment, the BDA may be powered up immediately to more quickly provide communication coverage enhancement more quickly based on the particular site configuration.

FIG. 2B is a flow chart 200B showing a method for deploying portable radio coverage. A method for deploying portable radio coverage is shown in which the BDA can be powered up with a delayed start. This delay start is actuated with a single button. Further, the delay start option can be communicated using an indicator light on the outside of the amplifier case. The delay start provides the opportunity to operate the BDA safely and effectively and establish communications quickly with minimal instrumentation while avoiding problematic oscillation or automatic shutdown of the BDA. The operator can choose the best timing sequence for powering the BDA based on the conditions on site. Multiple powering sequences can be used and can be actuated simply using an amplifier kit with the same configuration and instrumentation. In all scenarios, the BDA has embedded intelligence to respond with the proper start-up and power sequence.

In step 201B, the power button 106 is pressed. The power button is held for more than 2 seconds in step 202B. The indication that the power sequence has been started is provided with the green light illuminating in step 203B. This start-up sequence is further actuated with the power button being released after less than 5 seconds has elapsed in step 204B. A green light flashes for time delay start in step 205B. The amplifier kit now may be operated as part of step 204A.

Holding the power button more than 2 seconds powers up the amplifier kit and the embedded intelligence. Once the amplifier kit is powered up information may be received from the amplifier kit intelligence by providing another command with the power button. In this embodiment, releasing the power button before 5 seconds has elapsed initiates a delay start-up mode. The embedded intelligence of the amplifier kit communicates that the delayed start-up mode has been initiated by flashing the green light.

FIG. 2C is a flow chart 200C showing a method for deploying portable radio coverage. In step 201C, the power button 106 is pressed. In this embodiment, an additional alternate start-up mode is initiated once the power of the amplifier kit has been turned on. This alternate start-up sequence is initiated by holding the power button down more than 2 seconds in step 202C. The green light illuminates in step 203C. Step 204C includes the operation of continuing to hold the power button more than 5 seconds. In step 205C, the green light goes out indicating the BDA in the amplifier case is not powering on, however, the intelligence in the amplifier case is powered on. In step 206C, the power button is released. The red light on the outside of the amplifier case flashes showing state of charge in step 207C. Indication of safe shipping status is provided in step 208C with the illumination of the green light. Step 209C is a step in which waiting occurs before the next button push.

In this embodiment as shown in view 200C of the flow chart, information on the energy level of the batteries is provided with the actuation of a single button. Further, important safety information is also communicated to the outside of the box from inside the box utilizing the intelligence embedded in the amplifier case and connections to the battery modules in the inside of the case. The case does not need to be opened and safety mechanisms of the battery are easily reported as functioning or non-functioning without requiring lengthy inspection.

Figure 2D:
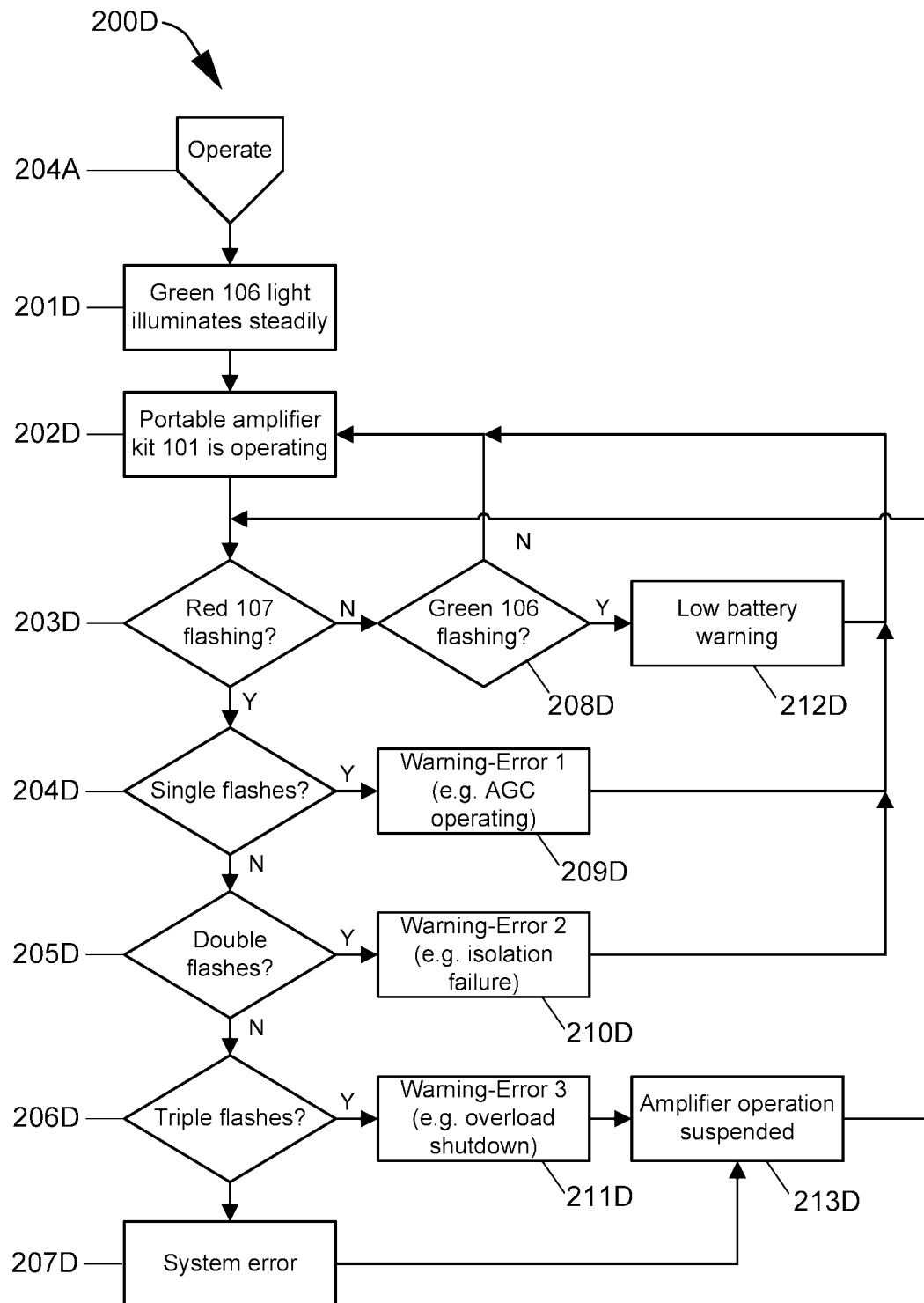
FIG. 2D is a flow chart (process diagram) for deploying portable radio coverage.

FIG. 2D is a flow chart 200D showing a method for deploying portable radio coverage. In addition to alternate start-up sequences, the intelligence in the amplifier kit also provides important information during operation of the amplifier. Step 204A, the amplifier case begins operation. Green light 106 illuminates steadily in step 201D. In an alternative embodiment, the green light illuminates mostly steadily, momentarily flashing off then quickly on again, simulating a heartbeat as an indication of normal, active operation status. The portable amplifier kit 101 is operating in step 202D. An indication of operational status is provided by a red light 107 and a green light 106. In the event, the red light is not flashing in 203D, evaluation by the operator may continue to examine the green light 106 in 208D. In the embodiment, where the green light 106 is not flashing, the portable amplifier is operating 202D. However, in the embodiment the green light is flashing slowly with equal on and off times, the intelligence of the amplifier kit is communicating a low battery warning 212D. The portable amplifier kit may continue to operate in step 202D.

However, in the event following 202D, single flashes are being produced by the red light 107 as in 204D, a Warning-Error 1 (e.g. AGC operating) 209D is provided. Following warning 209D, the portable amplifier kit 101 is operating as shown in 202D.

During operation of the portable amplifier kit 101 in 202D if a red light 107 is flashing 203D an evaluation step for double flashes 205D occurs. In the event of an affirmative response to the double flash evaluation step 205D, a Warning Error 2 (e.g. isolation failure) is indicated in 210D. The portable amplifier kit 101 is operating as shown in 202D.

Following operation of the portable amplifier kit 101 in 202D an evaluation for red light 107 flashing 203D takes place. A positive result for triple flashes indicates a Warning Error 3 (e.g. overload shutdown) by 211D. The suspension of the amplifier operation 213D may then occur. A system error following triple flashes is provided by 207D.

Figure 3:
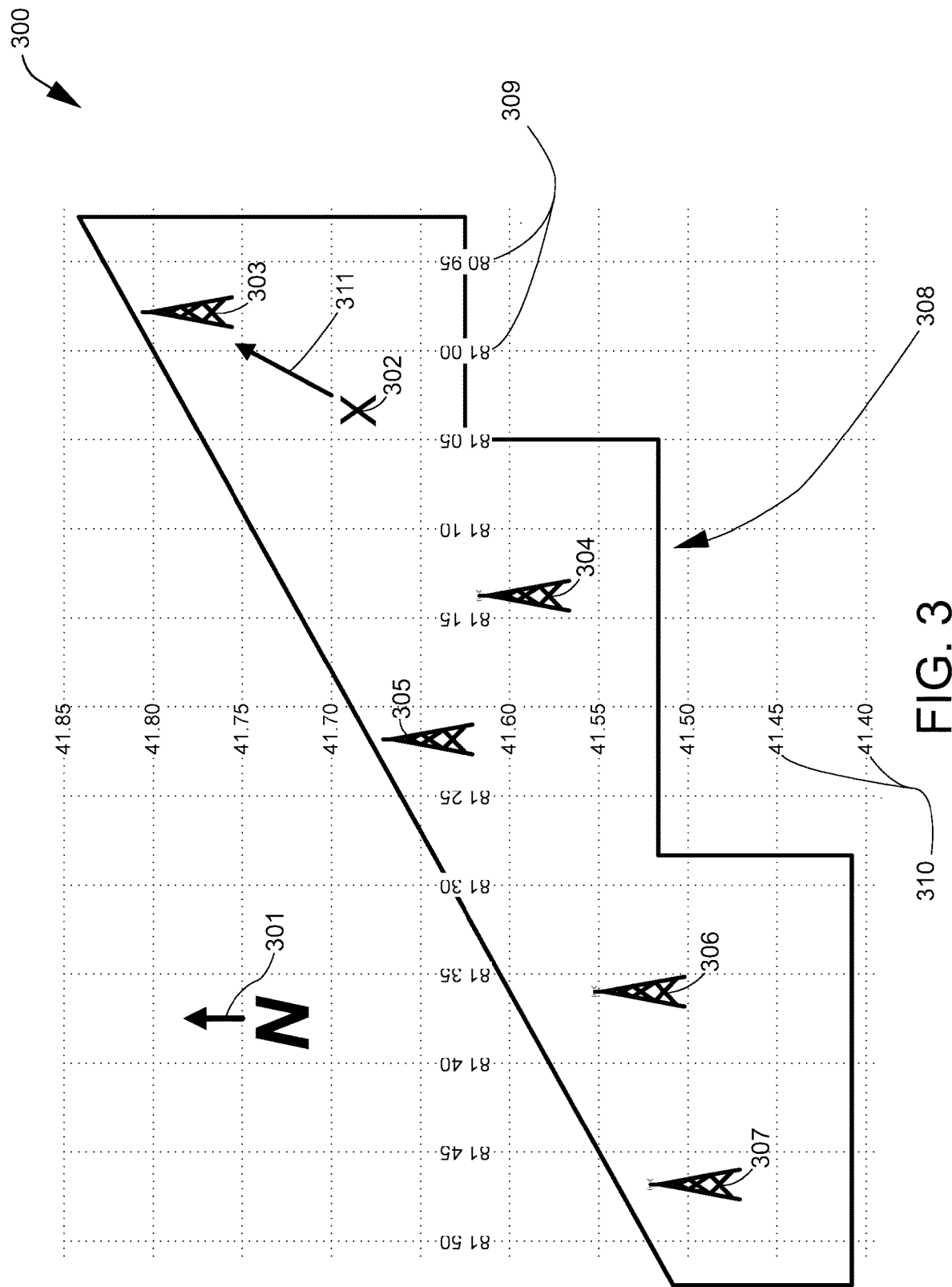
FIG. 3 illustrates a regional radio system grid map identifying several alternate radio system site locations (towers) in proximity to a particular location of site requiring radio coverage enhancement.

FIG. 3 is a view 300 of a regional radio system grid map 300 identifying several alternate radio system site locations 303, 304, 305, 306, 307 in proximity to a particular location requiring radio coverage enhancement 302. The regional radio system grid map 300 has a North direction indicator 301, longitude indications 309, latitude indications 310, and all the radio system site locations identified over the entire county region 308. The map also provides the direction to aim outdoor antenna 311 to communicate with the preferred radio system site location 303. This directional indication would be provided specific to each site. Each site has a specific plot that is stored in a location accessible by the personnel using the antenna kit and the amplifier kit.

Figure 3A:
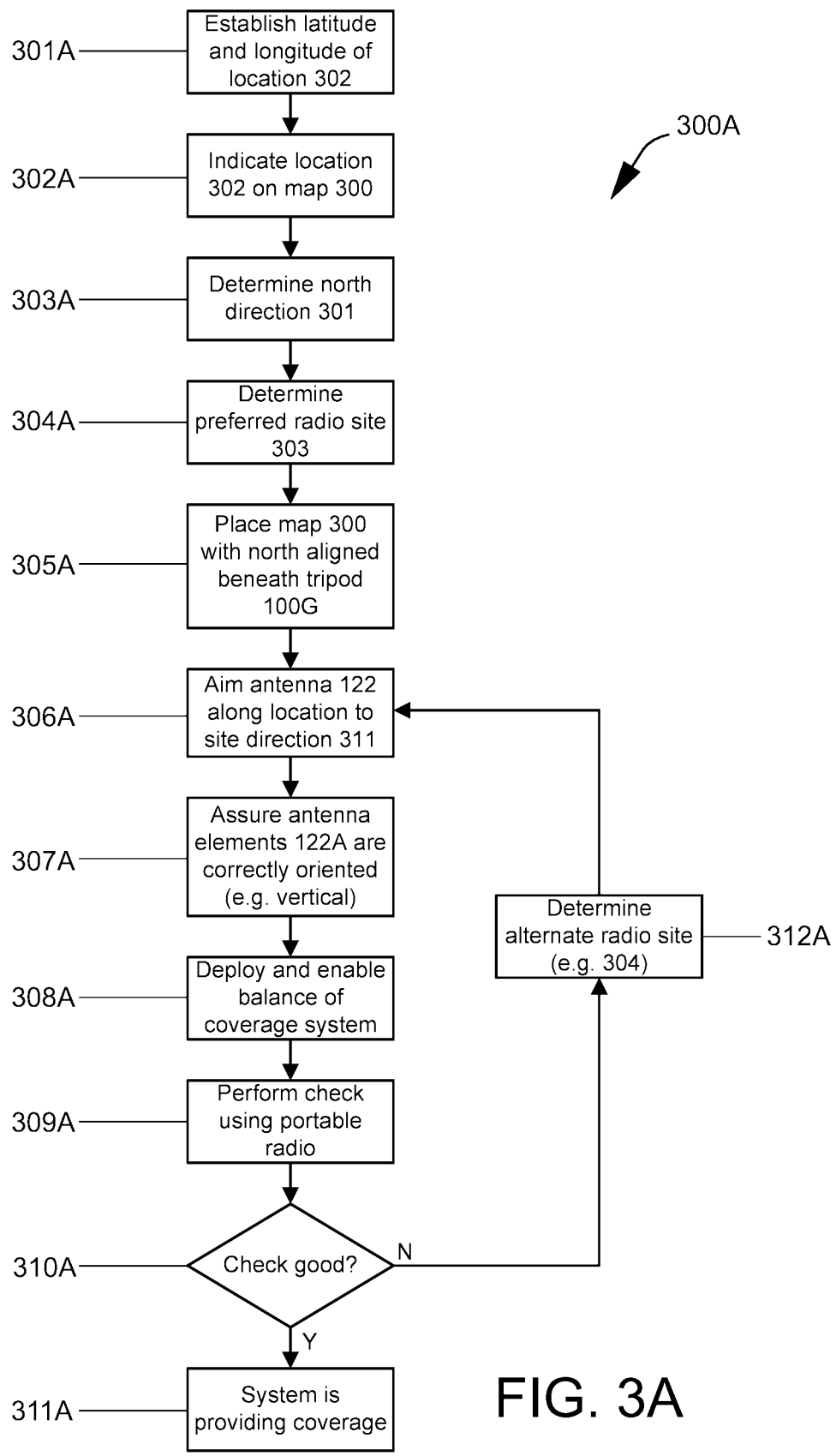
FIG. 3A illustrates a flow chart for aiming the outdoor antenna.

FIG. 3A shows a flow chart 300A for aiming the outdoor antenna. Initially, the latitude and longitude of location 302 is established in step 301A. Location 302 is identified on the map 300 in step 302A. North direction 301 at the location 302 in need of communication coverage enhancement is determined in step 303A. Based on topography of the area surrounding location 302, the building location, entrance location, infrastructure, emergency concerns, evacuation routes, equipment limitations, optimal location for cable length, and to reduce the amount of time to enter building to establish communications, the preferred radio site 303 is determined 304A. The map 300 is then oriented with north aligned beneath tripod 100G in this step 305A. In this step 306A, the antenna 122 is aimed in the direction of the radio site 303. The antenna elements 122A are checked for alignment and correctly oriented (e.g. vertical in the case of a Yagi directional antenna) as part of this step 307A. The remaining components of the coverage system are deployed and the coverage system is enabled during this step 308A.

A check may be performed using a portable radio to confirm that coverage has been enabled in step 309A. In one test, a first portable radio may have its portable antenna removed. The first portable radio attempts to transmit to a second portable radio. (The amplifier's power is off during this test). Once an error message is received by the first radio indicating that the signals to a second radio cannot be received, the amplifier is turned on. At this point, the first radio should attempt to transmit a signal to the second radio. The signal from the first radio to the second radio should be able to be received once the amplifier has been turned on. Another suitable test procedure could be used in place of this method to test the system quickly.

The results of the check are evaluated as part of step 310A. If the results of the test are positive, the system is providing coverage in step 310A. If the results of the test are not positive, an alternate radio site (e.g. 304 is determined in step 312A and steps starting with the aiming of the directional antenna step 306A in direction of the radio site 303 are repeated in sequence until a positive result for step 310A is obtained.

The system can establish communications rapidly through quick deployment and a simple set up configuration. The set up has simple orientations to ensure reliable set up with accuracy. Additionally, the set up can take place with a single person. The set up may also use a database of preferred radio sites instead of a regional grid map identifying the preferred local radio sites.

Figure 4:
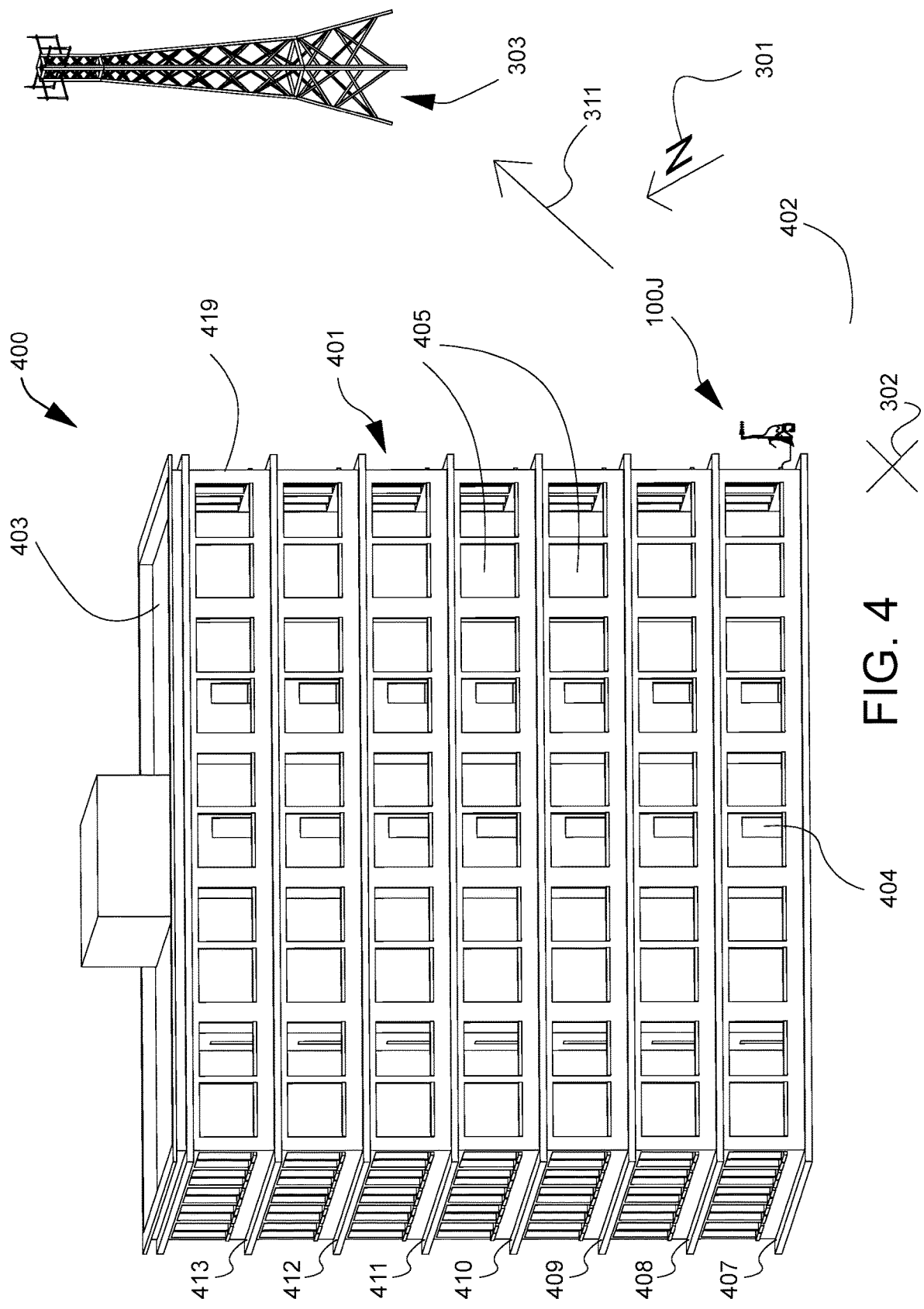
FIG. 4 schematically illustrates typical system deployment for building coverage enhancement at a location requiring radio coverage enhancement at a building having multiple floors.

FIG. 4 shows a view of typical system deployment 400 for building coverage enhancement at a location requiring radio coverage enhancement 302 at a building 401 having multiple floors. The portable antenna kit with the outdoor antenna raised 100J is located outside the building 401 on the ground 402 at the geographic location requiring radio coverage enhancement 302. The building 401 has a roof 403, windows 405, ground floor 407, interior doorway seen through window 404, and an exterior wall 419. The building has floors second 408 through seventh 413 which are considered as part of the system deployment.

Based on the regional radio system grid map 300 or the operator's own understanding of geography, the antenna kit may be oriented towards the building entranceway to dispense cable most safely and effectively. After orienting the gridmap 300 in the northward direction 301, the regional radio system grid map 300 is used to determine the direction to aim outdoor antenna 311. The outdoor antenna is aimed in the most acceptable line-of-sight path to the preferred radio system site location 303. The double ball joint on the amplifier kit may be useful in orienting the antenna boom in the proper direction 311 while simultaneously aligning the vertical elements coincident with the vertical plane.

Figure 4A:
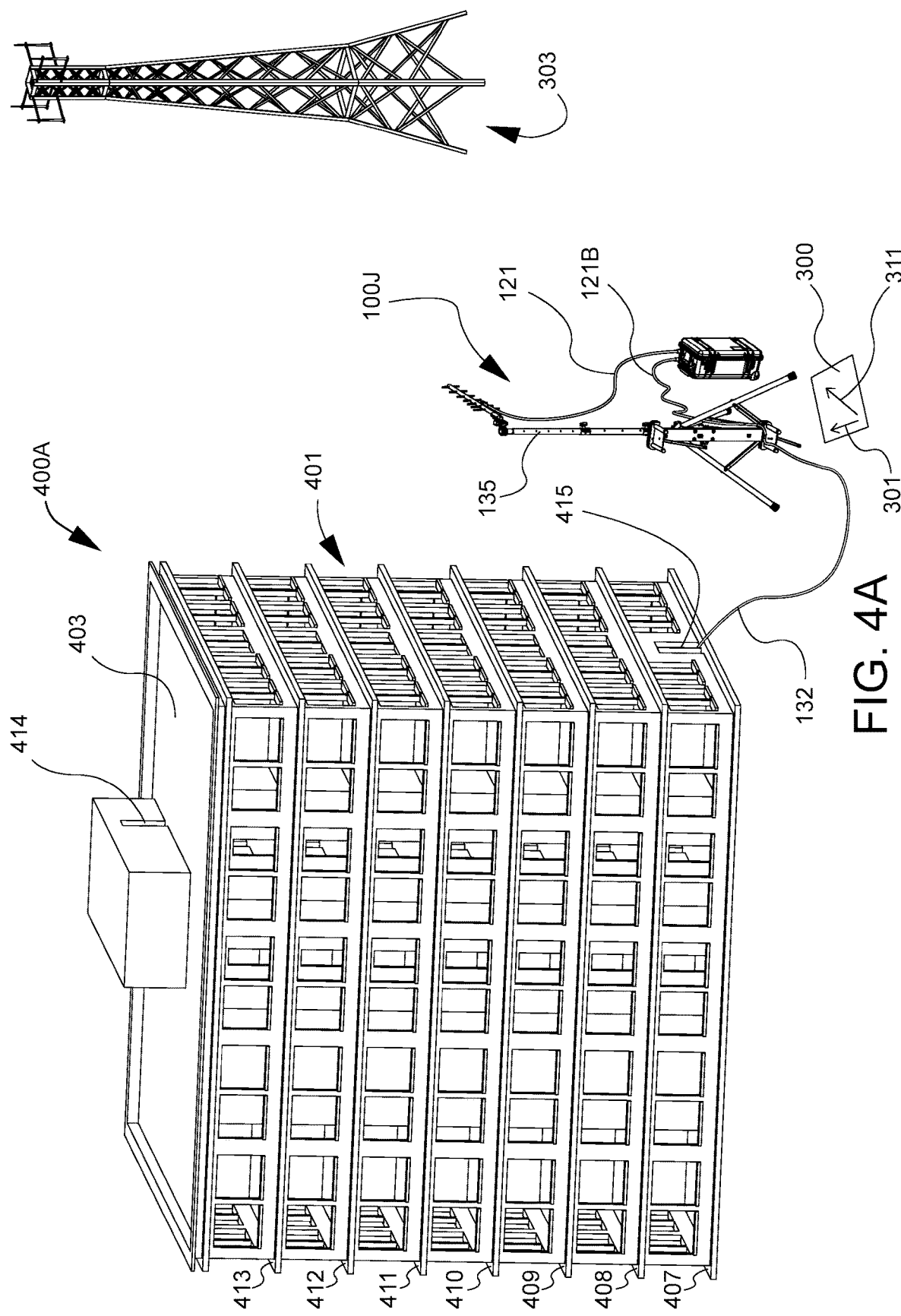
FIG. 4A schematically illustrates a partially enlarged view of a typical system deployment for building coverage enhancement at a location requiring radio coverage enhancement at a building having multiple floors.

FIG. 4A shows a closer perspective view 400A of a typical system deployment for building coverage enhancement at a location requiring radio coverage enhancement 302 (a building 401 having multiple floors). A closer view of a typical system deployment for building coverage enhancement 400A shows the outdoor antenna raised 100J and connected with an outdoor antenna cable 121 to the amplifier kit. The tripod has a telescoping section 135 which is in raised position. The antenna kit is also connected to the amplifier kit with a short segment of an indoor antenna cable 121B. The long segment of the indoor antenna cable 132 leads into the main entrance door 415 of the building 401. 121B and 132 are segments of an otherwise continuous cable connecting the amplifier with the indoor antenna.

The regional radio system grid map 300 is shown on the ground with the top of the map aligned to correspond to the North direction indicator 301. The direction to aim outdoor antenna 311 is also provided on the map 300. The boom of the outdoor antenna is aimed to point in this direction 311 toward the preferred radio system site location 303. The vertical elements of the boom are aligned to be perpendicular to level ground.

In this closer perspective view of the building 401, in addition to the ground floor 407, second floor 408, third floor 409, fourth floor 410, fifth floor 411, sixth floor 412, and seventh floor 413, and a roof access door 414 are shown from this view on the roof 403.

FIG. 4B shows an enlarged view 400B of portable antenna kit and portable amplifier kit deployed at a location requiring radio coverage enhancement 302 at a building 401 having multiple floors. The enlarged view 400B of a portable antenna kit and amplifier kit deployed by building 401 illustrates the portable antenna kit with the outdoor antenna raised 100J. The outdoor antenna is at the end of the raised telescoping section of the tripod 135 and the antenna is more clearly seen to be in communication configuration (elements of the boom are vertical or perpendicular to level ground). The outdoor antenna cable 121 is connected to the outdoor antenna and amplifier kit. A short segment of indoor antenna cable 121B connects the antenna kit to the amplifier kit. A long segment of indoor antenna cable 132 leads from the antenna kit over the ground 402 onto the ground floor 407 of the building 401 through the main entrance doorway 415. The location requiring radio coverage enhancement 302 is illustrated with the essential components of the outdoor components deployed outside the building 401.

Figure 4C:
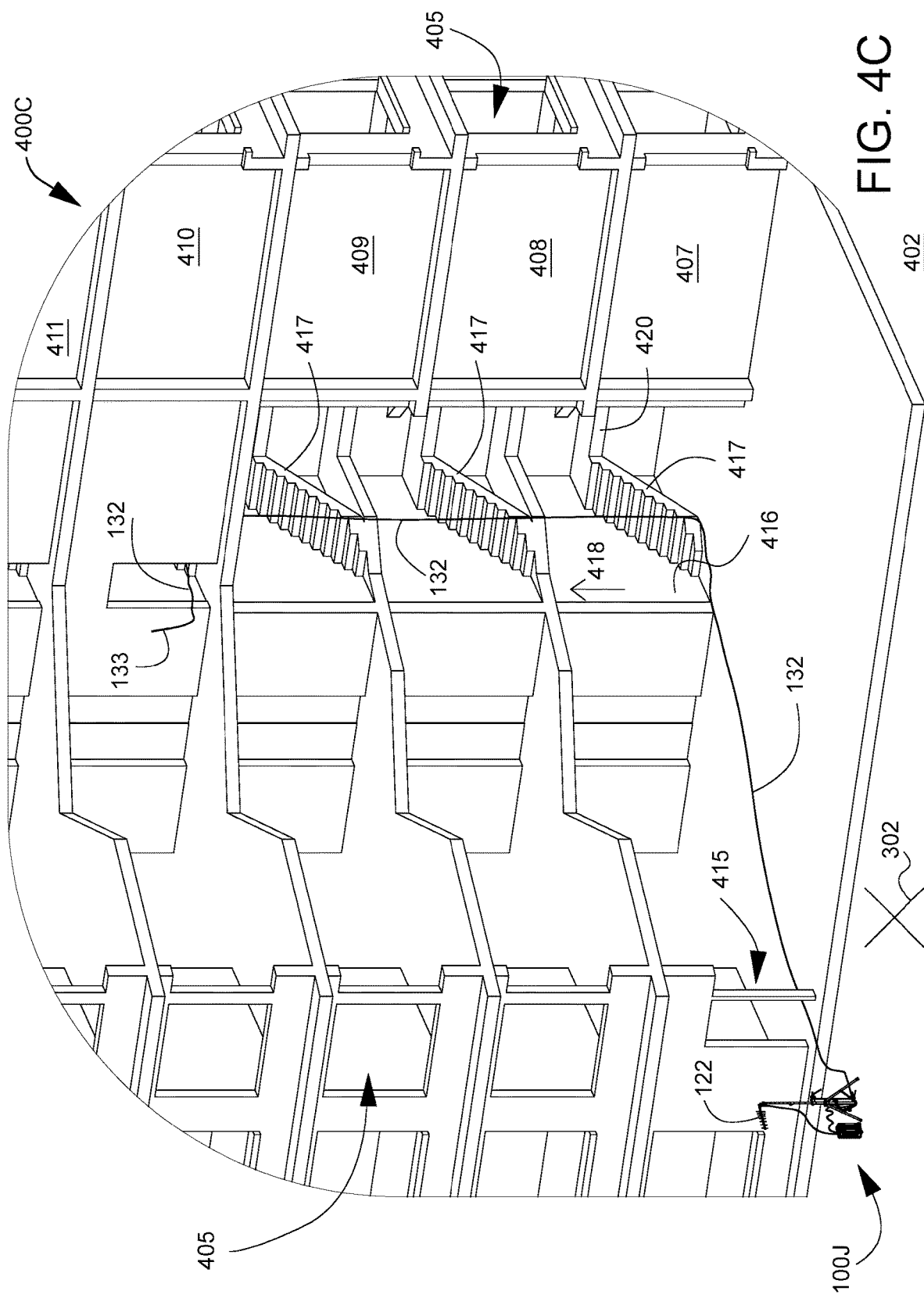
FIG. 4C schematically illustrates a cut away view of a cable from antenna kit to indoor antenna coverage location.

FIG. 4C shows a cut away view 400C of a cable from the antenna kit to the indoor antenna coverage location. The cut away view of a cable connecting the antenna kit to the indoor antenna coverage location 400C provides a view of the long segment of the indoor antenna cable 132 extending from the antenna kit (which is located outside the building on the ground) on the ground floor to the fourth floor in an upwards direction 418 in the stairwell 417. The cable 132 may proceed straight up along the stairwell wall 416 past the ground floor 407, the second floor 408, third floor 409, and ending on the fourth floor 410. In this way, less cable is used in this vertical path of the cable and less cable is placed on the path of travel on the stairs 417. In an alternative embodiment, the cable may be placed along each step on the stairway and across the midfloor landing 420. However, this path may require more cable to be used. Based on the specific area of the building requiring communication coverage enhancement will require the best available path to deploy the cable to provide the desired pattern of communication coverage enhancement. Optionally, an extended antenna kit or kits may be used to place incremental indoor antennas along the path to an ultimate or terminal indoor antenna location thus creating a distributed antenna array effecting coverage over a wide internal area of the building.

The indoor antenna 133 and long segment of the indoor antenna cable 132 are ultimately located on the fourth floor 410. The antenna 133 may be suspended from cable 132 draped over a door or edge, or mounted using various accessories standing on the floor or table or hung from an overhead fixture as shown later in FIGS. 12, 12A, 12B, and 12C. Communication coverage enhancement may be provided to floors adjacent based on the coverage of the indoor antenna and the building construction, materials, and other environmental conditions. For example, coverage on the fifth floor 411 may be enhanced, while the indoor antenna is located on the fourth floor 410. In this way, coverage may be provided to floor that is not yet secure without requiring communication personnel to step foot on the unsecured floor. Directional versus omni directional antennas may be selected for this very purpose such as the patch or Yagi antenna shown in FIGS. 11B and 11C. Such antennas will concentrate more signal energy in the particular direction they are aimed such as upper floors 5 through 7 if aimed upward from floor 4.

Based on the area of the building requiring communication coverage enhancement, the configuration will be determined for the location requiring radio coverage enhancement 302. In particular, windows 405 located throughout the building may also be used to establish communication coverage enhancement. The technique of placing the outdoor antenna and/or amplifier kit indoors aimed out windows may be used to reduce the path of cable traveling through the building. In one embodiment, the cable could lead directly from the outdoor antenna kit outside on the ground up the side of the building and in through a window on the particular floor in need of coverage enhancement. This may be used based on the building configuration, material construction, access to the building, available equipment (i.e. ladder and available length of cable), configuration factors such as isolation, coverage areas, access to the building as well as time.

Based on the area requiring communication, the outdoor antenna may be located inside and pointed in the direction of the preferred radio system site location 303 through a window. In this alternate configuration, the building's internal structure may be used to provide isolation between the indoor antenna and outdoor antenna. Since elements of the this communication enhancement invention are portable, a variety of configurations are possible and may be used to enhance communications including configurations where the outdoor antenna, the indoor antenna, and the amplifier kit may all be located inside the building, outside the building, or any combination. The amplifier kit and the antenna kit are portable and can be set up in a variety of configurations to overcome communication obstacles.

In another embodiment, the cable 132 used in the area needing communication coverage enhancement may be a type of coaxial cable referred to as "leaky coax" and may be used to provide radio coverage to an increasingly distributed coverage area. In one embodiment, the leaky coax may extend vertically as shown in the drawing or it may used to lay horizontally over the stairway and midfloor landing. In one embodiment, a portion of the cable (132) may be a type of low loss coaxial cable and another portion of the cable (132) may be a type of leaky coax. In one embodiment, the leaky coax portion of the cable (132) may be used at an end portion of cable (132) in place of an indoor antenna (133). Preferably, the portion of the cable (132) which is shown to bypass the exterior wall or other source of radio signal attenuation will have as little loss as possible. In another embodiment, a low loss coaxial portion may lead to a directional coupler or splitter, where two separate cables extend from said coupler one being an additional portion of low loss coaxial cable and another portion being a leaky coaxial cable portion. Many other combinations and permutations may be readily implemented.

Figure 4D:
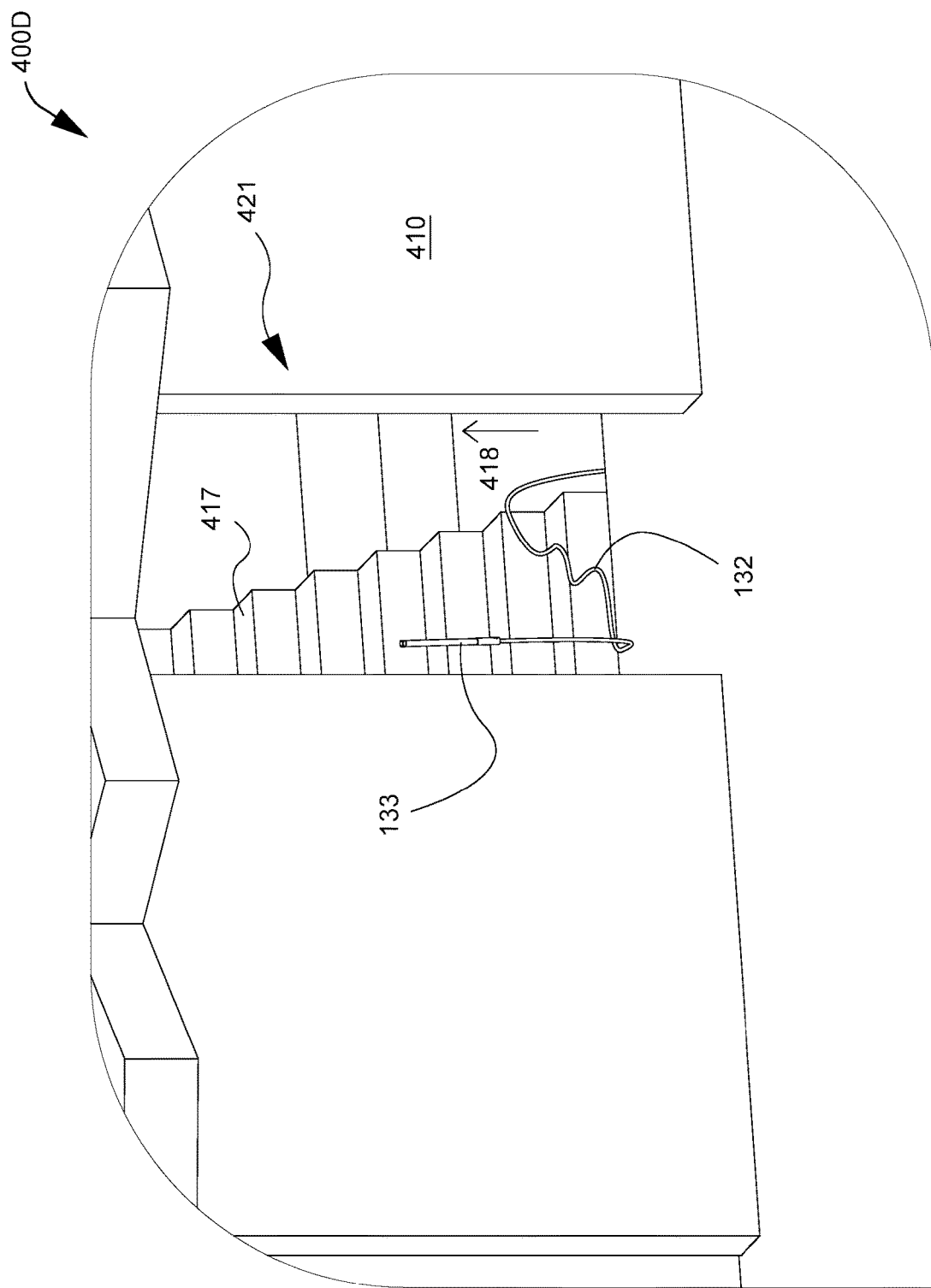
FIG. 4D schematically illustrates the indoor antenna location deployed at the fourth floor of a building requiring radio coverage enhancement.

FIG. 4D shows a view 400D of the indoor antenna location deployed at the fourth floor of building requiring radio coverage enhancement 302. The indoor antenna location on the fourth floor of building 400D shows a closer view of the indoor antenna 133 connected to the long segment of the indoor antenna cable 132 on the fourth floor 410. The cable 132 is illustrated extending in an upward direction 418 and laying across a portion of the stairs 417 on the fourth floor. The indoor antenna is located just outside the stairwell doorway 421 and may be variously supported or mounted as described above.

As mentioned previously, this location of the indoor antenna near the fourth floor stairwell doorway could also be achieved through a variety of configurations. Alternatively, the cable could extend in an upward direction from the antenna kit on the ground floor and enter the building through a window. Alternatively, the outside antenna and/or the amplifier kit could also be located in the building. In another configuration, the outdoor antenna could be located inside the building and pointed out ofa window or other entranceway or portal. In yet another embodiment elements of the system including the outdoor antenna and amplifier could be located on the roof of the building 403.

Figure 5:
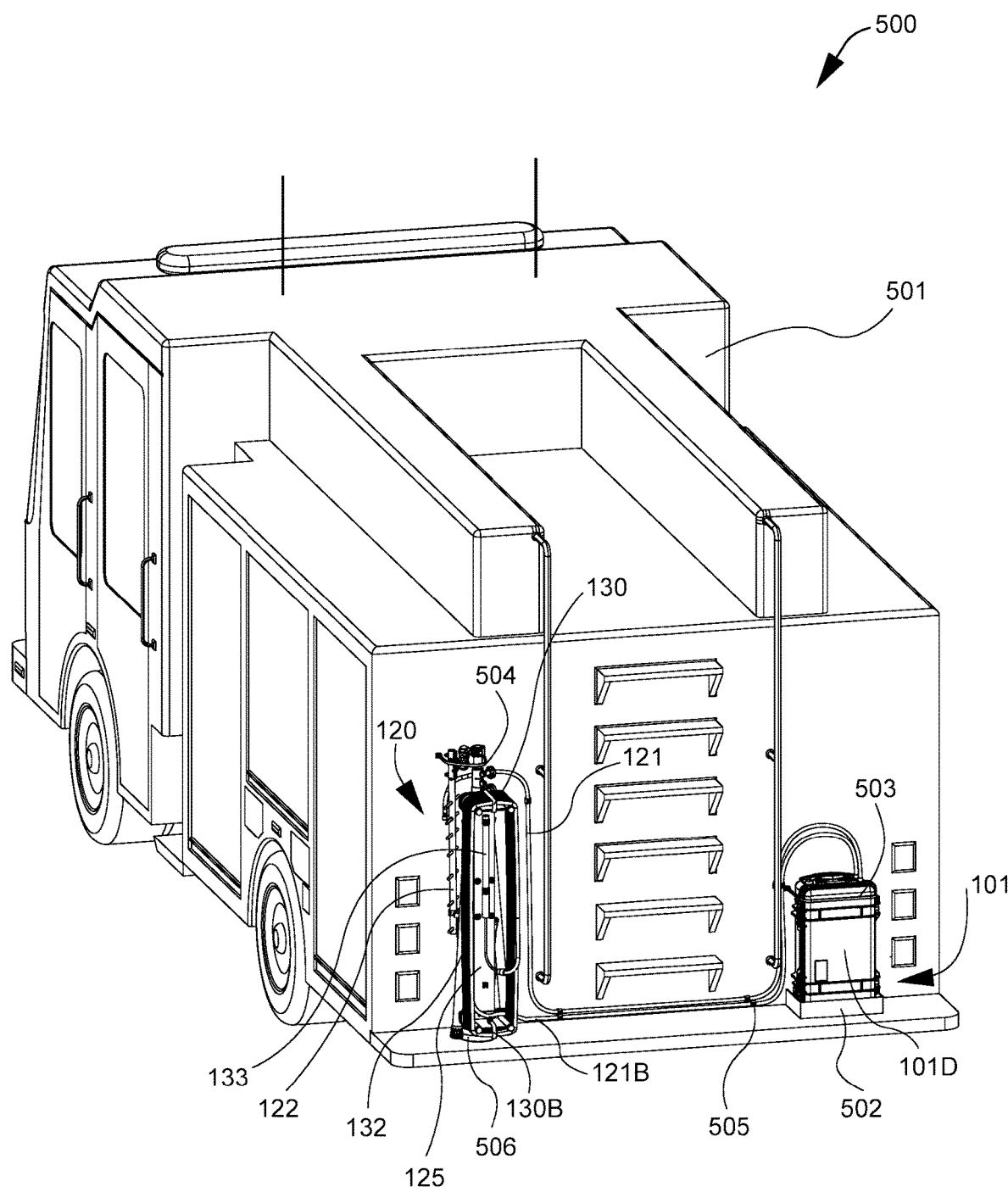
FIG. 5 illustrates the vehicle borne portable radio enhancement system.

FIG. 5 is a view 500 of a vehicle borne portable radio enhancement system. This vehicle born portable radio enhancement system view 500 shows a portable amplifier kit 101, portable antenna kit 120, and an outdoor antenna 122 secured to an emergency response vehicle 501. The portable amplifier kit 101 is secured in place using a portable amplifier kit retention strap 503 to extend across the door 101D of the portable amplifier case. The portable base is secured at the bottom by being placed in a kit bin 502.

On the opposite side of the end portion of the emergency response vehicle 501, a portable antenna kit retention strap 504 is used to secure a top portion of the antenna kit into place against the back surface of the emergency response vehicle 501. The bottom of the antenna kit rests on a rotating portable antenna kit mounting platform 506.

In this configuration, the outdoor antenna cable 121 is pre-connected to the amplifier kit and the antenna kit. The outdoor antenna cable 121 is secured into place out of the way of normal operations in a portion of the rear of the emergency response vehicle between the antenna kit and the amplifier kit using cable clamps 505. Short segment of the indoor antenna cable 121B is connected to the antenna kit and the indoor antenna. Long segment of the indoor antenna cable 132 is wrapped around the cable organizer attached to the antenna kit. The indoor antenna 133 is secured into place against the spine of cable organizer 125 in a central position surrounded by the coil of the indoor antenna cable 132. An upper cable retention strap 130 and a lower cable retention strap 130B hold the indoor antenna cable in a coiled configuration attached to the cable organizer. Portable antenna kit tripod 120 is also secured against the rear of the vehicle along with the outdoor antenna 122 by retaining strap 504.

FIG. 5A shows a close-up view 500A of the vehicle borne portable radio enhancement system. Portable antenna kit tripod 120 and an outdoor antenna 122 are secured to an emergency response vehicle 501 by rotatable base 506 and retaining strap 504. The portable amplifier kit 101 is secured in place using a portable amplifier kit retention strap 503 to extend across the door 101D of the portable amplifier case. Portable amplifier base is secured in a kit bin 502.

In this view, the rubber foot 124R at the end of the protrusions of the cable organizer are more clearly visible.

Figure 5B:
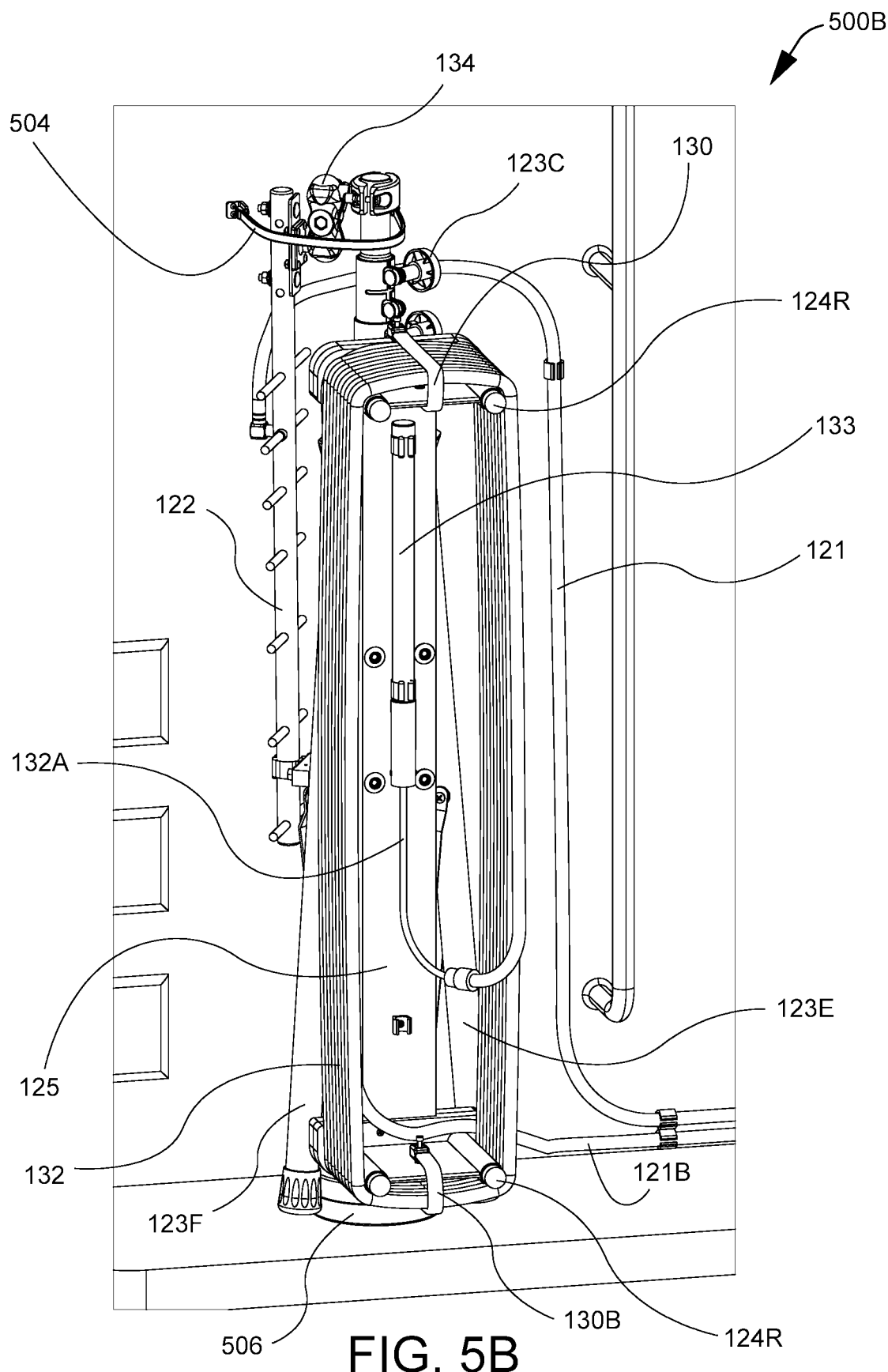
FIG. 5B illustrates the portable antenna kit mounted on emergency response vehicle in the vehicle borne portable radio enhancement system.

FIG. 5B is a further close-up view 500B of the portable antenna kit mounted on emergency response vehicle in the vehicle borne portable radio enhancement system.

The portable antenna kit retention strap 504 is seen at the top of the portable antenna kit spanning across the outdoor antenna 122, the dual ball joint 134, and the top of the telescoping mast securing them to the rear of the emergency response vehicle. The outdoor antenna cable 121 is connected to the outdoor antenna near the top of the antenna kit. The outdoor antenna cable 121 extends to a downward position where it is clamped against the rear of the vehicle alongside the short segment of the indoor antenna cable 121B.

A long segment of indoor antenna cable 132 is wrapped around a central portion of the cable organizer. At the top just below an adjuster for the second telescoping section 123C, a top portion of the coil of indoor antenna cable 132 is held into place with an upper cable retention strap 130. At the bottom of the cable organizer, a lower cable retention strap 130B holds the lower portion of the coil of indoor antenna cable 132 in place. Near the bottom of the cable organizer on the left is tripod leg 123F and on the right of the cable organizer is a tripod leg 123E. The coil of indoor antenna cable is wound around protrusions of the cable organizer covering the protrusions except for the rubber foot 124R near the end of each of the protrusion tips. The antenna kit at the bottom rests on a rotating portable antenna kit mounting platform 506. A rectangular portion of the cable organizer can be seen inside the coil of wound cable. The indoor antenna 133 is securely attached to the spine 125 of the cable organizer on the inside of the wound cable. A pigtail cable 132A can be seen attached to a bottom portion of the indoor antenna. It should be noted that the antenna stand may be quickly removed from the vehicle if needed by simply releasing retaining strap 504 and lifting the entire kit up and off of platform 506. Once removed, the antenna system may be portably deployed as described in previous paragraphs.

Figure 5C:
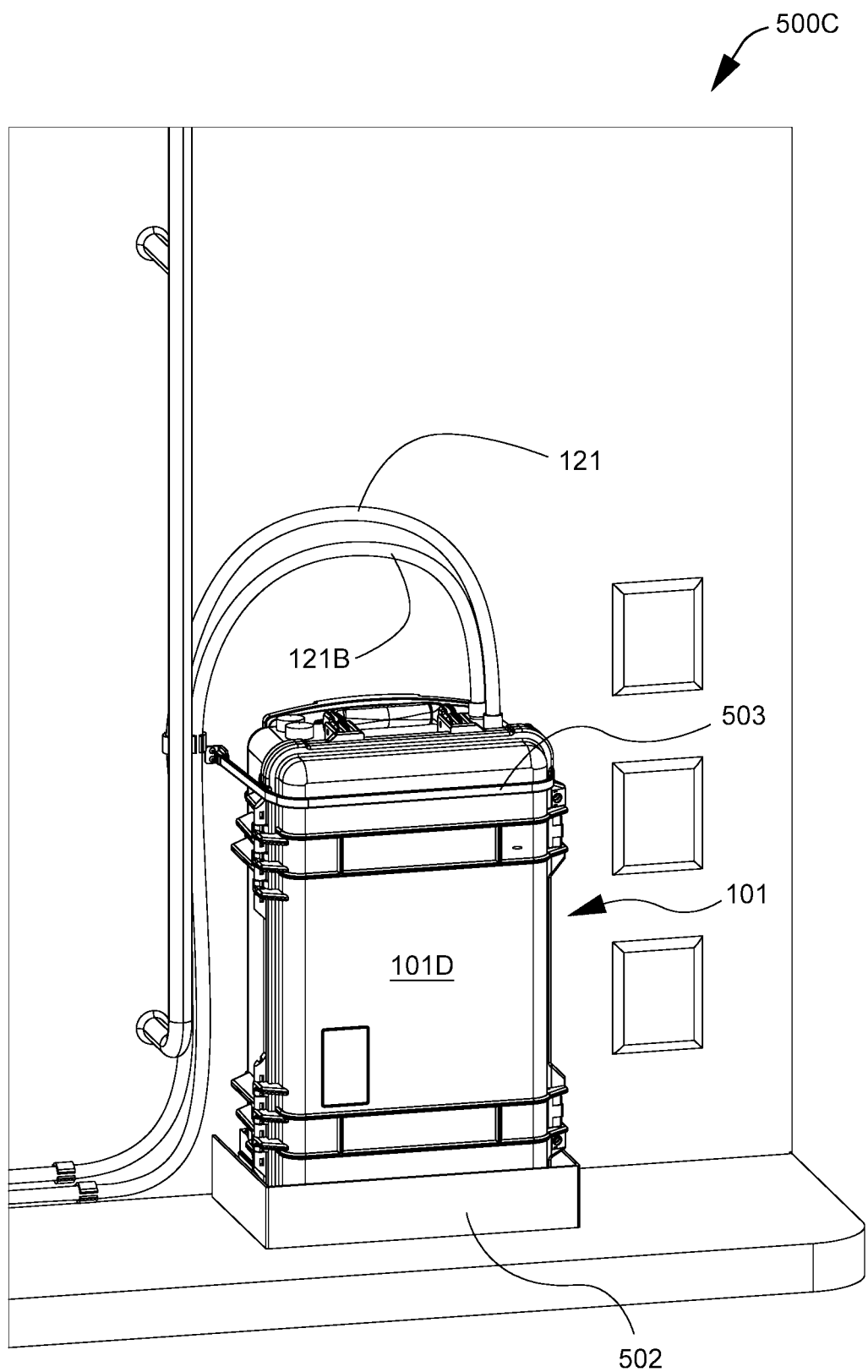
FIG. 5C illustrates the portable amplifier kit mounted on emergency response vehicle in the vehicle borne portable radio enhancement system.

FIG. 5C shows a view 500C of the portable amplifier kit mounted on an emergency response vehicle in the vehicle borne portable radio enhancement system. The bottom of the portable amplifier kit 101 is seated in a portable amplifier kit bin 502 on the back of an emergency response vehicle. A portable amplifier kit retention strap 503 spans across the top of the amplifier kit and holds the amplifier kit against the emergency response vehicle. The door 101D of the portable amplifier case is in closed position with the hinge side of the amplifier case running from top to bottom on the left side of the amplifier kit. The outdoor antenna cable 121 connects to the outdoor antenna connector port on the top right of the amplifier case. The short segment of the indoor antenna cable 121B is connected to the indoor antenna connector port adjacent to the outdoor antenna connector port on the top right of the amplifier case. The two cables extend alongside each other from the top of the amplifier case to a position to the left of the bottom of the amplifier case. It should be noted that the amplifier kit may be quickly removed from the vehicle simply by releasing retaining strap 503 and lifting the amplifier kit up and out of bin 502. Once removed, the amplifier kit may be portably deployed as described in previous paragraphs.

Figure 5D:
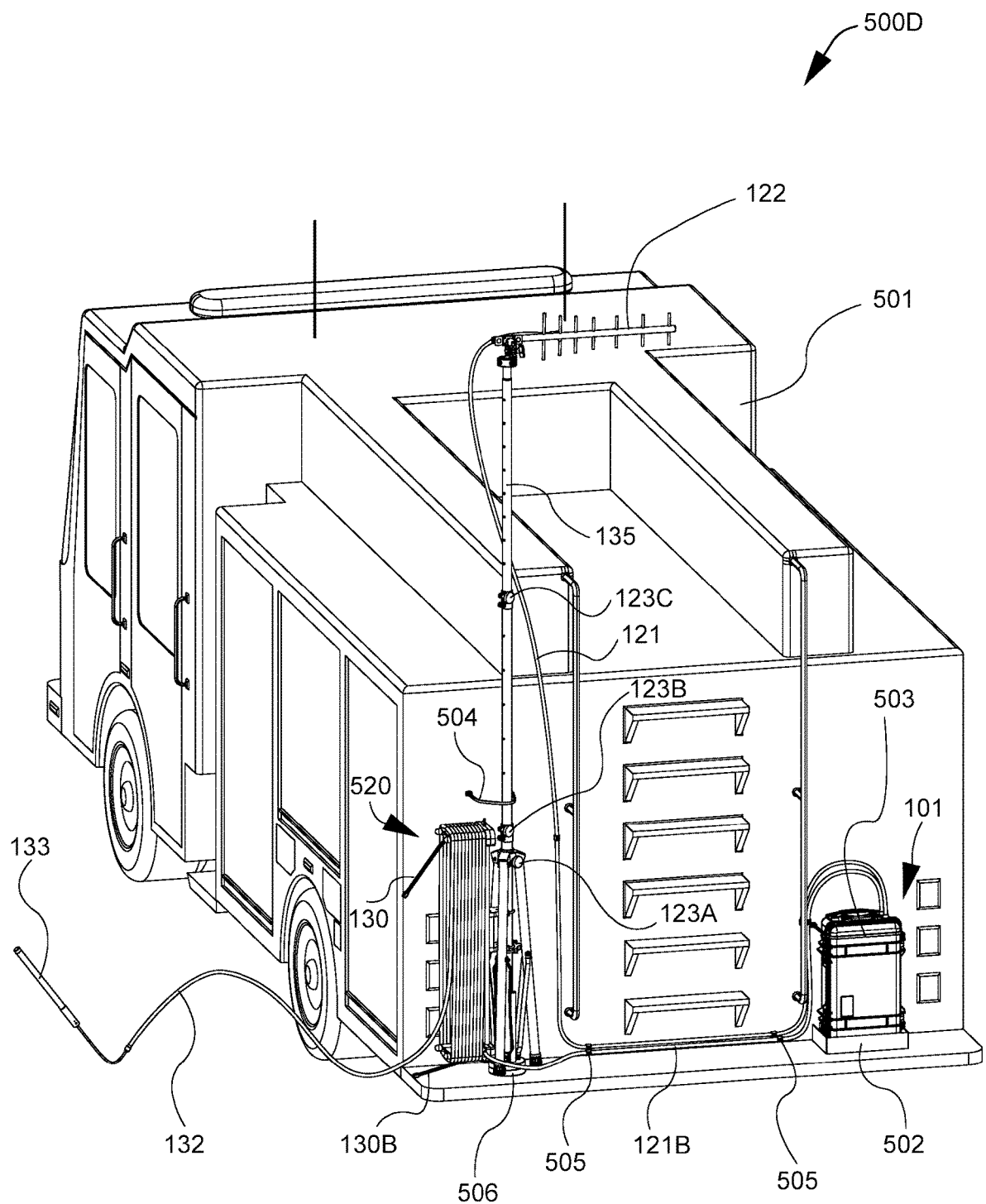
FIG. 5D illustrates the deployed vehicle borne portable radio enhancement system.

FIG. 5D is a view 500D of the vehicle borne portable radio enhancement system in the deployed configuration. The portable amplifier kit 101 is secured on one end of the emergency vehicle with a portable amplifier kit retention strap 503 spanning across the top of the amplifier kit and the bottom of the amplifier resting in a portable amplifier kit bin 502. Cable clamps 505 secure the cables leading from the amplifier along a bottom portion of the emergency response vehicle. The outdoor antenna cable 121 and the short segment of the indoor antenna cable 121B lead from the amplifier kit until reaching the left most cable clamp 505. From this leftmost cable clamp near the bottom of the emergency response vehicle, the outdoor antenna cable 121 extends upward connecting to the outdoor antenna 122. The short segment of the indoor antenna cable 121B leads back to the antenna kit.

The outdoor antenna is located at the top of an outdoor antenna mast in a position above the emergency response vehicle 501. A top portion of the portable antenna kit is secured to the back of the emergency vehicle with a portable antenna kit retention strap 504. The adjustor for the second telescoping section 123C and the adjuster for the first telescoping section 123B are turned to extend the antenna mast into an elevated position and then locked into place. The long segment of indoor antenna cable 132 is deploying from cable organizer 520 and headed for the building ingress as both the upper cable retention strap 130 and the lower cable retention strap 130B are unattached from the cable organizer allowing the cable connected to the indoor antenna 133 to deploy.

The rotating portable antenna kit mounting platform 506 is turned slightly away from the rear of the emergency response vehicle in a fashion to align the cable organizer in the direction of the building ingress so that cable 132 pays out easily as indoor antenna 133 is transported to and into the building.

Many alternative attachment locations and mechanisms for both antenna system and amplifier system on many different types of vehicles are possible and contemplated to all be part of this invention. For example, the components could be mounted to either side, the front, or the top of a truck. A helicopter could also be used to mount and deliver the equipment to a coverage enhancement scene. The system could be mounted on a stationary structure such as a maintenance outbuilding, safely removed from the structure requiring coverage where it would not be damaged in the event of a disaster in that building, but also quickly detachable and deployable in a fully portable way.

Figure 6:
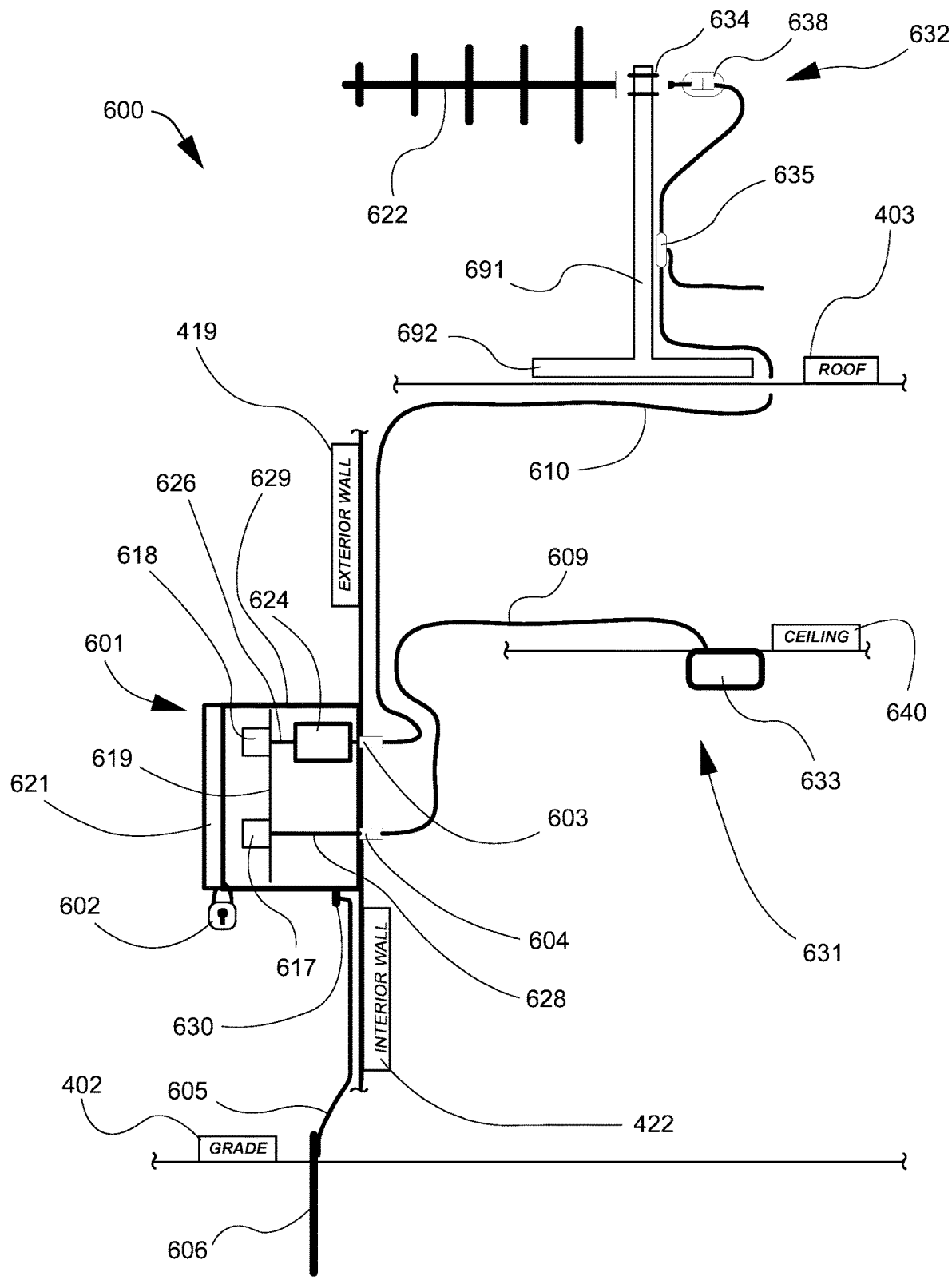
FIG. 6 is a schematic of a hybrid configuration of the In-Building Communication system including: an outdoor antenna, an indoor antenna, a standard In-Building Communication interface box mounted on the outside of the building, and suitable cable and coaxial cable connecting these elements together.

FIG. 6 illustrates a view 600A of a schematic of a hybrid system with standard interface box. The built-in outdoor antenna 622 is mounted on the building roof 403 preferably using a non-penetrating antenna system 632. Concrete block or sand bag ballast may be used to mount the non-penetrating roof stand 691 and non-penetrating roof stand base 692 on the roof 403. Alternatively, an existing building mast or other attachment point may be utilized. The built-in outdoor antenna 622 is a Yagi directional antenna and will be aimed at a tower located in a preferred proximity or orientation with the closest and most unobstructed path. Consideration of other radio systems such as cellular or private radio systems should also be considered when selecting the outdoor antenna location and orientation. Other antenna types and configurations may be used. A panel antenna may also be used. Coaxial cable shield is to be grounded via 6 AWG cable with appropriate weatherproofing at the connection point to the coaxial cable. Coaxial cable 610 extends from the roof top antenna system down the building to the interior wall space directly adjacent to the In-Building Communication (IBC) Interface Box where the cable 610 connects to the rear antenna port 603 on the standard building interface box 601. The low loss coaxial cable 610 connects the antenna to a rear antenna port 603 inside of the interface box 601. A surge suppressor 624 is located inside interface box between the outdoor antenna connection port 618 and the rear antenna connection port 603 protecting the outdoor antenna cable system and building systems in the event of a lightning strike. The surge suppressor has a robust ground connection via terminal 630, conductor 605, and ground stake 606.

The standard building interface box 601 may also be referred to as an emergency radio coverage system access panel, in building communications interface, communications panel, interface box, and other combinations thereof.

The outdoor antenna system 632 is now accessible through the outdoor antenna connection port 618 of the interface box 601 which is located on the exterior wall 419 of the building at a ground level location conveniently attended by first responders entering the building. In this embodiment, the outdoor antenna system is accessible to the emergency response personnel behind the door 621 of the interface box 601. Authorized access to the panel is enforced by a lock 602 or other securing to prevent access to the panel by unauthorized personnel. Preferably the panel would allow emergency personnel or authorized personnel to establish communications status without entering the building. Other locations may be used which are easily accessible to fire, other public safety, or building premise personnel.

Still referring to FIG. 6, the built in indoor antenna 633 will typically be positioned at a ceiling height near the center of the building or other suitable position in the building to provide coverage enhancement as needed. The small, lightweight antenna 633 may be connected via a magnetic base to a suitable steel structure or drop strut of the ceiling 640. Other suitable fasteners, clamp, adhesive backing, Velcrotype hook and loop, and other securing mechanisms may be used to connect to the antenna to a structure inside of the building. Low loss coaxial cable 609 connects the indoor antenna 633 to the indoor antenna rear port 604 on the in-Building Communication (IBC) Interface box through holes in the exterior wall 419. The indoor antenna system 631 is now accessible through the front antenna connection port 617 of the interface box which is located on the exterior wall 419 of the building at a ground level location easily accessible to fire and other public safety personnel. A ¼ 20 ground terminal 630 along with ground stake 606 and 6 AWG cable 605 are provided for earth grounding near the box location.

Figure 6A:
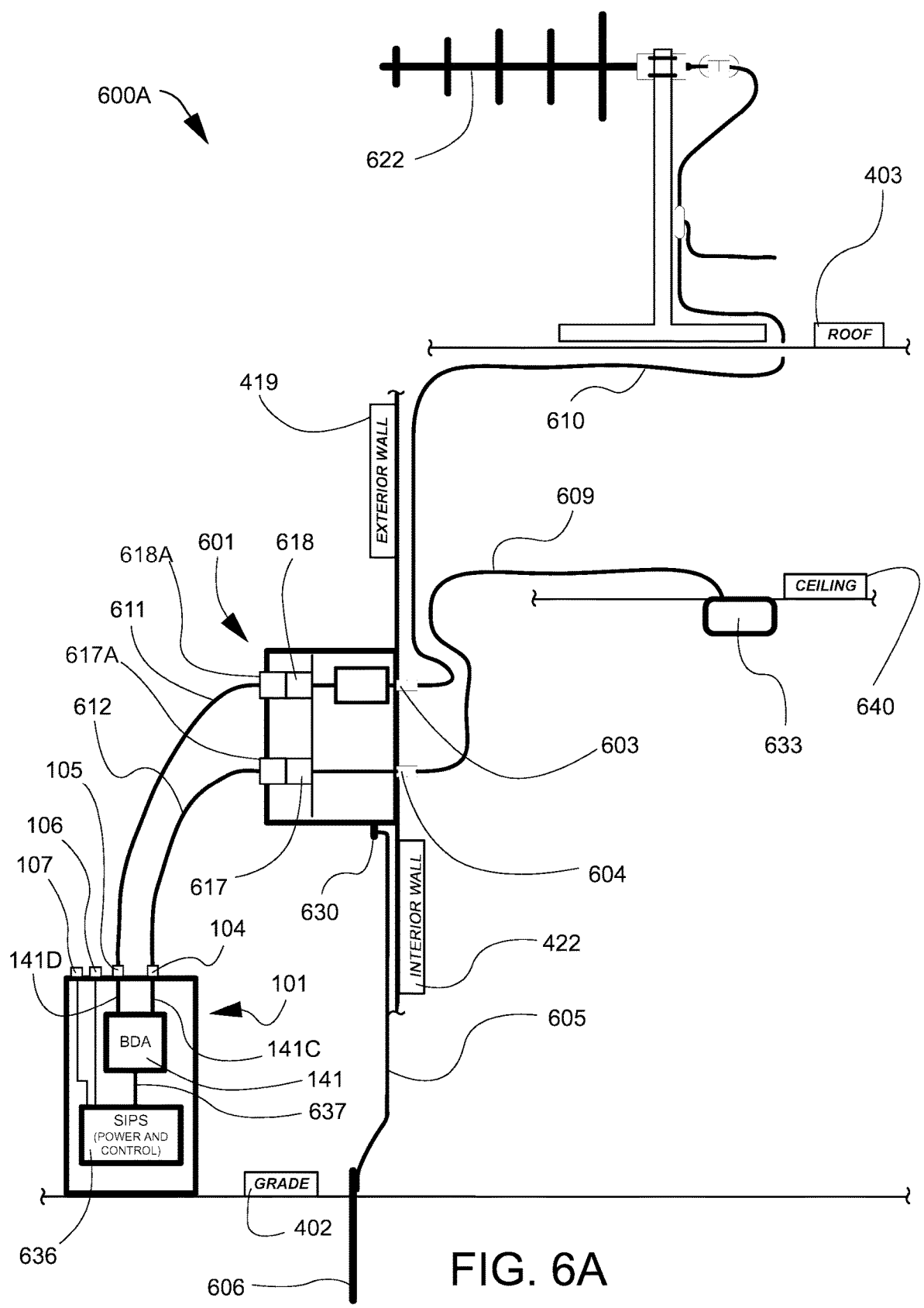
FIG. 6A is a schematic of a hybrid configuration of the In-Building Communication system including: an outdoor antenna, an indoor antenna, a portable Bi-Directional Amplifier (BDA) Kit with SIPS Power and Control, a standard In-Building Communication interface box mounted on the outside of the building, and suitable cable and coaxial cable connecting these elements together.

FIG. 6A provides a schematic representation 600A of a hybrid system with the portable amplifier kit connected to the outdoor antenna system. As before, the built in antenna systems are pre-configured and connected to the IBC Interface Box. The IBC Interface Box 601 has the security lock (not shown) removed and front door in open position (not shown). The IBC Interface Box 601 is connected via a coaxial cable 612 from the indoor antenna front port on the Interface Box to the indoor antenna connector port 104 on the portable amplifier kit 101. The portable amplifier kit 101 is connected via a coaxial cable 611 from the outdoor antenna connection front port 618 on the interface box 601 to the outdoor antenna connector port 105 on the portable amplifier kit 101. The portable amplifier kit 101 includes: a BDA 141, a SIPS Power and Control Module 636, and a carrying case. The case of the amplifier kit 101 includes a power push button 106 and a status light 107 which communicate information from the SIPS power and control module 244 located on the inside of the case to the outside of the case.

Figure 6B:
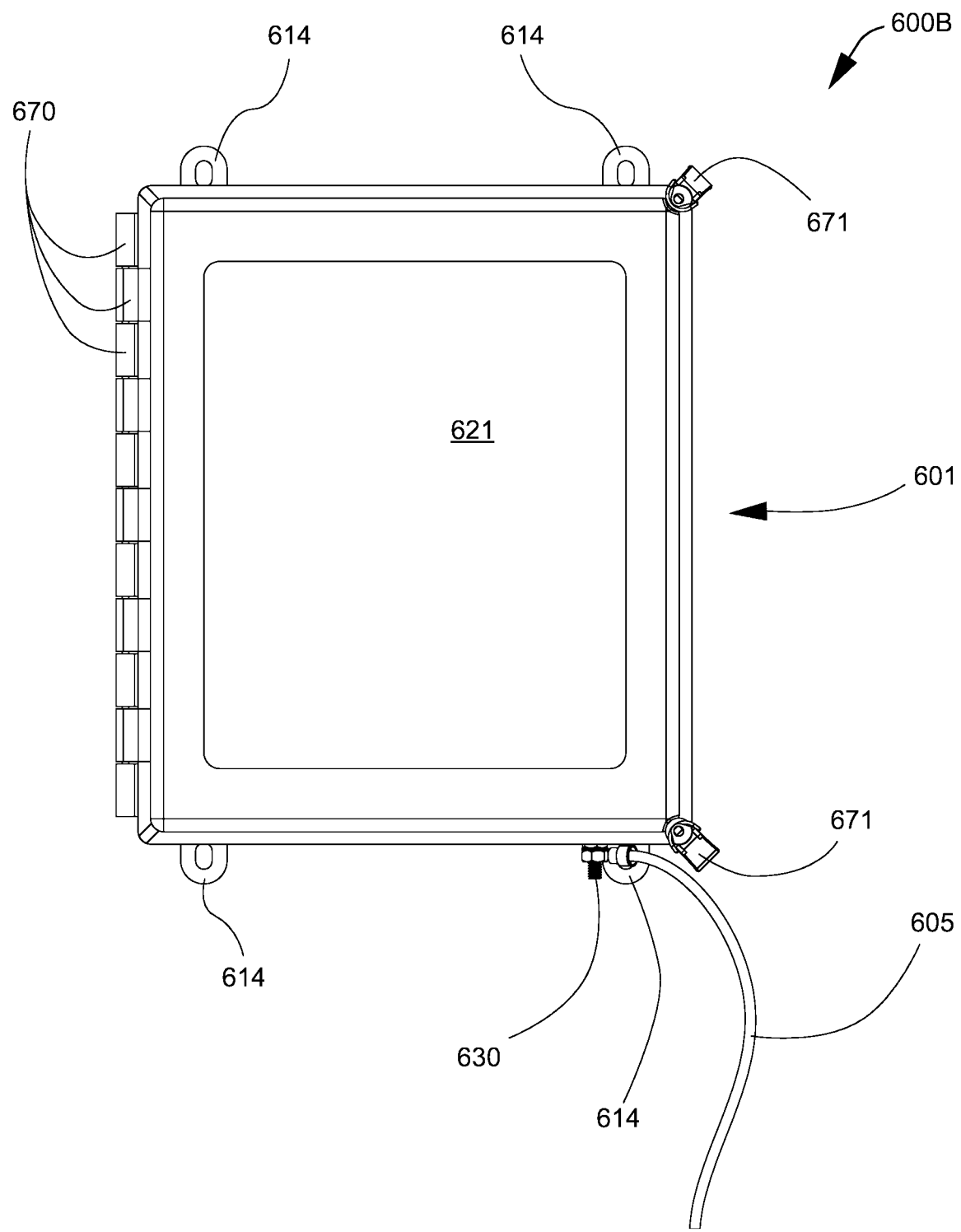
FIG. 6B is a front view of the standard interface box with the door closed.

FIG. 6B is a front view of the standard interface box 601 with the door 621 closed. The standard building interface box 601 may be pre-assembled and may be mounted to the exterior face of the building at a ground level location easily accessible to fire and other safety personnel. A hinge 670 is located on one side of the interface box. A cable 605 for earth grounding near the box location to an appropriate grounding mechanism is also attached to the standard interface box 601. Mounting ears 614 or other mechanisms may be used to attach the IBC assembly to the building or structure surface.

Figure 6C:
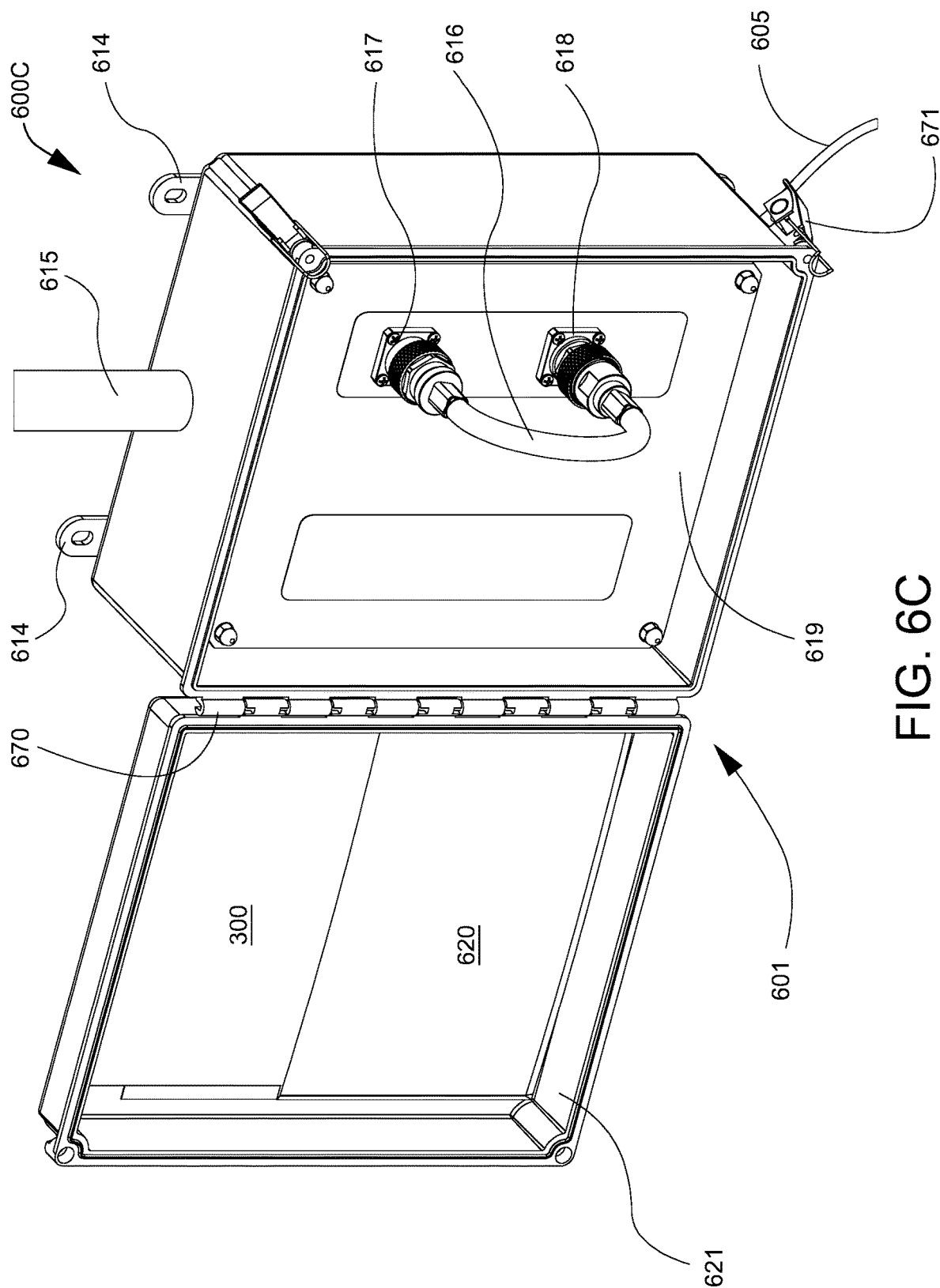
FIG. 6C is a front view of the standard interface box with the door open with a cable jumper in place creating a passive coverage system.

FIG. 6C is a front view of the standard interface box with the door 621 open with a cable jumper 616 in place. The cable jumper 616 connects the front indoor antenna port in the standard building interface box 617 to the outdoor antenna front port in the standard building interface box 618. This implements a passive coverage system which may be of some utility under certain circumstances even without a portable amplifier being connected. The inside of the door 621 includes a pocket 620 and a regional radio system grid map 300. The door of the interface box 601 is connected to the interface box 601 by a hinge 670. The front port of the outdoor antenna in the standard building interface box 618 eventually connects to the outdoor antenna (not shown) through various circuit elements and cables (not shown). A cable conduit 615 exits the top of the interface box as an optional route to connections at the outdoor antenna. In this embodiment, the fixed indoor antenna system interfaces directly with the fixed outdoor antenna system. In this embodiment, no portable equipment is used. The jumper is quickly removable and a portable amplifier system may be readily connected to provide bi-directional boosting of signal levels communicating between the outdoor and indoor antennas.

Figure 6D:
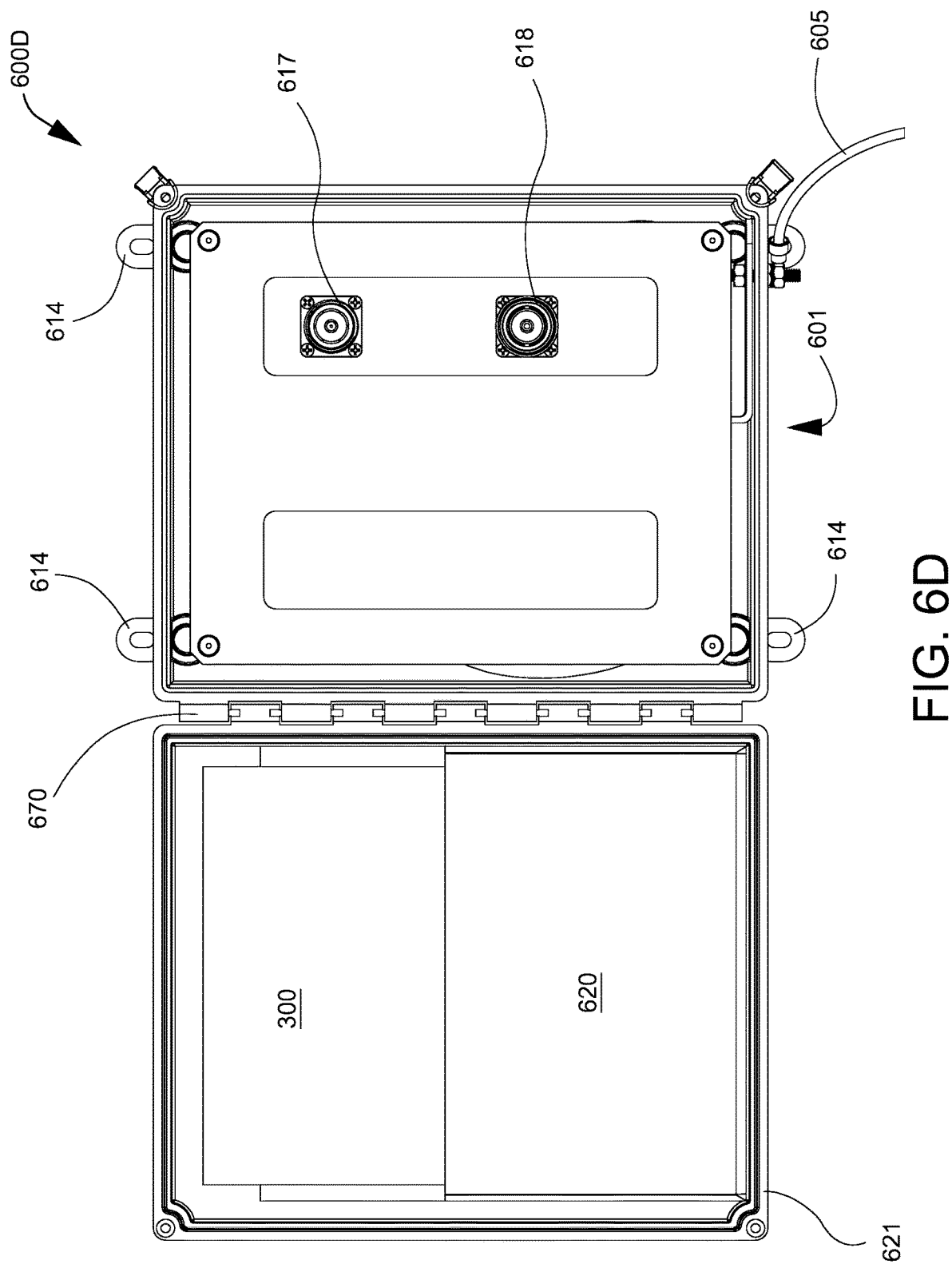
FIG. 6D is a front view of the standard interface box with the door open with the cable jumper removed.

FIG. 6D is a front view 600D of the standard interface box with the door open and the cable jumper removed. The interface box includes two polarized connectors on the right side of the front panel of the interface box. An earth ground cable 605 is connected to the lower right corner of the interface box 601 at terminal 630. The indoor antenna front port 617 is located on the upper right near the top portion of the interface box. The front port 617 has a polarized surface for mating with a cable connector. The outdoor antenna front port 618 is located on the right side beneath the indoor antenna port 617 and has polarization opposite of the indoor antenna port 617. This assures correct connection of outdoor antenna system to amplifier outdoor antenna port and indoor antenna system to amplifier indoor antenna port. Put simply, connector gender prevents misconnection.

Figure 6E:
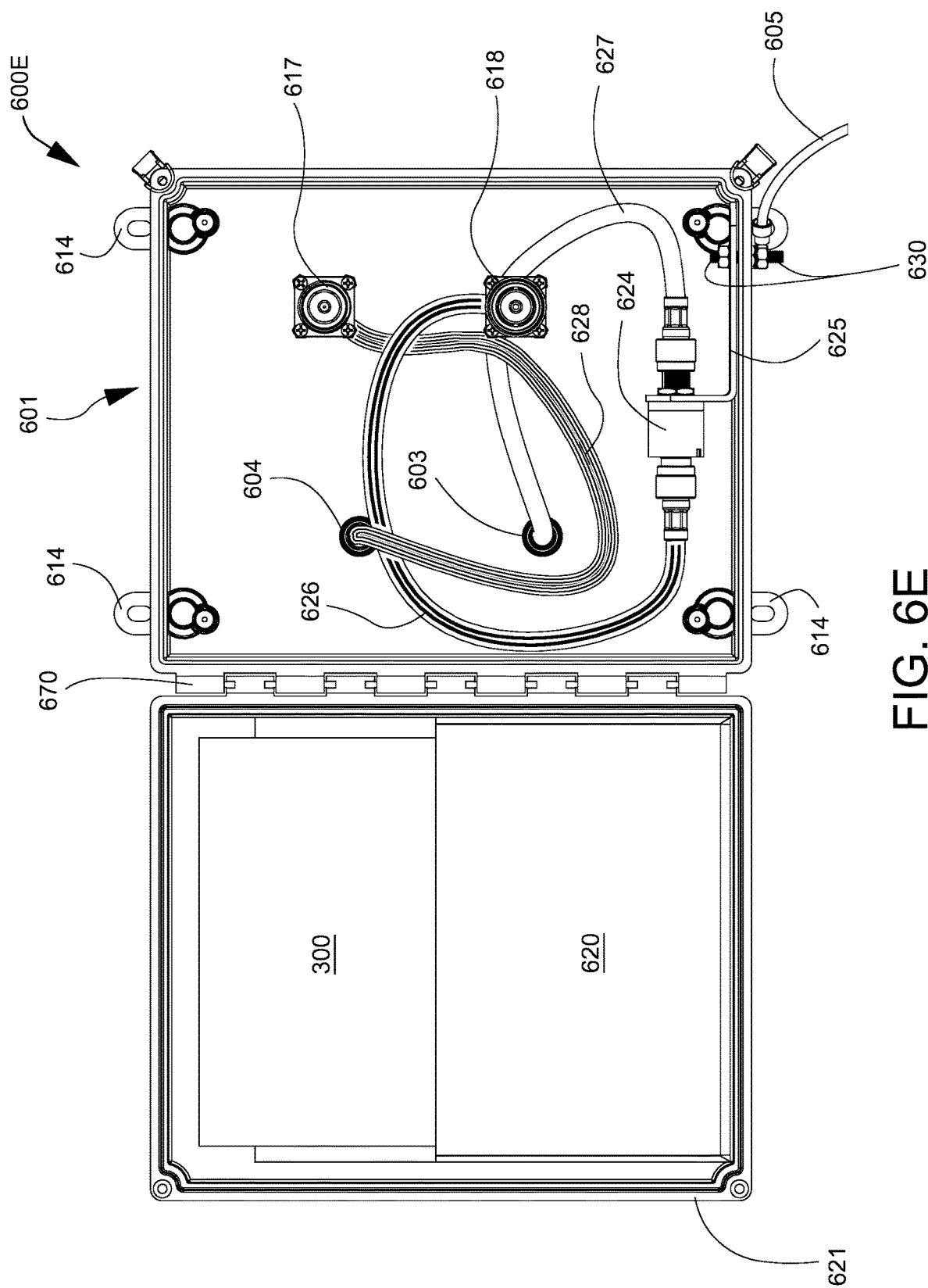
FIG. 6E is a cut away front view of the standard interface box with the door open with the cable jumper removed.

FIG. 6E is a cut away front view 600E of the standard interface box with the door open and with both the cable jumper and standard connector mounting panel removed. A regional radio system grid map 300 is included on the inside of the door 621 of the standard building interface box 601. With the standard connector mounting panel 619 (not shown) removed the cable connections between the indoor antenna, front port, standard building interface box 617 and the outdoor antenna, front port, standard building interface box 618 can be more easily observed. A cable 628 connects the indoor front port 617 on the right top portion to the indoor rear port 604 on the left upper portion of the standard building interface box.

The outdoor antenna front port 618 is connected via cable 626 to a surge suppressor 624. The cable surge suppressor 624 is connected to the outdoor antenna rear port 603 via cable 627. The surge suppressor 624 is connected to the standard interface box via mounting and grounding bracket for surge suppressor 625. The location of the front and rear ports are interchangeable, so long as the polarization of the connectors is maintained enabling a device on the outside of the box to be connected to the proper indoor or outdoor antenna.

Figure 6F:
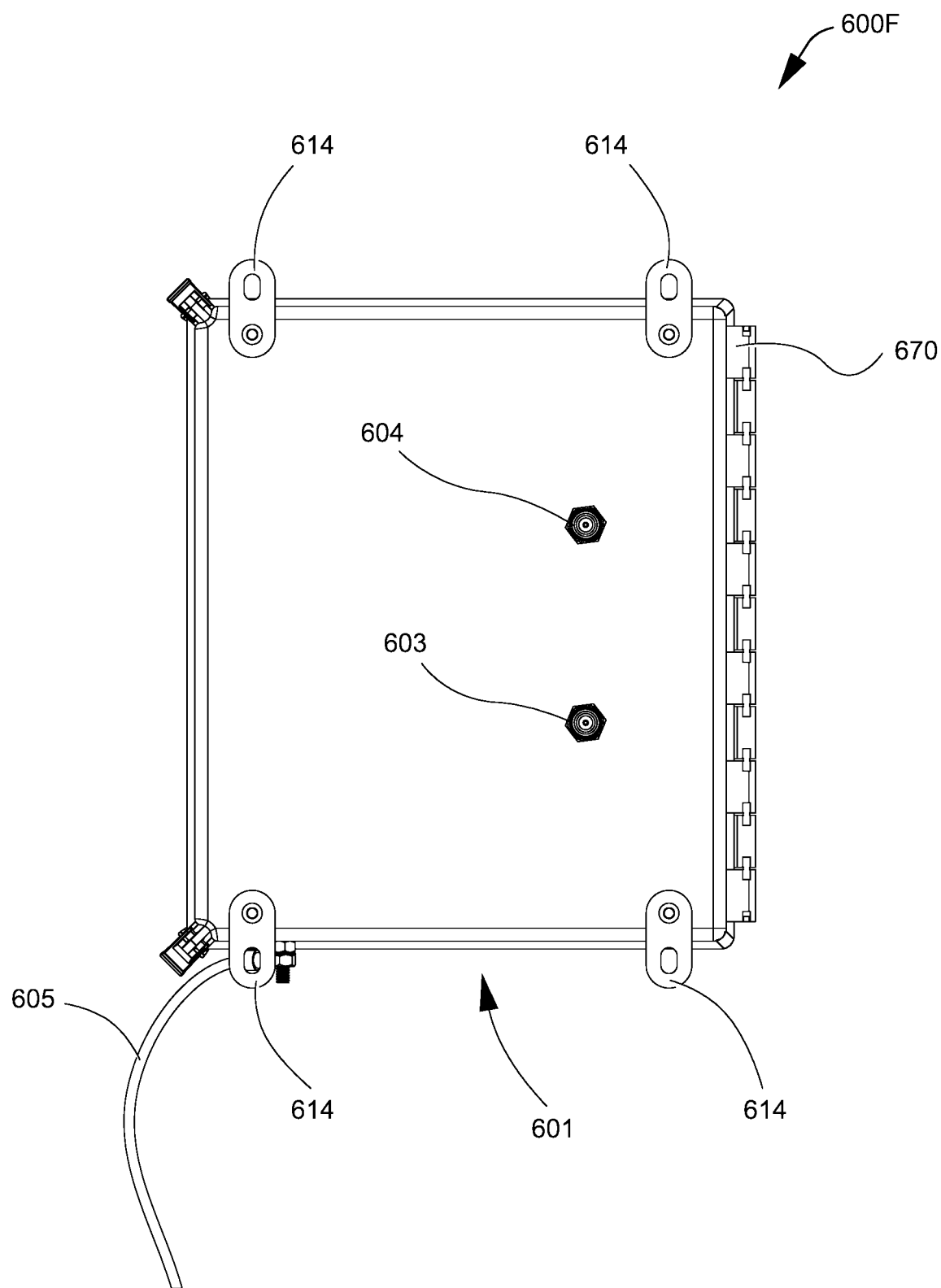
FIG. 6F is a rear view of the standard interface box.

FIG. 6F is a rear view 600F of the standard interface box as it would be seen looking through the wall upon which it is mounted. The standard building interface box 601 is shown to have an outdoor antenna rear port 603 on the lower right of the interface box and an indoor antenna rear port 604 in this view. The earth ground cable 605 is located on the lower left of the standard building interface box 601 with the hinge 670 located on the left.

The standard building interface box 601 includes: four mounting flange ears 614 for fastener mounting to the building surface. Other attachment mechanisms are contemplated. The approximate size of the box is 12" wide by 15" tall by 7" deep. Two cable connection rear ports 603, 604 for the outdoor antenna cable 610 and indoor antenna cable 609 are optionally positioned for wall side interface respectively. Access holes having a diameter of about 1" are required to be placed in the wall to accommodate each cable. A watertight gasket or caulking material would be used between the rear wall of the IBC interface box and the face of the structure wall to prevent water from reaching the connections or holes entering the building. Alternative conduit entry at the box top, bottom, or side surfaces may be used instead of one or both of these rear connection points.

Figure 6G:
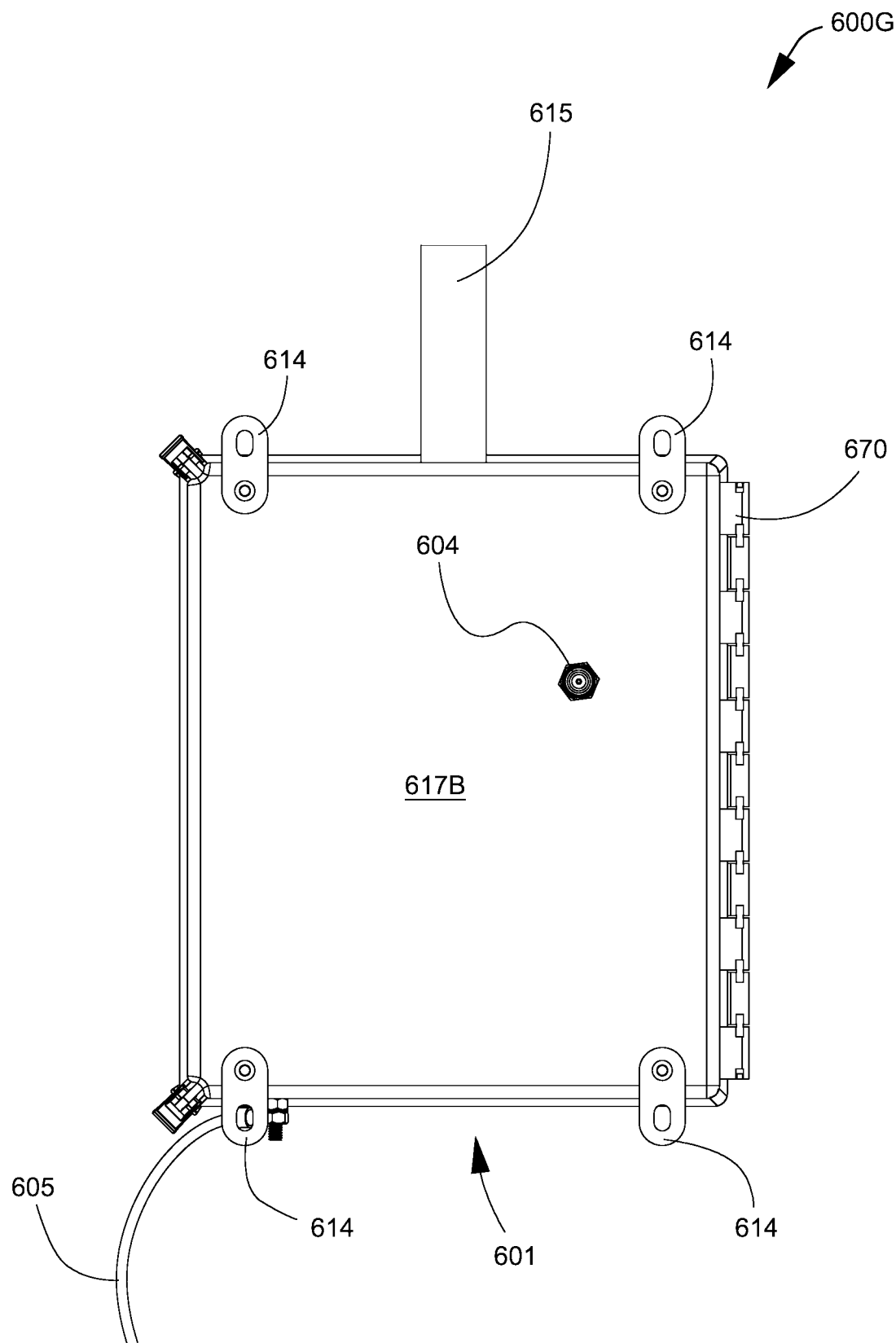
FIG. 6G is a rear view of the standard interface box with a mounted outdoor antenna connected to the standard interface box via a conduit.

FIG. 6G is a rear view 600G of the standard interface box with a mounted outdoor antenna connected to the standard interface box with the conduit embodiment as compared to the mar connection embodiment. In this rear view, 600G the standard building interface box 601 is shown to have the indoor antenna rear port 604 located on the upper right on the rear exterior wall 617B of the standard building interface box. The conduit 615 which connects to the outdoor antenna extends from the top of the interface box. The earth ground cable 605 is connected to the box on the lower left bottom portion of the standard building interface box. The hinge 670 is located on the right side of the interface box in this view.

Figure 6H:
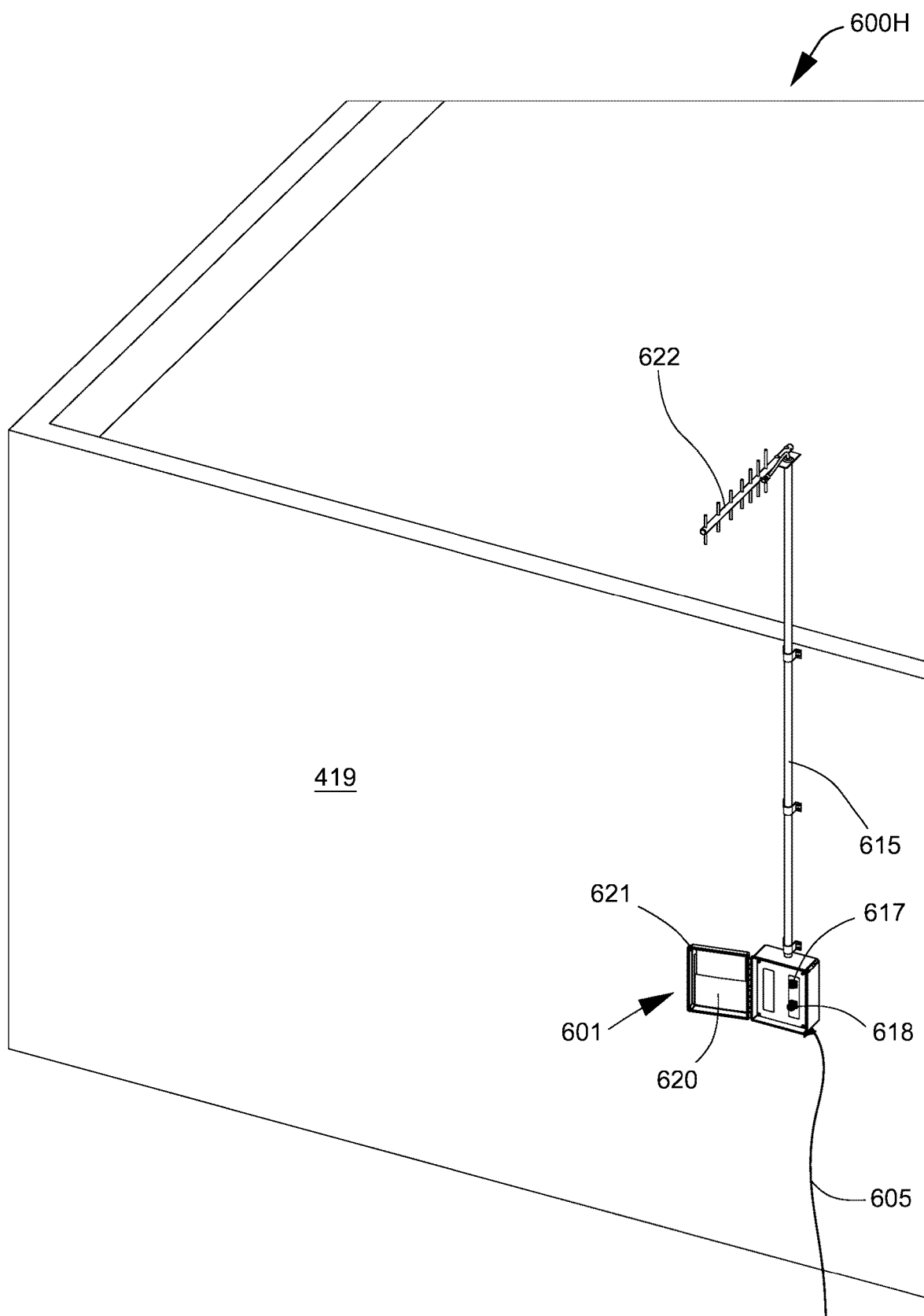
FIG. 6H is a exterior view of the standard interface box with a mounted outdoor antenna connected to the standard interface box via a conduit.

FIG. 6H is an exterior view 600H of the standard interface box with a mounted outdoor antenna connected to the standard interface box via a conduit in a hybrid system implementation. The hybrid system embodiment is shown with the standard interface box 601 mounted to an exterior wall 419. The earth ground cable 605 is shown exiting the box on the lower left. The conduit 615 is shown extending from the top of the interface box along the exterior wall 419 past the roof of the building and connecting to a built-in outdoor antenna 622. The indoor antenna front port 617 is shown on the front upper right portion of the standard building interface box 601. The outdoor antenna front port is shown on the lower front right of the standard building interface box 601 beneath the indoor antenna front port 617. The door 621 of the standard building interface box 601 is shown in an open position and extending to the left. The literature pocket 620 is located on an inside portion of the door.

Figure 6I:
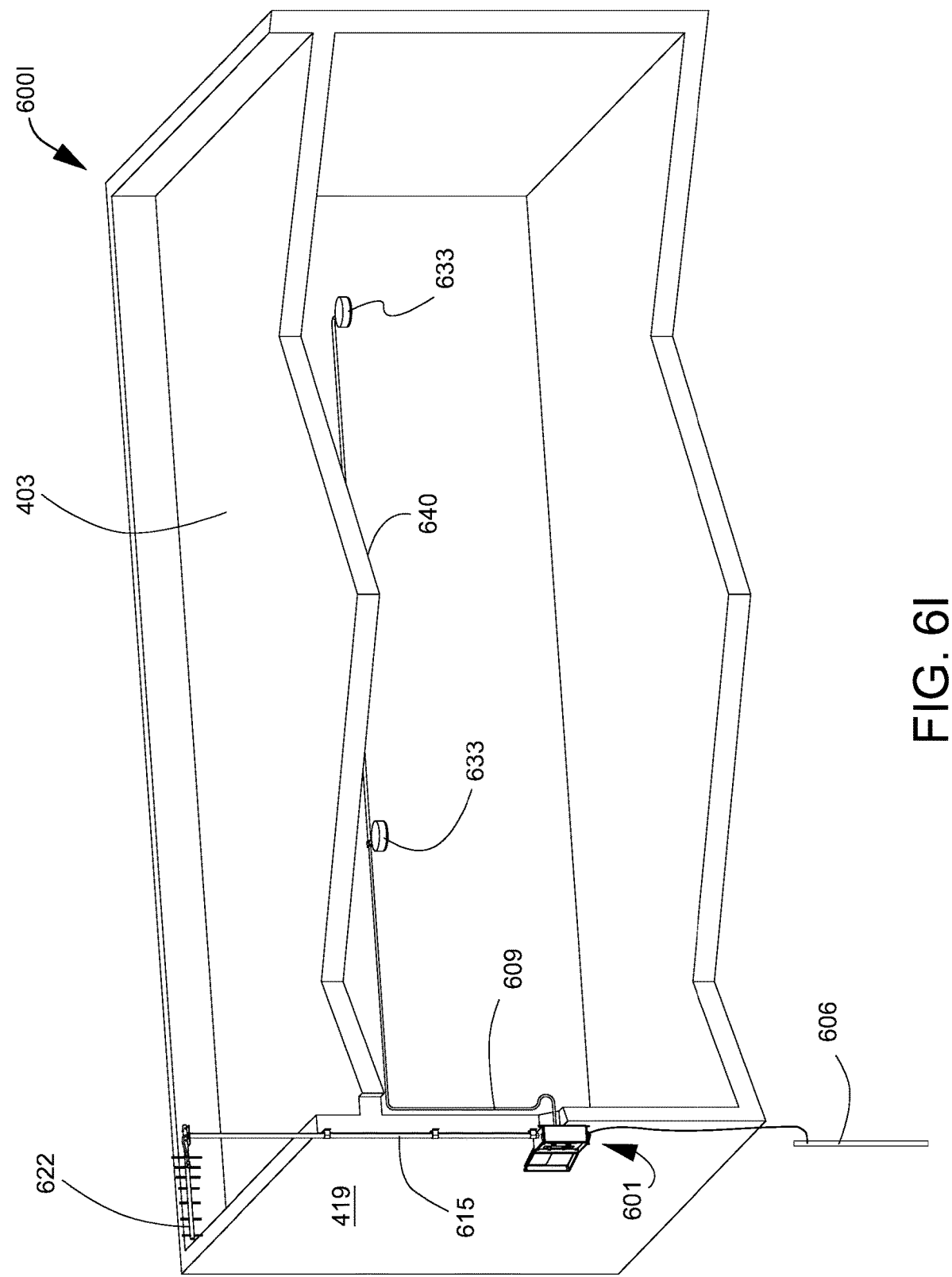
FIG. 6I is a cut away view of a hybrid system installed on a floor of a building with the standard interface box connected to an outdoor antenna via a conduit mount and to an array of indoor antennas.

FIG. 6I is a cut away view 600I of a hybrid system installed on a floor of a building with the standard interface box connected to an outdoor antenna via a conduit mount and to an array of indoor antennas. The standard building interface box 601 is mounted to an exterior wall 419 of a building. A conduit 615 runs from the top of the interface box alongside the exterior wall past the roof 403 to connect to a built-in outdoor antenna 622. An indoor antenna cable 615 is shown connecting the rear of the standard building interface box 601 to an array of built-in indoor antennas 633 mounted on the inside of the building to the ceiling 640 and connected using directional couplers or splitters (not called out). The earth ground stake 606 is sunk in the ground in front of the building and parallel to the exterior wall 419. A cable connects the interface box to the earth ground stake 606. In this view, both the indoor antennas and the outdoor antenna are built-in (attached to the building) and connected to the interface box in a completely pre-configured fashion.

Figure 6J:
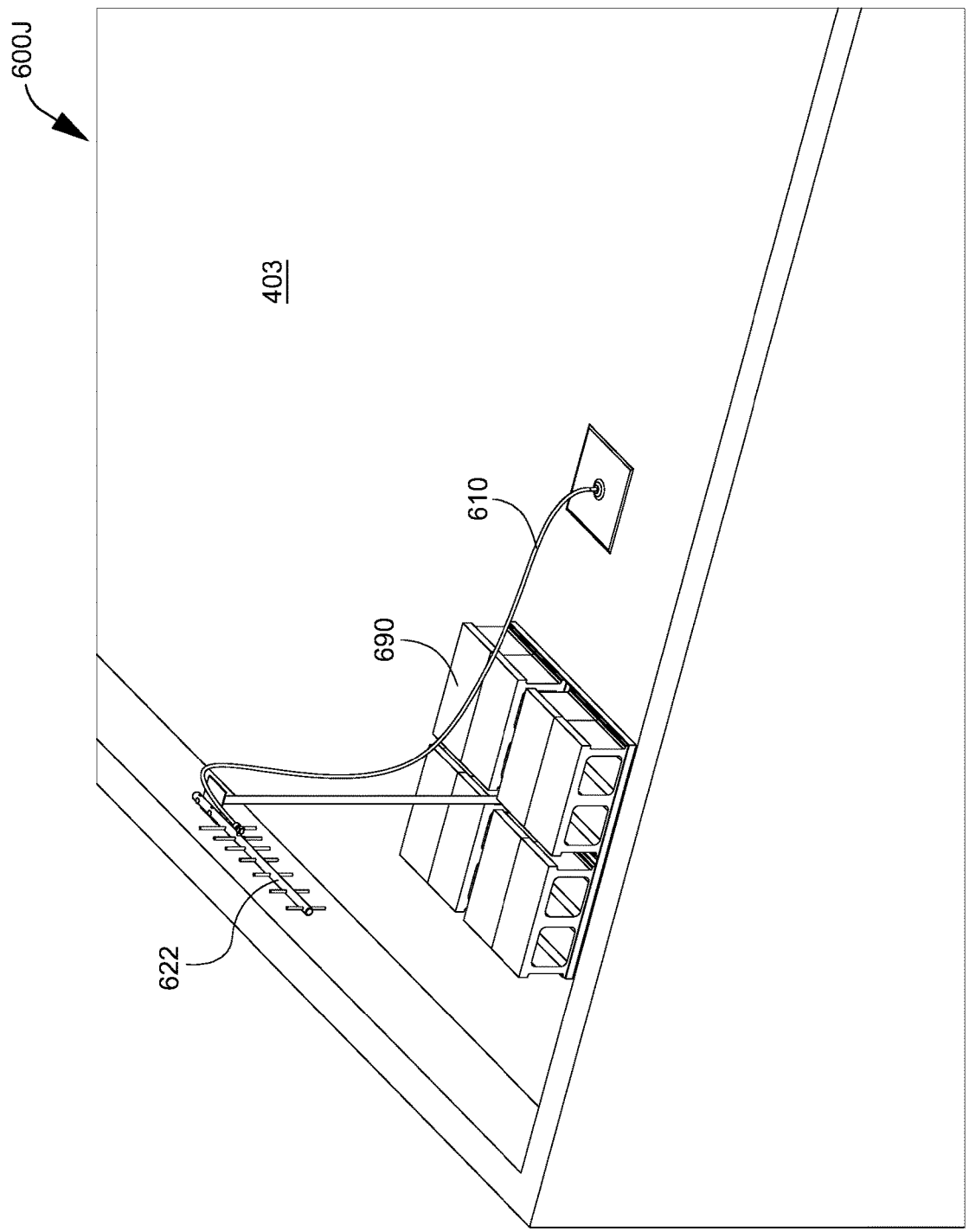
FIG. 6J is a view of a portion of the hybrid system including the outdoor antenna mounted on a rooftop with a non-penetrating roof mount.

FIG. 6J is a view 600J of a portion of the hybrid system including the outdoor antenna mounted on a rooftop with a non-penetrating roof mount. The built-in outdoor antenna 622 is shown on the roof 403 with concrete blocks 690 mounting the antenna to the roof. The cable 610 is seen extending from a port in the roof up to the base of the outdoor antenna 622. Cabling to the interface box is routed through the building interior as opposed to externally using conduit.

Figure 6K:
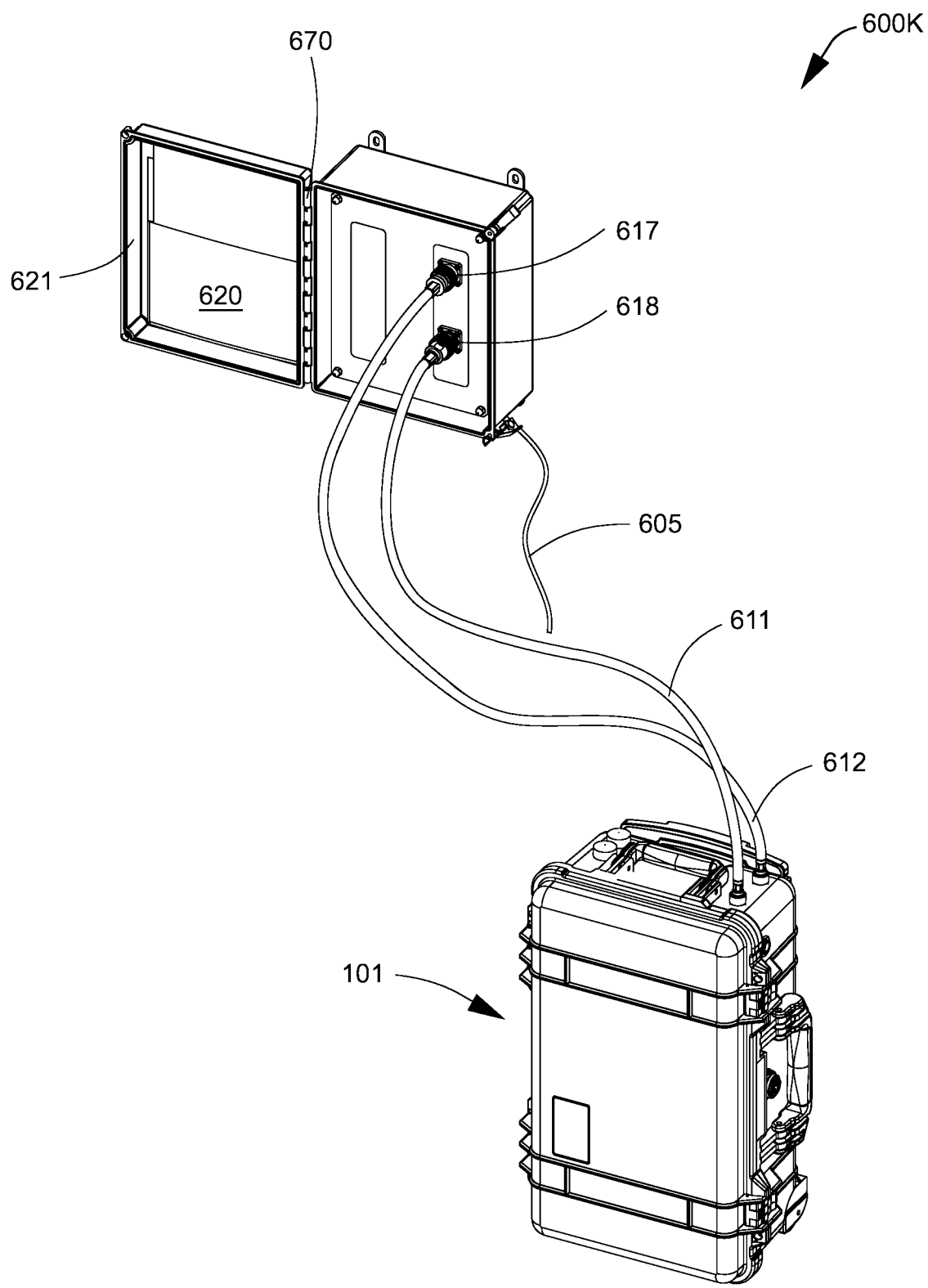
FIG. 6K is a view of the standard interface box with portable amplifier connected via cables to the standard interface box.

FIG. 6K is a view 600K of the standard interface box with a portable amplifier connected via cables to the standard interface box. The portable amplifier kit 101 has a cable 611 leading from the outdoor antenna port on the amplifier kit to the outdoor antenna front port 618 on the standard building interface box. The portable amplifier kit 101 has a cable 612 leading from the indoor antenna port on the amplifier kit to the indoor antenna front port 617 on the standard building interface box. An earth ground cable 605 extends downward from the lower right portion of the standard interface box. The door of the standard interface box is shown in open position with a literature pocket 620 on the inside of the door. The door is connected to the interface box via a hinge 670. The cables can be connected to the front ports of the interface box when the door is in open position and any installed jumper is removed.

Figure 6L:
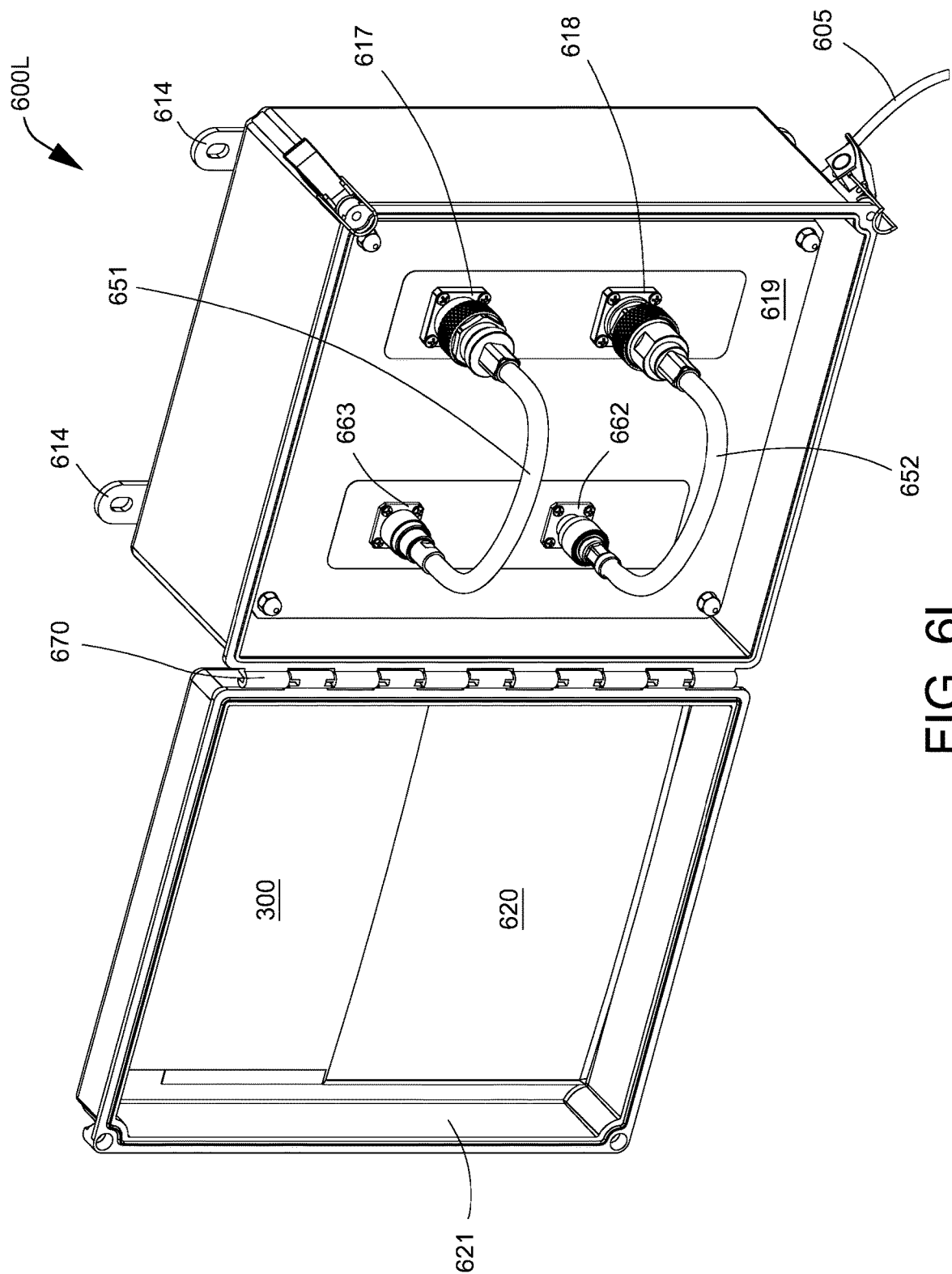
FIG. 6L is a view of the standard interface box with jumpers attached connecting the built-in components.

FIG. 6L is a view 600L of the standard interface box with jumpers attached connecting built-in antenna and amplifier components. The standard building interface box, full built in embodiment, is shown with a regional radio system grid map 300 inserted in the literature pocket 620 on the inside of the door 621. An earth ground cable 605 is shown exiting the lower left of the box. Mounting flanges 614 are located on the top portion of the standard interface box. The indoor antenna front port 617 is connected to the built-in booster indoor antenna front port 663 with a jumper 651. The outdoor antenna front port 618 is connected to a built-in booster outdoor antenna front port 662 with jumper 652. The connector mounting panel 619 of the standard interface box is shown on the front portion of the interface box having four port connections.

Figure 6M:
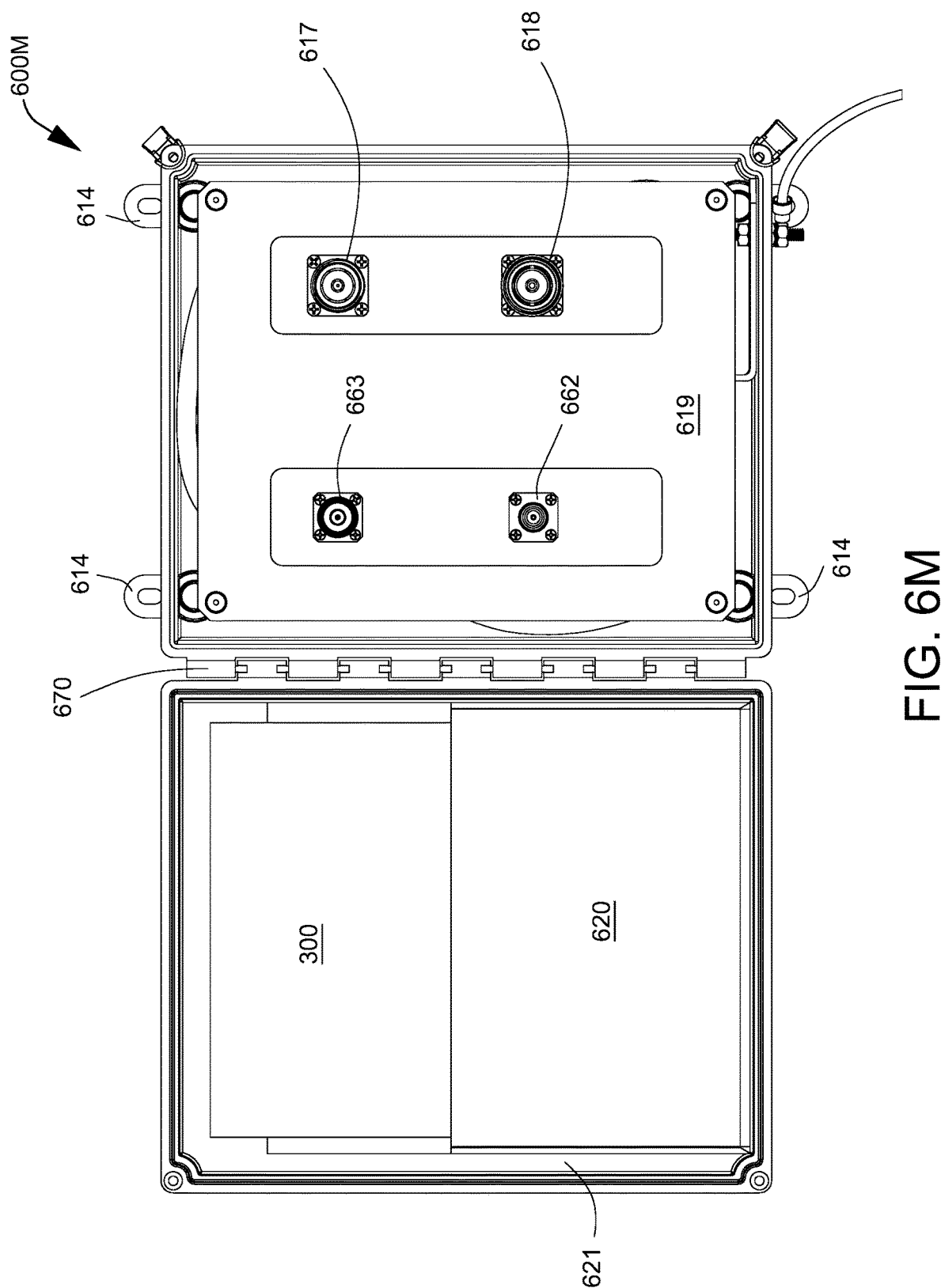
FIG. 6M is a view of the standard interface box for use with built-in components of the hybrid system with jumpers removed.

FIG. 6M is a view 600M of the standard interface box for use with built-in components of the hybrid system with jumpers removed. The standard building interface box in this full built in embodiment, has a regional radio system grid map 300 inserted in the literature pocket 620 on the inside of the door 621. An earth ground cable 605 is shown exiting the lower left of the box. Mounting flanges 614 are located on the top portion of the standard interface box. The indoor antenna front port 617 is shown on the front portion of the interface box positioned at about the same height as the built-in booster indoor antenna front port 663 also on the front panel portion of the standard interface box. The outdoor antenna front port 618 is located beneath the indoor antenna front port 617. The outdoor antenna front port 618 is shown at about the same height as the built-in booster indoor antenna front port 662 also on the front panel portion of the standard interface box. The built-in booster indoor antenna front port 662 is located beneath the built-in booster indoor antenna front port 663. The connector mounting panel 619 of the standard interface box is shown on the front portion of the interface box having four port openings: the built-in booster indoor antenna front port 663, the built-in booster indoor antenna front port 662, the indoor antenna front port 617, and the outdoor antenna front port 618. The ports have polarized connectors specific to each antenna or signal booster function: indoor or outdoor. Each port is polarized differently, so that the indoor antenna port and the outdoor antenna port connections cannot be misconnected.

Figure 6N:
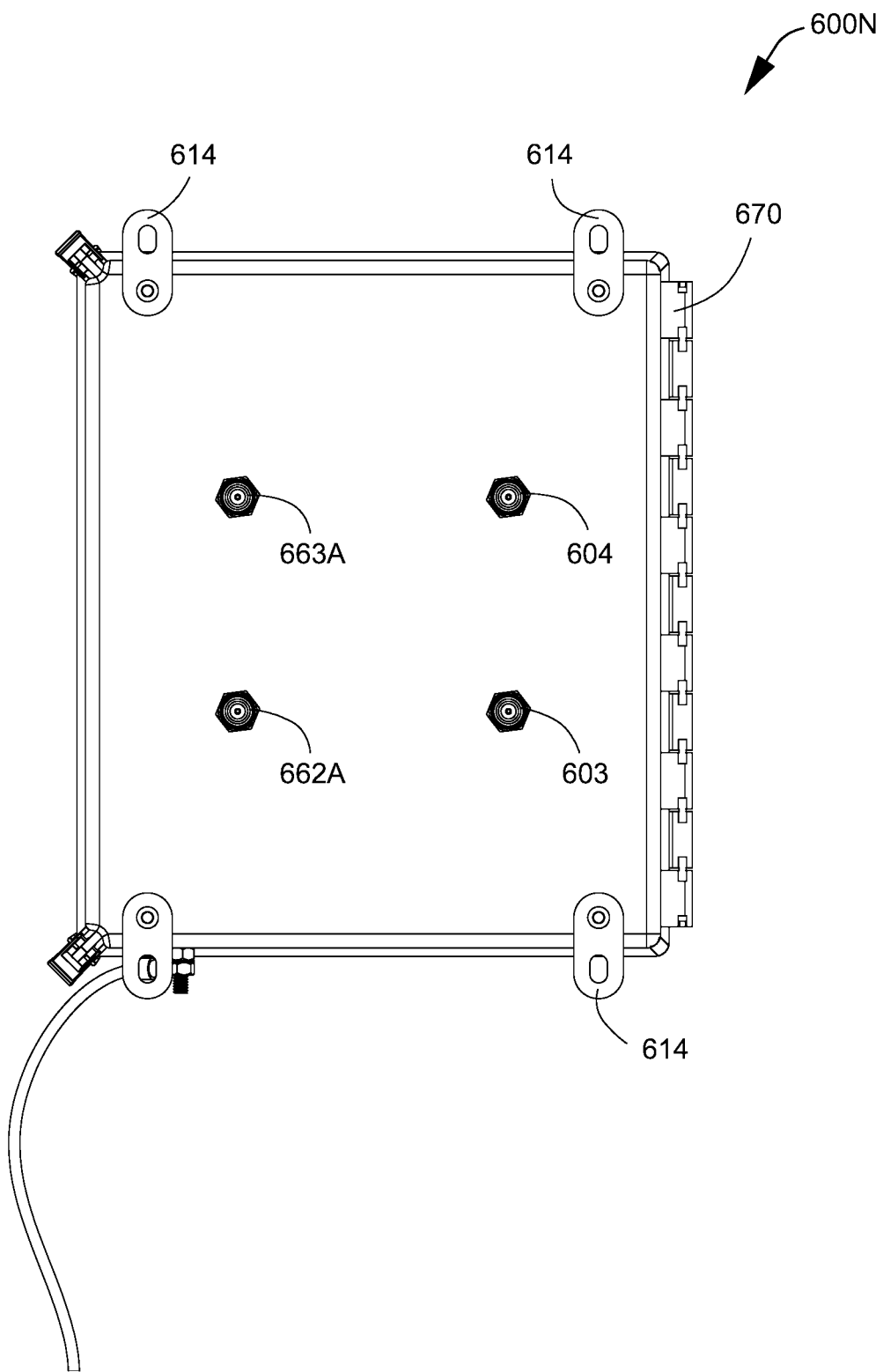
FIG. 6N is a rear view of the standard interface box for use with built-in components of the hybrid system.

FIG. 6N is a rear view 600N of the standard interface box for use with built-in components of the hybrid system. The ear view 600N of the standard interface box illustrates a rear portion of the interface box having four rear port connections: the built-in booster indoor antenna rear port 663A will be connected to the booster indoor antenna port via a cable run not shown, the built-in booster outdoor antenna rear port 662A will be connected to the booster outdoor antenna port via a cable run not shown, the indoor antenna rear port 604 will be connected to the indoor antenna array as previously described, and the outdoor antenna rear port 603 will be connected to the outdoor antenna system as previously described. The jumpers 651 and 652 previously shown complete the built in booster to built in antenna system circuit connections. The advantage of using the IBC Interface Box lies in the ability afforded first responders to quickly bypass and substitute portable components for malfunctioning or disabled built in components in any combination required for the IBC Interface Box located in the relative safety of the building's exterior.

Figure 6O:
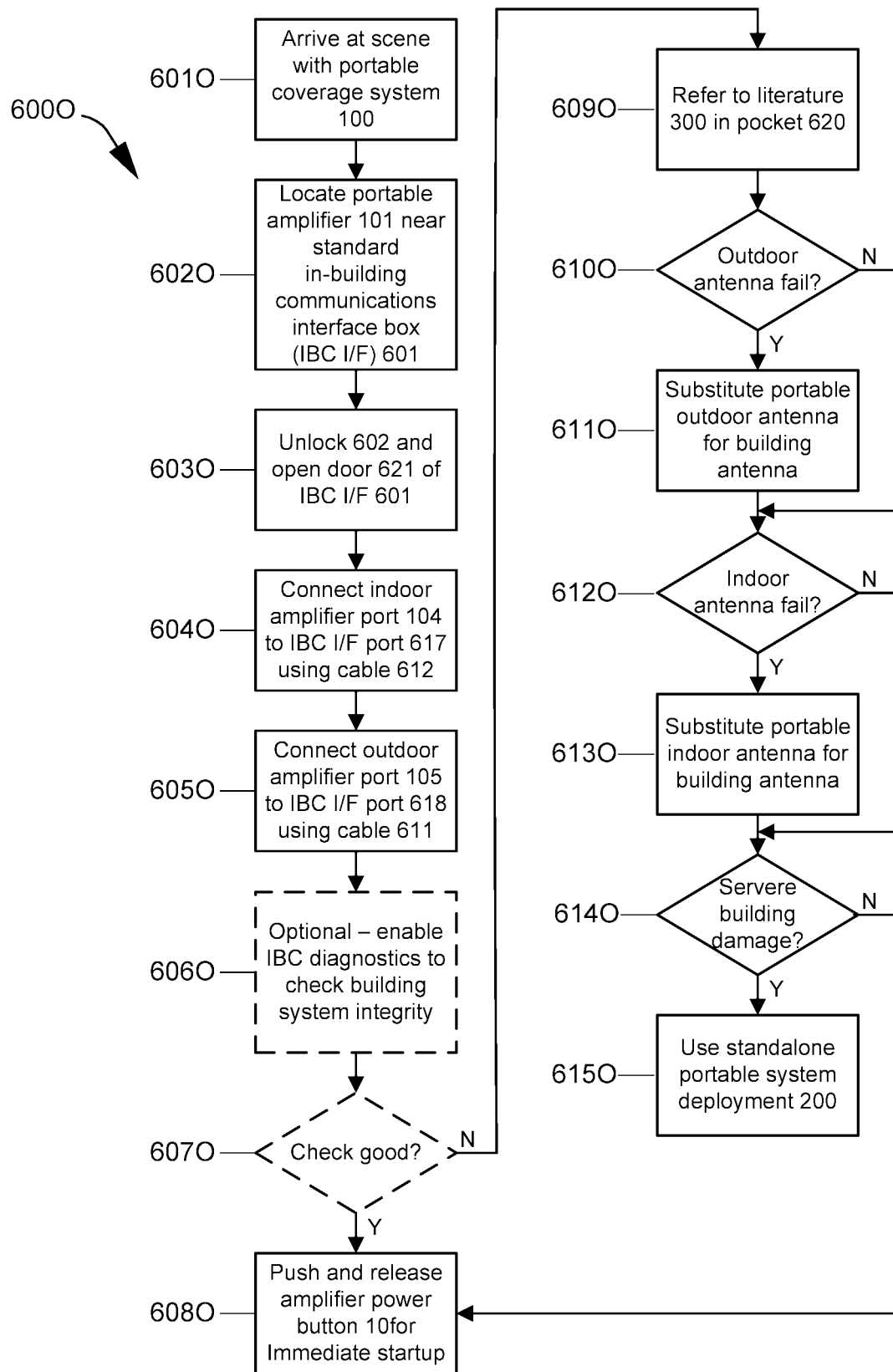
FIG. 6O is a flow chart of a method for deploying enhanced radio coverage.

FIG. 6O is a flow chart 600O of a method for deploying enhanced radio coverage. In step 601A, the portable coverage system arrives at the scene. The portable amplifier 101 is placed near the standard In-Building Communication interface box (IBC I/F) 601 in step 602O. The lock 602 is unlocked and the door 621 as part of step 603O. The indoor amplifier port 104 is connected to the IBC I/F port 617 using cable 612 in step 604O. In step 605O, the outdoor amplifier port 105 is connected to IBC I/F port 618 using cable 611. As part of optional step 606O, the IBC may be used to diagnose the building system integrity. The results of the optional check are evaluated as part of step 607O. A No response to this check in step 607O leads to step 609O. However, if the result of the test is positive in 607O, an immediate start-up procedure is initiated in step 608O by pushing and releasing amplifier power button.

However, following a no response to the check in step 607O and reference to the literature in step 609O. The outdoor antenna is evaluated for failure as part of step 610O. In the event an outdoor antenna failure is identified as part of step 610O, a portable outdoor antenna may be substituted for the building antenna as part of step 611O. In the event, the outdoor antenna has not failed or if the outdoor antenna has filed and once a substitute antenna may be inserted, the process continues with an inspection of the indoor antenna as part of 612O.

Following a yes response for indoor antenna failure check in step 612O, a portable indoor antenna may be substituted for the building antenna as part of step 613O. Following step 613O and a No response to step 612O, the building is inspected for severe damage as part of step 614O. If severe building damage is identified which may compromise other fixed components of the system, the stand-alone portable system deployment 200 is used in step 615O. However, if the severe damage is not identified in response to step 614O, the process proceeds to step 608O where the amplifier is powered on with push and release of the power button 106 for immediate start-up.

A similar process is applied in the case of the four-port IBC Interface Box full built in embodiment described above. In this case, in addition to the integrity checks of built in outdoor and indoor antenna systems, the built in booster system integrity may also be examined. If any of the built in components shows malfunction, portable components arriving safely and undamaged with first responders may be quickly substituted overcome the malfunction.

FIG. 7 is a table of preparedness strategies and deployment configurations. The table describes three different types of treatment scenarios in the second column and relative investment (monetary) in terms of first responders and premise(s) in columns three and four. The configuration requirements (portable or built-in) for the outdoor antenna, amplifier, and indoor antenna are indicated in columns six, seven, and eight. It should be noted that these strategies and their respective configurations correspond variously to the fully portable deployment, the IBC Interface Box hybrid embodiment, and the IBC Interface Box full built in embodiment described in the preceding paragraphs.

The first treatment strategy (Strategy #1) in row 2 of the chart indicates that a first responder can provide a completely portable communication coverage enhancement requiring no invested equipment in the premise. Configuration #1 within Strategy #1 represents a passive enhancement approach where antennas are utilized along with cabling to convey the signal past the blocking structure without the use of an active amplifier system (hence passive approach). Configuration #2 within Strategy #1 is a typical portable enhancement approach as described earlier using portable outdoor antenna, portable amplifier system, and portable indoor antenna or antenna array. Further options within these general configurations include various placements for the portable outdoor antenna, for example, outside the structure mounted on the ground or mounted on a vehicle, or inside the structure mounted to aim through a window or other opening, or upon the structure such as on a rooftop. Various placements for the portable amplifier are also contemplated including near the portable outdoor antenna, near the portable indoor antenna or array, or an arbitrary distance between the outdoor and indoor antenna. This may result in the portable amplifier being located outside the structure on the ground or mounted to a vehicle, or inside or upon the structure.

The second treatment strategy (Strategy #2) adjacent to the 2 in the first column of the chart indicates that a building with installed standard interface provides configurations 3-8 (5 different configurations total) utilizing a various combinations of built-in and portable components. The installation of the standard interface box requires a moderate investment by the premises and the same investment by the first responders as the previous strategy #1. However, the standard interface box provides a number of different configuration options which can provide a flexible response to emergency conditions including back up of damaged or inadequate built-in systems.

The third treatment strategy (Strategy #3) adjacent to the 3 in the first column of the chart indicates that a building with installed standard interface provides configurations 9-15 (7 different configurations total) utilizing various combinations of built-in and portable components including antenna subsystems, signal booster, backup power, and alarm system interconnected using a standard building interface. The installation of the standard interface box requires a moderate investment in the premises and the similar investment by first responders as the previous strategies. However, the installed antenna subsystem, signal booster, backup power, and alarm system require significantly more investment in the premises than the previous two types of treatment strategies. Again, the standard interface box provides a number of different configurations to utilize the installed and portable elements to provide the most effective communication coverage enhancement most quickly and flexibly at particular premises under particular circumstances.

Figure 8A:
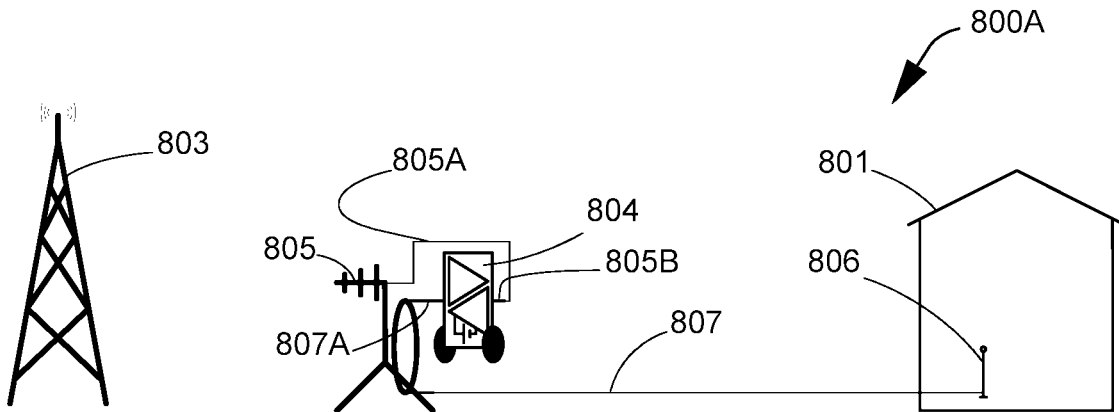
FIG. 8A is a schematic of the typical portable In-Building Communication enhancement treatment.

FIG. 8A is a schematic view 800A of the typical portable In-Building Communication enhancement treatment.

A portable In-Building Communication enhancement treatment is applied to a building 801 and set distance from a radio site 803 such as a radio tower. A portable amplifier kit 804 is located outside the building 801. The outdoor antenna amplifier port 805B of the portable amplifier kit 804 is connected via an outdoor antenna cable 805A to a portable outdoor antenna 805. A portable indoor antenna 806 is placed inside the building 801. The portable indoor antenna 806 is connected to the indoor antenna amplifier port 807A of the portable amplifier kit 804 with a long segment of indoor antenna cable 807 and a contiguous short segment 807A.

The amplifier kit is connected to the indoor antenna and portable outdoor antenna and powered on enhancing radio communications from inside of the building 801 to reach the radio site 803 and communications from the radio site 803 outside the building to be transmitted to radio users within the building. The indoor antenna 806 and the outdoor antenna 805 are separated by a sufficient distance and structure, so that oscillation of the amplifier is precluded by adequate isolation. The amplifier kit has an automatic shutdown feature in the event oscillation or other problematic forms of interference should occur.

The portable In-Building Communication enhancement treatment is simple to use and can be set up quickly which enables communication to be established with less risk to those on-site. In this embodiment, the indoor antenna is the only piece of equipment that is required to be brought into the building to provide communications. The indoor antenna can be brought into the building as part of the last step in establishing communications.

Figure 8B:
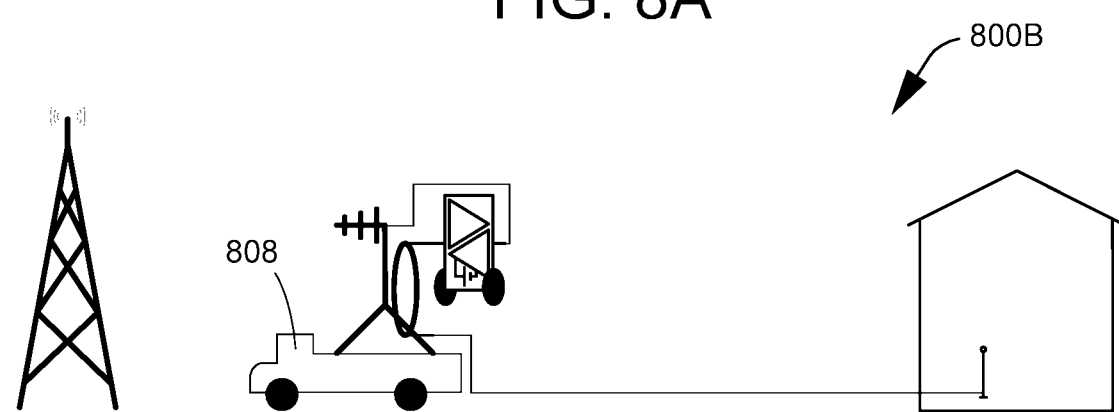
FIG. 8B is a schematic of the typical vehicle mounted portable In-Building Communication enhancement treatment.

FIG. 8B is a schematic 800B of the typical vehicle mounted portable In-Building Communication enhancement treatment. In this embodiment, all of the components of the portable outdoor amplifier kit 804 and the portable outdoor antenna 805 are mounted to an emergency response vehicle 808. In this way assembly time can be further reduced, as less time is necessary to establish communications by deploying the portable outdoor antenna from a bag. In this embodiment, the indoor antenna is the only piece of equipment that needs to be brought inside in order to provide the portable In-Building Communication enhancement treatment.

Figure 8C:
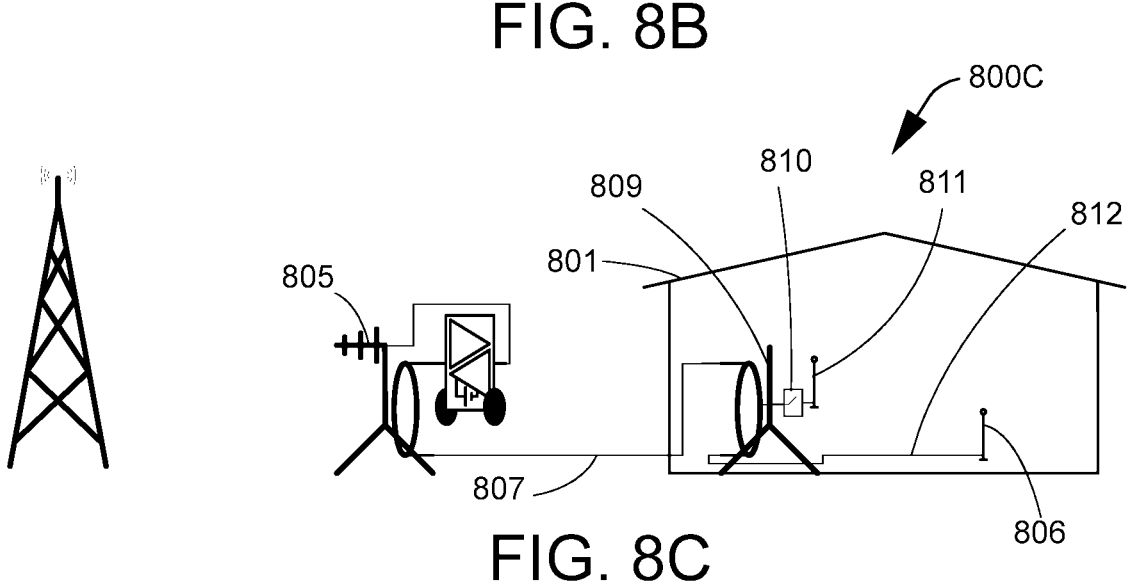
FIG. 8C is a schematic of the typical portable in-Building Communication enhancement kit with an extension antenna kit.

FIG. 8C is a schematic 800C of the typical portable In-Building Communication enhancement kit with an extension antenna kit. In this embodiment, the portable outdoor antenna 805 is located outside the building 801. The portable amplifier kit 804 is attached to the outdoor antenna and is also located outside of the building 801. The portable indoor antenna 806 is located inside the building 801 and is connected via an extension cable 812 to a portable extension antenna stand 809. The portable extension antenna stand 809 is coupled to the long segment of the indoor antenna cable 807 which connects to the amplifier kit. In this embodiment, the amplifier kit may be located outside of the building. The portable extension antenna stand 809 has an extension antenna selection switch 810, an extension indoor antenna 811, and an extension cable 812. Extension antenna selection switch 810 may be actuated to enable or disable signal distribution from interim extension antenna 811. Signal will be delivered to the ultimate indoor antenna 806 regardless of the position of switch 810.

The portable extension antenna stand can provide increased reach of the portable In-Building Communication enhancement treatment with its addition of extended length of cable as well as the use of an additional indoor antenna to provide increased coverage throughout the building. A distributed antenna system (DAS) may be applied to the building quickly as part of the overall portable In-Building Communication system deployment.

Figure 8D:
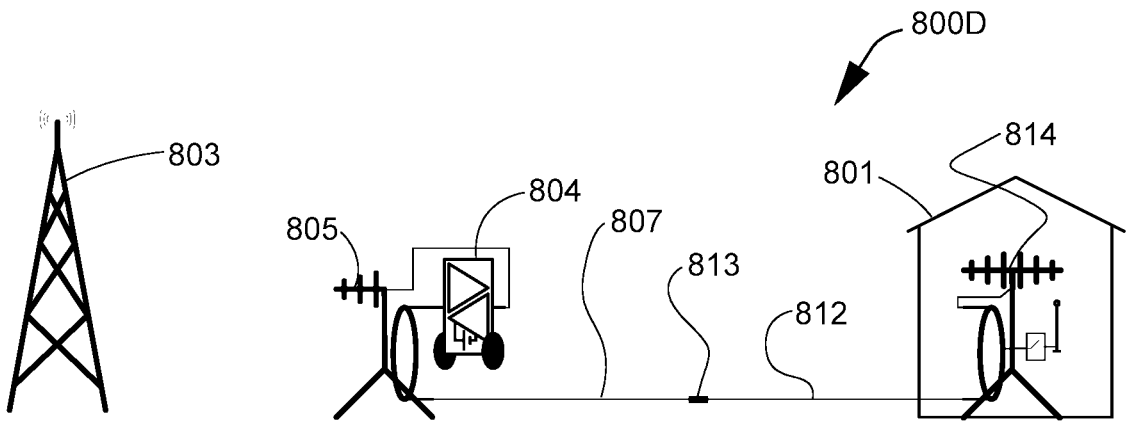
FIG. 8D is a schematic of the typical portable In-Building Communication enhancement kit with an extension cable and a specialty indoor antenna.

FIG. 8D is a schematic 800D of the typical portable In-Building Communication enhancement kit with an extension cable and a specialty indoor antenna. In this embodiment, the amplifier kit 804 and the portable outdoor antenna 805 are connected to each other and are located outside the building. The portable amplifier kit is connected to a specialty portable extension antenna 814 which is located inside the building 801. The specialty portable extension antenna may be selected based on the specific handheld radios that are used as part of the system, configuration or materials used in the building construction, coverage pattern intent, or other reason specific to the circumstances and the location in need of communication coverage enhancement.

The amplifier kit in this embodiment is shown connected to the specialty antenna system 814 via portable extension cable 812, cable coupler 813, and usual indoor antenna connection cable 807. In this embodiment an increased connection length is used between the amplifier kit 804 and the indoor antenna 814 using a coupler 813 and cable extension 812. The type of cable extension used can be determined based on the length of cabling required as well as other factors necessary to provide communication enhancement such as suitable isolation occurring between the amplifier kit and the specialty indoor antenna.

Figure 8E:
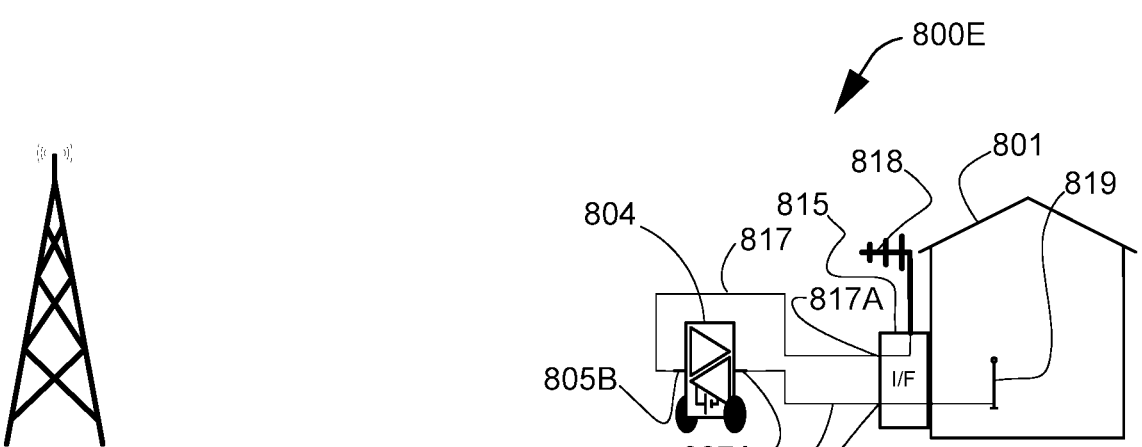
FIG. 8E is a schematic of a typical hybrid system including a portable amplifier kit.

FIG. 8E is a schematic 800E of a typical hybrid system including an attached portable amplifier kit. In this embodiment, the building 801 has a standard building interface box 815 attached directly to the building. The standard building interface box 815 is connected to a built-in outdoor antenna 818 and a built-in indoor antenna 819 both of which may also may be attached directly to the building.

The standard building interface box 815 includes a standard building interface indoor antenna front port 816A and a standard building interface outdoor antenna front port 817A. The portable amplifier kit 804 is located outside the building and includes: an outdoor antenna amplifier port 805B and an indoor antenna amplifier port 807A. An indoor antenna port cable 816 connects the indoor antenna amplifier port 807A of the amplifier kit 804 to the standard building interface indoor antenna front port 816A. An outdoor antenna port cable 817 connects the outdoor antenna amplifier port 805B of the amplifier kit 804 to the standard building interface outdoor antenna front port 817A.

In this embodiment, the amplifier kit is the only piece of portable equipment that is deployed on the scene to enable communication enhancement. The amplifier kit may be operated outside of the building. This portable set up may proceed more quickly than fully portable configurations. The outdoor antenna fixed to the building may be aimed correctly without requiring any additional orientation by the operator. In this embodiment, set up time and cost to provide a communication enhancement to the building may be greatly reduced. Maintenance costs associated with built in equipment are also optimized as it is far more economical to maintain simpler antenna and cabling systems compared to complex electronic amplifier, battery, and alarm systems.

Figure 8F:
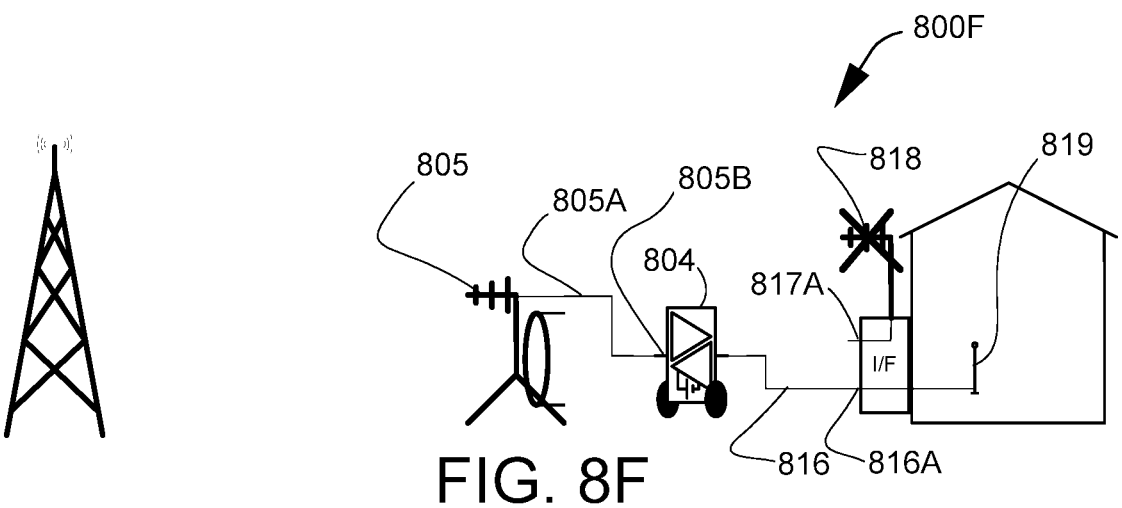
FIG. 8F is a schematic of a hybrid system including a portable amplifier kit bypassing a failed built-in outdoor antenna.

FIG. 8F is a schematic 800F of a hybrid system including a portable amplifier kit bypassing a failed built-in outdoor antenna 818. Perhaps antenna system 818 was damaged by fire, explosion, or weather related phenomena. Alternatively, the radio site at which antenna 818 was aimed in fixed fashion at time of installation may be disabled for any of several reasons. There are many potential reasons, especially during a disaster or emergency event, why built in systems may become dysfunctional. In this embodiment, to overcome a malfunction, a portable amplifier kit 804 is connected to a portable outdoor antenna 805 via an outdoor antenna cable 805A connected to the outdoor antenna amplifier port 805B of the amplifier. The indoor antenna port cable 816 connects the amplifier kit to the standard building interface indoor antenna front port 816A to utilize the built in indoor antenna anay which is found to be functioning without problem at the moment.

The standard building interface outdoor antenna front port 817A provides a connection to the outdoor antenna conveniently outside the building. The built in indoor antenna 819 is connected to the interface box as well. In the event, the built in outdoor antenna was disabled or not functioning, a portable outdoor antenna could be connected directly to the amplifier kit. In this way, interface box's connections to the indoor antenna could still be utilized, while problems associated with the built in outdoor antenna could be avoided.

In this embodiment, the interface box mechanism provides a valuable timesaving and safety enhancement as there is no need for an operator to enter the building, instead using an hybrid configuration both the outdoor antenna and the amplifier are able to be connected quickly and remain outside with the operator.

FIG. 8G is a schematic 800B of the full built-in system utilizing a standard interface box. In this embodiment, a full built-in system utilizing a standard interface box provides a fixed In-Building Communication enhancement treatment. A four-port standard building interface box 820 may be secured directly to the building. The interface box may include: a standard building interface indoor antenna front port 816A, a standard building interface outdoor antenna front port 817A, a built in booster outdoor antenna front port 821A, and a built in booster indoor antenna front port 822A. A built in outdoor antenna 818 and a built in indoor antenna 819 are fixed to the building and are connected to the interface box.

A BDA or other booster may be attached to the building and connected to the interface box as a built in booster. A jumper, a short segment of cable, or other connector 821 may be used to connect the built in outdoor antenna front port to the built in booster outdoor antenna front port. Another jumper, a short segment of cable, or other connector 822, may be used to connect the built in indoor antenna front port to the built in booster indoor antenna front port. In both cases, the ports are polarized so that the proper connectors or fitting with the appropriate polarity must be used to make the proper connection corresponding to the cable leading to the proper antenna system.

In this embodiment, the building has a fixed In-Building Communication enhancement treatment and, if all of these fixed systems are functioning without problem, no portable components are required for coverage enhancement.

However, if any built in components become damaged or malfunction, portable replacements may be easily substituted to restore coverage enhancement. FIG. 8H is a schematic 800H of the built-in system using portable systems bypassing a failed built in antenna and failed built in amplifier. In this embodiment, a portable amplifier kit 804 and a portable outdoor antenna 805 are connected to an interface box attached to a building which has been previously treated with a fixed In-Building Communication system. In the schematic, both the outdoor antenna and the booster which were part of the fixed In-Building Communication enhancement treatment are broken and not functioning.

However, the interface box provides the necessary connecting ports for a portable amplifier kit 804 to connect to the remaining operational components of the fixed In-Building Communication enhancement treatment easily. In this embodiment, the portable outdoor antenna 805 is connected to the outdoor antenna portable amplifier port 805B with an outdoor antenna cable 805A. An indoor antenna port cable 816 connects to the standard building interface indoor antenna front port 816A to the portable amplifier kit indoor antenna port thus connecting and utilizing built in indoor antennas which are part of the fixed in-building communication systems still functioning properly. This flexible configurability is enabled via the building standard IBC Interface Box, a key element of the present invention.

Overall, the IBC Interface Box enables a portable solution to be used in the event any components of the fixed in-building communication enhancement are disabled. This allows a booster such as a BDA to be stored safely off-site and applied quickly as an emergency backup. This embodiment also demonstrates important set up time and cost reduction advantages. A BDA stored off site provides important back up for a number of buildings in the event an emergency damages a fixed system at any of them. The interface box makes the functioning components of the fixed in-building communication enhancement system in a given building easily accessible in the relative safety of the building's exterior to the first responders during an emergency or non-emergency event.

FIG. 8I is a schematic 800I of portable deployment showing a portable amplifier kit located midway between portable outdoor and indoor antennas and including an extension antenna kit. A portable amplifier kit 804 is connected to a portable outdoor antenna 805 via an indoor antenna cable, long segment 807, a cable coupler 813, and an outdoor antenna cable 805A. The extended cable length may be used to provide the optimal positioning of the outdoor components (amplifier kit and outdoor antenna), indoor components (indoor antenna and cable), sufficient length to cable around a radio barrier, necessary isolation between the indoor antenna and outdoor antenna, sufficient slack to enter the building entranceway quickly, or other safety or operational consideration.

The amplifier kit 804 is connected to the indoor antenna via an extension cable 812 which is connected to a portable extension antenna stand 809. The portable extension antenna stand 809 provides connection to a portable indoor antenna 806 and an extension indoor antenna 811. An extension antenna selection switch 810 is located between the extension indoor antenna 811 and the portable extension antenna stand 809. In this embodiment, extensions are demonstrated between the amplifier kit and the outdoor antenna and between the amplifier kit and the indoor antenna. The portable antenna stand may provide extension cable for connecting the amplifier kit to an indoor antenna. In addition, the portable antenna stand may have an alternate connection to an alternate antenna stand.

Figure 9A:
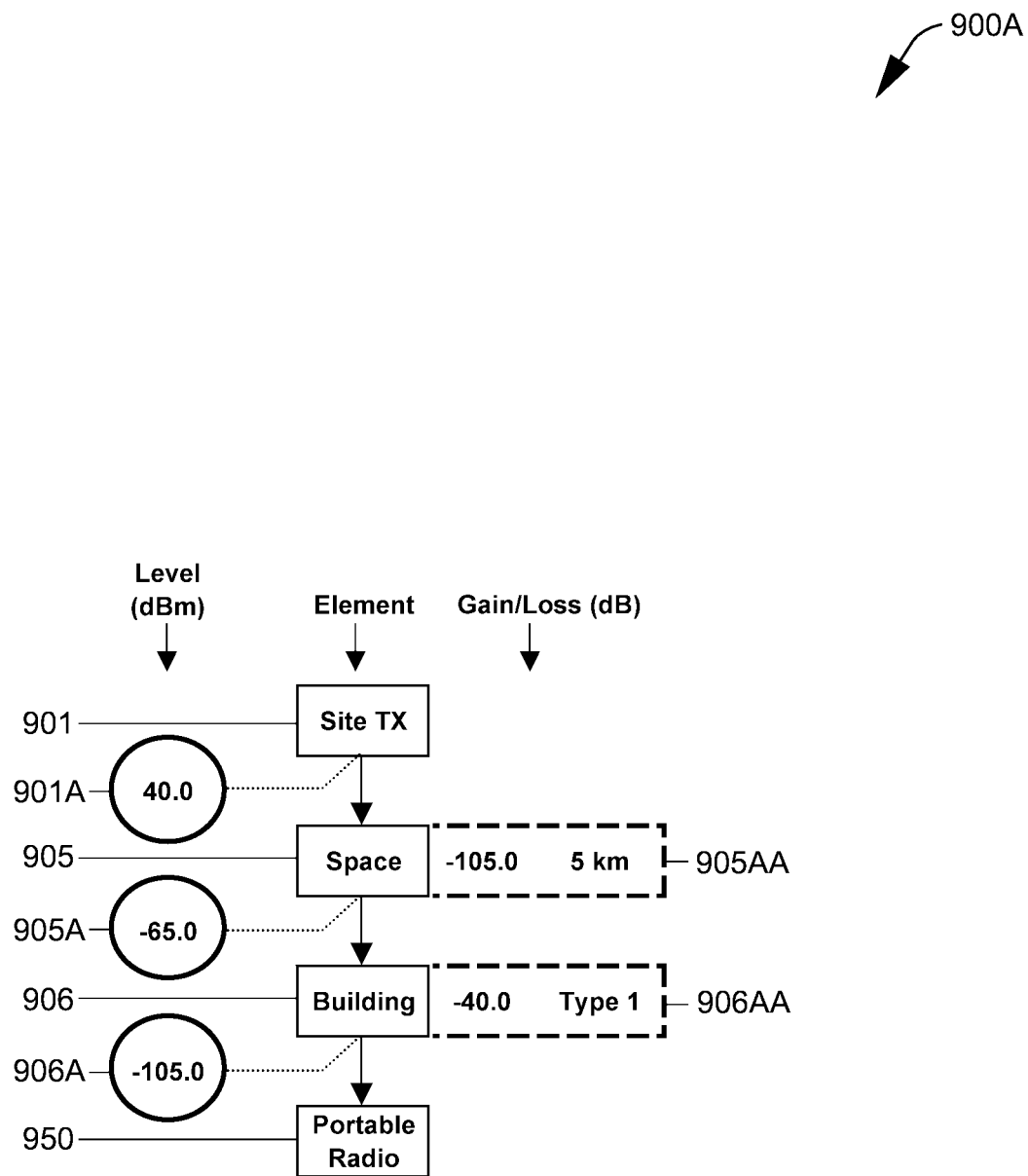
FIG. 9A is a gain map depicting a building with no treatment receiving a downlink transmission.

FIG. 9A is a gain map 900A depicting a building with no treatment receiving a downlink transmission. A portable radio receiver 950 in a building 906 receives a downlink transmission from a radio site transmitter 901. The radio site transmitter has an output power or Effective Radiated Power (ERP) of about 40 dBm 901A. Assuming a frequency of about 860 MHz, for example, the transmitted signal would then have a loss of approximately −105.0 dB after traveling 5 km 905AA through free space. (Other conditions may affect the transmission during its transmission such as humidity, weather, and other atmospheric conditions. Testing should take place at a given site to determine suitability for each particular location.) As a result, the signal at this point arriving at the building has an estimated power level of −65.0 dBm 905A. Upon reaching the building, the signal experiences an additional loss of 40 dB 906AA as it travels through Fire Type 1 building material (heavy concrete or masonry construction) providing a power level of −105.0 dBm 906A to the portable radio receiver inside the building. This signal level is below acceptable levels generally required for error free reception of transmitted information. This is one indication of the need for radio coverage enhancement.

Figure 9B:
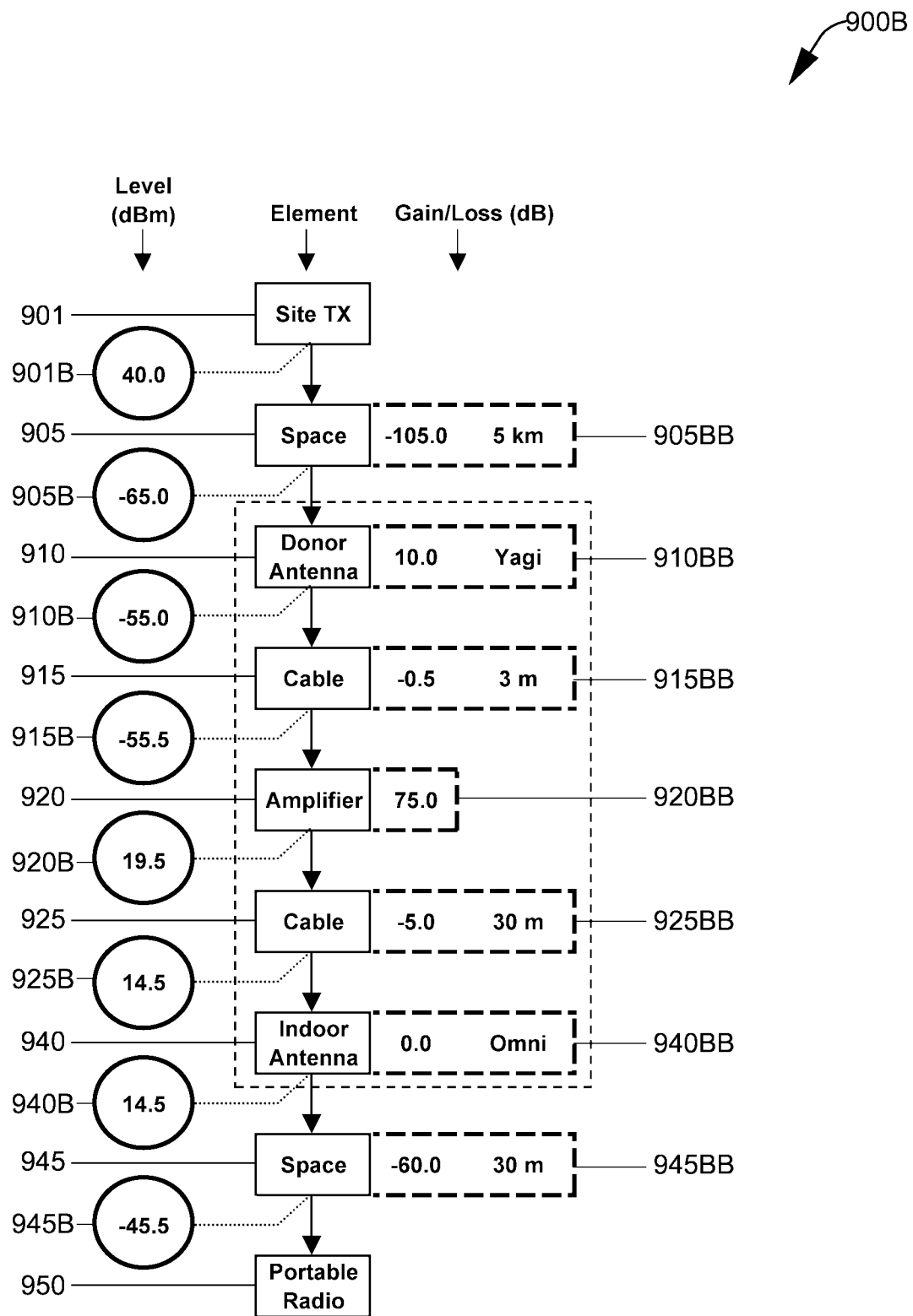
FIG. 9B is a gain map depicting a building with portable treatment receiving a downlink transmission.

FIG. 9B is a gain map 900B depicting a building with portable coverage enhancement treatment receiving a downlink transmission. A portable radio receiver 950 receives a downlink transmission from a radio site transmitter 901. A dotted line forms a box around the donor antenna, cable, amplifier, cable, and indoor antenna components representing the portable coverage enhancement system that is applied to the building. Once again, the radio site transmitter 901 has an ERP 901B of about 40 dBm. The transmitted signal is attenuated approximately 105 dB after traveling 5 km 905BB through free space. The signal at this point has a power level of −65.0 dBm 905B. Upon reaching a directional donor antenna 910, the signal experiences a gain of 10 dB 910BB providing a signal power level of −55.0 dBm 910B to the coaxial connecting cable 915.

Assuming the use of typical low loss coaxial cable, the signal next experiences a loss of about (1.5 dB 915BB traversing the cable 915 for approximately 3 m 915BB. The signal power level reaching the amplifier 920 is therefore about −55.5 dBm 915B. The amplifier 920 provides a gain of 75 dB 920BB boosting the signal power level to 19.5 dBm 920B. Cable 925 leads from the amplifier to an indoor antenna approximately and is 30 m in length imparting an expected loss of 5 dB 925BB which further reduces the signal power to 14.5 dBm 925B. The cable may lead from outside of the building where the amplifier kit and donor antenna are typically located in this embodiment to the indoor antenna which is typically located inside of the building in this embodiment. The cable may cross the exterior wall of the building or other barrier. Using an amplifier to boost the received signal and a low loss cable to deliver the boosted signal to an indoor antenna across all building wall or other material attenuators is advantageous. It provides a by-pass of the building wall and other attenuators that weaken an already low signal level below levels acceptable for reliable communications within.

An omni directional antenna may be used as an indoor antenna 940 with no appreciable gain or loss. In the scenario of FIG. 9B, the signal radiates from the indoor antenna 30$m$ from the indoor antenna through free space 945 before finally reaching the portable radio receiver 950 experiencing a loss of about 60 dB 945BB reaching the portable radio at a power level of about −45.5 dBm 945B. The signal level available to the portable receiver in the coverage enhanced scenario of FIG. 9B is therefore 60 dB higher than the untreated scenario depicted in FIG. 9A and is well above acceptable levels for error free reception of transmitted information.

The gain map show in FIG. 9B shows the benefit to signal power level of the treated (−45 dBm versus the untreated gain map shown in FIG. 9A where the received signal strength was −105.0 dBm 905A. As stated, the gain in signal strength provided by the portable coverage enhancement system is significant as it may enable an emergency responder to receive a life saving communications over the portable radio while inside the building.

Figure 9C:
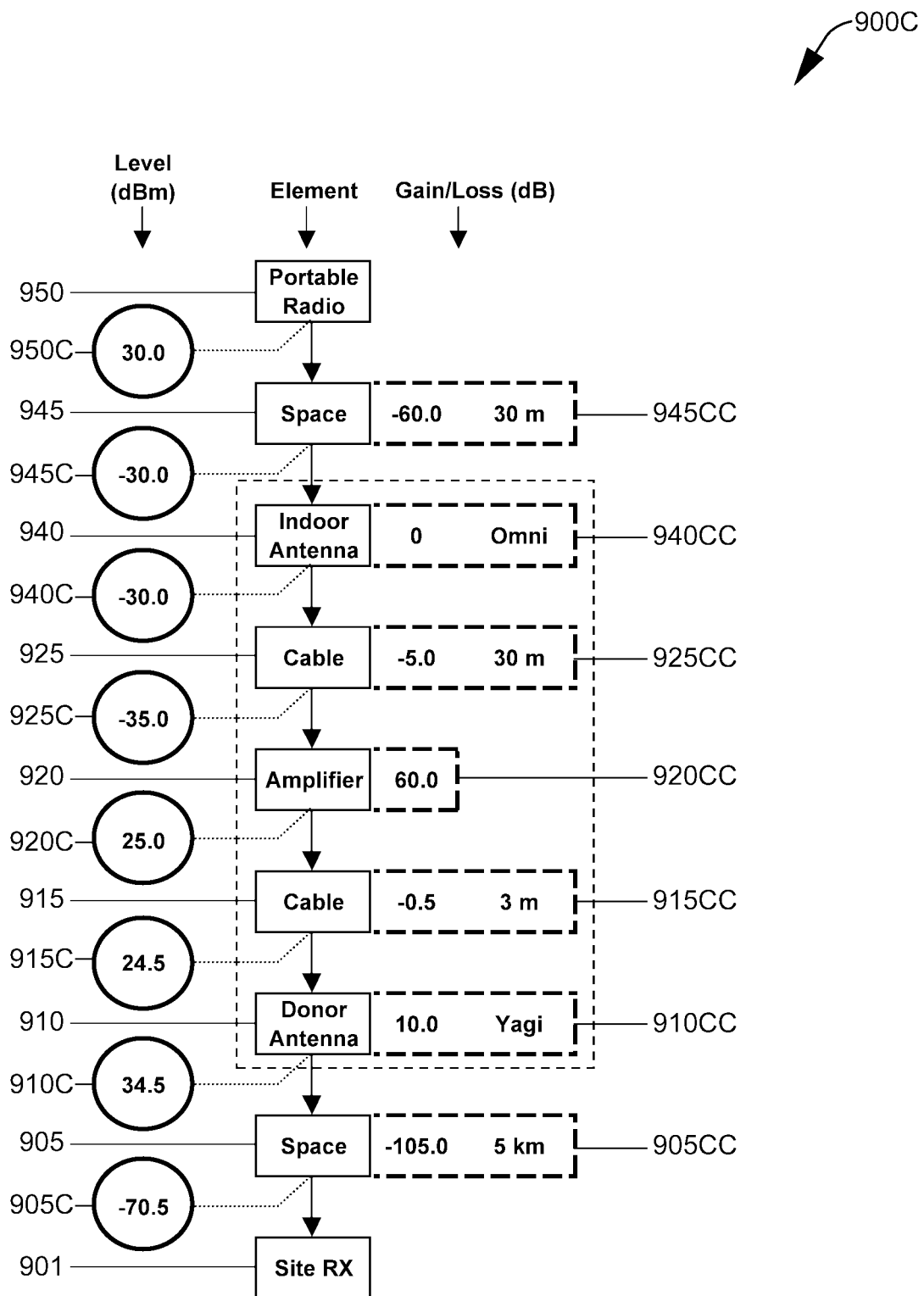
FIG. 9C is a gain map depicting a building with portable treatment sending an uplink transmission.

FIG. 9C is a gain map 900C complementary to the scenario of FIG. 9B depicting a portable radio 950 sending an uplink signal from inside a building with portable treatment. The portable radio 950 has an ERP 950C of about 30 dBm. A dotted line again delineates the portable coverage enhancement system being applied to the building. The transmitted signal is attenuated approximately 60 dB after traveling 30 m 945CC through free space. The signal at this point has a power level of −30.0 dBm 945C. Upon reaching an indoor antenna, no appreciable gain or loss 940CC is experienced by the signal and the signal has a power level of −30.0 dBm 940C. The signal next experiences a loss of 5.0 dB 925CC as the signal travels through a typical low loss coaxial cable approximately 30 m in length. At this point, the signal power is −35.0 dBm 925C. The loss experienced by the radio signal traveling through cable as the cable exits the building is preferable to the loss experienced by a signal exiting the building which must travel directly through the building exterior wall and other physical structures. The amplifier 920 is configured to provide a gain of 60 dB 920CC boosting the signal power level to 25 dBm 920C. Cable 915 from the amplifier leads to the portable donor antenna approximately 3 m further imparting a loss of about-0.5 dB 915CC reducing signal power to 24.5 dBm 915C. A Yagi directional antenna may be used as the donor antenna 910CC to provide an important directional gain and reduce potential interference. In the scenario of FIG. 9C, the signal radiates from the donor antenna about 5 km through free space 905CC before finally reaching the radio site 901 experiencing a loss of about −105 dB 905CC where the signal reaches the portable radio at a level expected to be −70.5 dBm 905C. The signal level available to the receiver in the coverage enhanced scenario of FIG. 9C is well above acceptable levels for error fret reception of transmitted information.

The gain map in FIG. 9C illustrates the benefit to signal power level of the treated system (−70.5 dBm) for sending a radio transmission from inside a building. As stated previously, the gain in signal strength provided by the portable coverage enhancement system is significant because it may enable an emergency responder to send a life saving communications over the portable radio inside the building.

Figure 9D:
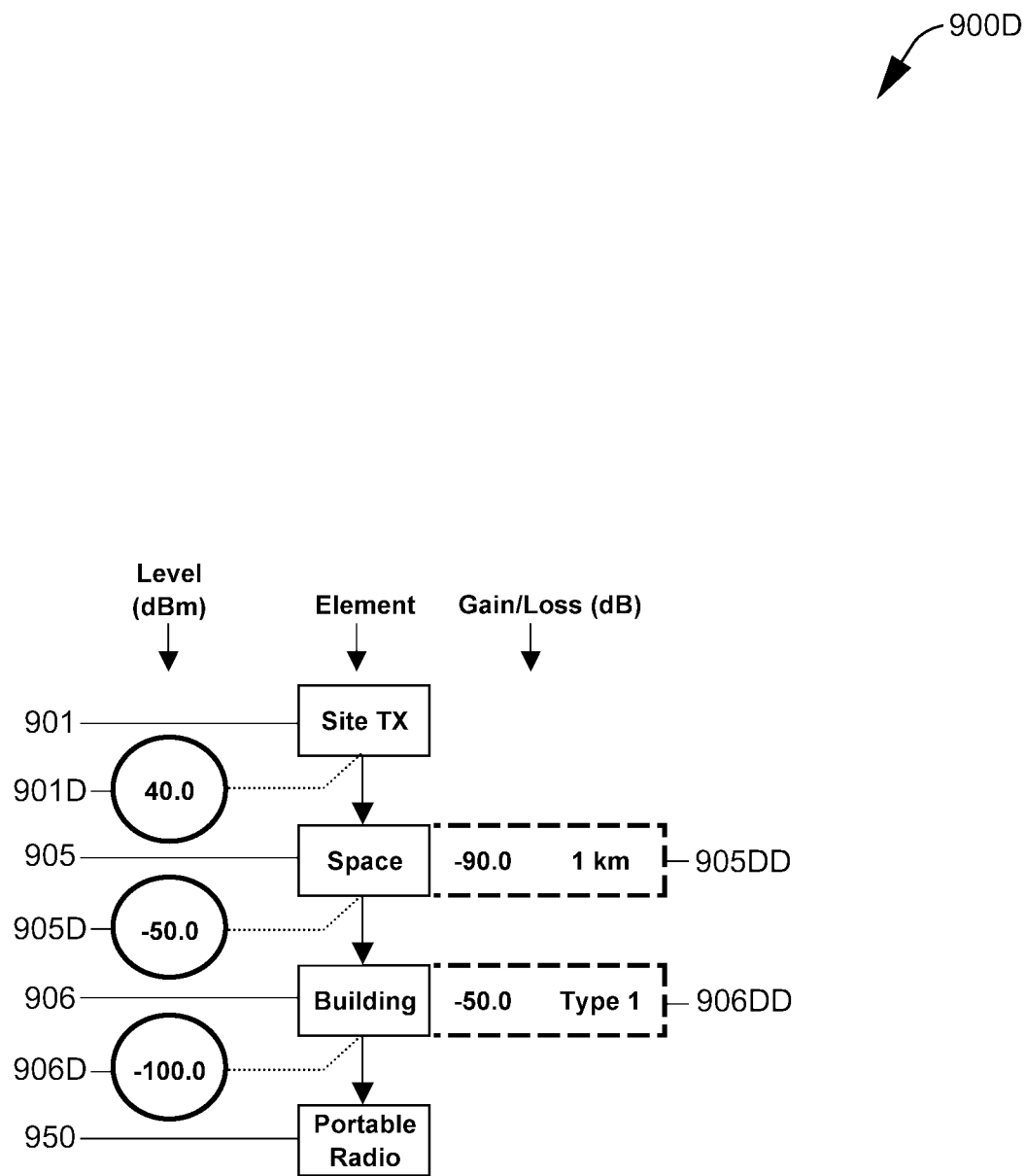
FIG. 9D is a gain map depicting a building with no treatment receiving a downlink transmission from an alternate source.

FIG. 9D is a gain map 900D depicting a building with no treatment receiving a downlink transmission from an alternate source 901. A portable radio receiver 950 in a building 906 receives a downlink transmission from a radio site transmitter 901. The radio site transmitter has an output power or Effective Radiated Power (ERP) of 40 dBm 901D. Assuming a frequency of about 860 MHz for example, for the transmitted signal would experience a loss of approximately −90.0 dB after traveling 1 km 905DD through free space. As a result, the signal at this point has a power level of about −50.0 dBm 905D. Upon reaching the building, the signal experiences an additional loss of about 50 dB 906DD as the radio signal travels through Fire Type 1 building material (heavy concrete or masonry construction) providing a power level of −100.0 dBm 906D to the portable radio receiver inside the building. This signal level is below acceptable levels generally required for error free reception.

Figure 9E:
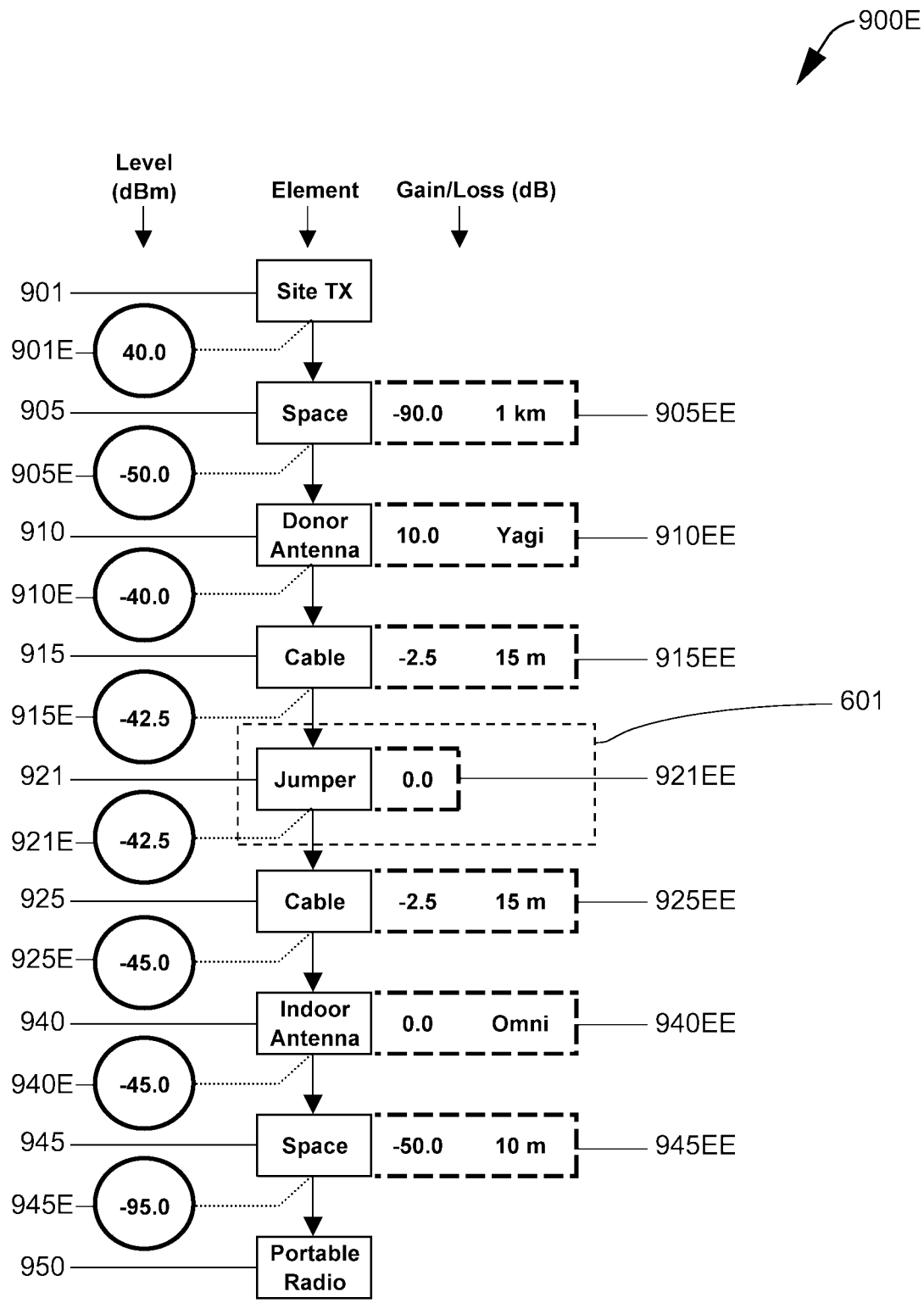
FIG. 9E is a gain map depicting a building with hybrid treatment receiving a downlink transmission while in passive configuration.

FIG. 9E is a gain map 900E depicting a building with hybrid treatment receiving a downlink transmission while in passive configuration. A portable radio receiver 950 receives a downlink transmission from a radio site transmitter 901. A dotted line is illustrated forming a box around the jumper cable which connects the passive components applied to the building through the standard interface box 601. The radio site transmitter 901 has an ERP 901E of about 40 dBm. The transmitted signal is attenuated approximately 90 dB after traveling 1 km 905EE through free space. The signal at this point has a power level of −50.0 dBm 905E. Upon reaching a donor antenna 910, the signal experiences a gain of 10 dB 910EE providing a signal power level of about −40.0 dBm 910E to coaxial connecting cable 915. The donor antenna in this embodiment may also be a directional antenna, such as a Yagi antenna. In this embodiment, the antenna may be in an outdoor location fixed to the building. Assuming the use of typical low loss coaxial cable, the signal next experiences a loss of about 2.5 dB 915EE traveling through the cable 915 for approximately 15 m 915EE. The signal power level reaching the jumper 921 is −42.5 dBm 915E. The jumper 921 is part of the interface box 601 and being very short provides no appreciable gain or loss 921EE leaving the signal power level largely unchanged at −42.5 dBm 921E. Cable 925 leads from the jumper in the interface box to a cable about 15 m in length imparting a loss of −2.5 dB 925BB further reducing the signal power to −45.0 dBm 925E. The cable may lead from the interface box which is mounted on an exterior wall of the building to the indoor door antenna which may be located on the inside of the building in this embodiment. The cable may cross the exterior wall of the building or other barrier. Enabling the signal to cross the barrier inside of a cable is preferable to attempting to penetrate the exterior wall or other additional barriers directly. As a result, transmission of the radio signal in the cable provides a by-pass of the radio signal around the building wall and prevents the building wall from weakening the radio signal significantly.

An omni directional antenna may be used as an indoor antenna 940 with no appreciable gain or loss 940EE. In the scenario of FIG. 9E, the signal radiates from the indoor antenna about 10 m through free space 945EE before finally reaching the portable radio receiver 950 experiencing a loss of about 50 dB 945EE. The signal reaches the portable radio at a power level of about −95.0 dBm 945E. The signal level available to the portable receiver in the coverage enhanced scenario of FIG. 9E is 5 dB higher than the untreated scenario depicted in FIG. 9D. The gain map in FIG. 9E illustrates a small gain to signal power level of the passively treated versus untreated scenario (−95 dBm versus the untreated gain map shown in FIG. 9D where the received signal strength was −100.0 dBm 906D). The passive enhancement is generally of limited application being useful in a small number of special circumstances where tower signal strength is very high, building attenuation is very high, cable runs for the installation are relatively short, and indoor communications is needed only in a relatively concise area of the building interior in close proximity to the indoor antenna.

Figure 9F:
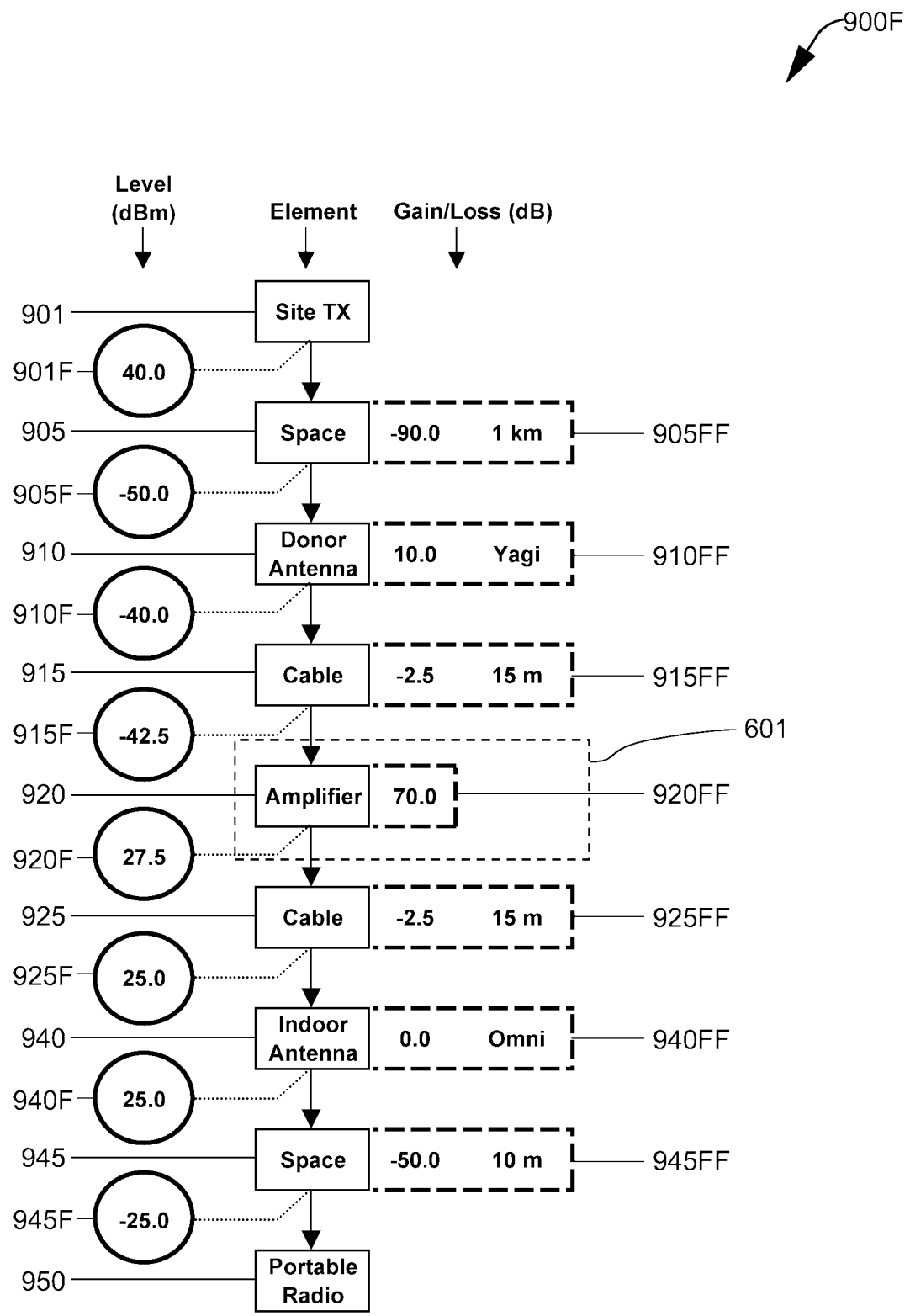
FIG. 9F is a gain map depicting a building with a hybrid treatment receiving a downlink transmission while using a portable amplifier configuration.

FIG. 9F is a gain map 900F depicting a building with a hybrid treatment receiving a downlink transmission using a portable amplifier configuration. A portable radio receiver 950 receives a downlink transmission from a radio site transmitter 901. A dotted line forms a box around the amplifier. The box includes the components portable coverage enhancement applied to the building through the standard interface box 601. The radio site transmitter 901 has an ERP 901E of 40 dBm. The transmitted signal is attenuated approximately 90 dB after traveling 1 km 905FF through free space. The signal at this point has a power level of −50.0 dBm 905F. Upon reaching a donor antenna 910, the signal experiences a gain of 10 dB 910FF providing a signal power level of −40.0 dBm 910F to the coaxial connecting cable 915. The donor antenna in this embodiment may also be a directional antenna, such as a Yagi antenna. In this embodiment, the outdoor antenna may be fixed to the building.

Assuming the use of typical low loss coaxial cable, the signal next experiences a loss of about 2.5 dB 915FF from traveling through the cable 915 for approximately 15 m. The cable may connect the directional antenna on the outside of the building to a standard interface box also mounted on the exterior of the building. The signal power level reaching the amplifier 920 is −42.5 dBm 915F. The amplifier 920 is connected to the interface box 601 and provides again of about 70 dB 920FF providing an improved signal power level of about 27.5 dBm 920F. The amplifier may also be located outside the building. Cable 925 leads from the amplifier back to the interface box and connects with a cable about 15 m in length to an indoor antenna imparting a loss of about −2.5 dB 925FF which further reduces the signal power at this point to 25.0 dBm 925F. The cable may lead from the interface box which is mounted on an exterior wall of the building to the indoor door antenna which may be located on the inside of the building in this embodiment. The cable may cross the exterior wall of the building or other barrier. The signal crosses the exterior wall of the building (and other physical structures or barriers) inside of the cable. This cable by-pass of the exterior wall is preferable to attempting to penetrate the exterior wall or other additional barriers directly with a radio signal. As a result, transmission of the radio signal in the cable provides a by-pass of the radio signal from direct interference or attention from the building wall.

An omni directional antenna may be used as an indoor antenna 940 with no appreciable gain or loss 940FF. In the scenario of FIG. 9F, the signal radiates from the indoor antenna about 10 m through free space 945FF before finally reaching the portable radio receiver 950 experiencing a loss of 50 dB 945F where the signal reaches the portable radio at a power level of −25.0 dBm 945F. The signal level available to the portable receiver in the coverage enhanced scenario of FIG. 9F is about 70 dB more powerful than the passive scenario depicted in FIG. 9E and is 75 dB more powerful than the passive scenario depicted in FIG. 9D The gain map in FIG. 9F illustrates the benefit to signal power level from the portable treatment (−25 dBm versus the untreated gain map shown in FIG. 9D and the passive system as shown in FIG. 9E. The gain map shows in FIG. 9F shows the benefit to signal power level for sending a radio transmission in a building. As stated previously, the gain in signal strength provided by the hybrid enhancement system is significant.

Figure 9G:
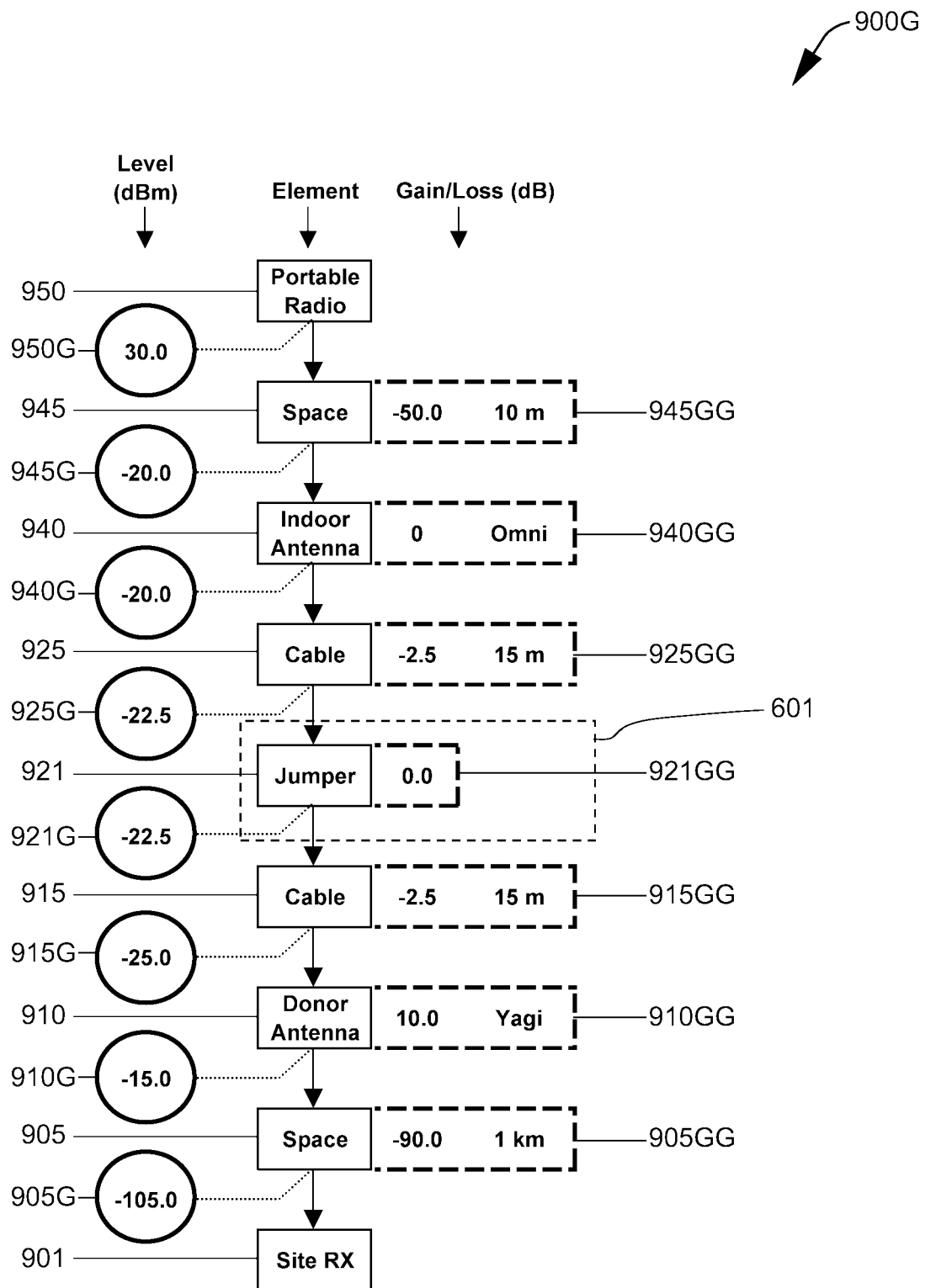
FIG. 9G is a gain map depicting a building with portable treatment sending an uplink transmission while in passive configuration.

FIG. 9G is a gain map depicting a building with portable treatment sending an uplink transmission while in passive configuration. A portable radio receiver 950 sends an uplink transmission to a radio site transmitter 901. A dotted line forms a box around the jumper cable which connects the passive components applied to the building representing the standard interface box 601. The portable radio 950 has an ERP of about 30 dBm 950G. The transmitted signal is attenuated approximately 50 dB after traveling 10 m 945GG through free space. The signal at this point has a power level of −20.0 dBm 945G. Upon reaching an indoor antenna 940, the signal experiences no appreciable gain or loss 940GG providing a signal power level of −20.0 dBm 940G to coaxial connecting cable 925.

Assuming the use of typical low loss coaxial cable, the signal next experiences a loss of 2.5 dB 925GG traveling through the cable 925 for approximately 15 m 92500. The signal power level reaching the jumper 921 is −22.5 dBm 925G. The jumper 921 connects parts of the interface box 601 and provides no appreciable gain or loss 921GG leaving the signal power level large unchanged at −22.5 dBm 921G. The signal then travels from the jumper 921GG in the interface box to a cable 15 m in length imparting a loss of −2.5 dB 925BB which further reduces the signal power to −25.0 dBm 915G. The cable may lead from the interface box which is mounted on an exterior wall of the building to an outdoor antenna which may be located on the outside of the building and be fixed to the building in this embodiment. The cable may cross the exterior wall of the building or other barrier or proceed up to the building in a conduit alongside an exterior wall. Enabling the signal to cross the barrier inside of a cable is preferable to attempting to penetrate the exterior wall or other additional barriers directly. As a result, transmission of the radio signal in the cable provides a by-pass of the radio signal directly interfacing with the building wall and being weakened significantly.

A directional antenna may be used as a donor antenna 910GG providing an appreciable gain of 10.0 dB 910GG. In the scenario of FIG. 9G, the signal radiates from the outdoor antenna 1 km through free space 905GG before finally reaching the radio site 901 experiencing a loss of 90 dB 905GG where the signal reaches the radio site with power level −105.0 dBm 905G. This may or may not be adequate level for assured communications depending upon site receiver sensitivity and attendant RF noise conditions.

Figure 9H:
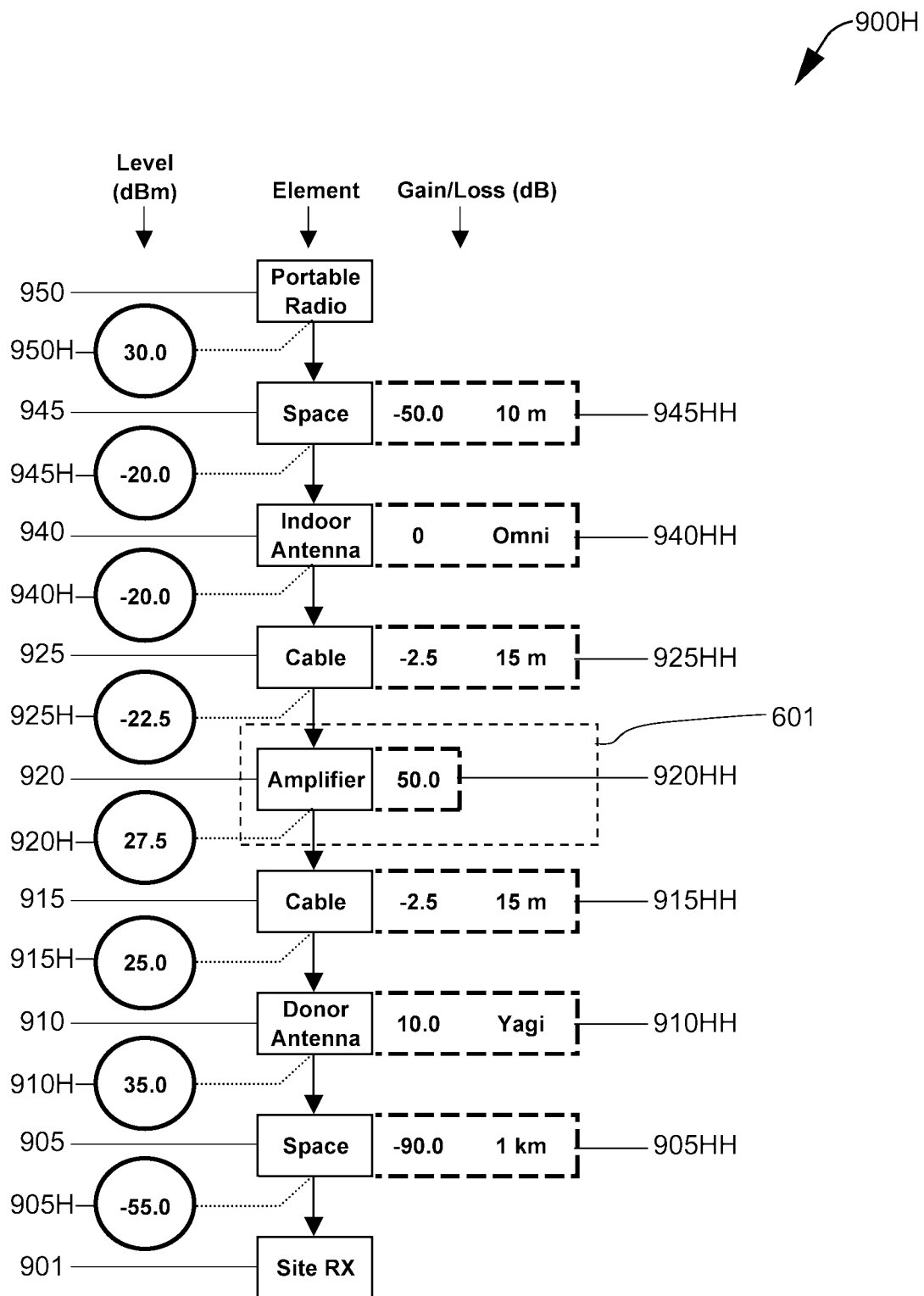
FIG. 9H is a gain map depicting a building with hybrid system utilizing portable amplifier treatment sending an uplink transmission.

FIG. 9H is a gain map 900H depicting a building with hybrid system utilizing portable amplifier treatment sending an uplink transmission. A portable radio receiver 950 sends an uplink transmission to a radio site transmitter 901. A box formed of dotted lines is illustrated around the amplifier. The box includes the components of the portable coverage enhancement being applied to the building through the standard interface box 601. The portable radio 950 has an ERP of 30 dBm 950H. The transmitted signal is attenuated approximately 50 dB 945HH after traveling 10 m through free space. The signal at this point has a power level of −20.0 dBm 945H. Upon reaching an indoor antenna 940, the signal experiences no appreciable gain or loss 940HH providing a signal power level of −20.0 dBm 940F to the coaxial connecting cable 925. The indoor antenna in this embodiment may also be an omni directional antenna.

Assuming the use of typical low loss coaxial cable, the signal next experiences a loss of 2.5 dB 925HH traveling through the cable 925 for approximately 15 m. The cable may connect the indoor antenna on the inside of the building to a standard interface box mounted on the exterior wall of the building. The signal power level reaching the amplifier 920 is −22.5 dBm 925H. The amplifier 920 is connected to the interface box 601 and provides a gain of about 50 dB 920HH providing an improved signal power level of about 27.5 dBm 920H. The amplifier may also be located outside the building and applied as part of a portable system. Cable 915 leads from the interface box to an outdoor antenna imparting a loss of 2.5 dB 915HH which reduces the signal power to about 25 dBm 915H. The cable may lead from the interface box which is mounted on an exterior wall of the building to a directional antenna which may be located on the outside of the building in this embodiment.

A directional antenna may be used as the donor antenna 910HH and provides a gain of about 10 dB 910HH. In the scenario of FIG. 9H, the signal radiates from the outdoor antenna through about 1 km of free space 905HH before finally reaching the radio site 901 experiencing a loss of about −90 dB 905HH where the signal reaches the radio site at a power level of −55.0 dBm 905H. The signal level available to the tower site is clearly adequate to support error free communications.

The gain map in FIG. 9H illustrates the benefit to signal power level from the portable treatment (−55 dBm) versus the passive gain map in FIG. 9G (−105 dBm). The gain map in FIG. 9H shows a clear benefit to signal strength for sending a radio transmission in a building with the portable treatment. In this embodiment, the gain in signal strength provided by the hybrid enhancement system is significant.

Figure 9I:
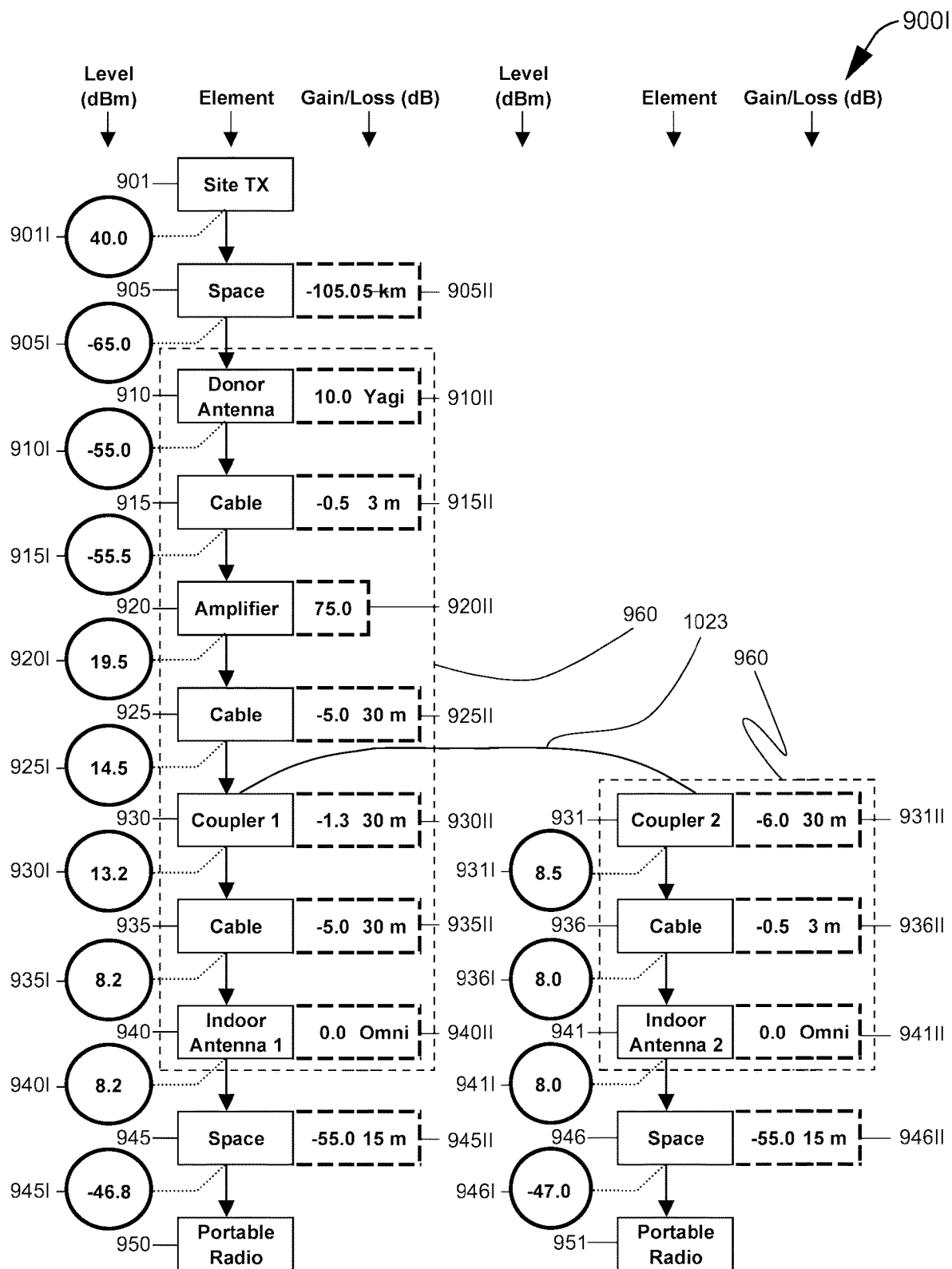
FIG. 9I is a gain map depicting a building with portable system treatment including an extended antenna receiving a downlink transmission.

FIG. 9I is a gain map 900I depicting a building with portable system treatment including an extended antenna forming a distributed antenna system which receives a downlink transmission. A portable radio receiver 950 receives a downlink transmission from a radio site transmitter 901. A dotted line forms a box representing the portable communication enhancement. The box 960 includes: a donor antenna 910, a cable 915, an amplifier 920, cable 925, a first coupler port 930, cable 935, a first indoor antenna 940, a second coupler port 931, cable 936, and a second indoor antenna 941. The radio site transmitter 901 transmits with ERP 901I of 40 dBm. The transmitted signal is attenuated approximately 105.0 dB after traveling about 5 km 905II through free space. The signal at this point has a power level of about −65.0 dBm 905I. Upon reaching a donor antenna 910, the signal experiences a gain of about 10 dB 910II providing a signal power level of −55.0 dBm 910I to the coaxial connecting cable 915. The donor antenna in this embodiment may also be a directional antenna, such as a Yagi antenna. In this embodiment, the antenna may be in an outdoor location applied as part of a portable antenna kit.

Assuming the use of typical low loss coaxial cable, the signal next experiences a loss of about −0.5 dB 915II traveling through the cable 915 for approximately 3 m. The cable may connect the directional antenna on the outside of the building to an amplifier. The signal power level reaching the amplifier 920 is −55.5 dBm 915I. The amplifier 920 provides a gain of 75 dB 920II providing an improved signal power level of 19.5 dBm 920I. The amplifier may also be located outside the building. Cable 925 from the amplifier has a length of about 30 m imparting a loss of about 5.0 dB 925II which further reduces the signal power to 14.5 dBm 925I. The cable may lead from the outside of the building to the inside of the building in this embodiment. The cable may cross the exterior wall of the building or other barrier. Enabling the signal to cross a physical barrier such as a wall while inside of a cable is preferable to attempting to penetrate the exterior wall or other additional physical barriers directly. As a result, transmission of the radio signal in the cable provides an effective by-pass of the radio signal past the building wall with a smaller loss than being transmitted directly through the wall.

A directional coupler 1023 may be used to direct the radio signal in two paths. Following from cable 925, the radio signal may be received through a first coupler port 930 imparting a loss of 1.3 dB by a cable which has a length of about 30 m imparting a further loss of 5.0 dB. The radio signal is routed to a second coupler port which imparts a loss of 6.0 dB to a second cable having a length of about 3 m and imparting a further loss of about 0.5 dB. The signal arriving ultimately at a first portable radio located 15 m distant from first indoor antenna 940 along first coupler port path 930 is estimated to be −46.8 dBm. The signal arriving at a second portable radio located 15 m distant from a second indoor antenna 941 along second coupler port path 931 is estimated to be −47.0 dBm. This illustrates the benefit from the portable invention to two portable radio users located as far apart as 60 m inside a building that would otherwise have unreliable or nonexistent communications.

In FIG. 9I, the directional coupler enables the benefit of this portable communication enhancement to reach more than one portable radio user. In addition, a wider coverage area can be obtained by using more than one indoor antenna without requiring the use of an additional amplifier. The benefits of this portable communication system are significant as it is simple to establish communication enhancement without significant changes to existing infrastructure and without incurring significant additional expense for more equipment.

Figure 10:
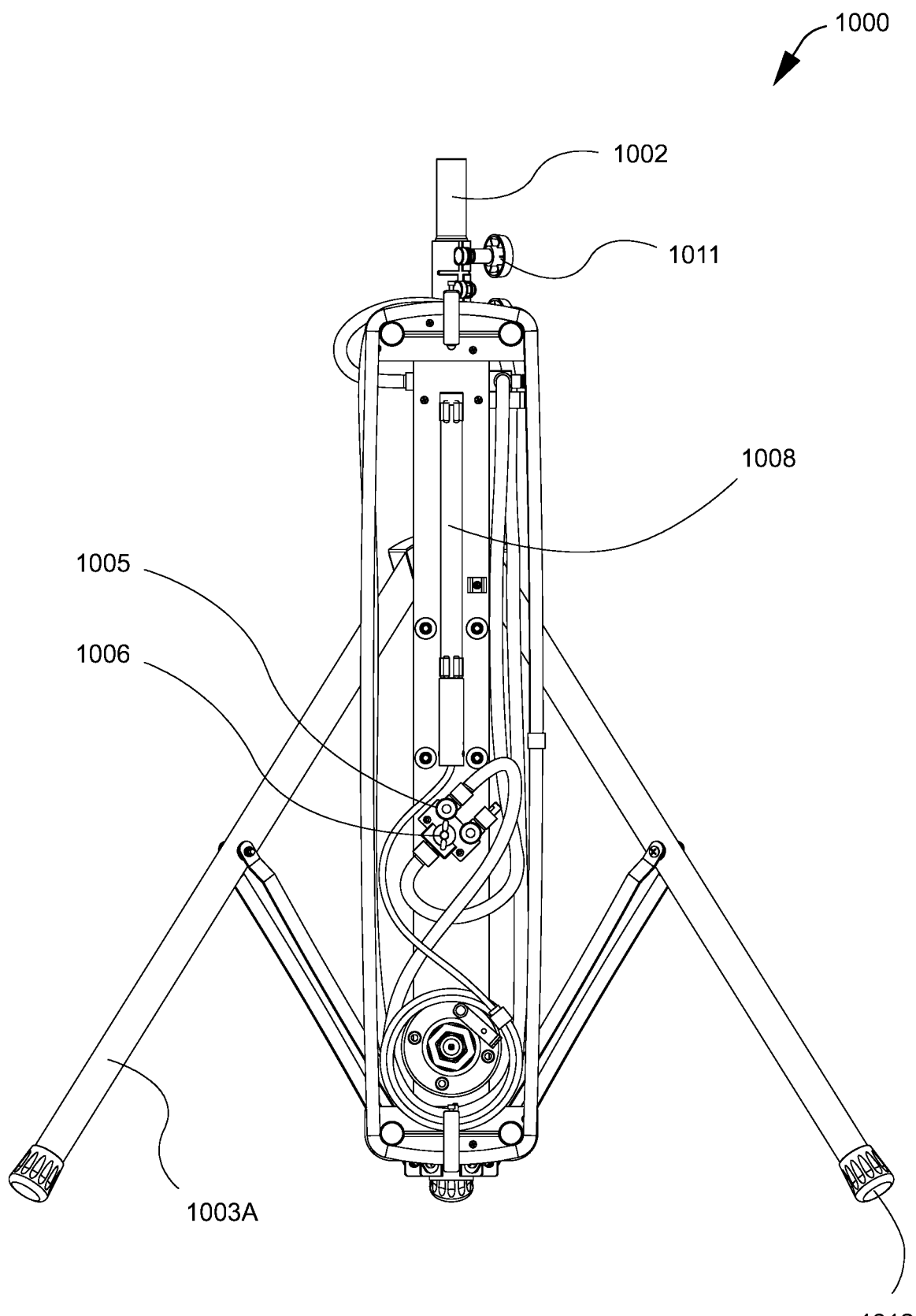
FIG. 10 is a portable extended antenna kit once removed from the bag.

FIG. 10 is a view 1000 of a portable extended antenna kit once removed from the bag in which it is conveniently transported. The portable extended antenna kit when removed from the bag rests on extended tripod legs 1003A. The tripod legs may have rubber feet 1012 which engage the ground or other resting surface. The portable extended antenna kit has a telescoping mast 1002 and a telescoping mast adjuster 1011 located near the top portion of the portable antenna kit. The telescoping mast 1002 may be elevated. An extension indoor antenna 1008 is located near a central portion of the portable extended antenna kit attached directly to the spine of the portable extended antenna kit cable organizer. The extension indoor antenna 1008 is surrounded by a coil of wound cable when the cable is in its stored location. An extension antenna selection switch 1005 and an extension antenna selection switch actuator 1006 are located beneath the indoor antenna in an interior position of the coil secured around the periphery of the cable organizer.

Figure 10A:
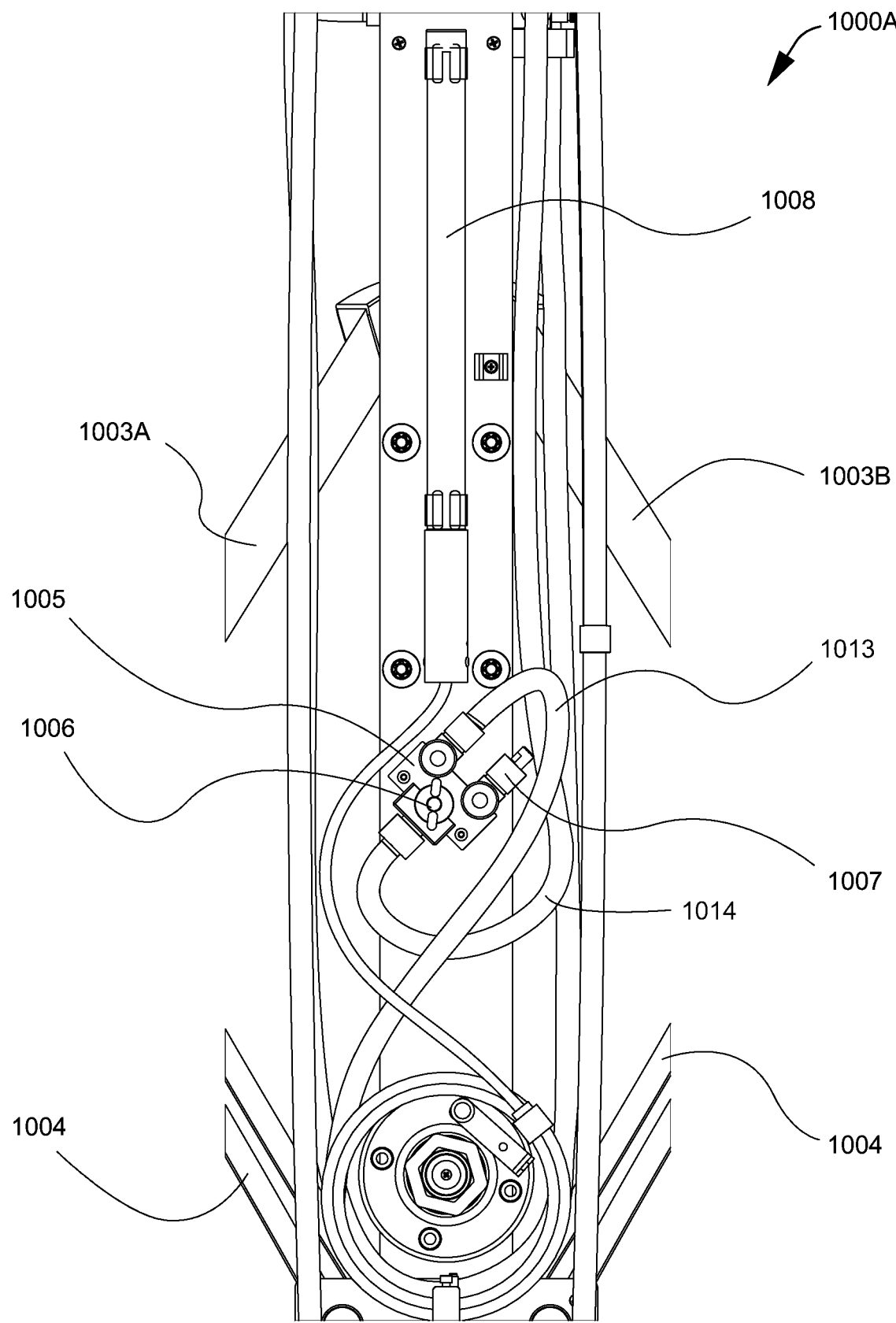
FIG. 10A is a close-up view of the portable extended antenna kit once removed from the bag.

FIG. 10A is a close-up view 1000A of the portable extended antenna kit once removed from the bag. A central portion of the portable extended antenna kit is shown including: the extension indoor antenna 1008, extension indoor antenna cable 1013, and the extension antenna selection switch actuator 1006. Tripod legs 1003A, 1003B are seen extending in a downward direction behind the central portion of the portable extended antenna kit. Leg braces 1004 are shown extending in an upward direction behind a lower end of the central portion of the portable extended antenna kit. The extension antenna selection switch actuator 1006 is connected to an extension antenna selection switch 1005 and a terminator 1007. One end of the indoor antenna is connected to a pigtail cable. This pigtail cable is connected to an indoor antenna cable which is stored in a coil in a lower portion of the portable extended antenna kit. This indoor antenna cable 1013 leads to the extension antenna selection switch 1005. The extension antenna selection switch 1005 has three ports including one used for terminator 1007, one port coupling to a cable 1014 leading to directional coupler 1023, and one terminating the aforementioned indoor antenna cable 1013.

Figure 10B:
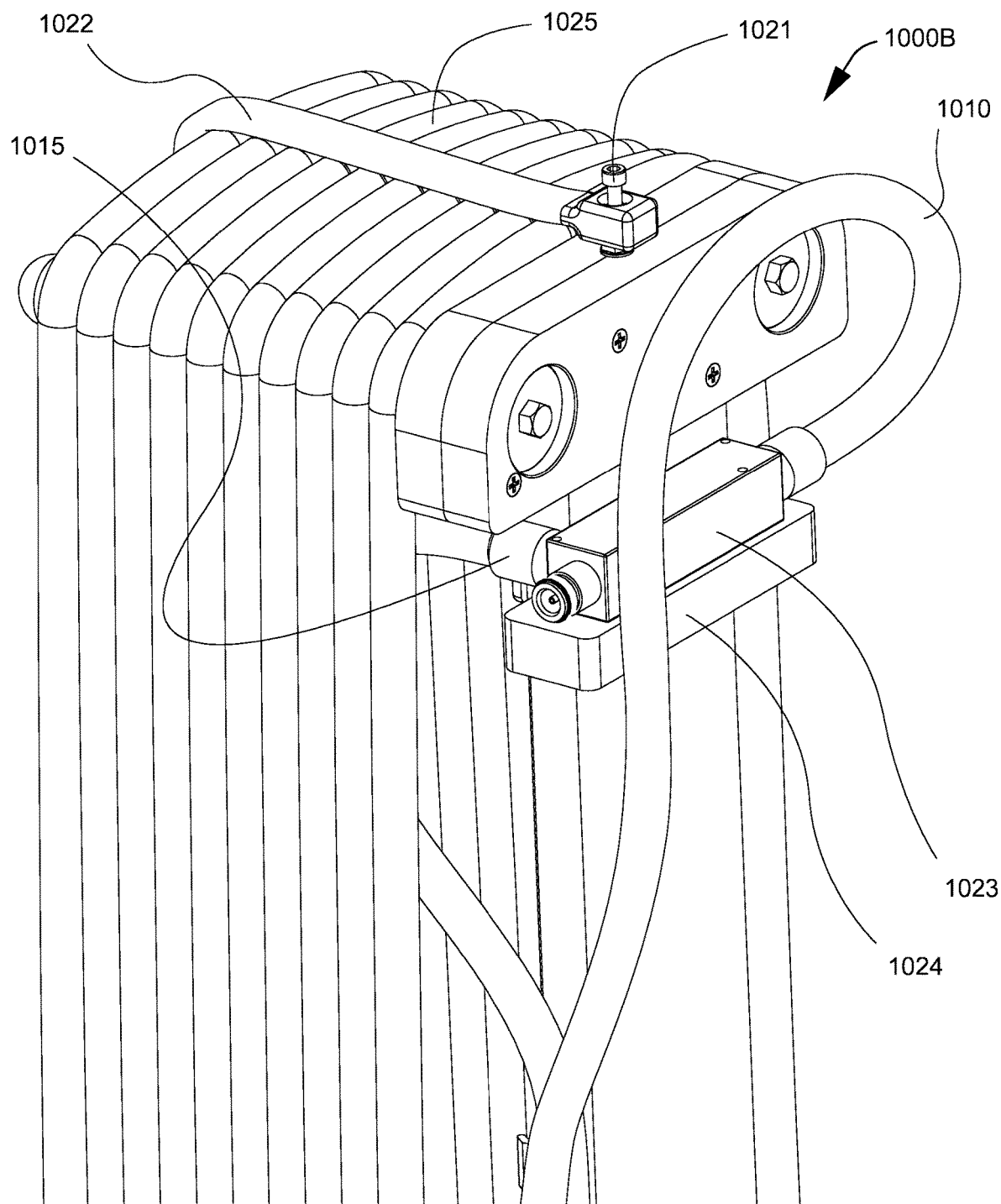
FIG. 10B is a rear perspective view of the portable extended antenna kit.

FIG. 10B is a rear perspective view 1000B of the portable extended antenna kit. A long segment of extension cable is coiled around the cable organizer and held in place with a cable retention strap 1022. The cable mention strap 1022 is fastened to a cable retention strap pin 1021 on a top portion of the cable organizer. A short segment of the long extension cable 1010 is connected to a directional coupler 1023. The directional coupler 1023 rests on a directional coupler mounting shelf 1024 in the rear of the portable extended antenna kit. An extension indoor antenna switch cable connection 1015 is directly connected to the directional coupler 1023 in the rear of the portable extended antenna kit.

Figure 10C:
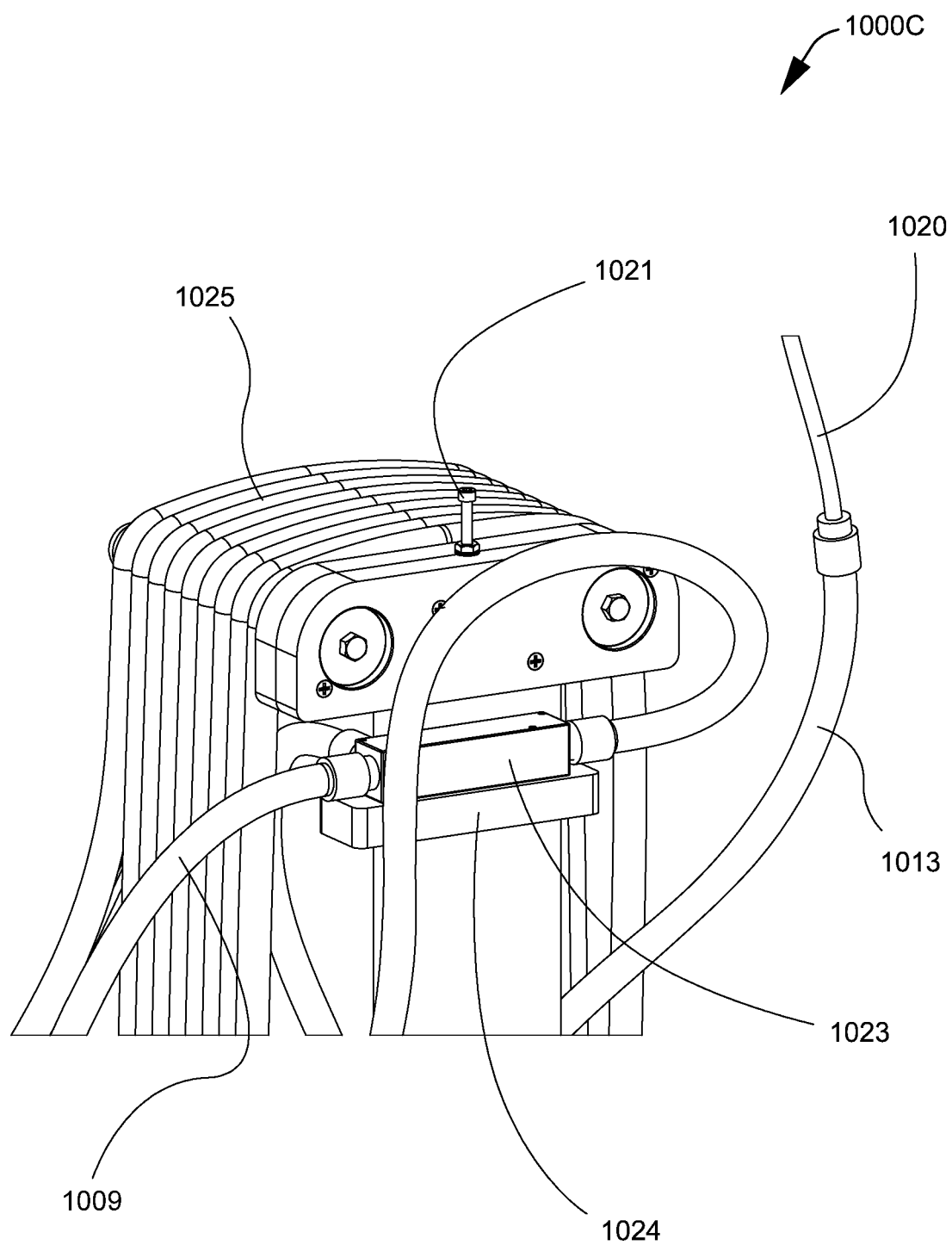
FIG. 10C is a close-up rear perspective view of the portable extended antenna kit.

FIG. 10C is a close-up rear perspective view 1000C of the portable extended antenna kit. The cable retention strap pin

1021 is shown on the top rear of the portable extended antenna kit. The long segment of long extension cable 1025 is coiled around the cable organizer in deploy position as the cable retention strap 1022 is no longer secured to the cable retention strap pin 1021 and holding the long segment of long extension cable 1025 in place. The directional coupler 1023 is seated on the directional coupler mounting shelf 1024 and is connected to a cable input to the extension antenna kit 1009 on the left end of the directional coupler. A short segment of cable 1013 connects to the extension indoor antenna pigtail 1020 and to the extension antenna selection switch 1005.

The directional coupler 1023 is used to unevenly split and/or combine signals. The directional coupler may include three ports: including an input port, an output port, and a coupled port. The coupled port is DC isolated (open circuit) from the input or output ports. The directional, input, and output ports must be connected properly. The directional coupler may have less loss than a splitter at one port at the expense of a greater loss at the other port. A directional coupler may be to provide a long segment of cable with several antenna points. Additionally, in a vertical configuration a directional coupler may be used to provide antenna feed(s) on each floor in a multi-floor building. The directional coupler provides low loss on the thru port and versatile selection of coupled ports. As a result, the directional coupler can be an important component in a distributed antenna system.

Figure 10D:
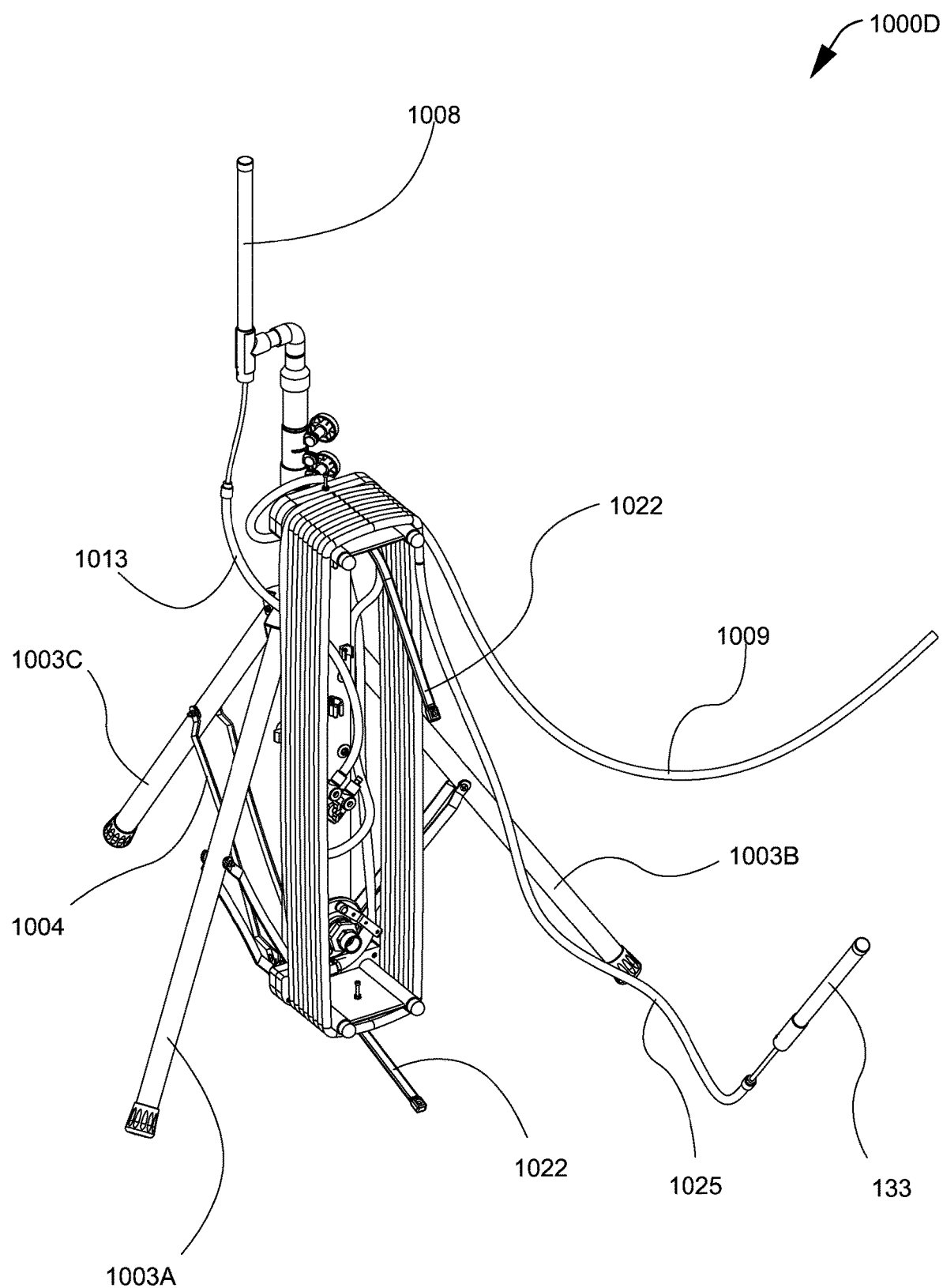
FIG. 10D is a view of the deployed portable extended antenna kit.

FIG. 10D is a view 1000D of the portable extended antenna kit in deployed configuration. The extension indoor antenna 1008 is mounted on top of the telescoping mast of the portable extended antenna kit. All three tripod legs 1003A, 1003B, and 1003C are extended and engaging directly the ground or other resting surface. Leg braces 1004 connect each of the tripod legs by connecting to the portable extended antenna kit. Both cable retention straps 1022 are disengaged enabling the long segment of long extension cable 1025 to deploy from the portable extended antenna kit. The extension indoor antenna 1008 is connected to an extension indoor antenna cable 1013 which connects to the extension antenna selection switch 1005 in a central portion of the portable extended antenna kit. Cable input to extension antenna kit 1009 leads to a directional coupler port at a top rear portion of the portable extended antenna kit. An indoor antenna 133 connects to a long segment of long extension cable 1025 leading from another directional coupler port at the top rear portion of the portable extended antenna kit. The portable extended antenna kit in deployed configuration provides cable extension to enable the indoor antenna 133 to have an increased portable range, while an extension indoor antenna 1008 mounted directly to the portable extended antenna kit provides increased communication coverage in the direct vicinity surrounding the portable extended antenna kit if optionally enabled by selector switch 1005. In this way, a distributed antenna system can be applied and extended with modular additions quickly providing incremental extensions to the coverage area, so that communications can be maintained and increased without disconnecting communication previously established.

Figure 10E:
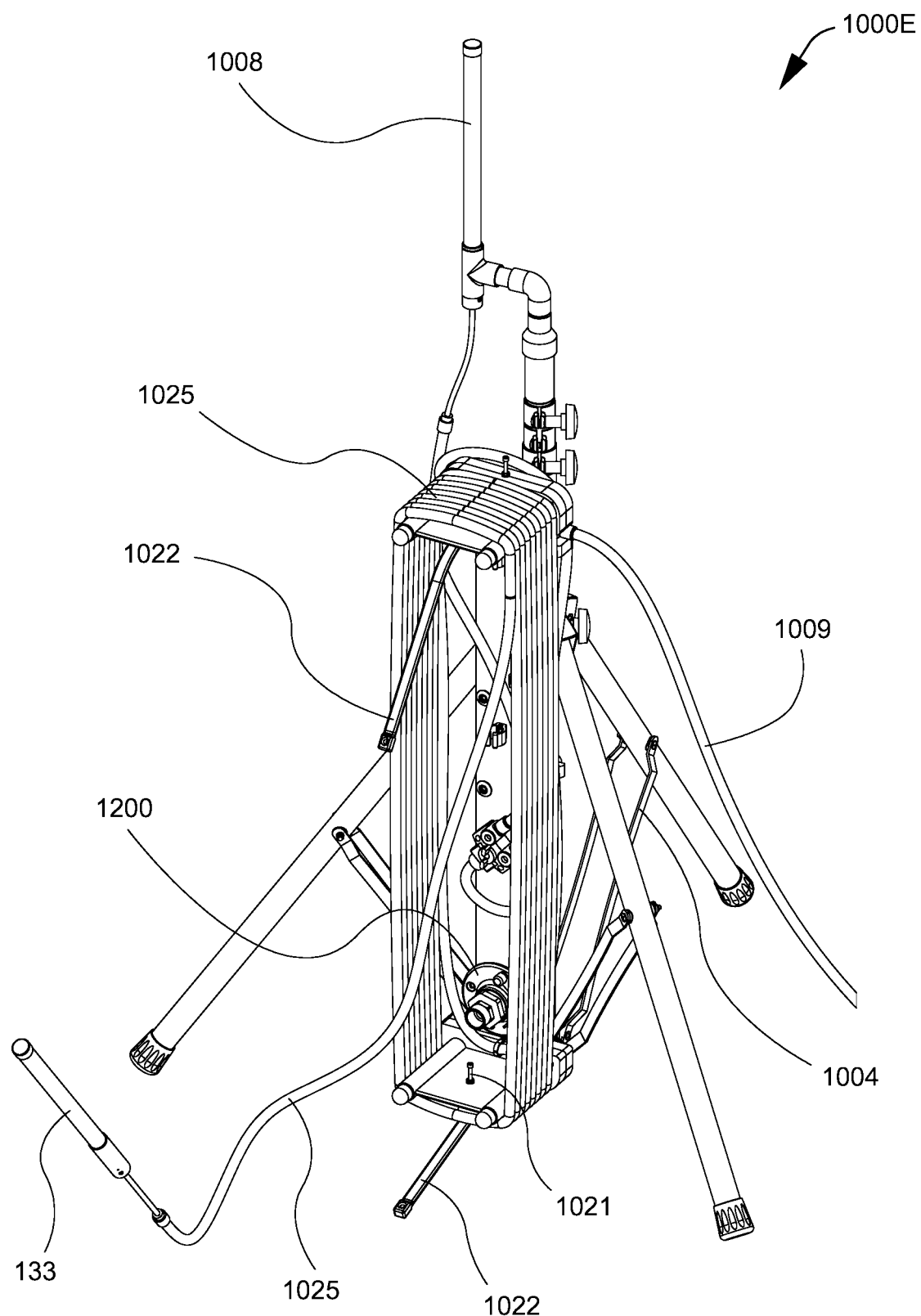
FIG. 10E is an alternate view of the deployed portable extended antenna kit.

FIG. 10E is an alternate view 1000E of the portable extended antenna kit in deployed configuration. The indoor antenna 133 is connected to a long segment of long extension cable 1025 where the long segment of long extension cable connects to the coil of a long extension cable wound around a central portion of the portable extended antenna kit. The long segment of long extension cable 1025 leading from the indoor antenna 133 joins the cable organizer at an upper right location near the right protrusion holding the wound segment of cable. An extension indoor antenna 1008 extends in a vertical upright position from mount attached to a telescoping mast portion of the portable extended antenna kit.

Cable input to extension antenna kit 1009 is shown from the right connecting to the portable extended antenna kit in a front upper right location. Both cable retention strap pins 1021 are shown disengaged from the cable retention straps 1022. A portable indoor antenna mounting adapter 1200 is located in a lower portion of the portable extended antenna kit.

Figure 11:
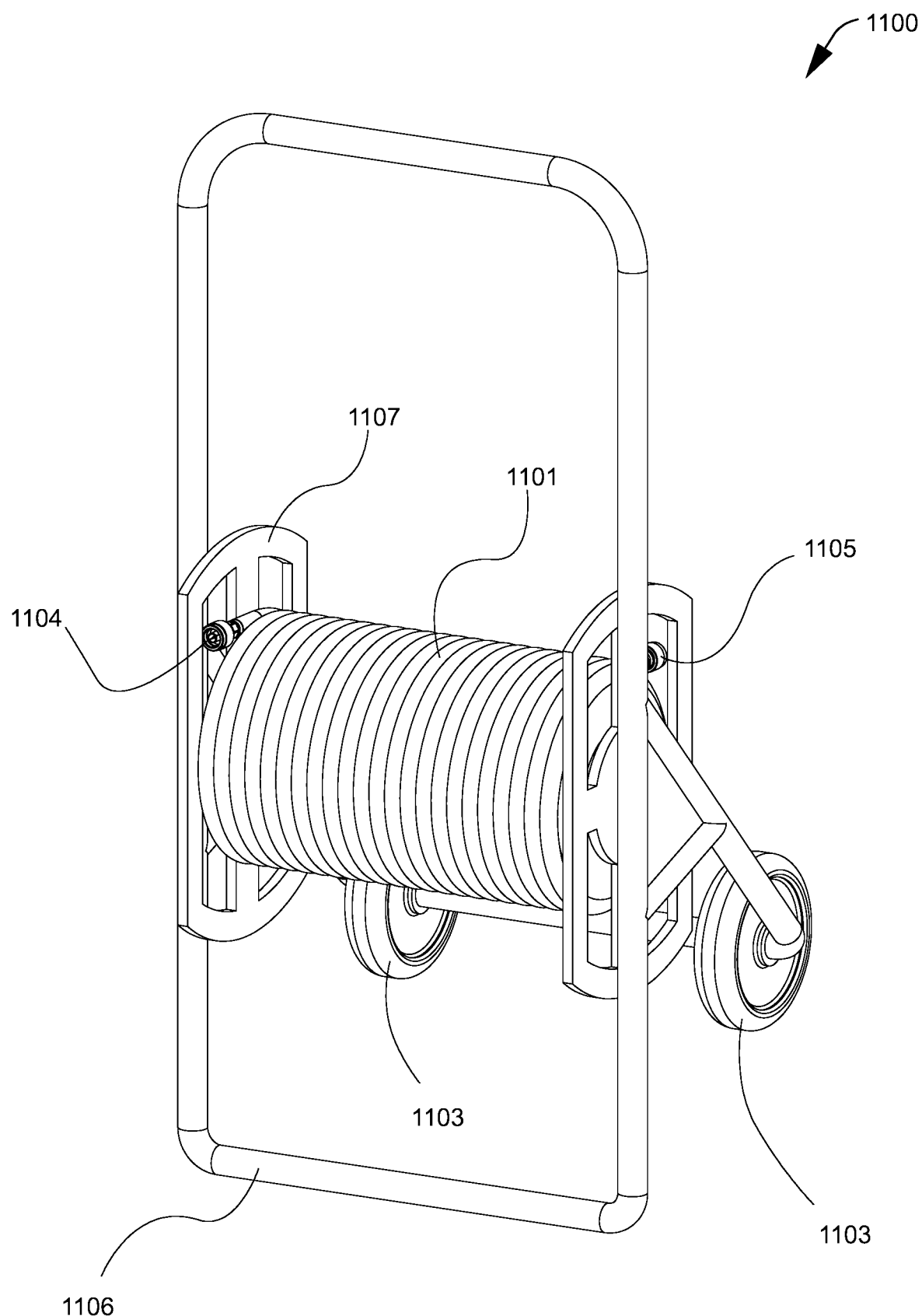
FIG. 11 is a view of the portable extension cable reel.

FIG. 11 is a view 1100 of the portable extension cable reel. Cable 1101 is wound around a central spool having a first end of cable 1104 on the left and a second end of cable on the right 1105. The portable extension cable reel has wheels on one side 1103 engaging the ground and a frame 1106 engaging the ground on the other. The portable extension cable reel has a spool end 1107 which serves as a handle to turn the spool to deploy cable. The portable cable extension reel may be used to transport an extended amount of cable. Alternatively, the portable cable extension reel may be used in a stationary position to dispense cable from the central spool.

Figure 12:
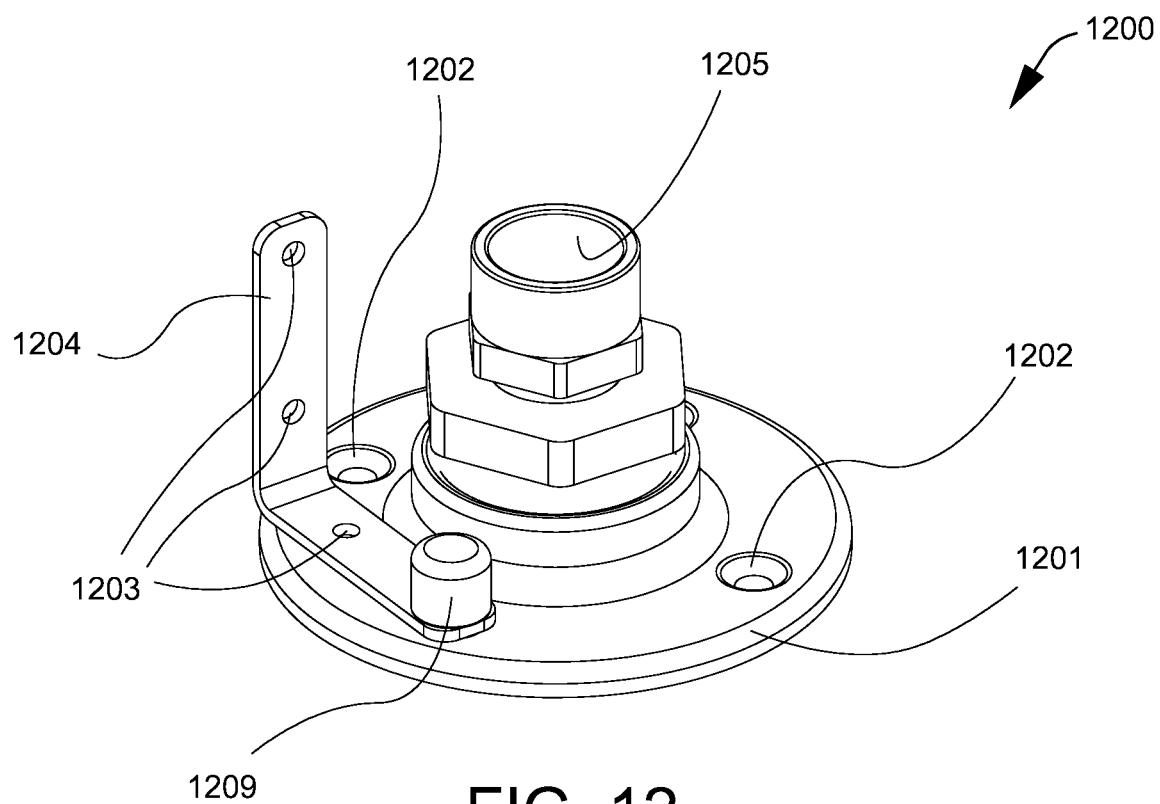
FIG. 12 is a view of the portable indoor antenna-mounting adapter.

FIG. 12 is a view of the portable indoor antenna mounting adapter 1200. The portable indoor antenna mounting adapter 1200 has a base 1201 with base utility mounting apertures 1202. The base has a top and bottom surface with a circular periphery. A hook 1204 having a horizontal portion and a vertical portion rests on the topside of the portable indoor antenna mounting adapter base. The hook has hook utility mounting apertures 1203. The hook can slidably pivot about a hook pivot 1209. The portable indoor antenna mounting adapter 1200 has a central receptacle 1205 for receiving an indoor antenna. The receptacle 1205 extends vertically upward from the topside of the base.

Figure 12A:
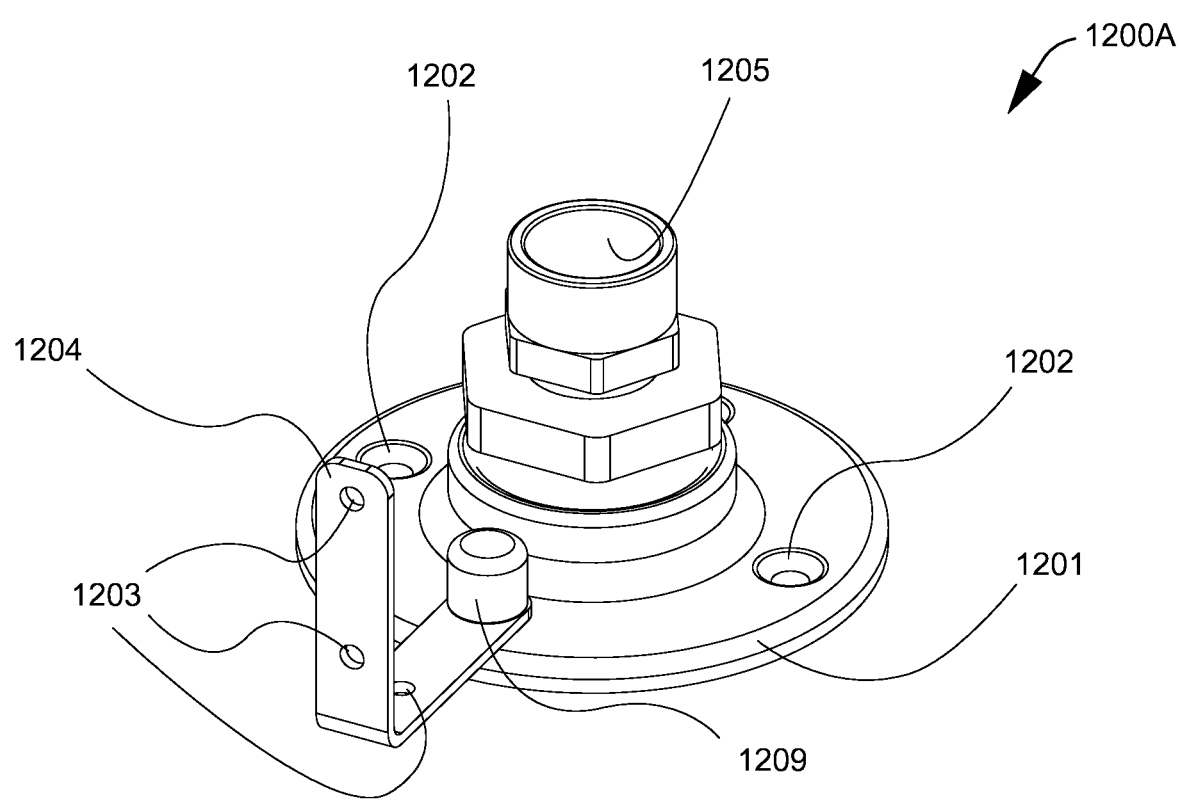
FIG. 12A is a view of the portable indoor antenna mounting adapter with the hook deployed.

FIG. 12A is a view of the portable indoor antenna mounting adapter with the hook deployed. The portable indoor antenna mounting adapter, hook deployed 1200A is shown with an end of the horizontal portion of the hook resting on the top surface of the base. The opposite end of the horizontal portion extends radially outward beyond the top surface of the base. The receptacle 1205 extends vertically from a central position on the topside of the base of the portable antenna mounting adapter. The hook is able to pivot about the hook pivot 1209 between this fully extended location shown in FIG. 12A and the position in FIG. 12 where the horizontal portion rests substantially on the top surface of the base.

Figure 12B:
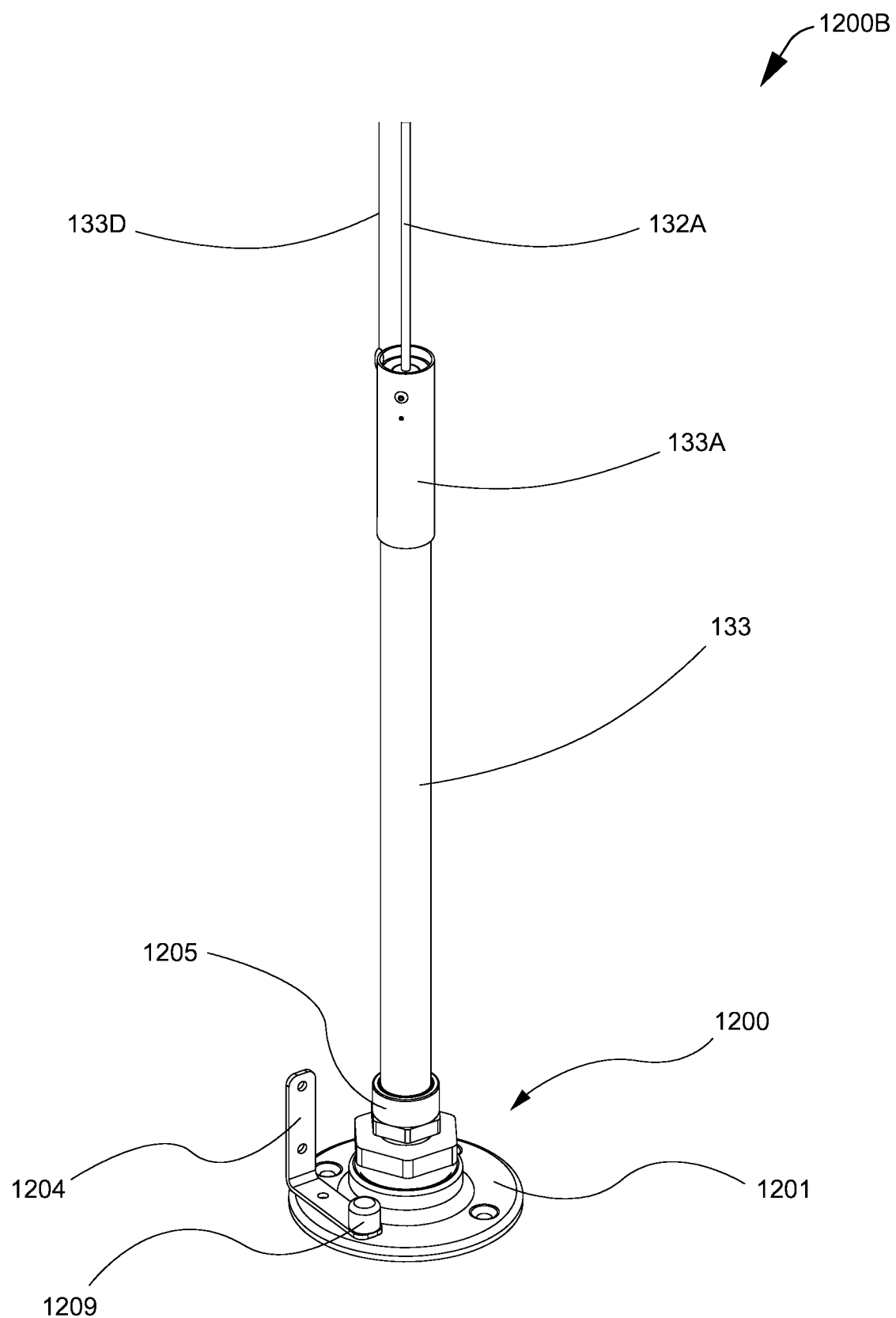
FIG. 12B is a view of the portable indoor and portable antenna mounting adapter where the antenna is deployed standing on the floor or ground.

FIG. 12B is a view 1200B of the portable indoor and portable antenna mounting adapter. The indoor antenna 133 is shown in a vertical upright position extending from the base 1201. The indoor antenna is in an inverted position with the indoor antenna base 133A located above the other end portion of the indoor antenna which is inserted in the omni antenna receptacle 1205 in the portable indoor antenna mounting adapter 1200. A lanyard cable 133D is attached to the indoor antenna base. The indoor antenna pigtail cable 132A is connected to the indoor antenna 133. The hook 1204 is pivoted about the hook pivot 1209 with the horizontal portion of the hook 1204 resting on the top surface of the portable indoor antenna mounting adapter 1200. This configuration deploys the indoor antenna to easily rest upon a floor, tabletop, or other horizontal surface and to be easily lowered via long connecting cable 132 down a stairwell or vertical shaft to come to rest upon a horizontal surface below.

Figure 12C:
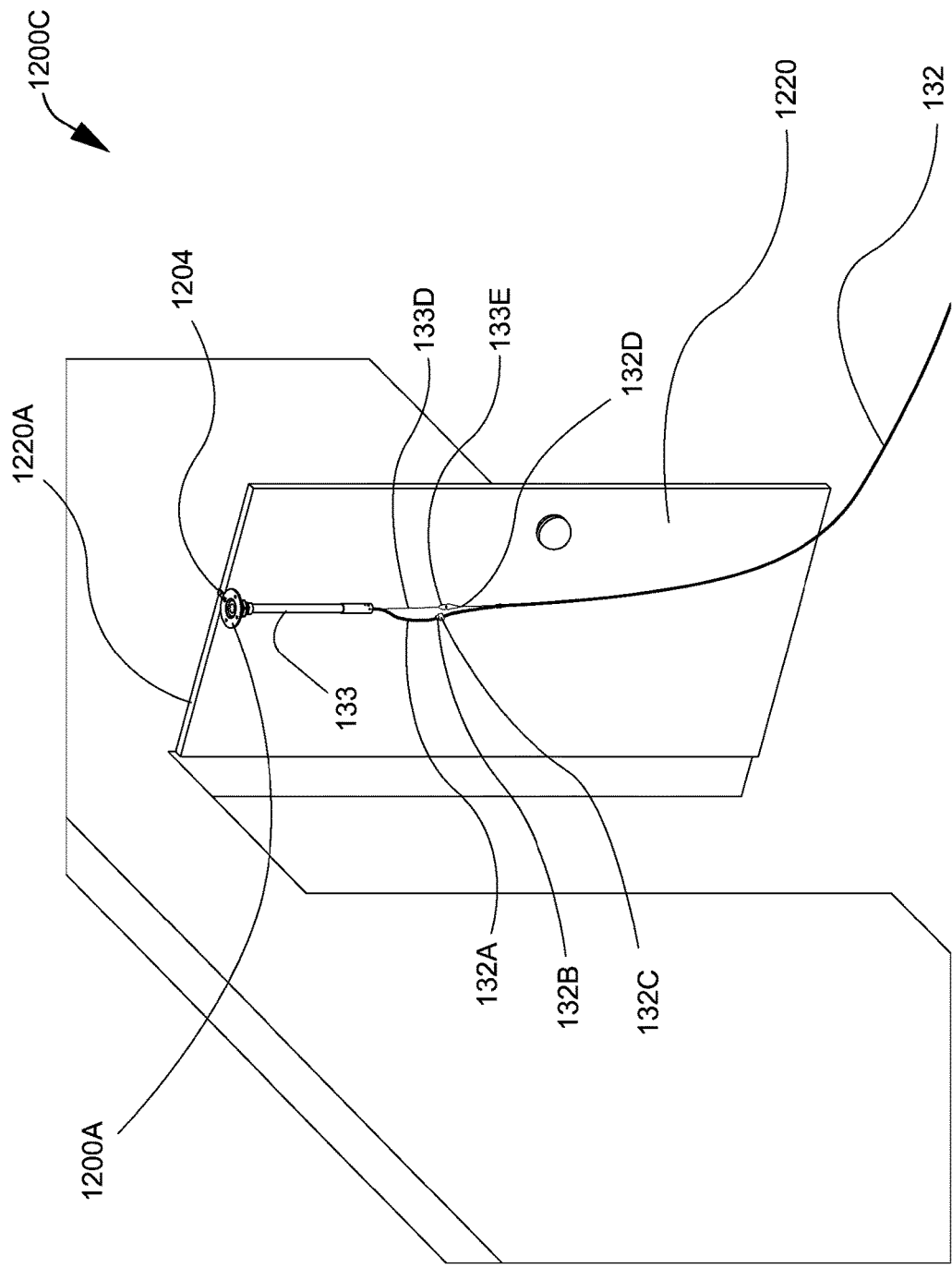
FIG. 12C is a view of the portable indoor and portable antenna mounting adapter where the portable indoor antenna is deployed hanging from a door.

FIG. 12C is a view 1200C of the portable indoor and portable antenna mounting adapter where the portable indoor antenna 133 is deployed in a hanging configuration upon the top edge of a door. The portable indoor antenna mounting adapter with the hook deployed 1200A engages the top edge 1220A of a door 1220. The long segment of the antenna cable 132 leads from the bottom portion of the indoor antenna to a position to the right of the bottom of the door. The indoor antenna is in a vertical upright position with the top portion of the indoor antenna engaged in the omni antenna receptacle 1205. The portable indoor antenna mounting adapter 1200 is hooked onto the top edge of the door. This view 1200C demonstrates how the indoor antenna may be used indoors with a non-penetrating portable and temporary mount.

Figure 13:
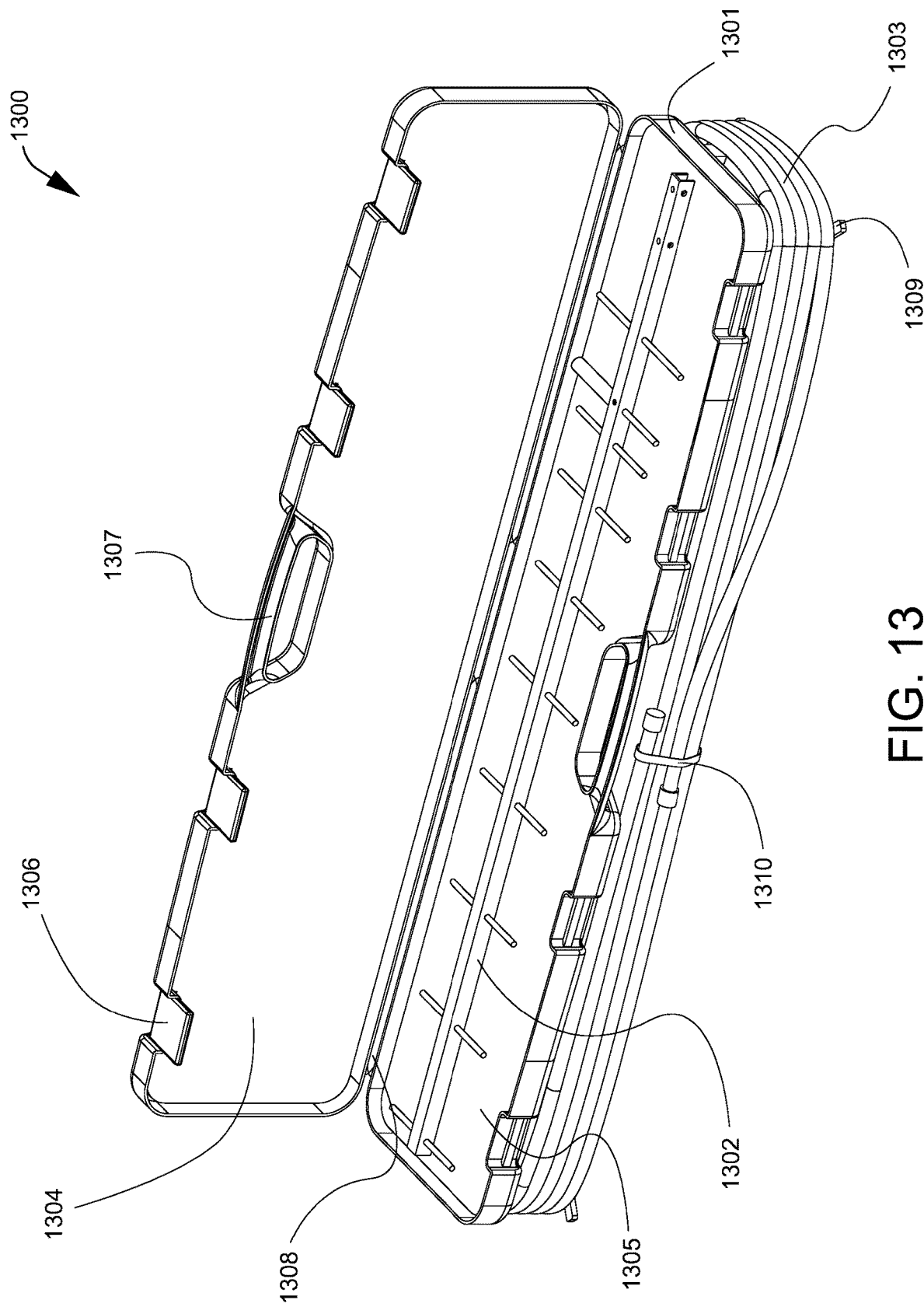
FIG. 13 is a view of the optional outdoor antenna kit.

FIG. 13 is a view 1300 of the optional outdoor antenna kit. The optional outdoor antenna kit 1300 includes a case 1301 which houses an outdoor antenna 1302. The optional door antenna kit case 1301 includes a door and a bottom case portion. Both the inside of the bottom case portion has padding 1305 and the inside of the door has padding 1304. The door and the bottom case portion of the optional antenna kit case 1301 are separated by a hinge 1308. The door of the case includes a locking mechanism in the form of a latch 1306. A handle 1307 is located in the central top edge of the door and in central portion of the case so that the when the door is closed the two handles are aligned. Cable 1303 is wound around the outer periphery of the bottom case portion. Four cable winding posts and feet 1309 are located at a bottom portion of the case to engage the ground or other resting surface and provide locations around which the cable can be wound (only two posts and feet 1309 are visible in this view). A cable retention strap 1310 is used to secure the cables together.

The optional outdoor antenna kit 1300 provides a secure way to transport a directional outdoor antenna and cable in an orientation that can be easily stored and transported and quickly deployed. The directional antenna may be secured in an internal cavity surrounded by padding and the cable is secured around the case providing storage that is easy to access and carry.

FIG. 13A is a top view 1300A of the optional outdoor antenna kit. A view of the case 1301 is illustrated from the top in closed position. The wound cable 1303 surrounds the periphery of the outdoor antenna kit and protrudes slightly on the short sides of the antenna kit. A latch 1306 is used to secure the door of the case in a closed position. A handle 1307 in a central position on one side can be engaged by hand to allow one person to carry the case.

FIG. 13B is a front view 1300B of the optional outdoor antenna kit. The latches 1306 extend in a downward vertical position. The outdoor antenna kit rests on the antenna at the bottom of the antenna kit. The handle 1307 is attached to the antenna kit in two places in the front of the antenna kit case.

FIG. 13C is a bottom view 1300C of the optional outdoor antenna kit. The case 1301 has a cable 1303 surrounding the perimeter of its bottom surface. The cable retention strap 1310 secures the cable in place against the optional outdoor antenna kit case 1301.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

REFERENCE NUMERALS

100 Portable amplifier kit and portable antenna kit
100A Portable antenna kit
100B Portable antenna kit cutaway view
100C Top view of portable outdoor antenna kit and cable organizer
100D Cable organizer detail
100E Portable antenna kit removed from bag, side view
100F Portable antenna kit removed from bag, alternate side view
100G Portable antenna kit, outdoor antenna aimed
100H Portable antenna kit, portable amplifier connected
100I Indoor and outdoor antennas, examples
100J Portable antenna kit, outdoor antenna raised
100J Portable antenna kit, outdoor antenna raised
100J Portable antenna kit, outdoor antenna raised
100J Portable antenna kit, outdoor antenna raised
100J Portable antenna kit, outdoor antenna raised
100K Portable amplifier kit with indoor antenna
100L Portable amplifier case
100M Portable amplifier kit, alternate implementations
100N Portable amplifier kit internal details
100O Portable amplifier kit internal details, alternate view
100P Portable amplifier kit internal details, alternate view
100Q Portable amplifier kit internal details, alternate view
100R Alternate portable amplifier kit, internal details
100S Alternate portable amplifier kit, internal details, alternate view
100T Alternate portable amplifier kit, internal details, rear view
100U Alternate portable amplifier kit, internal details, alternate front view
100V Block diagram of portable amplifier kit
101 Portable amplifier kit
101A Latch, portable amplifier case
101A Latch, portable amplifier case
101A Latch, portable amplifier case
101B Latch, portable amplifier case
101B Latch, portable amplifier case
101B Latch, portable amplifier case
101C Wheel, portable amplifier case
101C Wheel, portable amplifier case
101C Wheel, portable amplifier case
101D Door, portable amplifier case
101D Door, portable amplifier case
101D Door, portable amplifier case
101D Door, portable amplifier case
101D Door, portable amplifier case
101D Door, portable amplifier case
101G Seal, portable amplifier case
101H Housing, portable amplifier case
101H Housing, portable amplifier case
101H Housing, portable amplifier case
101H Housing, portable amplifier case
101K Controller with cover
101K Controller with cover
101K Controller with cover
101L Rib, portable amplifier case
101S Ancillary energy subsystem connector
101SS Primary energy subsystem connector
101SS Primary energy subsystem connector
101SS Primary energy subsystem connector
101V Vent, portable amplifier case 101V Vent, portable amplifier case
101V Vent, portable amplifier case
101V Vent, portable amplifier case
101W Wheel well, portable amplifier case
101W Wheel well, portable amplifier case
102 Portable antenna kit
103A Sliding handle
103A Sliding handle
103A Sliding handle
103B Side handle
103B Side handle
103B Side handle
104 Indoor antenna connector port
104A Indoor antenna connector port
105 Outdoor antenna connector port
105A Outdoor antenna connector port
106 Power switch
107 Status light
108 Top handle
109 AC/DC output connector
109A AC/DC input connector
110 Zipper
111 Portable antenna kit handle
112 Portable antenna kit handle
120 Portable antenna kit tripod
121 Outdoor antenna cable
121A Outdoor antenna connector
121B Indoor antenna cable, short segment
121C Indoor antenna cable retainer clamp
121D Outdoor antenna cable, long version
122 Outdoor Antenna
122A Vertical elements, outdoor antenna
123 Tripod
123A Adjustor for tripod legs
123B Adjuster for telescoping section 1
123C Adjuster for telescoping section 2
123D Tripod leg
123E Tripod leg
123F Tripod leg
124A End portion of cable organizer
124B Alternate end portion of cable organizer
124C End portion of cable organizer protrusion, upper left
124D End portion of cable organizer protrusion, upper right
124E End portion of cable organizer protrusion, lower left
124F End portion of cable organizer protrusion, lower right
124R Rubber foot
124R Rubber foot
125 Spine of cable organizer
126 Lower cable organizer mount spacer block
126A Lower cable organizer mount spacer block clamp
127 Upper cable organizer mount spacer block
127A Upper cable organizer mount spacer block clamp
128 Cable organizer spacer block brace
129 Outdoor antenna mount spacer block
129 Outdoor antenna mount spacer block
129A Outdoor antenna clip
129B Outdoor antenna mount spacer block clamp
130 Cable retention strap, upper
130A Cable retention strap pin, upper
130B Cable retention strap, lower
130D Cable retention strap pin, lower
131 Indoor antenna clip
131A Indoor antenna connector clip
131B Omni-directional antenna clip
131B Indoor antenna clip, second
132 Indoor antenna cable, long segment
132A Indoor antenna, pigtail cable
132B Indoor antenna, pigtail cable connector
132C Indoor antenna cable, long segment, connector
132D Indoor antenna cable, long segment, lanyard
133 Indoor antenna
133A indoor antenna, base
133B Indoor antenna, optional mount
133C indoor antenna, cap
133D indoor antenna, lanyard cable
133E indoor antenna, lanyard cable coupling
134 Dual ball joint, outdoor antenna mount
134A Adjuster, outdoor antenna mount
134B tripod clamp, outdoor antenna mount
134C Outdoor antenna to dual ball joint mounting flange
135 Tripod main telescoping section
135A Tripod, telescoping section 2
140 Battery module docking location
140A Battery module docking location (Clearance for power conversion I/O connector)
140B Battery energy module
140C Battery module electrical connections
140P Power conversion I/O connector
140PP Power conversion module
140R Energy subsystem rack
141 Bidirectional amplifier
141A Bidirectional amplifier, outdoor cable
141B Bidirectional amplifier
141C Bidirectional amplifier, indoor cable
141D Bidirectional amplifier, outdoor cable
170 Portable amplifier internal main mounting plate
171A AC/DC conversion module for AC input
171B DC/DC conversion module for DC input
171C DC/AC inverter module, bi-directional amplifier power
171D DC/AC inverter module, convenience AC output power
172 Energy subsystem rack interface
172A Controller, AC/DC conversion module for AC input
172B Controller, DC/DC conversion module for DC input
172C Controller, DC/AC inverter module, bi-directional amplifier power
172D Controller, DC/AC inverter module, convenience AC output power
173 Electrical terminals, amplifier kit I/O interconnections
173A Electrical terminals, amplifier kit I/O interconnections
174 Electrical terminals, bi-directional amplifier interconnections
174A Electrical terminals, bi-directional amplifier interconnections
175 Electrical terminals, power I/O interconnections
175A Electrical terminals, power I/O interconnections
176 Management gateway computer
177 IP management network
200 Flow chart, method for deploying portable radio coverage system
201 Arrive at scene with portable coverage system
202 Select tentative location for outdoor antenna
203 Perform check using portable radio
204 Check good?
205 Try alternate outdoor location
206 Lay portable antenna kit aimed at structure entry
207 Extend tripod legs
208 Stand tripod upright—cable organizer aimed at structure entry
209 Orient grid map at tripod base
210 Remove top and bottom cable retention straps
211 Aim donor antenna at selected radio site
212 Place portable amplifier near tripod base 213 Connect donor antenna cable to amplifier outdoor antenna port
214 Connect indoor antenna cable to amplifier indoor antenna port
215 Push and hold amplifier power button for >2 sec for delayed startup
216 Pull indoor antenna from clips and proceed into structure
217 Optional—extend indoor antenna cable with additional cable segments
218 Optional—insert extended antenna kit and continue further into structur
219 Position indoor antenna near center of work area
300 Regional radio system grid map
300A Flow chart, method for aiming outdoor antenna
301 North direction indicator
301A Establish latitude and longitude of location 302
302 Location of site requiring radio coverage enhancement
302A Indicate location 302 on map 300
303 Preferred radio system site location
303A Determine north direction 301
304 Alternate radio system site location
304A Determine preferred radio site 303
305 Alternate radio system site location
305A Place map 300 with north aligned beneath tripod 100G
306 Alternate radio system site location
306A Aim antenna 122 along location to site direction 311
307 Alternate radio system site location
307A Assure antenna elements 122A are correctly oriented (e.g. vertical)
308 County region
308A Deploy and enable balance of coverage system
309 Longitude indications
309A Perform check using portable radio
310 Latitude indications
310A Check good?
311 Direction to aim outdoor antenna
311A System is providing coverage
312A Determine alternate radio site (e.g. 304
400 Typical system deployment for building coverage enhancement
400A Typical system deployment for building coverage enhancement, closer view
400B Enlarged view of portable antenna and amplifier kits deployed by building
400C Cut away view of cable routing from antenna kit to indoor antenna coverage location
400D Indoor antenna location at fourth floor of building
401 Building
402 Ground
403 Roof
404 Interior doorway seen through window
405 Windows
407 Ground floor
408 Second floor
409 Third floor
410 Fourth floor
411 Fifth floor
412 Sixth floor
413 Seventh floor
414 Roof access door
415 Main entrance door
416 Stairwell wall
417 Stairs
418 Upwards direction
419 Exterior wall
420 Midfloor landing
421 Stairwell doorway
500 Vehicle born portable radio enhancement system
500A Vehicle born portable radio enhancement system, close up view
500B Portable antenna kit mounted on emergency response vehicle
500C Portable amplifier kit mounted on emergency response vehicle
500D Vehicle born portable radio enhancement system, deployed
501 Emergency response vehicle
502 Portable amplifier kit bin
503 Portable amplifier kit retention strap
504 Portable antenna kit retention strap
505 Cable clamps
506 Rotating portable antenna kit mounting platform
520 Cable deploying from cable organizer
600 Schematic representation of hybrid system with standard interface box
601 Standard building interface box
600A Schematic representation of hybrid system with portable amplifier kit connected
600B Standard building interface box, front view, door closed
600C Standard building interface box, front view, door open
600D Standard building interface box, front view, door open, jumper removed
600E Standard building interface box, cut away front view
600F Standard building interface box, rear view
600G Standard building interface box, rear view, conduit mounted outdoor antenna
600H Hybrid system with standard interface box, exterior view
600I Hybrid system with standard interface box, cut away view
600J Hybrid system using non-penetrating roof mount for outdoor antenna
600K Standard building interface box with portable amplifier attached
600L Standard building interface box, full built in example
600M Standard building interface box, full built in, jumpers removed
600N Standard building interface box, full built in example, rear view
602 Lock
603 Outdoor antenna, rear port, standard building interface box
604 Indoor antenna, rear port, standard building interface box
605 Earth ground cable
606 Earth ground stake
609 Cable, indoor antenna
610 Cable, outdoor antenna
611 Outdoor antenna to amplifier cable
612 Indoor antenna to amplifier cable
614 Mounting flange, standard building interface box
615 Conduit option to outdoor antenna
616 Jumper cable
617 Indoor antenna, front port, standard building interface box
617B Standard building interface box, rear exterior wall
618 Outdoor antenna, front port, standard building interface box
619 Connector mounting panel
620 Literature pocket
621 Door, standard building interface box
622 Built in outdoor antenna 624 Surge suppressor
625 Mounting and grounding bracket for surge suppressor
626 Cable, outdoor front port to surge suppressor
627 Cable, surge suppressor to outdoor rear port
628 Cable, indoor front port to indoor rear port
629 Top of standard building interface box
630 Earth ground stud
631 Indoor Antenna System
632 Outdoor Antenna System
633 Built in indoor antenna
634 Outdoor antenna mount
635 Waterproof safety ground
636 Power and control system
637 Power path to bi-directional amplifier
638 Waterproof RF connection
640 Ceiling
651 Jumper, built in indoor antenna front port to built in booster indoor antenna front port
652 Jumper, built in outdoor antenna front port to built in booster outdoor antenna front port
662 Built in booster outdoor antenna front port
662A Built in booster outdoor antenna rear port
663 Built in booster indoor antenna front port
663A Built in booster indoor antenna rear port
670 Hinge
671 Door retaining latch
690 Concrete blocks
691 Non-penetrating roof stand
692 Non-penetrating roof stand base
700 Table of preparedness strategies and deployment configurations
800A Schematic view, typical portable enhancement
800B Schematic view, typical vehicle mounted portable enhancement
800C Portable enhancement with extension antenna kit
800D Portable enhancement, extension cable, specially indoor antenna
800E Typical hybrid system with portable amplifier kit
800F Hybrid system with portable amplifier kit bypassing failed built in antenna
800G Full built in system utilizing standard building interface box
800H Full built in system bypassing failed antenna and amplifier
800I Portable deployment utilizing extension antenna kit
801 Building
803 Radio site
804 Portable amplifier kit
805 Portable outdoor antenna
805A Outdoor antenna cable
805B Outdoor antenna amplifier port
806 Portable indoor antenna
807 Indoor antenna cable, long segment
807A Indoor antenna amplifier port
808 Emergency response vehicle
809 Portable extension antenna stand
810 Extension antenna selection switch
811 Extension indoor antenna
812 Extension cable
813 Cable coupler
814 Specialty portable extension antenna
815 Standard building interface box
816 Indoor antenna port cable
816A Standard building interface indoor antenna front port
817 Outdoor antenna port cable
817A Standard building interface outdoor antenna front port
818 Built in outdoor antenna
819 Built in indoor antenna
820 Four port standard building interface box
821 Jumper, built in outdoor antenna front port to built in booster outdoor antenna front port
821A Built in booster outdoor antenna front port
822 Jumper, built in indoor antenna front port to built in booster indoor antenna front port
822A Built in booster indoor antenna front port
900A Gain map, no treatment, downlink
900B Gain map, portable treatment, downlink
900C Gain map, portable treatment, uplink
900D Gain map, no treatment, downlink, alternate scenario
900E Gain map, hybrid system, passive configuration, downlink
900F Gain map, hybrid system, portable amplifier configuration, downlink
900G Gain map, hybrid system, passive configuration, uplink
900H Gain map, hybrid system, portable amplifier configuration, uplink
900I Gain map, portable system, extended antenna, downlink
901A 901 Output power
901B 901 Output power
901E 901 Output power
901F 901 Output power
901I 901 Output power
901 Radio site transmitter 905A Power after 905
905AA Gain/Loss attributable to 905
905B Power after 905
905BB Gain/Loss attributable to 905
905C Power after 905
905CC Gain/Loss attributable to 905
905D Power after 905
905DD Gain/Loss attributable to 905
905E Power after 905
905EE Gain/Loss attributable to 905
905F Power after 905
905FF Gain/Loss attributable to 905
905O Power after 905
905GG Gain/Loss attributable to 905
905H Power after 905
905HH Gain/Loss attributable to 905
905I Power after 905
905II Gain/Loss attributable to 905
905 Free space from transmitter to building (Free space from 910 to radio site)
906 Building
906A Power after 906
906AA Gain/Loss attributable to 906
906D Power after 906
906DD Gain/Loss attributable to 906
910 Portable donor outdoor antenna
910B 910 power
910BB Gain/Loss attributable to 910
910C 910 power
910CC Gain/Loss attributable to 910
910D 901 Output power
910E 910 power
910EE Gain/Loss attributable to 910
910F 910 power
910FF Gain/Loss attributable to 910
910G 910 power
910GG Gain/Loss attributable to 910
910H 910 power
910HH Gain/Loss attributable to 910
910I 910 power 910II Gain/Loss attributable to 910
915 Cable
915B Power after 915
915BB Gain/Loss attributable to 915
915C Power after 915
915CC Gain/Loss attributable to 915
915E Power after 915
915EE Gain/Loss attributable to 915
915F Power after 915
915FF Gain/Loss attributable to 915
915G Power after 95
915GG Gain/Loss attributable to 915
915H Power after 915
915HH Gain/Loss attributable to 915
915I Power after 915
915II Gain/Loss attributable to 915
920 Portable amplifier
920B Power after 920
920BB Gain/Loss attributable to 920
920C Power after 920
920CC Gain/Loss attributable to 920
920F Power after 920
920FF Gain/Loss attributable to 920
920H Power after 920
920HH Gain/Loss attributable to 920
920I Power after 920
920II Gain/Loss attributable to 920
921E Power after 921
921EE Gain/Loss attributable to 921
921G Power after 921
921GG Gain/Loss attributable to 921
925 Cable
925B Power after 925
925BB Gain/Loss attributable to 925
925C Power after 925
925CC Gain/Loss attributable to 925
925E Power after 925
925EE Gain/Loss attributable to 925
925F Power after 925
925FF Gain/Loss attributable to 925
925G Power after 925
925GG Gain/Loss attributable to 925
925H Power after 925
925HH Gain/Loss attributable to 925
925I Power after 925
925II Gain/Loss attributable to 925
930 Coupler 1 port
930I Power after 930
930II Gain/Loss attributable to 930
931 Coupler 2 port
931I Power after 931
931II Gain/Loss attributable to 931
935 Cable
935I Power after 935
935II Gain/Loss attributable to 935
936 Cable
936I Power after 936
936II Gain/Loss attributable to 936
940 Portable indoor antenna
940B 940 power
940BB Gain/Loss attributable to 940
940C 940 power
940CC Gain/Loss attributable to 940
940E 940 power
940EE Gain/Loss attributable to 940
940F 940 power
940FF Gain/Loss attributable to 940

940G 940 power
940GG Gain/Loss attributable to 940
940H 940 power
940HH Gain/Loss attributable to 940
940I 940 power
940II Gain/Loss attributable to 940
941I 941 power
941II Gain/Loss attributable to 941
945 Free space from indoor to portable
945B Power after 945
945BB Gain/Loss attributable to 945
945C Power after 945
945CC Gain/Loss attributable to 945
945E Power after 945
945EE Gain/Loss attributable to 945
945F Power after 945
945FF Gain/Loss attributable to 945
945G Power after 945
945GG Gain/Loss attributable to 945
945H Power after 945
945HH Gain/Loss attributable to 945
945I Power after 945
945II Gain/Loss attributable to 945
946 Free space from indoor to portable
946I Power after 946
946II Gain/Loss attributable to 946
950 Portable radio receiver
950C 950 Output power
950G 950 Output power
950H 950 Output power
951 Portable radio receiver
960 Portable kit
1000 Portable extended antenna kit out of bag
1000A Portable extended antenna kit close up
1000B Portable extended antenna kit cable organizer detail, rear view
1000C Portable extended antenna kit cable organizer detail, deployed
1000D Portable extended antenna kit deployed
1000E Portable extended antenna kit deployed, alternate view
1002 Telescoping mast
1003A Tripod leg
1003A Tripod leg
1003A Tripod leg
1003B Tripod leg
1003B Tripod leg
1003C Tripod leg
1004 Leg brace
1004 Leg brace
1004 Leg brace
1005 Extension antenna selection switch
1006 Extension antenna selection switch actuator
1007 Terminator
1008 Extension indoor antenna
1009 Cable input to extension antenna kit
1010 Long extension cable, short segment
1011 Telescoping mast adjuster
1012 Replaceable rubber foot
1013 Extension indoor antenna cable
1014 Extension switch to directional coupler connecting cable
1015 Extension indoor antenna switch connection
1020 Extension indoor antenna pigtail
1021 Cable retention strap pin
1022 Cable retention strap
1023 Directional coupler 1024 Directional coupler mounting shelf
1025 Long extension cable, long segment
1100 Portable extension cable reel
1101 Cable
1103 Wheel
1104 Cable first end
1105 Cable second end
1106 Frame
1107 Spool end
1200 Portable indoor antenna mounting adapter
1200A Portable indoor antenna mounting adapter, hook deployed
1200A Portable indoor antenna mounting adapter, hook deployed
1200B Portable indoor antenna mounting adapter with antenna
1200C Portable indoor antenna mounting adapter with antenna deployed
1201 Base
1201 Base
1201 Base
1202 Base utility mounting holes
1203 Hook utility mounting holes
1204 Hook
1205 Omni antenna receptacle
1209 Hook pivot
1220 Door
1220A Top edge of door
1300 Optional antenna kit
1300A Optional antenna kit, top view
1300B Optional antenna kit, front view
1300C Optional antenna kit, bottom view
1301 Case
1302 Antenna
1303 Cable
1304 Padding
1305 Padding
1306 Latch
1307 Handle
1308 Hinge
1309 Cable winding post and foot
1310 Cable retention strap Those skilled in the art will recognize that the invention has been set forth by way of example only and that changes may be made to the invention without departing from the spirit and scope of the appended claims.

The invention claimed is:

1. A method for using a portable wireless communication device on a regional communications system in a wireless-communication dead zone or other area having a wireless-communication deficit comprising the steps of:
    setting up a portable donor antenna in a first location having access to an RF signal from said regional communications system;
    using a first coaxial cable to connect said portable donor antenna to an outdoor antenna port of a portable bi-directional amplifier kit;
    using a second coaxial cable to connect a portable server antenna to an indoor antenna port of said portable bi-directional amplifier kit;
    positioning said portable server antenna at a second location within said wireless-communication dead zone or other area having a wireless-communication deficit;
    activating a power switch causing said portable bi-directional amplifier kit to begin operating with power from a portable battery;
    receiving an RF downlink signal from said regional communications system using said portable donor antenna;
    conducting said RF downlink signal via said first coaxial cable to said outdoor antenna port of said portable bi-directional amplifier kit;
    producing an amplified RF downlink signal from said RF downlink signal via a first gain of said portable bi-directional amplifier kit;
    delivering said amplified RF downlink signal to said indoor antenna port of said portable bi-directional amplifier kit;
    conducting said amplified RF downlink signal via said second coaxial cable to said portable server antenna positioned in said wireless-communication dead zone or other area having a wireless-communication deficit;
    transmitting said amplified RF downlink signal from said portable server antenna to said portable wireless communication device within said wireless-communication dead zone or other area having a wireless-communication deficit;
    receiving an RF uplink signal from said portable wireless communication device within said wireless-communication dead zone or other area having a wireless-communication deficit using said portable server antenna;
    conducting said RF uplink signal via said second coaxial cable to said indoor antenna port of said portable bi-directional amplifier kit;
    producing an amplified RF uplink signal from said RF uplink signal via a second gain of said portable bi-directional amplifier kit;
    delivering said amplified RF uplink signal to said outdoor antenna port of said portable bi-directional amplifier kit;
    conducting said amplified RF uplink signal via said first coaxial cable to said portable donor antenna, and transmitting said amplified RF uplink signal from said portable donor antenna to said regional communications system.

2. A method for using a portable wireless communication device on a regional communications system in a wireless-communication dead zone or other area having a wireless-communication deficit as claimed in claim 1 further comprising the step of:
    automatically adjusting said first gain using an AGC function of said portable bi-directional amplifier kit.

3. A method for using a portable wireless communication device on a regional communications system in a wireless-communication dead zone or other area having a wireless-communication deficit as claimed in claim 1 further comprising the step of:
    automatically adjusting said second gain using an AGC function of said portable bi-directional amplifier kit.

4. A method for using a portable wireless communication device on a regional communications system in a wireless-communication dead zone or other area having a wireless-communication deficit as claimed in claim 1 further comprising the step of:
    manually adjusting said first gain using a manual gain control function of said portable bi-directional amplifier kit.

5. A method for using a portable wireless communication device on a regional communications system in a wireless-communication dead zone or other area having a wireless-communication deficit as claimed in claim 1 further comprising the step of:

manually adjusting said second gain using a manual gain control function of said portable bi-directional amplifier kit.

6. A method for using a portable wireless communication device on a regional communications system in a wireless-communication dead zone or other area having a wireless-communication deficit as claimed in claim 1 wherein said portable battery is a rechargeable battery.

7. A method for using a portable wireless communication device on a regional communications system in a wireless-communication dead zone or other area having a wireless-communication deficit as claimed in claim 6 wherein said rechargeable battery is a lithium ion battery.

8. A method for using a portable wireless communication device on a regional communications system in a wireless-communication dead zone or other area having a wireless-communication deficit as claimed in claim 1 further comprising the step of:
flashing using a controller a light of said portable bi-directional amplifier kit in a pattern determined by the state of charge of said portable battery.

9. A method for using a portable wireless communication device on a regional communications system in a wireless-communication dead zone or other area having a wireless-communication deficit as claimed in claim 1 further comprising the step of:
flashing using a controller a light of said portable bi-directional amplifier kit in a pattern determined by an error state of said portable bi-directional amplifier kit.

10. A method for using a portable wireless communication device on a regional communications system in a wireless-communication dead zone or other area having a wireless-communication deficit as claimed in claim 6 further comprising the step of:
charging said rechargeable battery with a battery charger embedded in said portable bi-directional amplifier kit.

11. A method for using a portable wireless communication device on a regional communications system in a wireless-communication dead zone or other area having a wireless-communication deficit as claimed in claim 6 further comprising the step of:
charging said rechargeable battery with battery charger external to said portable bi-directional amplifier kit.

12. A method for using a portable wireless communication device on a regional communications system in a wireless-communication dead zone or other area having a wireless-communication deficit as claimed in claim 1 wherein said portable wireless communication device is a portable public safety radio.

13. A method for using a portable wireless communication device on a regional communications system in a wireless-communication dead zone or other area having a wireless-communication deficit as claimed in claim 1 wherein said portable wireless communication device is a cellular phone.

14. A method for using a portable wireless communication device on a regional communications system in a wireless-communication dead zone or other area having a wireless-communication deficit as claimed in claim 1 wherein said regional communications system is a public safety trunked radio system.

15. A method for using a portable wireless communication device on a regional communications system in a wireless-communication dead zone or other area having a wireless-communication deficit as claimed in claim 1 wherein said wireless-communication dead zone or other area having a wireless-communication deficit is a building.

16. A method for using a portable wireless communication device on a regional communications system in a wireless-communication dead zone or other area having a wireless-communication deficit as claimed in claim 1 wherein said wireless-communication dead zone or other area having a wireless-communication deficit is a tunnel.

17. A method for using a portable wireless communication device on a regional communications system in a wireless-communication dead zone or other area having a wireless-communication deficit as claimed in claim 1 wherein said wireless-communication dead zone or other area having a wireless-communication deficit is a ship.

18. A method for using a portable wireless communication device on a regional communications system in a wireless-communication dead zone or other area having a wireless-communication deficit as claimed in claim 1 wherein said wireless-communication dead zone or other area having a wireless-communication deficit is a storage container.

19. A method for using a portable wireless communication device on a regional communications system in a wireless-communication dead zone or other area having a wireless-communication deficit as claimed in claim 1 wherein said portable battery further comprises a plurality of quick-disconnect battery packs and further comprising the steps of:
removing one of said plurality of said quick-disconnect battery packs from said portable battery, and
replacing said removed quick-disconnect battery pack with a replacement quick-disconnect battery pack.

20. A method for using a portable wireless communication device on a regional communications system in a wireless-communication dead zone or other area having a wireless-communication deficit comprising the steps of:
using a fixed donor antenna in a first location having access to an RF signal from said regional communications system;
using a first cable system to connect said fixed donor antenna to a first side of a first antenna port of an RF signal interface system;
using a second cable system to connect a fixed server antenna positioned within said wireless-communication dead zone or other area having a wireless-communication deficit to a first side of a second antenna port of said RF signal interface system;
connecting using a third cable system an outdoor antenna port of a portable bi-directional amplifier to a second side of said first antenna port of said RF signal interface system;
connecting using a fourth cable system an indoor antenna port of said portable bi-directional amplifier to a second side of said second antenna port of said RF signal interface system;
activating a power switch causing said portable bi-directional amplifier to begin operating with power from a portable battery;
receiving an RF downlink signal from said regional communications system using said fixed donor antenna;
conducting said RF downlink signal via said first cable system to said first side of said first antenna port of said RF signal interface system, therefrom to said second side of said first antenna port of said RF signal interface system, therefrom via said third cable system to said outdoor antenna port of said portable bi-directional amplifier;

producing an amplified RF downlink signal from said RF downlink signal via a first gain of said portable bi-directional amplifier;

conducting said amplified RF downlink signal to said indoor antenna port of said portable bi-directional amplifier, therefrom via said fourth cable system to said second side of said second antenna port of said RF signal interface system, therefrom to said first side of said second antenna port of said RF signal interface system, therefrom via said second cable system to said fixed server antenna positioned within said wireless-communication dead zone or other area having a wireless-communication deficit;

transmitting said amplified RF downlink signal from said fixed server antenna to said portable wireless communication device within said wireless-communication dead zone or other area having a wireless-communication deficit;

receiving an RF uplink signal from said portable wireless communication device within said wireless-communication dead zone or other area having a wireless-communication deficit using said fixed server antenna;

conducting said RF uplink signal via said second cable system to said first side of said second antenna port of said RF signal interface system, therefrom to said second side of said second antenna port of said RF signal interface system, therefrom via said fourth cable system to said indoor antenna port of said portable bi-directional amplifier;

producing an amplified RF uplink signal from said RF uplink signal via a second gain of said portable bi-directional amplifier;

conducting said amplified RF uplink signal to said outdoor antenna port of said portable bi-directional amplifier, therefrom via said third cable system to said second side of said first antenna port of said RF signal interface system, therefrom to said first side of said first antenna port of said RF signal interface system, therefrom via said first cable system to said fixed donor antenna in said first location having access to said RF signal from said regional communications system, and transmitting said amplified RF uplink signal from said fixed donor antenna to said regional communications system.

21. A method for using a portable wireless communication device on a regional communications system in a wireless-communication dead zone or other area having a wireless-communication deficit as claimed in claim 20 wherein said portable battery is a rechargeable battery further comprising the step of:

charging said rechargeable battery with a portable battery charger embedded with said portable bi-directional amplifier.

\* \* \* \* \*